United States Patent [19]
Katayama et al.

[11] Patent Number: 5,933,528
[45] Date of Patent: Aug. 3, 1999

[54] IMAGE PROCESSING APPARATUS

[75] Inventors: Akihiro Katayama; Yoshihiro Ishida; Junichi Yamakawa, all of Kawasaki, Japan

[73] Assignee: Canon Kabushiki Kaisha, Tokyo, Japan

[21] Appl. No.: 08/009,901

[22] Filed: Jan. 26, 1993

[30] Foreign Application Priority Data

| Jan. 27, 1992 | [JP] | Japan | 4-012014 |
| Jun. 26, 1992 | [JP] | Japan | 4-169582 |

[51] Int. Cl.⁶ ..................... G06K 9/48
[52] U.S. Cl. ................ 382/197; 382/199; 382/266
[58] Field of Search ............... 382/22, 21, 41, 382/44, 199, 200, 197, 276, 266, 269; 358/447

[56] References Cited

U.S. PATENT DOCUMENTS

| 4,545,067 | 10/1985 | Juvin et al. | 382/21 |
| 4,566,124 | 1/1986 | Yamamoto et al. | 382/21 |
| 4,628,532 | 12/1986 | Stone et al. | 382/21 |
| 5,007,098 | 4/1991 | Kumagai | 382/22 |
| 5,093,870 | 3/1992 | Watanabe | 382/47 |
| 5,197,108 | 3/1993 | Watanabe | 382/22 |
| 5,214,718 | 5/1993 | Khosla | 382/21 |

FOREIGN PATENT DOCUMENTS

| 482862 | 4/1992 | European Pat. Off. | G06F 15/62 |
| 63-36483 | 2/1988 | Japan . | |
| 4-157578 | 5/1992 | Japan | G06F 15/70 |
| 2201562 | 9/1988 | United Kingdom | H04N 1/41 |

OTHER PUBLICATIONS

Computer Vision, Graphics & Image Processing, vol. 28, No. 1, Oct. 1984, pp. 109–125, David Capson, "An Improved Algorithm For Sequential Extraction of Boundaries From a Raster Scan".

Computer Vision, Graphics & Image Processing, vol. 38, No. 3, Jun. 1987, pp. 229–257, Lunscher WHHJ & Beddoes MP, "Fast Binary—Image Boundary Extraction".

*Primary Examiner*—Joseph Mancuso
*Attorney, Agent, or Firm*—Fitzpatrick, Cella, Harper & Scinto

[57] ABSTRACT

An image processing apparatus of this invention reads raster-scanning type binary image data, and causes an outline extraction unit to extract outline vectors of an image. When a white raster detection unit detects that one raster data consists of all white pixels, it supplies the detection result to the outline extraction unit. Upon reception of this detection result, the outline extraction unit outputs the outline vectors extracted so far as a group of data to an outline smoothing & enlarging/compressing unit as a processing unit for executing outline smoothing processing or enlarging/compressing processing. In this manner, since this invention processes an image as a group of data divided in units of white rasters, advantages such as a decrease in required memory capacity can be expected.

21 Claims, 96 Drawing Sheets

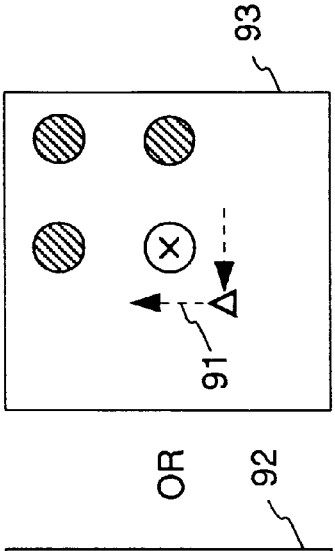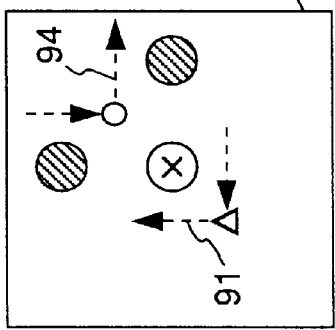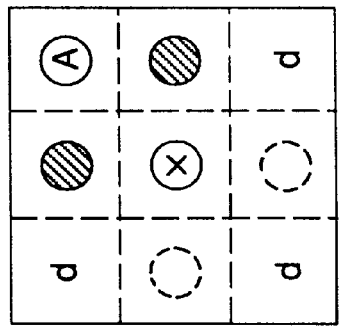
CASE 3
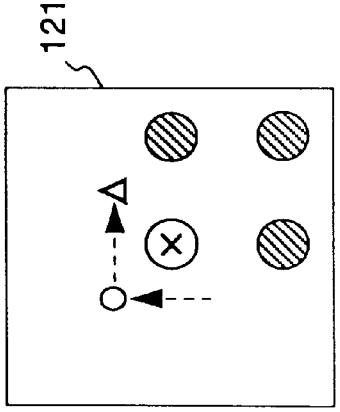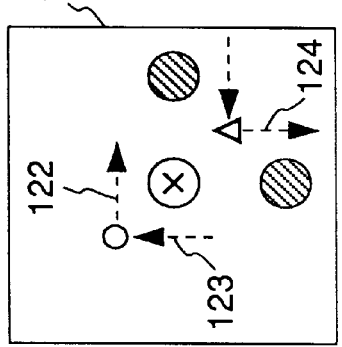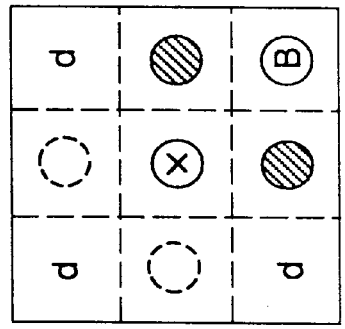
CASE 6

FIG. 7A  FIG. 7B
CASE 4
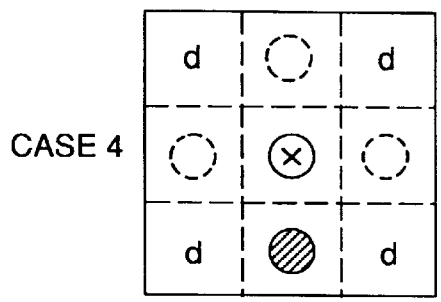 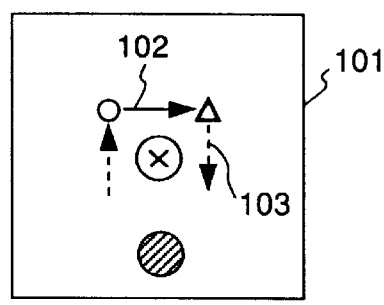
FIG. 8A  FIG. 8B
CASE 5
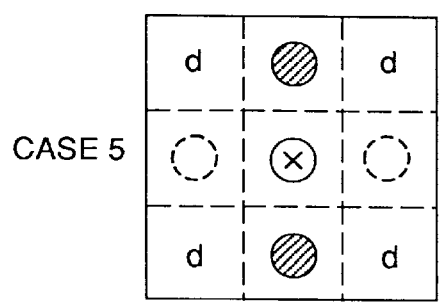 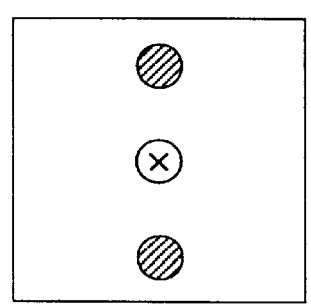
FIG. 11A  FIG. 11B
CASE 8
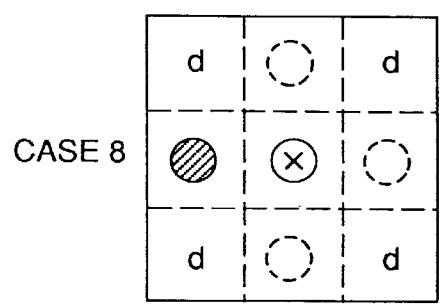 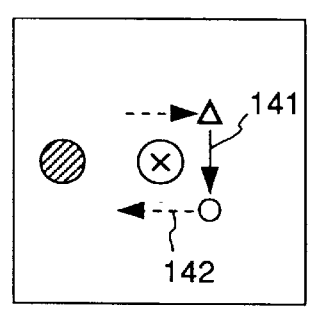
FIG. 13A  FIG. 13B
CASE 10
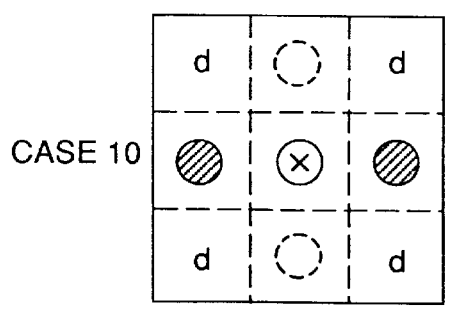 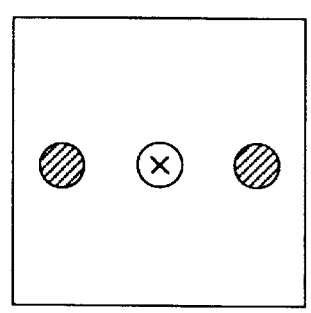

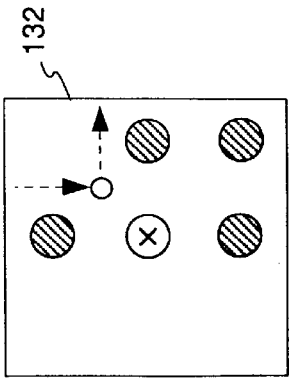
FIG. 10D
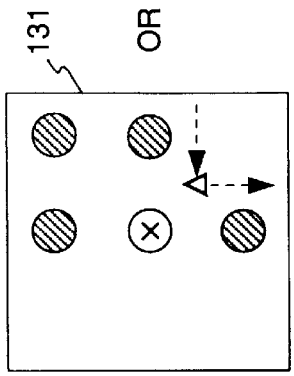
FIG. 10C
OR
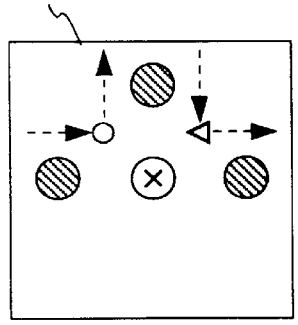
FIG. 10B
OR
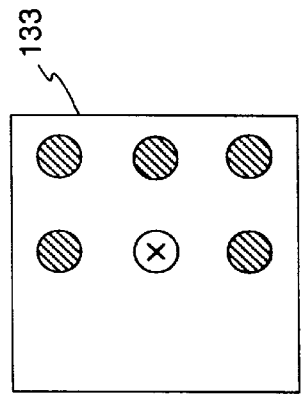
FIG. 10E
OR
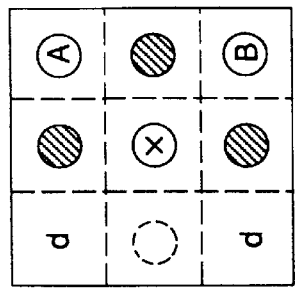
FIG. 10A
CASE 7

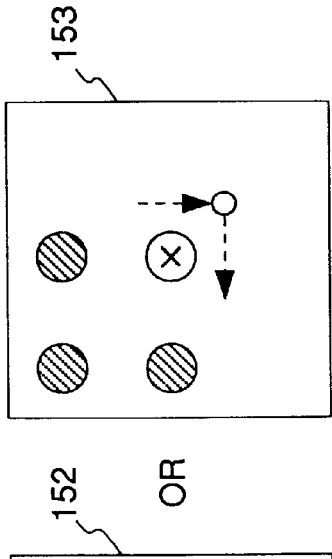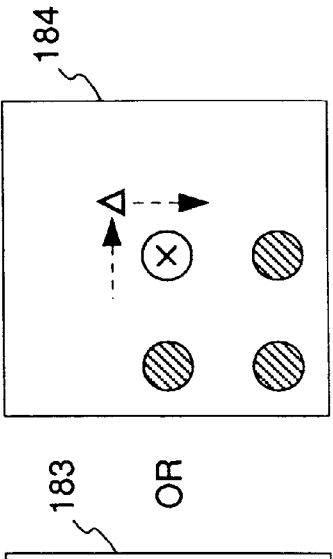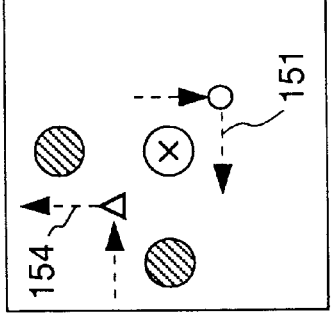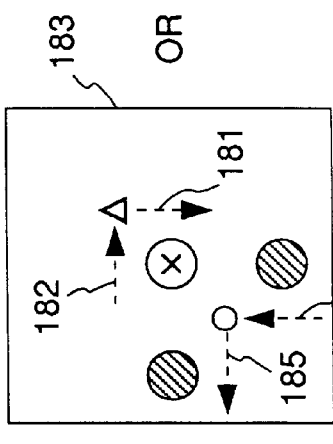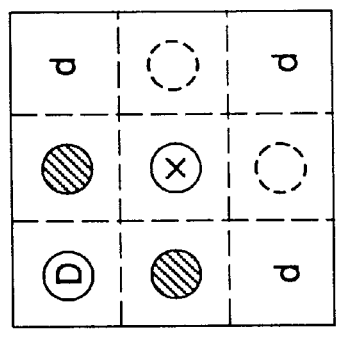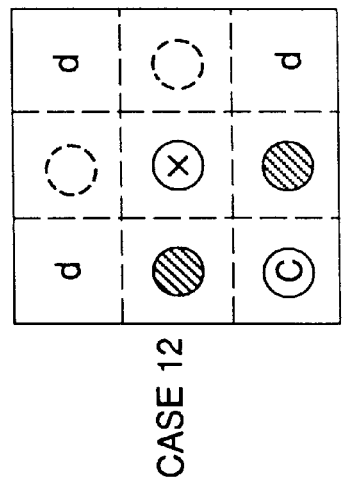

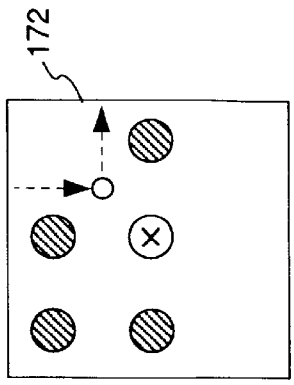
FIG. 14D
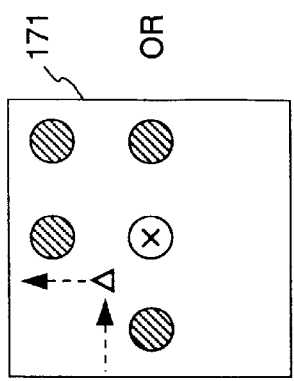
FIG. 14C OR
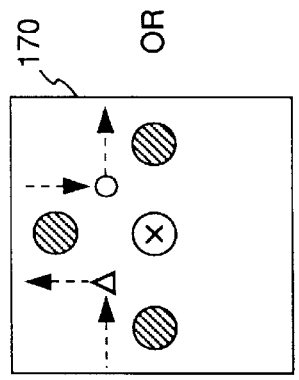
FIG. 14B OR
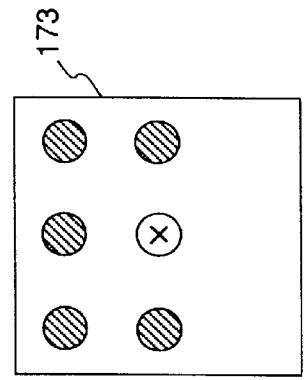
FIG. 14E OR
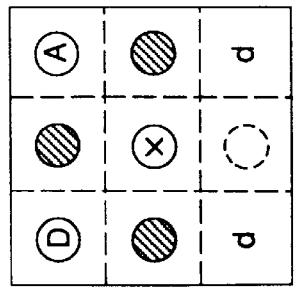
FIG. 14A
CASE 11

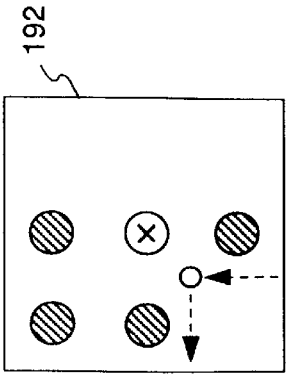
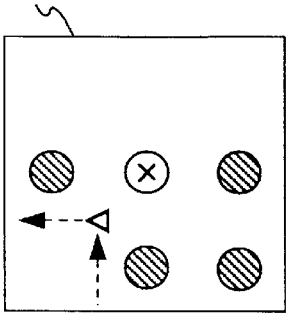
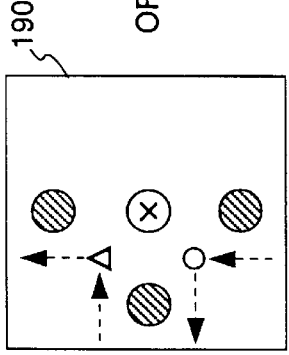
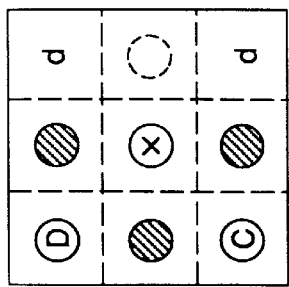
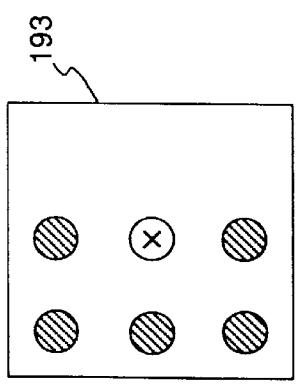

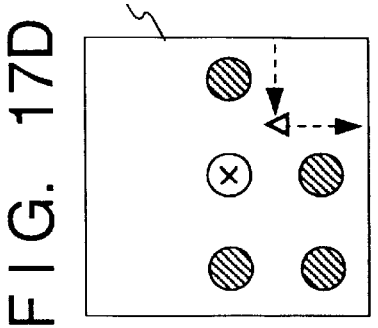
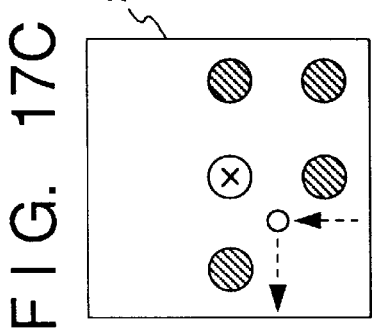
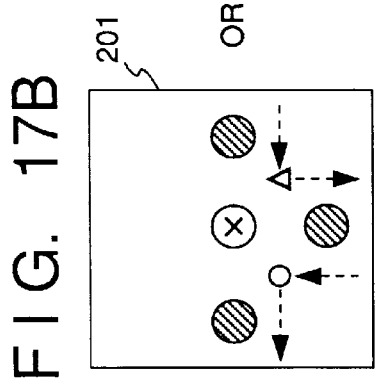
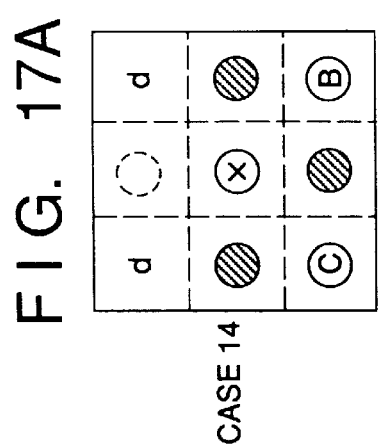
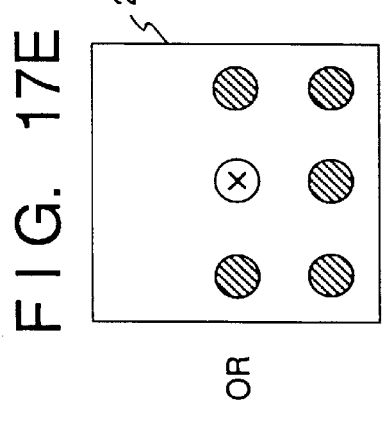

FIG. 18A   FIG. 18B   FIG. 18C
CASE 15 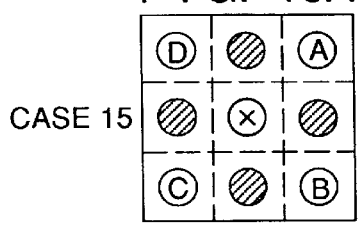 ⇨ 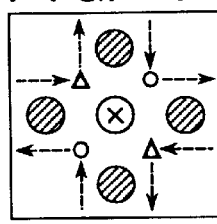 OR 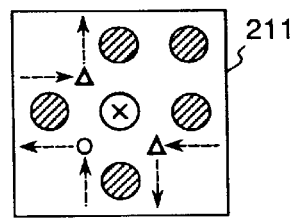
FIG. 18D   FIG. 18E   FIG. 18F
OR 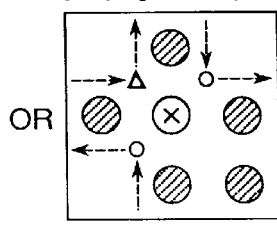 OR 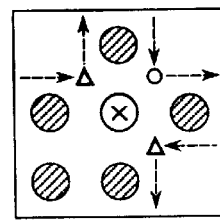 OR 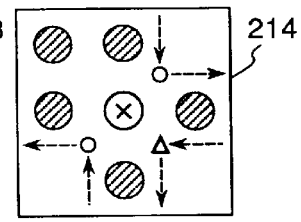
FIG. 18G   FIG. 18H   FIG. 18J
OR 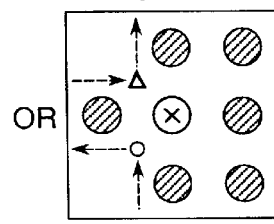 OR 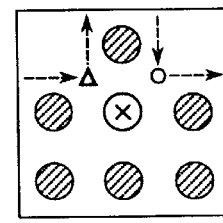 OR 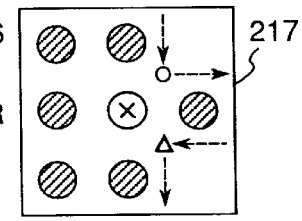
FIG. 18K   FIG. 18L   FIG. 18M
OR 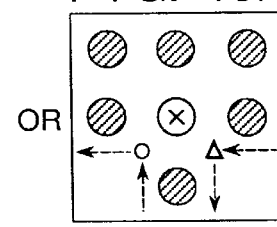 OR 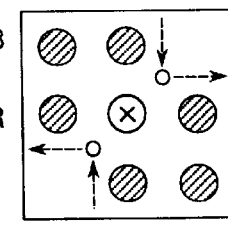 OR 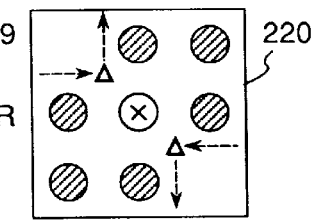
FIG. 18N   FIG. 18P   FIG. 18Q
OR 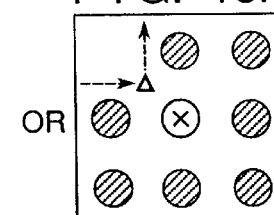 OR 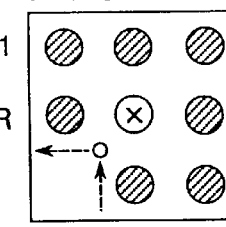 OR 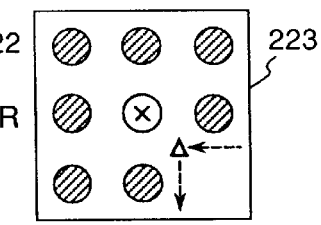
FIG. 18R   FIG. 18S
OR 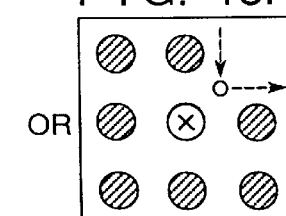 OR 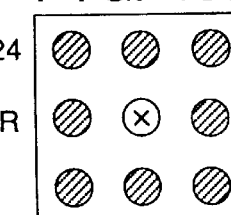

F I G. 30
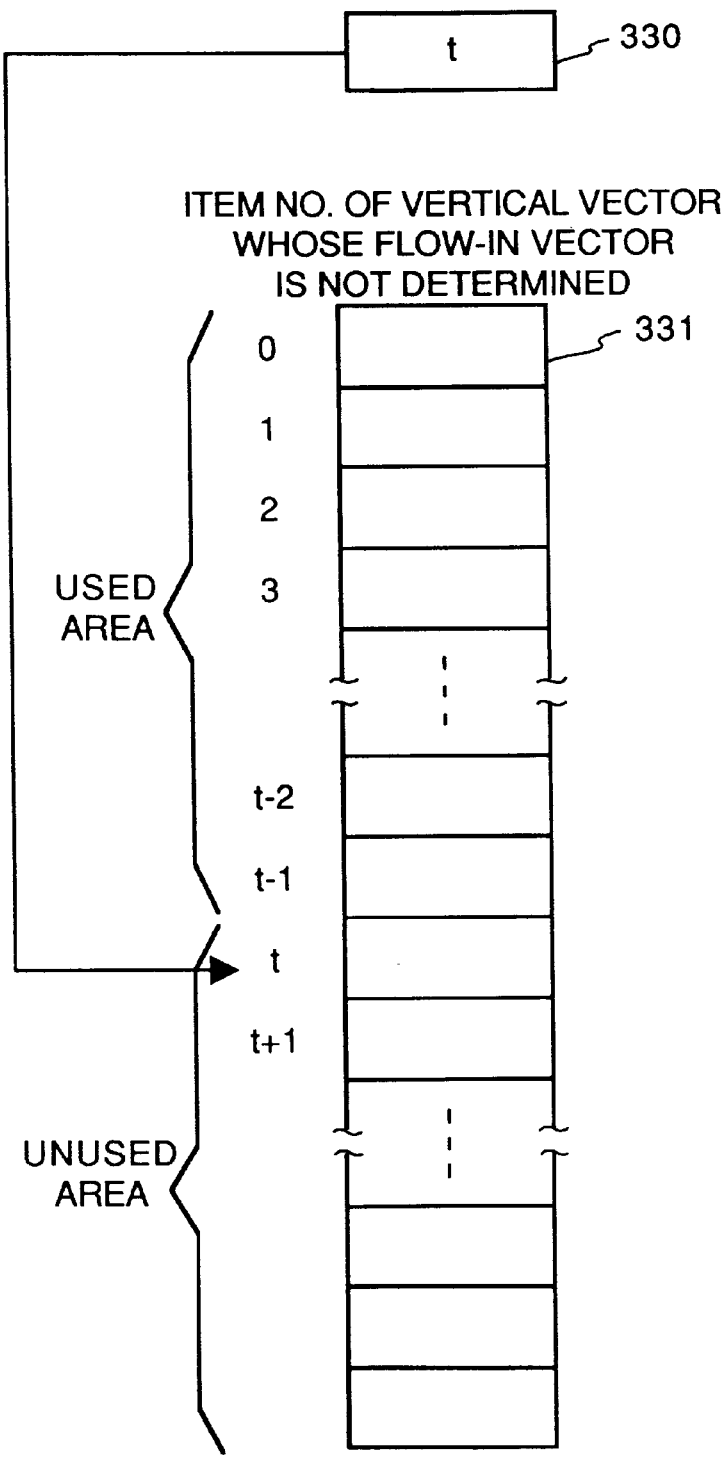

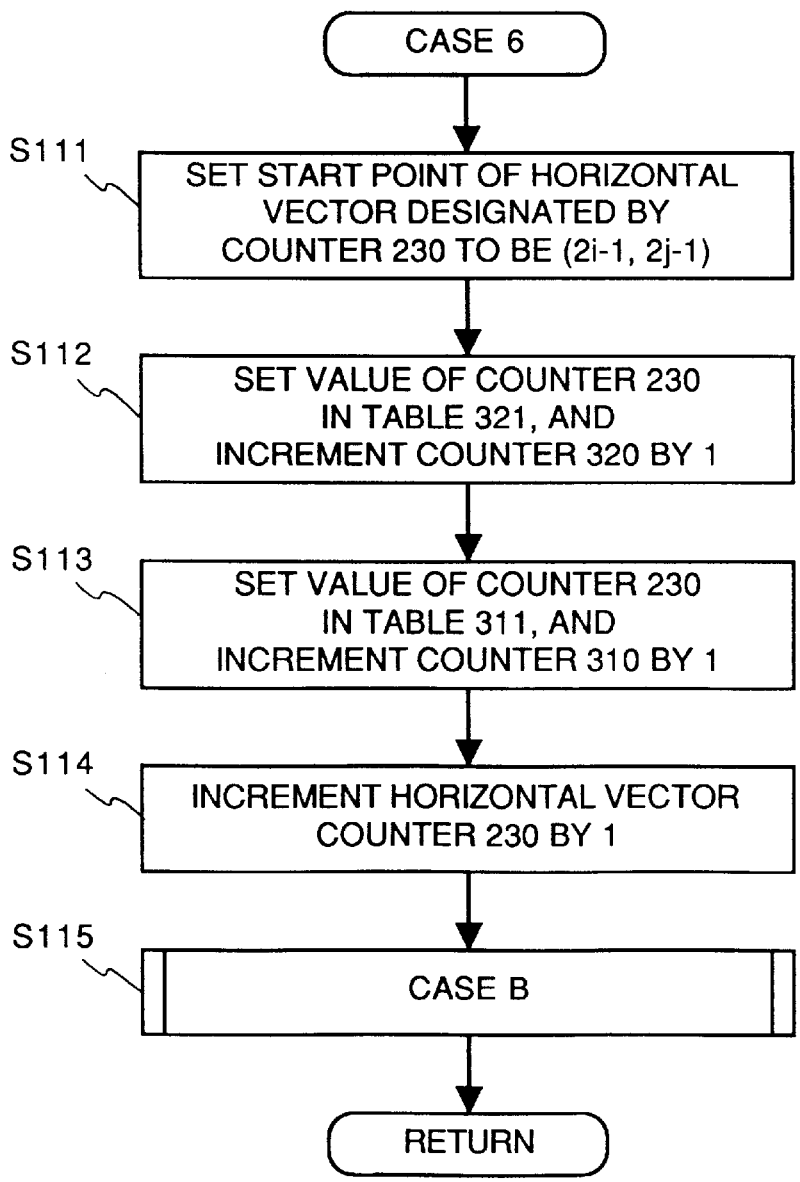

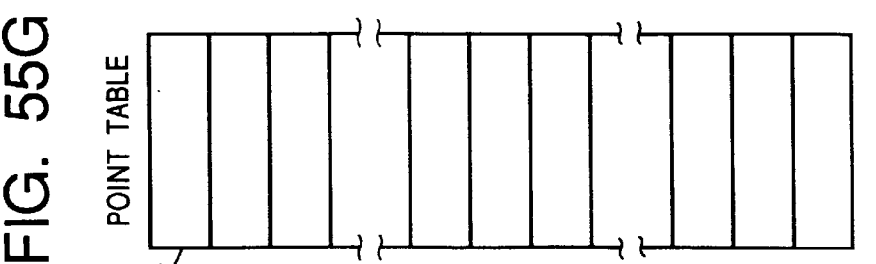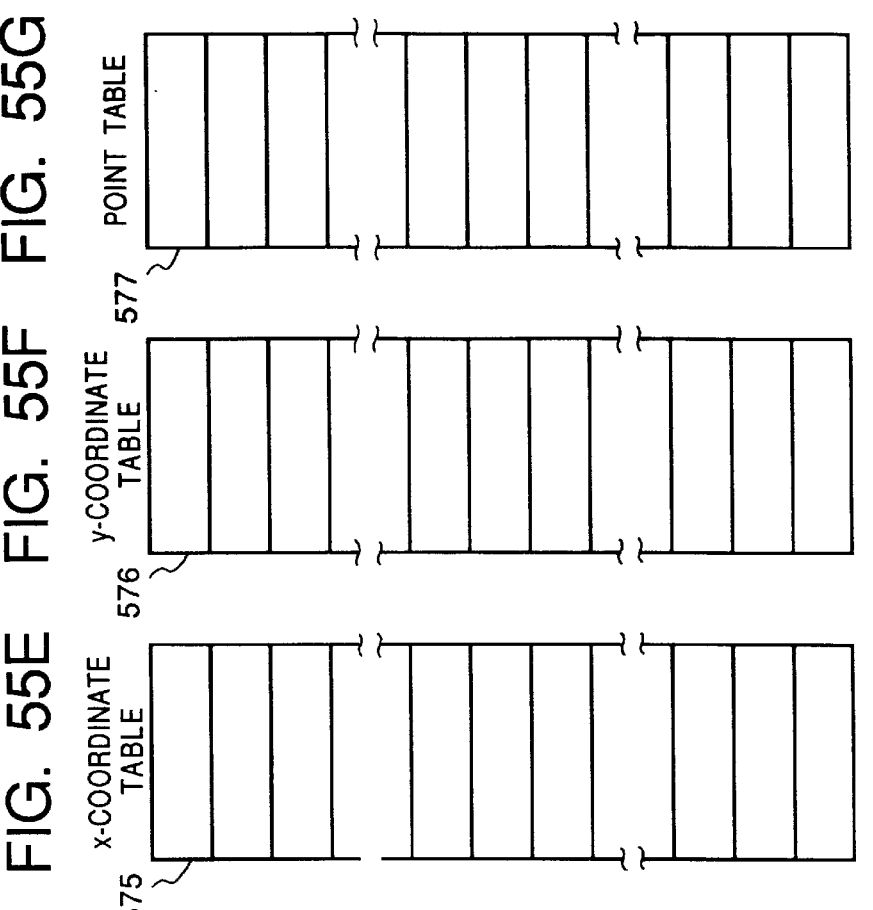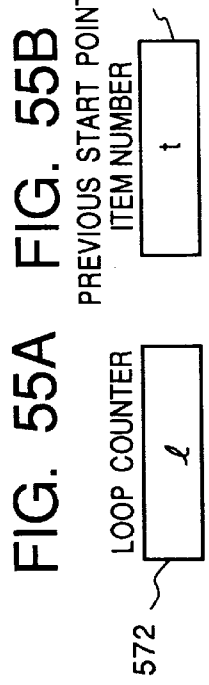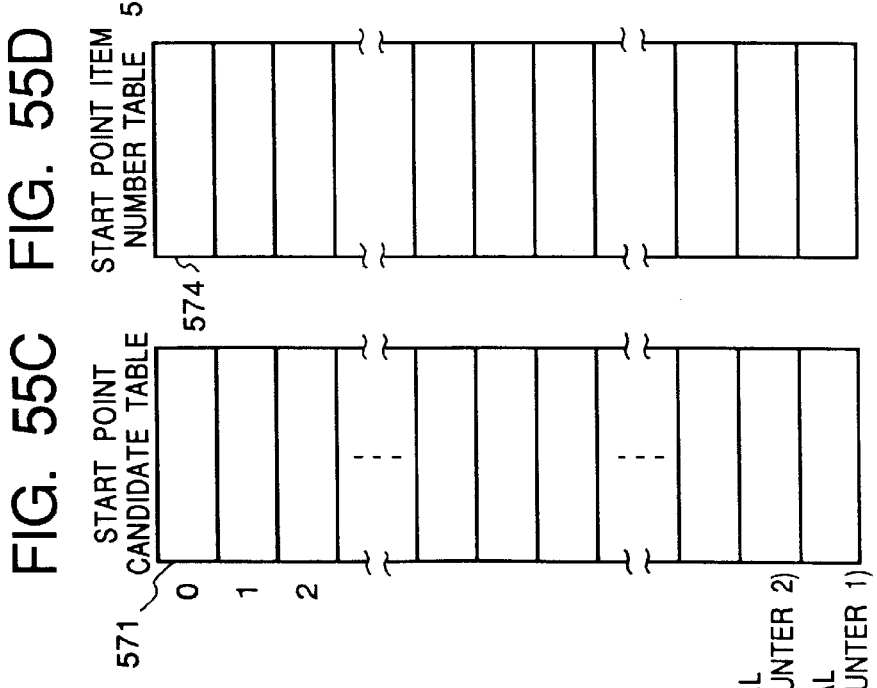

FIG. 61

| VECTOR NO. | START POINT x-COORDINATE | START POINT y-COORDINATE | END POINT x-COORDINATE | END POINT y-COORDINATE | FLOW-IN VECTOR NO. | FLOW-OUT VECTOR NO. |
|---|---|---|---|---|---|---|
| 0 | | | | | | |
| 1 | | | | | | |
| 2 | | | | | | |
| 3 | | | | | | |
| 4 | | | | | | |
| 5 | | | | | | |
| 6 | | | | | | |
| 7 | | | | | | |
| 8 | | | | | | |
| 9 | | | | | | |
| 10 | | | | | | |
| 11 | | | | | | |
| 12 | | | | | | |
| 13 | | | | | | |
| 14 | | | | | | |
| ------ | ----- | ----- | ----- | ----- | ----- | ----- |

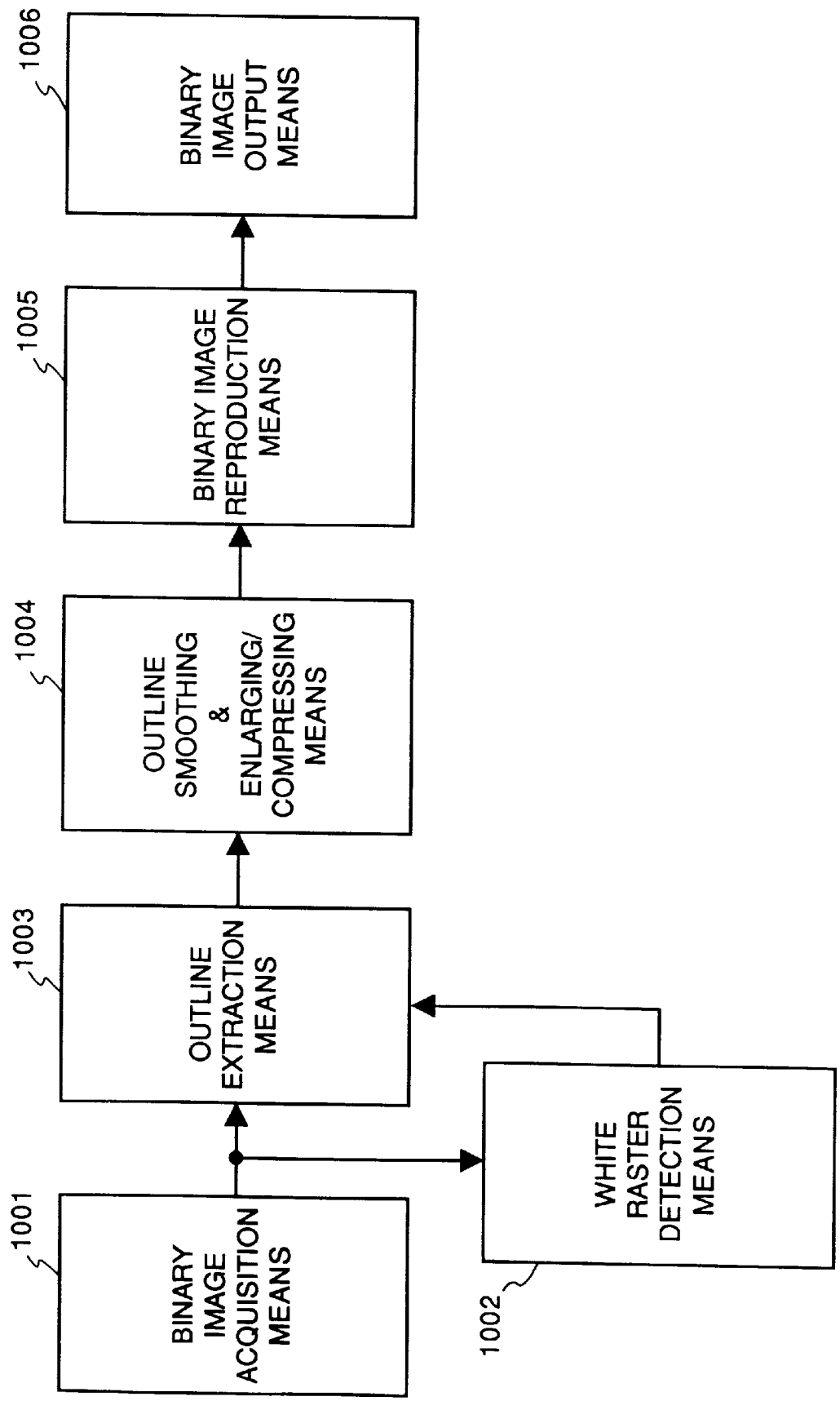

○—→  △  VERTICAL LINE
HORIZONTAL LINE    VERTICAL VECTOR
HORIZONTAL VECTOR

FIG. 65
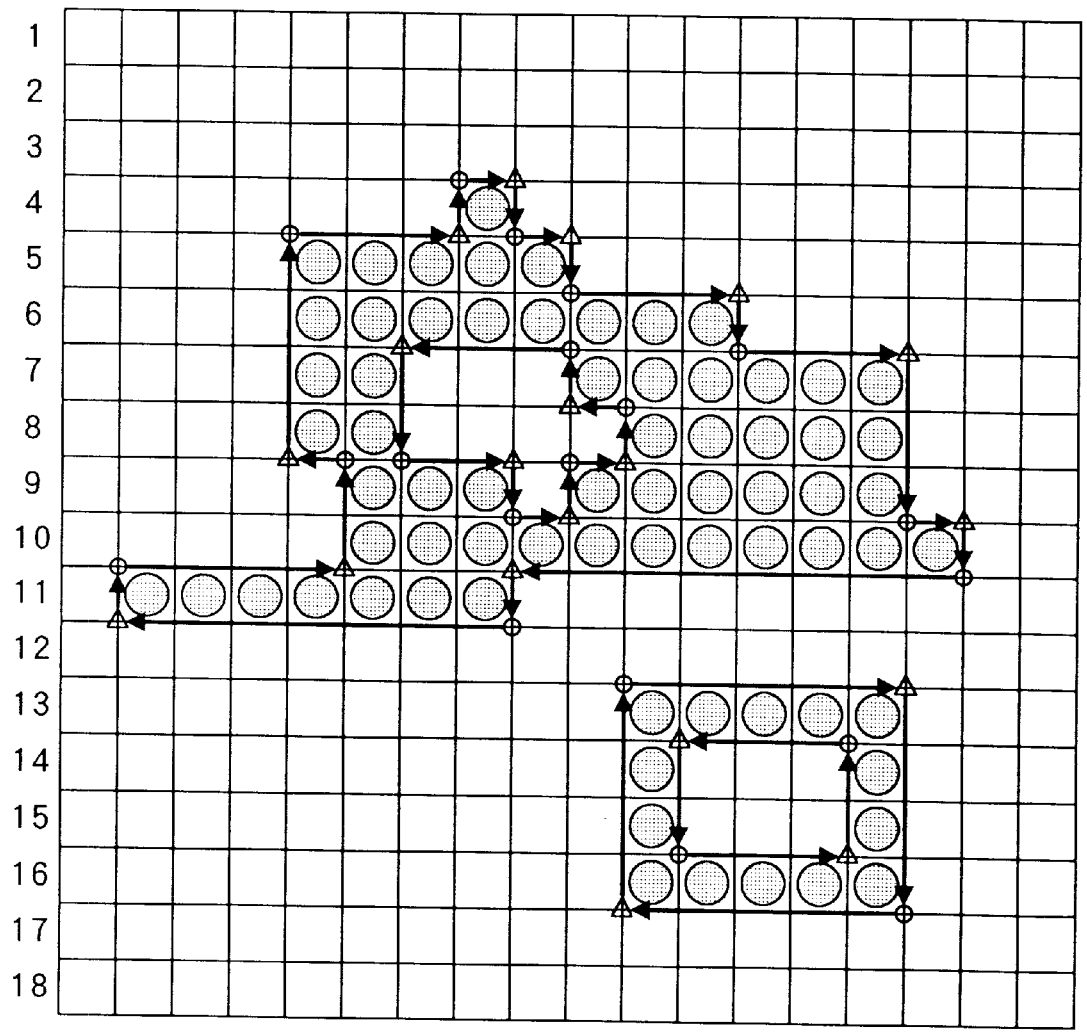
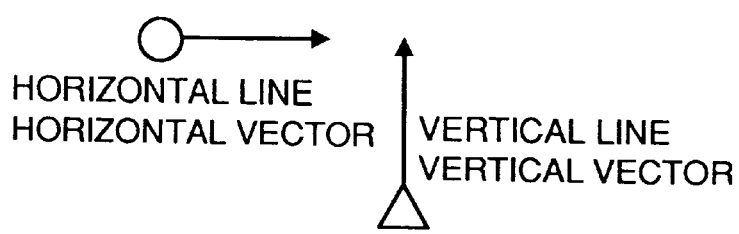

FIG. 70
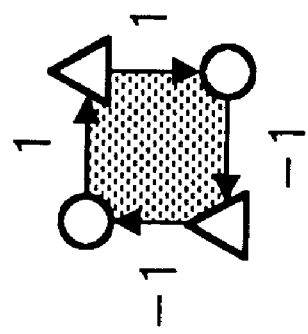
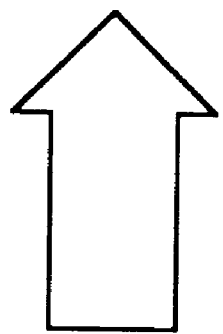

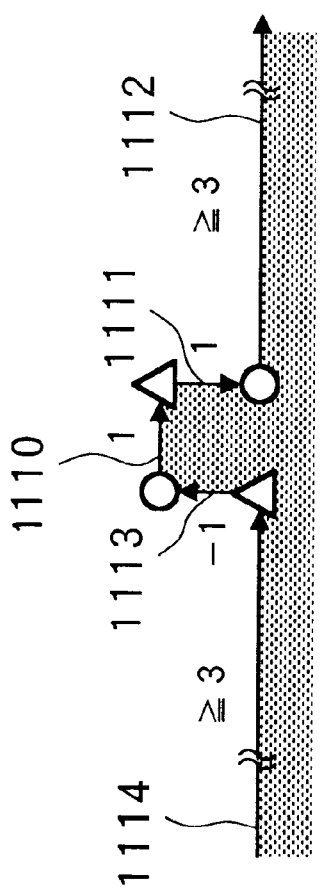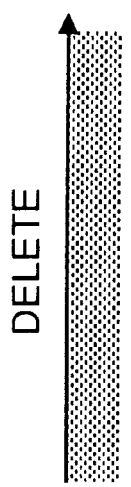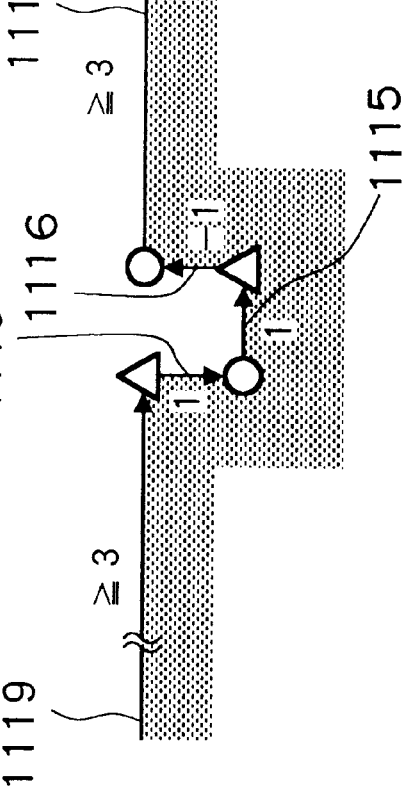

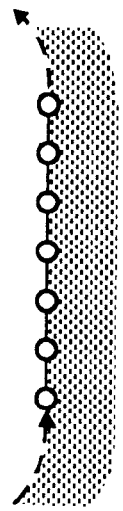
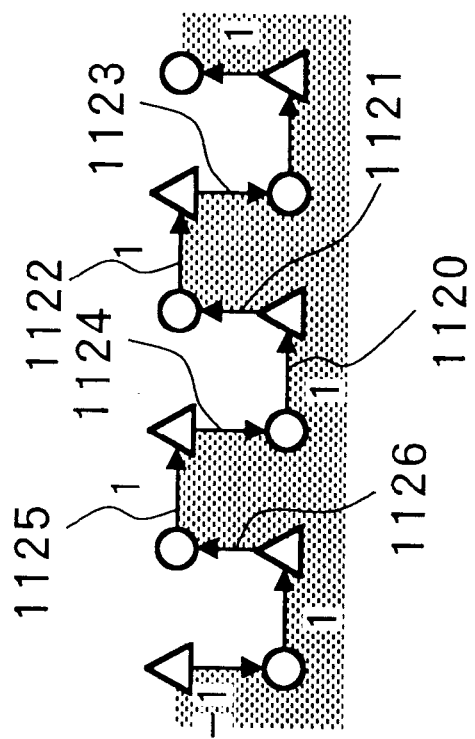
FIG. 72B
FIG. 72A

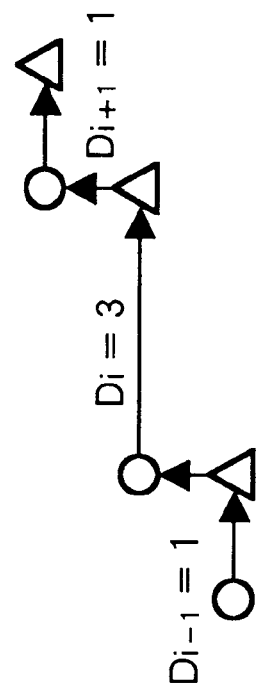
FIG. 75B
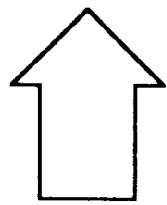
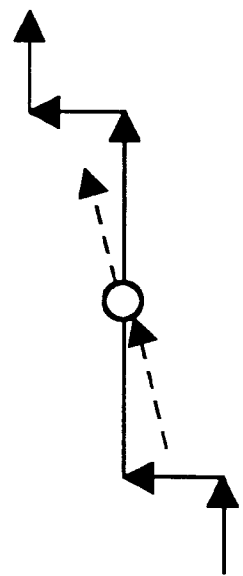
FIG. 75A

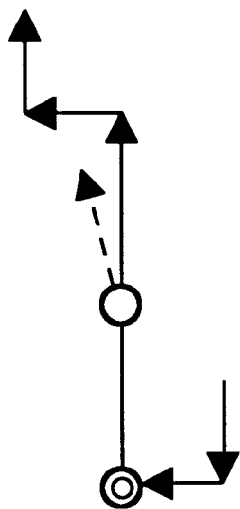
FIG. 76B
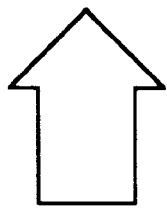
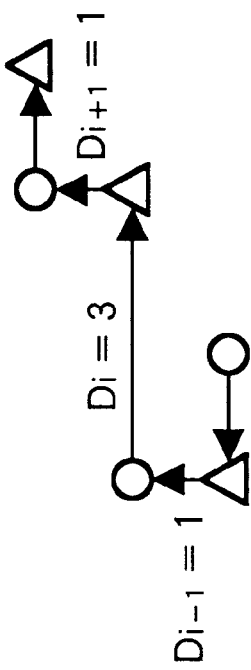
FIG. 76A

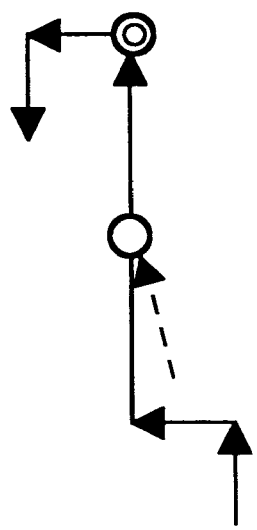
FIG. 77B
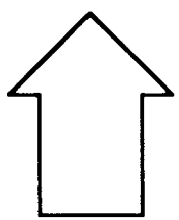
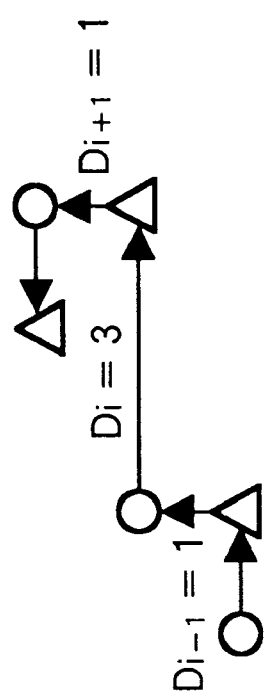
FIG. 77A

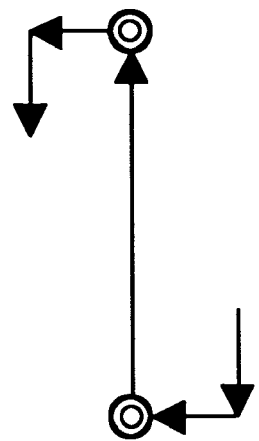
FIG. 78B
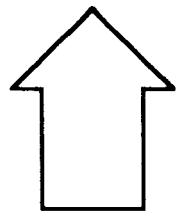
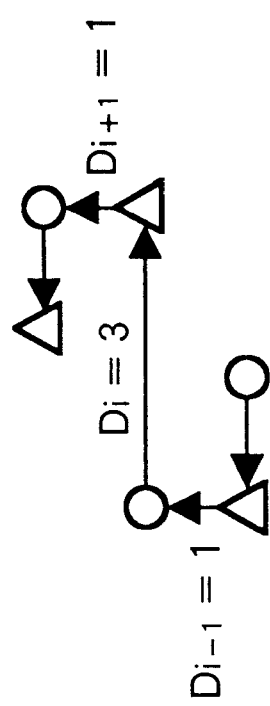
FIG. 78A

F I G. 81B
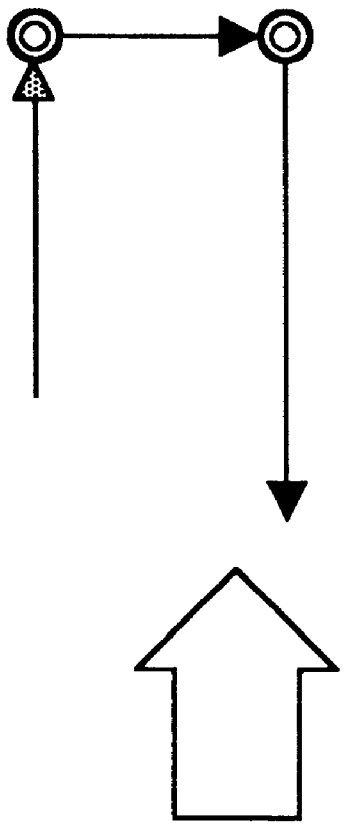
F I G. 81A
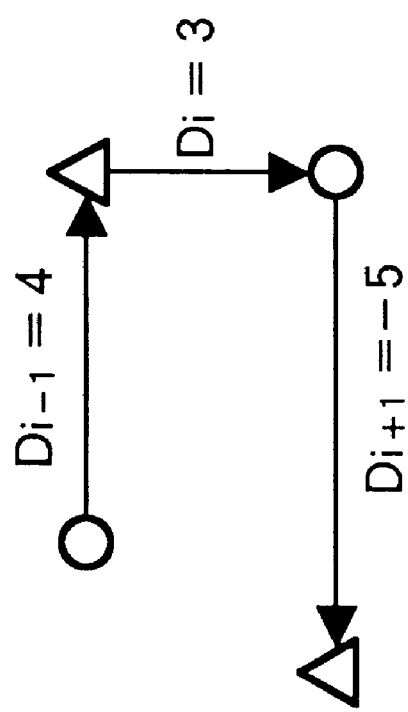
$D_i = 3$
$D_{i-1} = 4$
$D_{i+1} = -5$
$|D_{i-1}| \geq 2$ & $|D_i| \geq 3$ $|D_i| > |D_{i-2}| + |D_{i+2}|$
$(|D_{i-1}| = |D_{i+1}| = 1)$

FIG. 87

| SIDE DATA OF SIDE VECTOR HAVING FIRST POINT AS START POINT AND SECOND POINT AS END POINT |
|---|
| SIDE DATA OF SIDE VECTOR HAVING SECOND POINT AS START POINT AND THIRD POINT AS END POINT |
| SIDE DATA OF SIDE VECTOR HAVING THIRD POINT AS START POINT AND FOURTH POINT AS END POINT |
| ⋮ |
| SIDE DATA OF SIDE VECTOR HAVING i-TH POINT AS START POINT AND (i+1)-TH POINT AS END POINT |
| ⋮ |
| SIDE DATA OF SIDE VECTOR HAVING (n-1)-TH POINT AS START POINT AND n-TH POINT AS END POINT |
| SIDE DATA OF SIDE VECTOR HAVING n-TH POINT AS START POINT AND FIRST POINT AS END POINT |

IMAGE PROCESSING APPARATUS

BACKGROUND OF THE INVENTION

The present invention relates to a method of extracting outline loops of a binary image stored in the raster scanning order, and an apparatus therefor.

Conventionally, an apparatus for extracting an outline loop from a binary dot pattern extracts an outline loop of a character pattern of a binary image, and stores the extracted outline loop in the form of vector information. Extraction of an outline loop of a binary image begins with finding out of a trace start point for tracing an outline loop of a target binary image. When the trace start point is found, the outline loop of the image is traced in turn from the trace start point. A trace end mark is assigned to traced dots on the outline loop. When the entire outline loop is traced, the marked dot string corresponds to the outline loop to be obtained. Such a procedure is repetitively executed to extract all outline loops in a target image.

SUMMARY OF THE INVENTION

The conventional outline loop extraction apparatus must start outline loop extraction processing after the entire image is stored in a memory since it executes trace processing along an outline loop after the trace start point of an outline loop is determined. For this reason, a large memory capacity is required, resulting in a high-cost apparatus and long processing time.

The conventional apparatus cannot start processing such as enlarging/compressing processing in a stage next to the outline loop extraction processing unless all the outline loops of a target image are extracted. As a result, the outline loop extraction processing and the processing in the next stage cannot be executed at high speed.

The present invention has been made in consideration of the above-mentioned prior art, and has as its object to provide an image processing apparatus, which uses a small memory capacity, and can quickly extract outline loops, and a method therefor.

It is another object of the present invention to provide an image processing apparatus, which can improve linking efficiency between outline extraction processing and processing in the next stage.

In order to achieve the above objects, an image processing apparatus and method according to the present invention comprise the following arrangements.

That is, there is provided an image processing method for extracting outline vectors from input raster-scanning type binary image data, and executing predetermined processing, comprising: the outline vector extraction step of extracting outline vector data of the binary image on the basis of input raster data; and the output step of outputting already extracted outline vector data to the step in the next stage according to a dot state of one input raster data.

There is also provided an image processing apparatus for extracting outline vectors from input raster-scanning type binary image data, and executing predetermined processing, comprising: outline vector extraction means for extracting outline vector data of the binary image on the basis of input raster data; and output means for outputting already extracted outline vector data to processing means in the next stage according to a dot state of one input raster data.

Furthermore, there is provided an image processing method for extracting outline vectors from input raster-scanning type binary image data, and executing predetermined processing, comprising: the detection step of detecting pixel arrangement vectors on the basis of a local state of pixels in the binary image data; the discrimination step of discriminating connection states among the pixel arrangement vectors detected in the detection step; the storage step of storing the connection states of the pixel arrangement vectors discriminated in the discrimination step; the white raster detection step of detecting whether pixels on a raster of interest are all white pixels; and the extraction step of extracting outlines of the image data on the basis of the connection states among the pixel arrangement vectors stored in the storage step, and a result in the white raster detection step.

Moreover, there is provided an image processing apparatus for extracting outline vectors from input raster-scanning type binary image data, and executing redetermined processing, comprising: detection means for detecting pixel arrangement vectors on the basis of a local state of pixels in the binary image data; discrimination means for discriminating connection states among the pixel arrangement vectors detected by the detection means; storage means for storing the connection states of the pixel arrangement vectors discriminated by the discrimination means; white raster detection means for detecting whether pixels on a raster of interest are all white pixels; and extraction means for extracting outlines of the image data on the basis of the connection states among the pixel arrangement vectors stored in the storage means, and a result from the white raster detection means.

As described above, an outline extraction apparatus according to the present invention uses a small memory capacity, and can quickly extract outline loops.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 3A to 18S are views showing vector generation examples according to the states of pixels near a pixel of interest in outline extraction of the first embodiment;

FIG. 30 shows a registration table for vertical vectors whose flow-in vectors are not determined;

FIGS. 32 to 52 are flow charts showing vector string extraction processing;

FIGS. 55A to 55G are views for explaining a start point candidate table in the first embodiment;

FIG. 61 is a view for explaining a connection information table;

FIG. 63 is a schematic block diagram showing an image processing apparatus according to the third embodiment of the present invention;

FIG. 65 is a view showing a binary image and its coarse outline vectors;

FIG. 70 is a view showing a first smoothing processing rule in the third embodiment;

FIGS. 71A to 71D are views showing other first smoothing processing rules in the third embodiment;

FIGS. 72A and 72B are views showing still another first smoothing processing rule in the third embodiment;

FIGS. 75A and 75B are views showing still another first smoothing processing rule in the third embodiment;

FIGS. 76A and 76B are views showing still another first smoothing processing rule in the third embodiment;

FIGS. 77A and 77B are views showing still another first smoothing processing rule in the third embodiment;

FIGS. 78A and 78B are views showing still another first smoothing processing rule in the third embodiment;

FIGS. 81A and 81B are views showing still another first smoothing processing rule in the third embodiment;

FIG. 87 shows the definitions of side data used in the first smoothing processing of the third embodiment;

DETAILED DESCRIPTION OF THE PREFERRED EMBODIMENTS

FIRST EMBODIMENT

An image processing apparatus according to the preferred embodiment of the present invention will be described below with reference to the accompanying drawings.

An apparatus of this embodiment has a connection information table for storing connection states of outline loops in units of pixels, and obtains the final total number of loops of outline vectors, the number of outline points constituting each loop, coordinate values of outline points constituting each loop, and the like by scanning the connection information table after outline loops of all pixels in an image are extracted. In this case, the connection information table has a small capacity to prevent a decrease in retrieval speed of the table.

Figure 1:
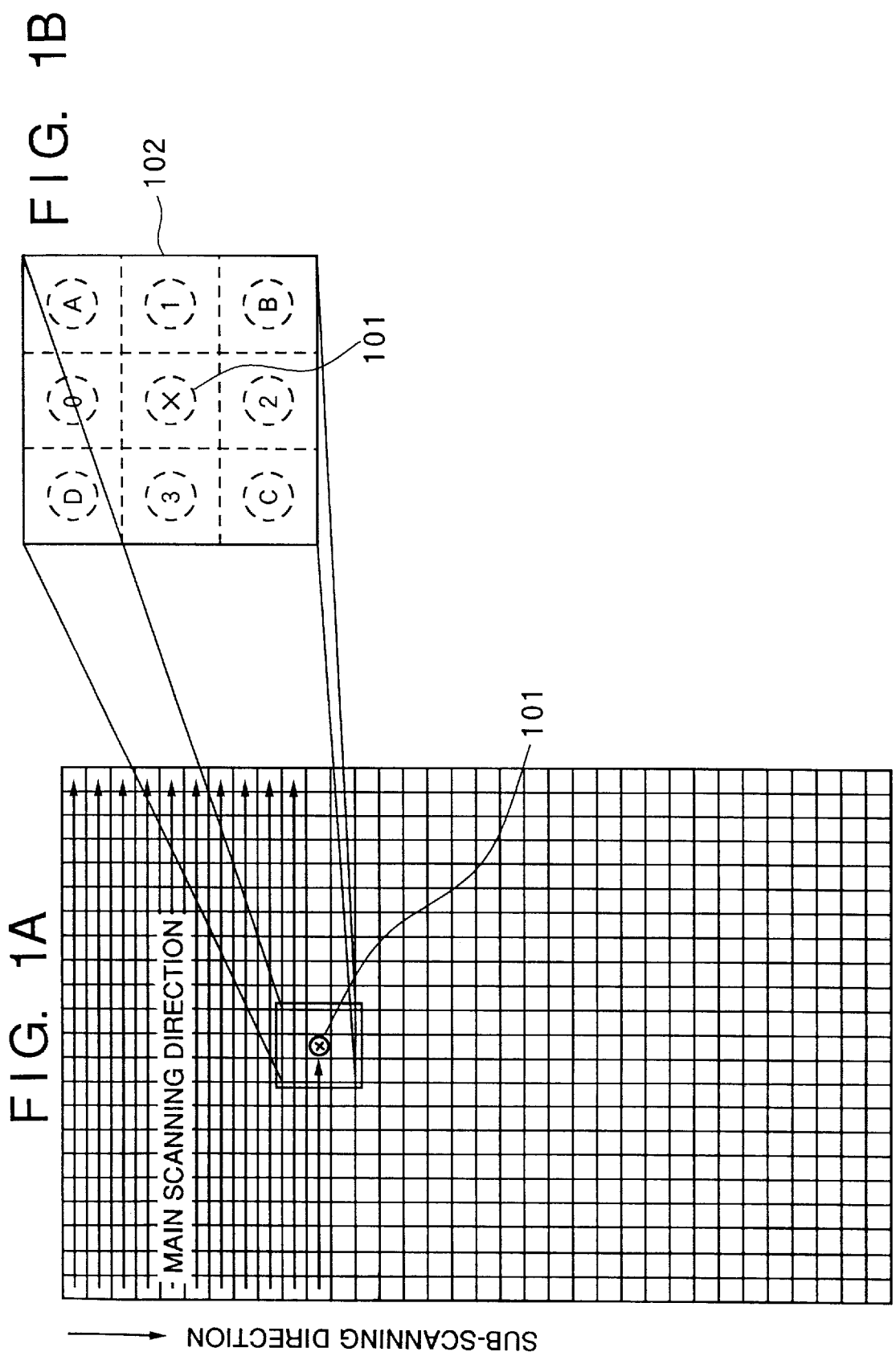
FIGS. 1A and 1B are views showing a pixel of interest and pixels near the pixel of interest in the first embodiment of the present invention.

The image processing apparatus of this embodiment executes processing with reference to a pixel 101 of interest in a binary image and eight pixels near the pixel of interest, as shown in FIGS. 1A and 1B. The pixel of interest is selected one by one by raster scanning, and processing for the entire image is performed.

Figure 2:
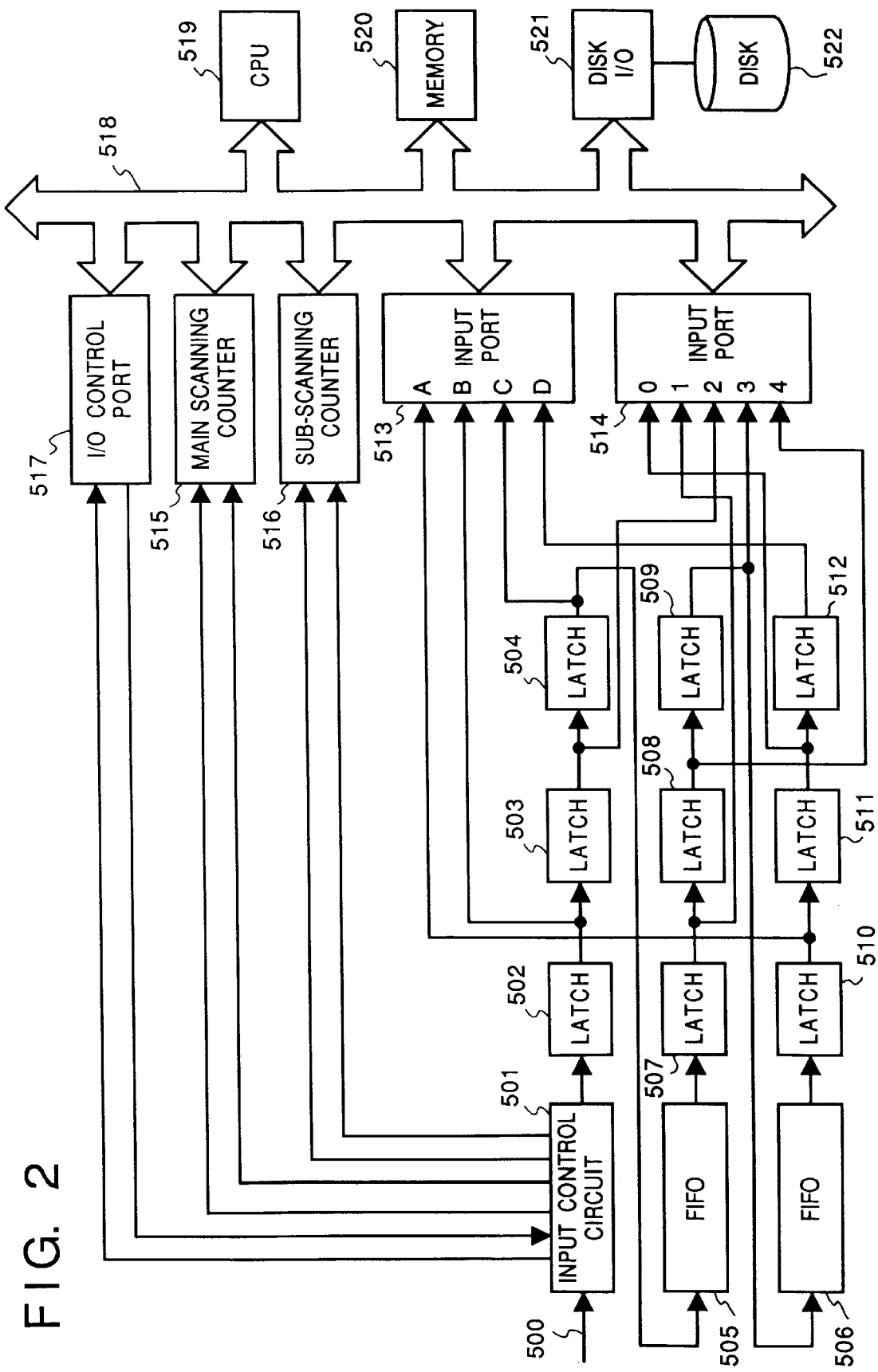
FIG. 2 is a schematic block diagram showing an arrangement of an outline extraction apparatus according to the first embodiment of the present invention.

In FIGS. 1A and 1B, ⊗ indicates the pixel 101 of interest. In FIG. 1B as an enlarged view of a portion near the pixel 101 of interest in FIG. 1A, positions indicated by "0" and "2" respectively represent pixels (0) and (2), which are located at the same positions as the pixel 101 of interest in the main scanning direction, and at positions one raster before and after the pixel of interest in the sub-scanning direction. Positions indicated by "1" and "3" represent pixels (3) and (1), which are located on the same raster as the pixel 101 of interest, and at positions immediately before and next to the pixel of interest. Positions indicated by "A" and "B" represent pixels, which are located at positions next to the pixel of interest in the main scanning direction, and at positions one raster before and after the pixel of interest. Positions indicated by "C" and "D" represent pixels, which are located at positions immediately before the pixel of interest in the main scanning direction, and at positions one raster before and after the pixel of interest. FIG. 2 is a block diagram showing a hardware arrangement for executing outline detection of this embodiment.

An input control circuit 501 exchanges image data input through a signal line 500. Data input through the signal line 500 is raster-scanned binary image data. A latch 502 holds image data input from the input control circuit 501 in units of pixels in synchronism with pixel sync clocks (not shown) while sequentially updating the held content. When the latch 502 fetches pixel data from the input control circuit 501, pixel data already held in the latch 502 is latched by a latch 503 in synchronism with the pixel sync clock. Similarly, the pixel data held in the latch 503 is latched by a latch 504 in synchronism with the pixel sync clock.

Each of FIFOs (first-in first-out memories) 505 and 506 holds pixel data for one raster. The FIFO 505 sequentially fetches the output from the latch 504 in synchronism with the pixel sync clocks, and outputs, to a latch 507, pixel data one raster before pixel data output from the input control circuit 501. Latches 507, 508, and 509, and latches 510, 511, and 512 operate in the same manner as the latches 502, 503, and 504.

In this manner, nine pixels stored in the latches 502, 503, 504, 507, 508, 509, 510, 511, and 512 are pixel data in a region consisting of nine (3×3) pixels shown in FIG. 1B. More specifically, the pixel data in these latches respectively correspond to "B", "2", "C", "1", ⊗, "3", "A", "0", and "D" in FIG. 1B.

An input port 513 inputs data in the latches 510, 502, 504 and 512, i.e., pixel data "A", "B", "C" and "D" in FIG. 1B to a CPU 519. Similarly, an input port 514 inputs data in the latches 511, 507, 503, 509 and 508, i.e., pixel data "0", "1", "2", "3" and ⊗ to the CPU 519.

A main scanning counter 515 indicates a pixel position in the main scanning direction, is reset by a sub-scanning sync signal (not shown), and performs a count-up operation in synchronism with a pixel sync signal. A sub-scanning counter 516 indicates a pixel position in the sub-scanning direction, is reset by a page sync signal (not shown), and performs a count-up operation in synchronism with the sub-scanning sync signal. An I/O (input/output) control I/O port 517 holds a signal for instructing the input control circuit 501 to execute or suspend execution of a pixel data input operation, a signal for informing updating of pixel data from the input control circuit 501 to the CPU 519, and the like. The disk I/O 521 performs I/O control of a hard disk 522. The I/O control port 517, the main scanning counter 515, the sub-scanning counter 516, the input ports 513 and 514, a memory 520, and the disk I/O 521 are connected to the CPU 519 through a bus 518.

With the above-mentioned arrangement, the CPU 519 updates pixel data via the I/O control port 517, and can detect the pixel position (i,j) of a pixel of interest via the main scanning counter 515 and the sub-scanning counter 516. The CPU 519 can also detect the states of the pixel of interest and eight pixels near the pixel of interest via the input ports 513 and 514.

Upon completion of processing of the pixel of interest, the CPU 519 instructs to update pixel data stored in the nine latches via the I/O control port 517, and at the same time, resets a pixel data updating instruction signal. Upon reception of the updating instruction, the input control circuit 501 clears the pixel data updating instruction, updates pixel data to be latched by the latches in the next stage, and upon completion of this updating operation, outputs an updating end signal to the I/O control port 517.

After the CPU 519 outputs the updating instruction, it monitors an updating end signal input from the I/O control port 517. Upon reception of the updating end signal, the CPU 519 executes processing associated with new pixel data stored in the nine latches 501 to 504, and 507 to 512, and thereafter, repeats the same processing. The input control circuit 501 outputs an end signal to the I/O control port 517 after the final pixel in an image region is processed as a pixel of interest.

Processing according to the states of a pixel of interest and eight pixels near the pixel of interest will be described below.

When the pixel of interest is a white pixel, the processing is ended, and the raster-scanning position is advanced by one pixel, thereby updating the position of a pixel of interest.

When the pixel of interest is a black pixel, the following processing operations are executed depending on the states of the eight pixels near the pixel of interest. FIGS. 3A to 18S show the processing contents in the corresponding states.

Figure 3A:
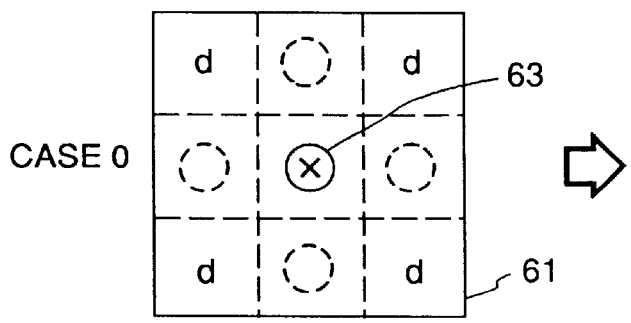

In a pixel matrix 61 in FIG. 3A, "d" means "do not care". More specifically, pixels at positions indicated by "d" can be either white or black pixels. The same applies to other drawings. In a pixel matrix 62 in FIG. 3B, small ○ marks represent the start points of horizontal vectors and the end points of vertical vectors, and Δ marks represent the start points of vertical vectors and the end points of horizontal vectors. In the matrix 62 in FIG. 3B, a solid arrow represents an outline vector, both the start and end points of which are determined, and which has a direction indicated by the arrow. In a matrix shown in FIG. 4B, a dotted arrow represents an outline vector, either the start or end point of which is determined, and which has a direction indicated by the arrow. The meanings of these ○, Δ, solid arrow, and dotted arrow apply to other drawings. * indicates a black pixel. A white pixel is illustrated as a dotted circle only when its position is to be indicated; otherwise, it is not illustrated. These illustrations also apply to other drawings.

Figure 4A:
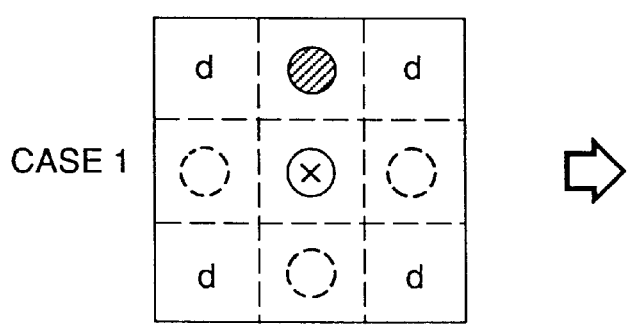
Figure 4B:
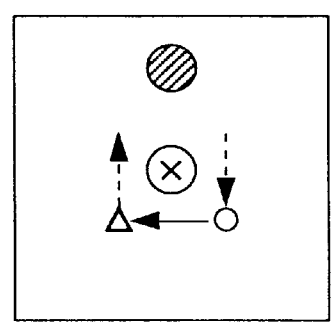

The start and end point positions of an outline vector are located at intermediate positions between adjacent pixels in both the main scanning and sub-scanning directions. The positions of a pixel in both the main scanning and sub-scanning directions are represented by positive integers, and the pixel position is expressed by two-dimensional coordinates using the main scanning and sub-scanning directions as axial directions. For example, if the position of a pixel 63 of interest in FIG. 3A is (3,7) [the third pixel position in the seventh raster], four vectors shown in FIG. 4B are expressed as four continuous vectors respectively having four points, i.e., a point 64 (2.5,6.5), a point 65 (3.5,6.5), a point 66 (3.5,7.5), and a point 67 (2.5,7.5) as the start and end points.

Figure 3B:
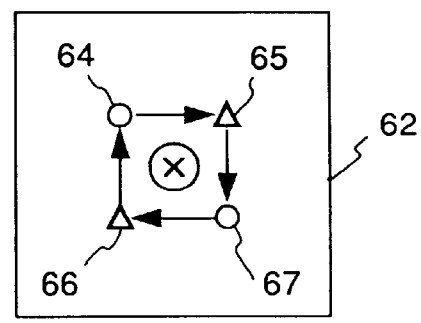

If these vectors are expressed by [(coordinates of start point},(coordinates of end point)], the four vectors in FIG. 3B are respectively expressed by [(2.5,6.5),(3.5,6.5)], [3.5, 6.5),(3.5,7.5)], [(3.5,7.5),(2.5,7.5)], and [(2.5,7.5),(2.5,6.5)]. However, in order to avoid expressions using decimal numbers in the following description, a pixel position is expressed by only even numbers, and start and end point positions are expressed by odd integers, for the sake of simplicity. More specifically, in an m (pixels) ×n (pixels) image, each pixel is expressed by coordinates of 2m×2n positive even numbers (integers). Thus, in FIG. 3A, the position of the pixel of interest is expressed by (6,14), and the four start and end points are expressed by (5,13), (7,13), (7,15), and (5,15). Therefore, the four vectors in FIG. 3B are respectively expressed by [(5,13),(7,13)], [(7,13),(7,15)], [(7,15),(5,15)], and [(5,15),(5,13)].

In the following description, assume that a binary image is constituted by n rasters each consisting of m pixels, i.e., m×n pixels (m and n are positive integers). An i-th pixel position in a j-th raster in an image is expressed by (2i, 2j) (i and j are positive integers, and satisfy i ≦m and j ≦n).

<Description of Outline Extraction Processing>

Figure 19:
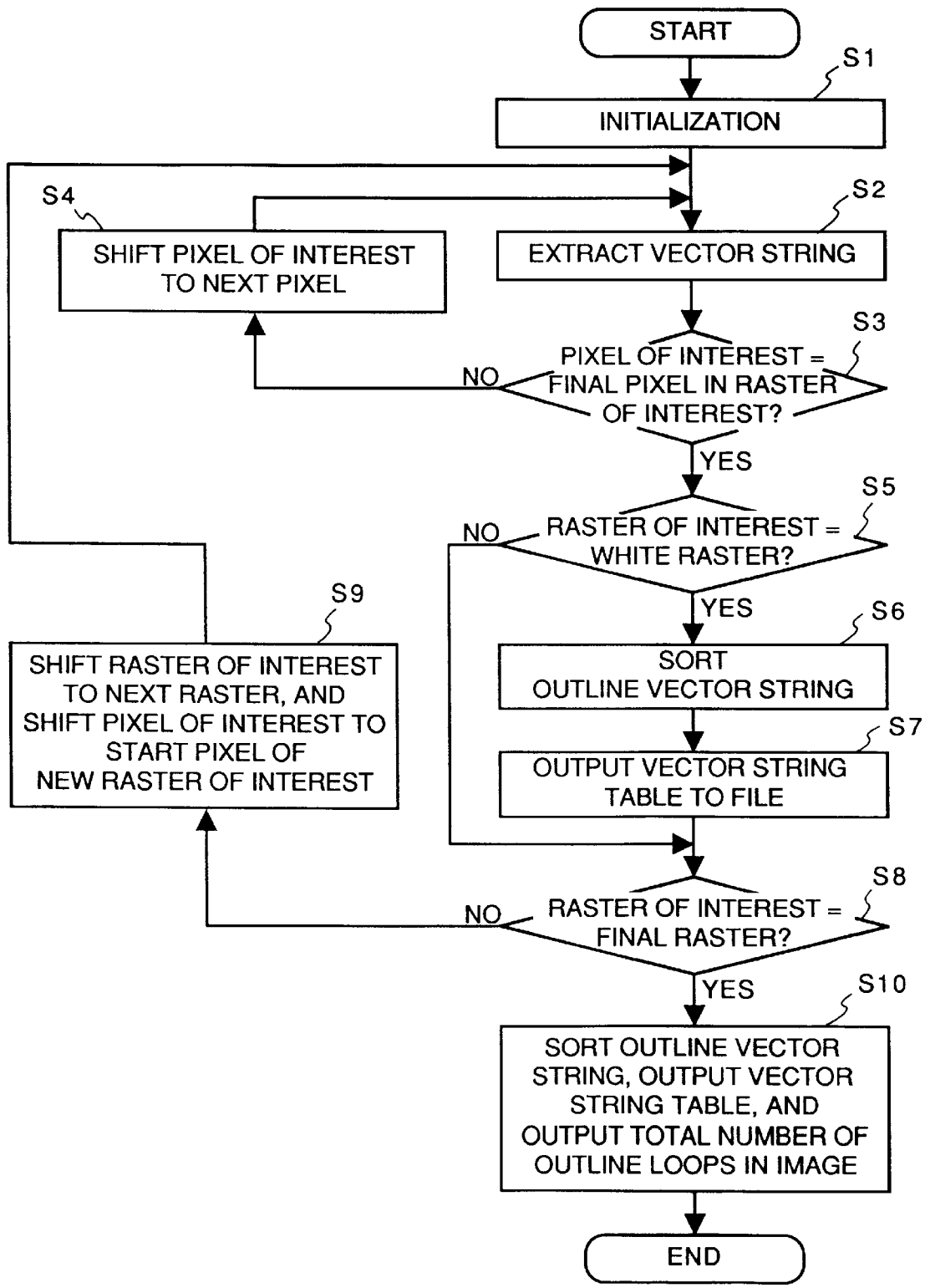
FIG. 19 is a flow chart showing the general flow of outline extraction processing.

FIG. 19 is a flow chart showing the general flow of outline extraction processing by the CPU 519 in the apparatus of this embodiment.

In step S1, initialization processing is executed (the start raster of an image is set to be a raster of interest, and the start pixel of the raster of interest is set to be a pixel of interest).

Figure 20:
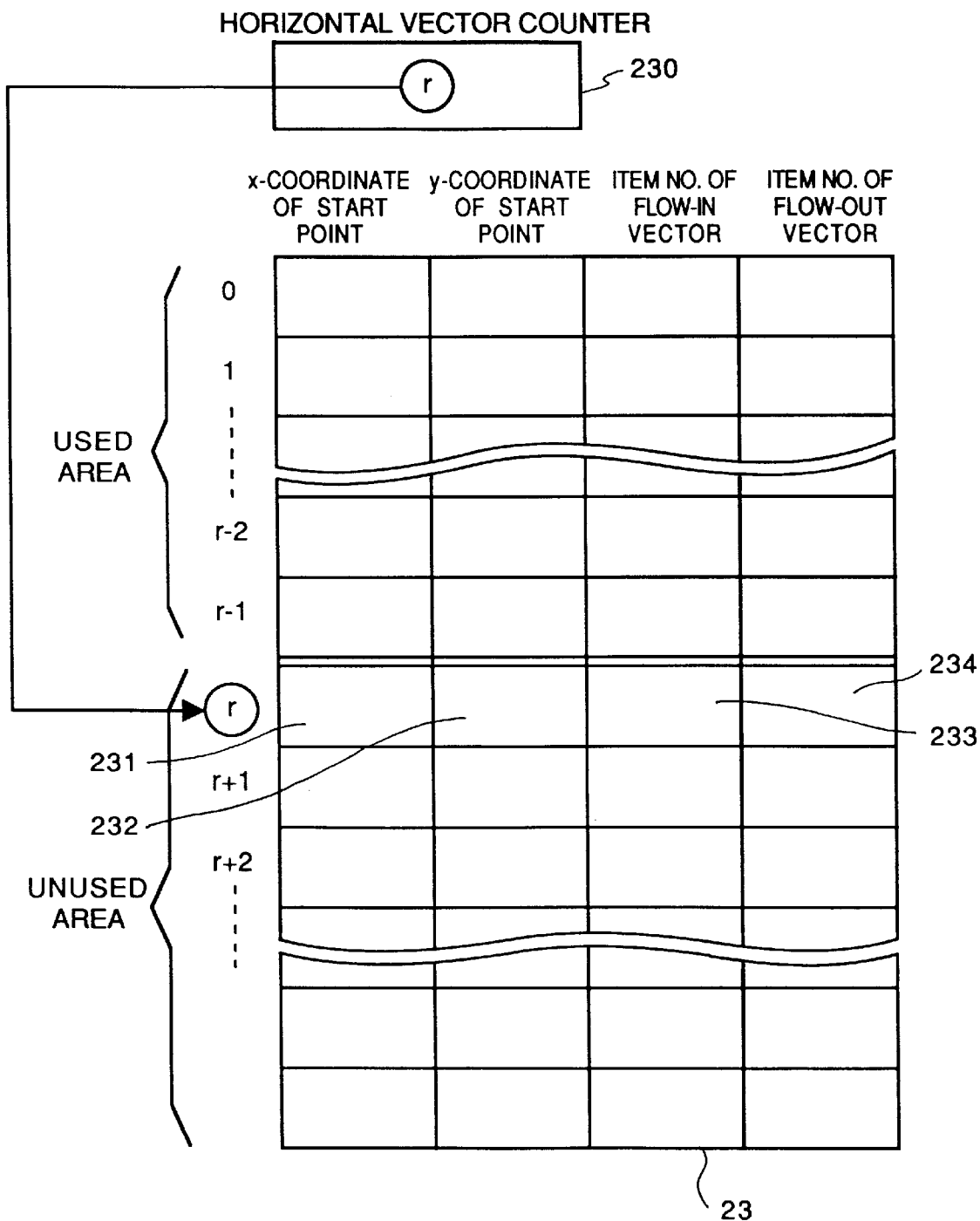
FIG. 20 shows a horizontal vector registration table.
Figure 21:
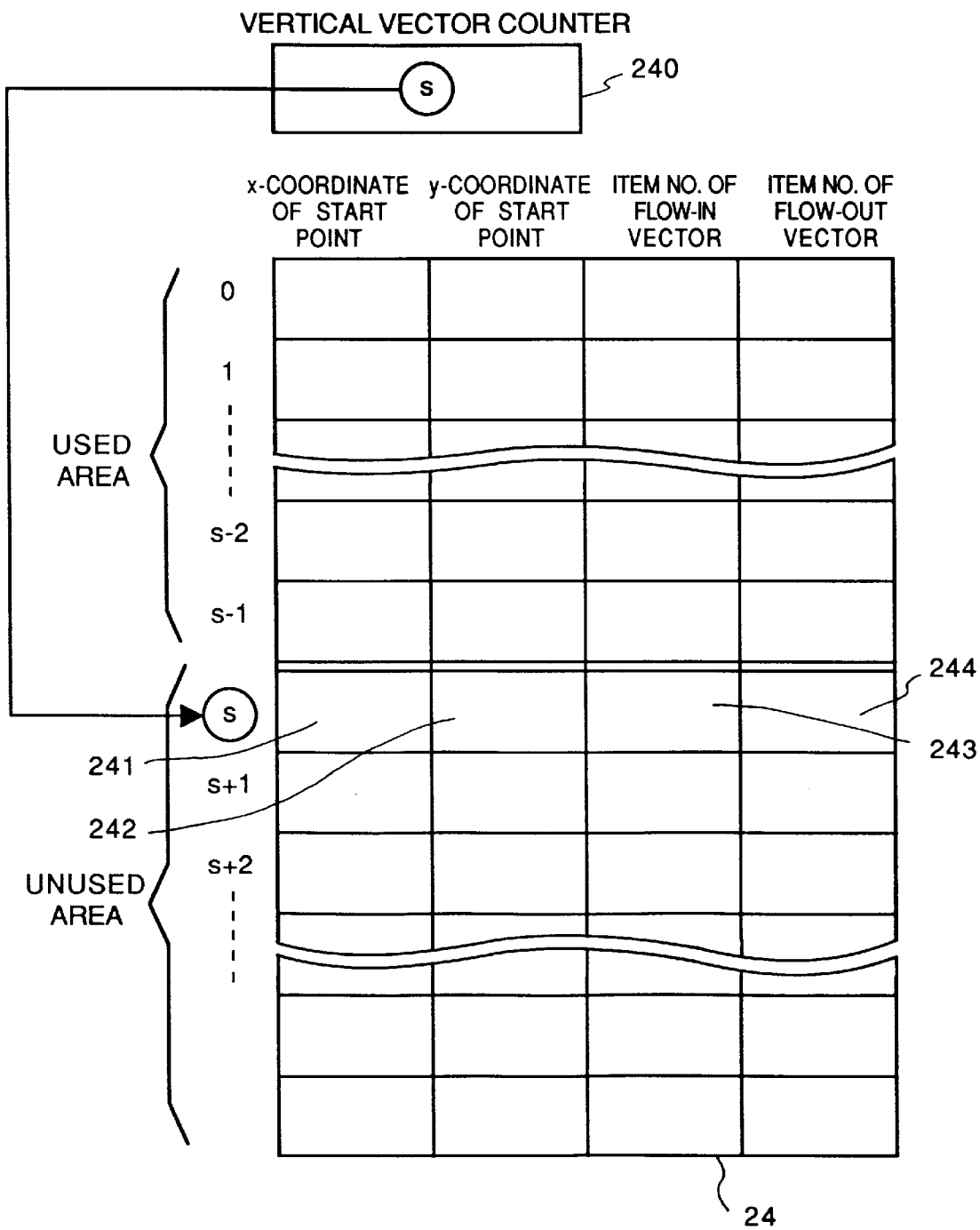
FIG. 21 shows a vertical vector registration table.

In step S2, a vector string is extracted from binary image data, and the coordinates of the start point of each vector, a vector which flows into the vector of interest (i.e., which has the coordinates of the start point of the vector of interest as the end point), and a vector which flows out from the vector of interest (i.e., which has the coordinates of the end point of the vector of interest as the start point) are output in the form of tables shown in FIGS. 20 and 21 (these tables will be defined as connection information tables hereinafter). FIG. 20 shows a table for horizontal vectors, and FIG. 21 shows a table for vertical vectors.

In step S3, it is checked if the pixel of interest is the final pixel in the raster of interest. If YES in step S3, the flow advances to step S5; otherwise, the pixel of interest is shifted to the next pixel in step S4, and the flow returns to step S2.

It is checked in step S5 if the raster of interest is a white raster (the white raster means a raster constituted by all white pixels). If YES in step S5, the flow advances to step S6; otherwise, the flow jumps to step S8.

Figure 22:
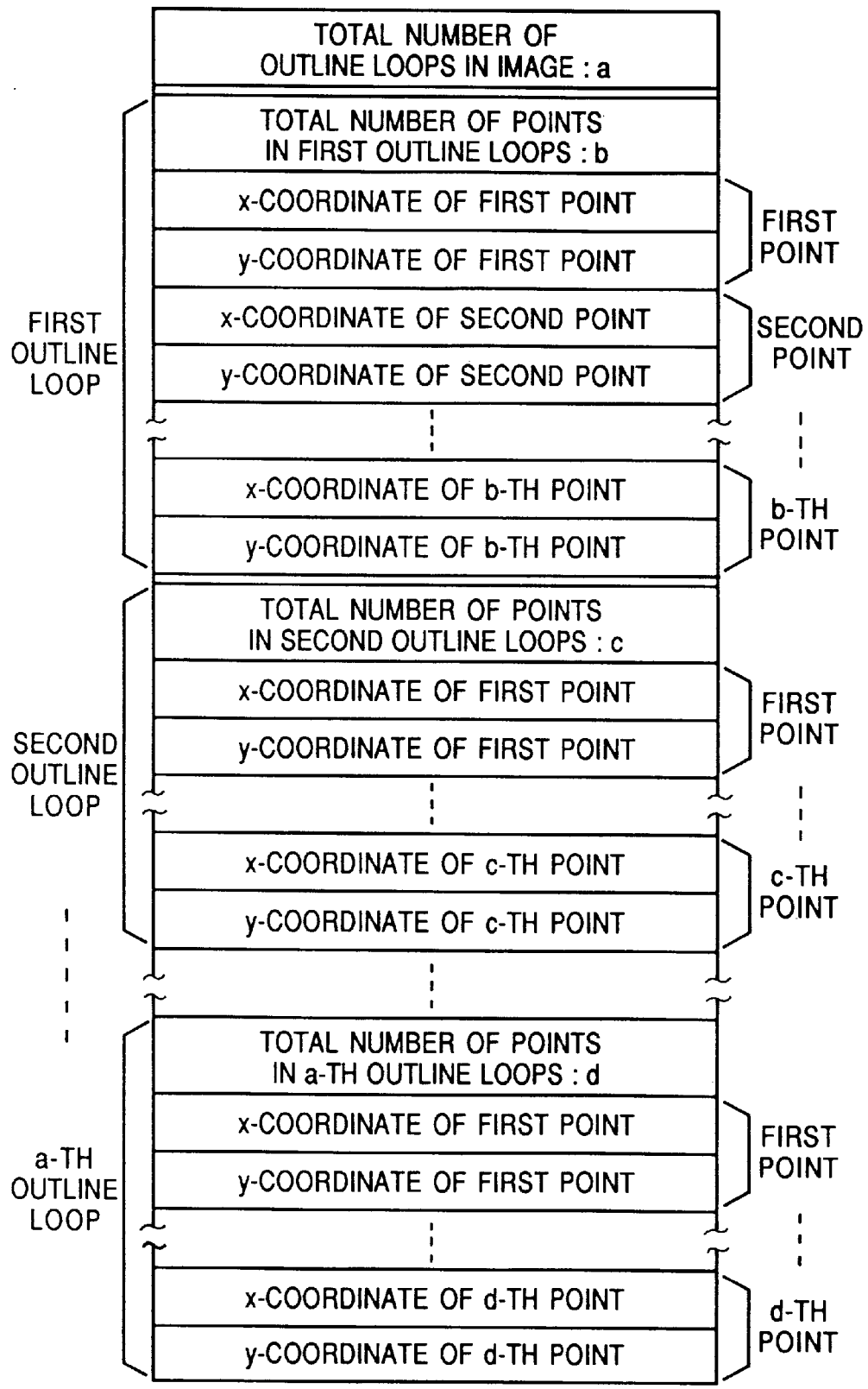
FIG. 22 shows the data format of an outline loop.

In step S6, the item numbers of flow-in and flow-out vectors are followed with reference to the tables shown in FIGS. 20 and 21, thereby forming a table, which stores the total number of outline loops in an image, the total number of points of outline loops in units of outline loops, and x- and y-coordinates of points in each outline loop, as shown in FIG. 22.

The flow then advances to step S7. In step S7, the table information is stored in the disk 522 in the form of a file via the disk I/O 521, and the contents of the tables shown in FIGS. 20 and 21 are cleared. Thereafter, the flow advances to step S8 to check if the raster of interest is the final raster in the image. If YES in step S8, the flow advances to step S10; otherwise, the flow advances to step S9. In step S9, the raster of interest is shifted to the next raster, and the pixel of interest is shifted to the start pixel of the raster of interest. Thereafter, the flow returns to step S2. In step S10, the same processing as in step S6 is performed, and thereafter, table information is stored in the disk 522 in the form of a file as in the processing in step S7.

With the above arrangement, every time a white raster is generated, information in the tables shown in FIGS. 20 and 21 is sorted and output, thereby reducing the capacities of the tables shown in FIGS. 20 and 21.

Figure 23:
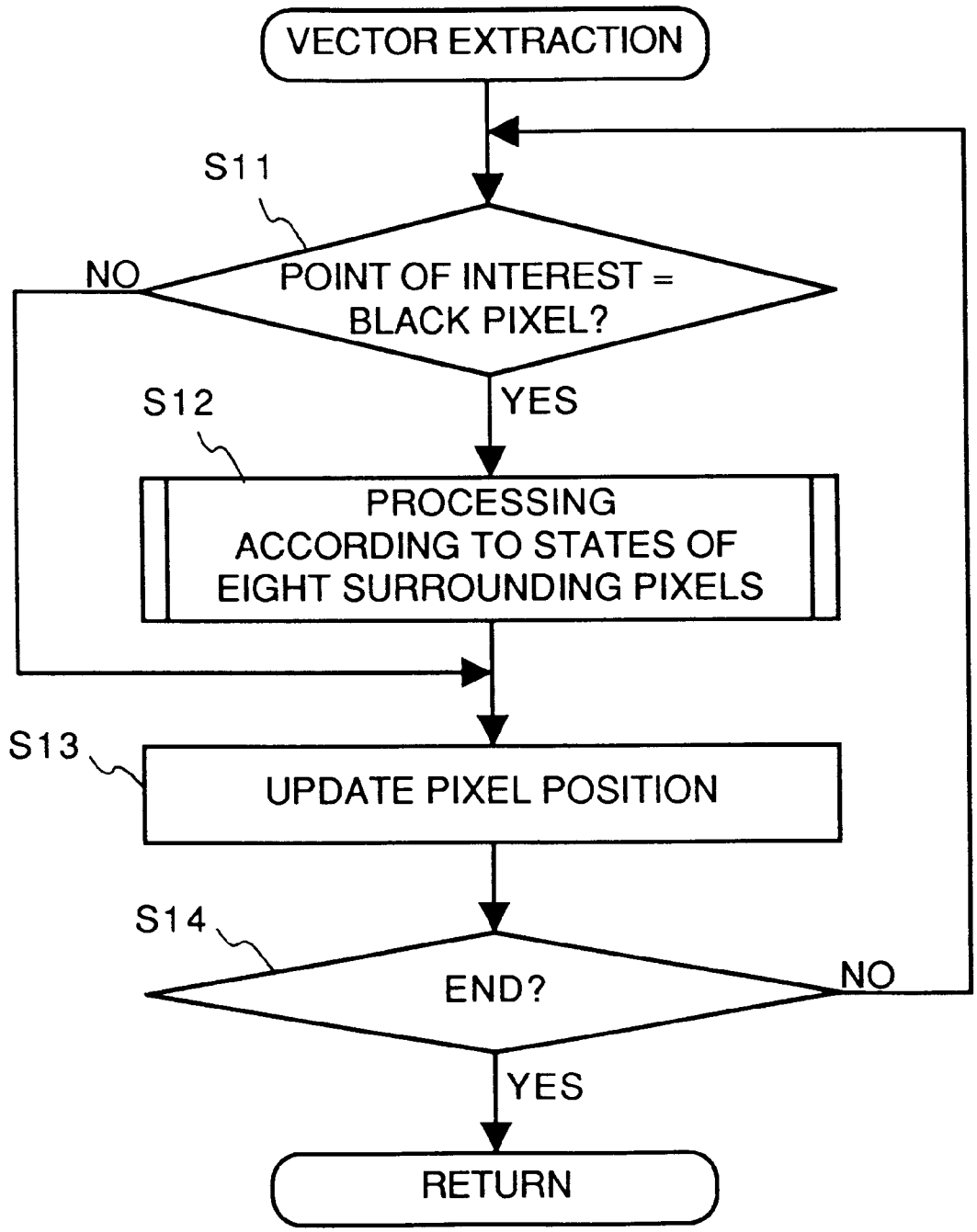
FIGS. 23 to 27 are flow charts showing vector string extraction processing.

FIG. 23 is a flow chart showing vector string extraction processing in step S2 in FIG. 19.

In step S11, it is checked with reference to bit "4" (pixel of interest) of the input port 514 whether the pixel of interest is a black or white pixel. If it is determined that the pixel of interest is a white pixel, the flow jumps to step S13; otherwise, the flow advances to step S12. In step S12, the states of the eight pixels near the pixel of interest are checked, and a proper processing routine according to the state is called.

In step S13, a pixel position updating instruction is issued via the I/O control port 517, as described above. Upon reception of an updating end signal from the I/O control port 517, the flow advances to step S14 to check via the I/O control port 517 if processing of the final pixel is ended. If it is determined in step S14 that the processing of the final pixel is not ended, the flow returns to step S11 to perform the same processing for the next pixel of interest; otherwise, the flow returns to the main routine.

Figure 24:
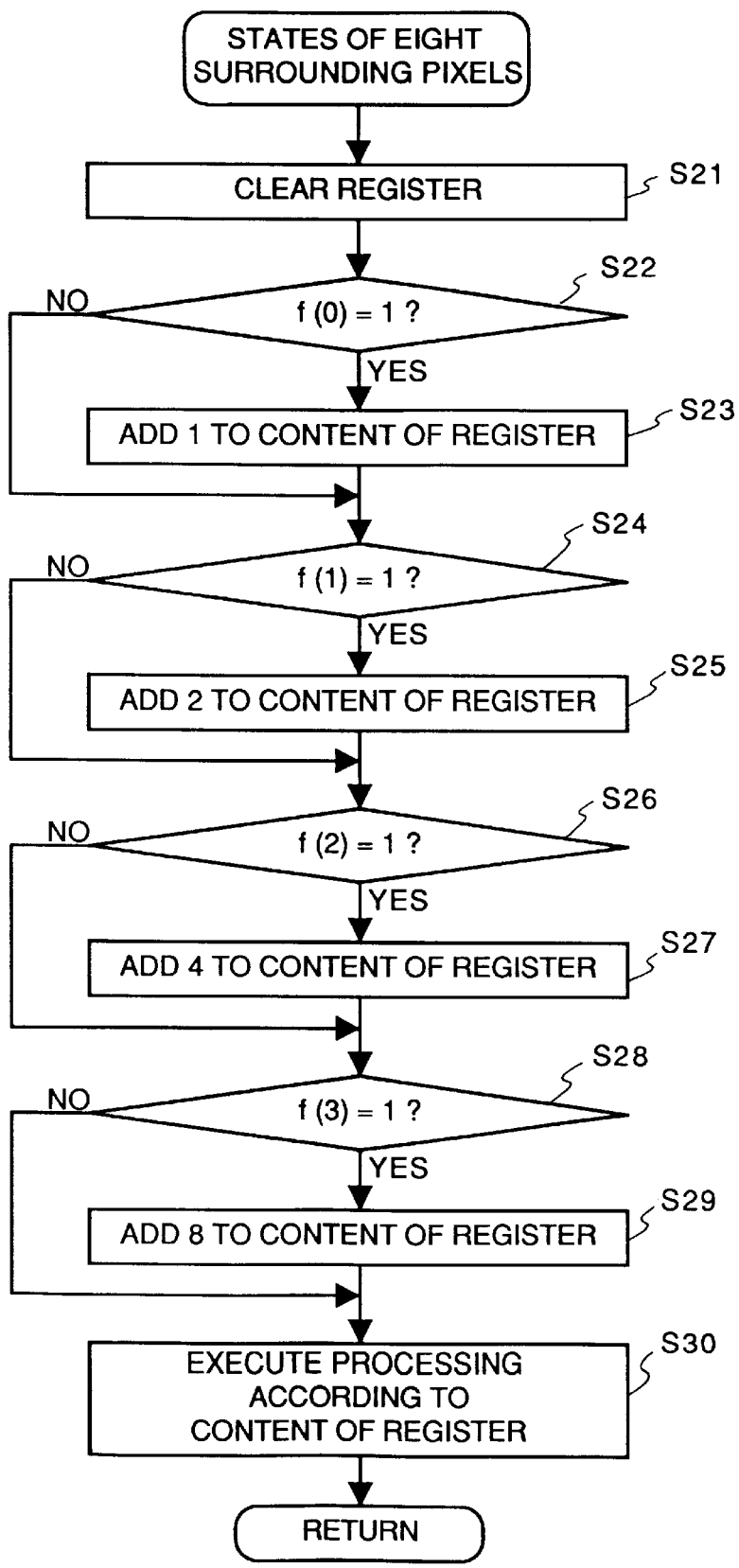

FIG. 24 is a flow chart showing processing executed according to the states of surrounding pixels in step S12 in FIG. 23.

In step S21, a register of the CPU 519 is cleared to "0". The flow advances to step S22. If it is determined in step S22 that the state of a pixel at the position indicated by "0" in FIG. 1B (to be expressed by f(0) hereinafter) indicates a black pixel (to be expressed by "1" hereinafter), the flow advances to step S23; if it indicates a white pixel (to be expressed by "0" hereinafter), the flow jumps to step S24. In step S23, the content of the register is incremented by 1.

If it is determined in step S24 that the state of a pixel at the position "1" in FIG. 1B indicates a black pixel (f(1)=1), the flow advances to step S25, and the content of the register is incremented by 2. However, if f(1)=0, the flow jumps to step S26 to check if a pixel at the position "2" in FIG. 1B is a black pixel. If f(2)=1 (black pixel), the flow advances to step S27, and the content of the register is incremented by 4.

The flow then advances to step S28 to check the state of a pixel at the position "3" in FIG. 1B. If f(3)=1, the flow advances to step S29, and the content of the register is incremented by 8; otherwise, the flow jumps to step S30. In step S30, a routine having a processing number corresponding to the value held in the register is called.

Thus, the content of the register can assume a value ranging between 0 and 15 according to the states of the pixels at the pixel positions "0", "1", "2", and "3" shown in FIG. 1B. These states are respectively shown, according to their values, in (case 0) in FIGS. 3A and 3B, (case 1) in FIGS. 4A and 4B, (case 2) in FIGS. 5A and 5B, (case 3) in FIGS. 6A to 6C, (case 4) in FIGS. 7A and 7B, (case 5) in FIGS. 8A and 8B, (case 6) in FIGS. 9A to 9C, (case 7) in FIGS. 10A to 10E, (case 8) in FIGS. 11A and 11B, (case 9) in FIGS. 12A to 12C, (case 10) in FIGS. 13A and 13B, (case 11) in FIGS. 14A to 14E, (case 12) in FIGS. 15A to 15C, (case 13) in FIGS. 16A to 16E, (case 14) in FIGS. 17A to 17E, and (case 15) in FIGS. 18A to 18S.

The processing contents of the CPU 519 in the respective states will be described in detail below.

Figure 25:
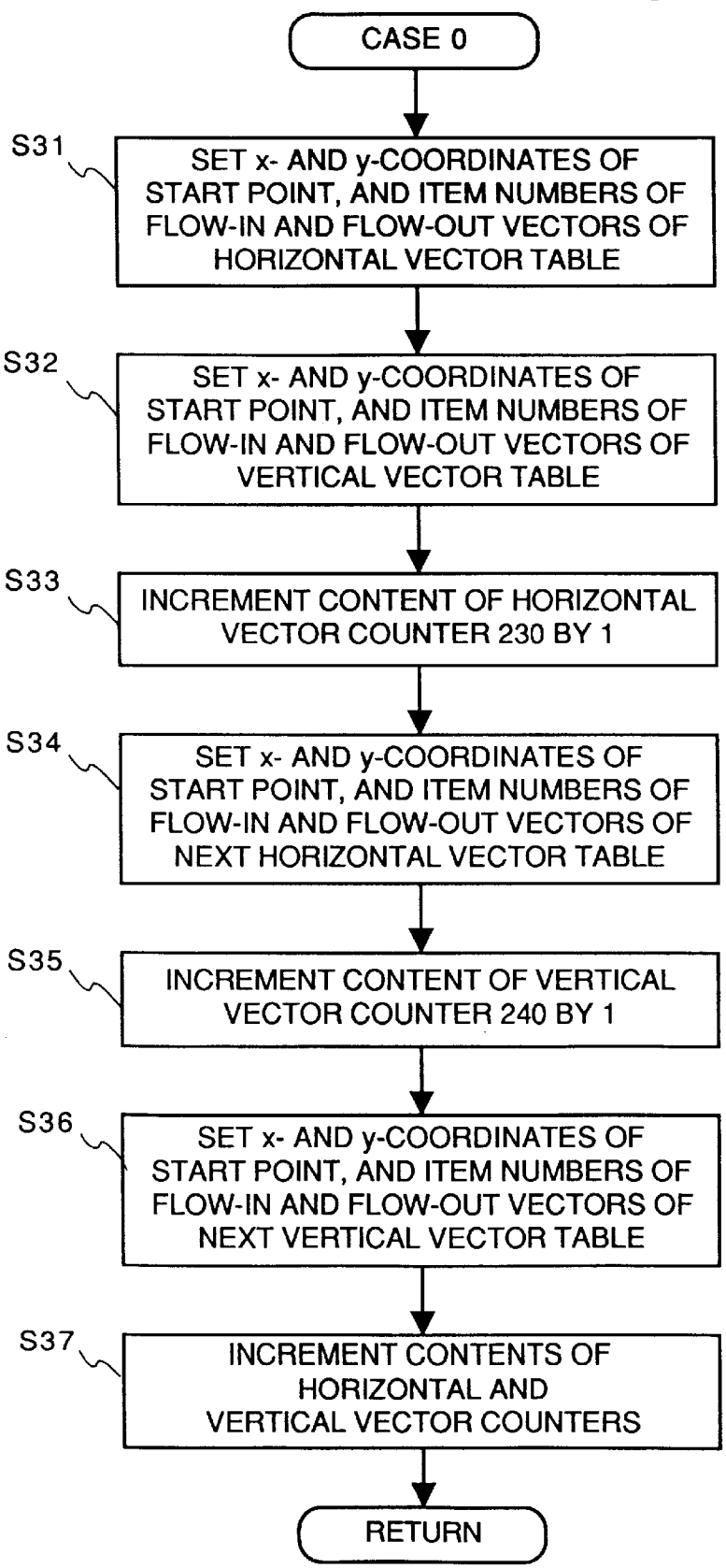

If it is determined in step S30 in FIG. 24 that the value in the register is "0", processing shown in FIG. is called. FIG. 25 shows a routine for processing a state (case 0) shown in FIGS. 3A and 3B. In the following description, assume that the coordinates of the pixel 63 of interest are (2i, 2j).

<Description of Processing in Case 0 (FIGS. 3A, 3B, 20, 21, and 25)>

In step S31 in FIG. 25, coordinates (2i−1,2j−1) are registered as the coordinates of a start point of a horizontal vector. More specifically, (2i−1) is stored in the column of the x-coordinate (231 in FIG. 20) of the start point (64 in FIG. 3B) of the horizontal vector indicated by a horizontal vector counter 230 in FIG. 20, and (2j−1) is stored in the column of the y-coordinate (232 in FIG. 20) of the start point of the horizontal vector. A vertical vector, which flows into this horizontal vector, is a vector to be stored at a position next to a vertical vector indicated by a vertical vector counter 240 in FIG. 21 at this time. A vertical vector, to which this horizontal vector flows out, is a vertical vector indicated by the vertical vector counter 240 at this time.

More specifically, in the column of the flow-in vector item number of the horizontal vector shown in FIG. 20, a value obtained by adding 1 to the value of the vertical vector counter 240 is stored at a position (a column 233 in FIG. 20) indicated by the horizontal vector counter 230. In the column of the flow-out vector item number of the horizontal vector, the value of the vertical vector counter 240 is stored at a position (a column 234 in FIG. 20) indicated by the horizontal vector counter 230.

In step S32, coordinates (2i+1,2j−1) are registered as the coordinates of a start point (65 in FIG. 3B) of a vertical vector, as in step S31. A horizontal vector, which flows into this vertical vector, is the horizontal vector registered in step S31. A horizontal vector, to which this vertical vector flows out, is a horizontal vector to be stored at the position next to the horizontal vector, which is registered in step S31 in a horizontal vector start point coordinate table 23.

More specifically, referring to a table 24 in FIG. 21, (2i+1) is stored in a column 241, (2j−1) is stored in a column 242, the value of the horizontal vector counter 230 at this time is stored in a column 243, and a value obtained by adding 1 to the value of the horizontal vector counter 230 at this time is stored in a column 244.

The flow advances to step S33, and the content of the horizontal vector counter 230 is incremented by 1. In step S34, coordinates (2i+1,2j+1) are registered as the coordinates of a start point (67 in FIG. 3B) of a horizontal vector. As a vertical vector, which flows into this horizontal vector, the vertical vector registered in step S32 is registered, and as a vertical vector to which this horizontal vector flows out, a vertical vector (i.e., a vector connecting points 66 and 64 in FIG. 3B) stored at a position next to the vertical vector registered in step S32 is registered.

In step S35, the content of the vertical vector counter 240 is incremented by 1. In step S36, coordinates (2i−1,2j+1) are registered as the start point coordinates of a vertical vector. As a horizontal vector, which flows into this vertical vector, the horizontal vector registered in step S34 is registered, and as a horizontal vector, to which this vertical vector flows out, the horizontal vector registered in step S31 is registered. In this manner, the contents of the horizontal and vertical vector counters 230 and 240 are incremented by 1 in step S37, and the processing is ended.

As a result of the above-mentioned processing, as indicated by 62 in FIG. 3B, a state wherein the two horizontal vectors, i.e., the vector connecting the points 64 and 65 and the vector connecting the points 67 and 66, and the two vertical vectors, i.e., the vector connecting the points 65 and 67 and the vector connecting the points 66 and 64 form one loop is extracted.

<Description of Case 1 (FIGS. 4A, 4B, 20, 21, and 26)>

Figure 26:
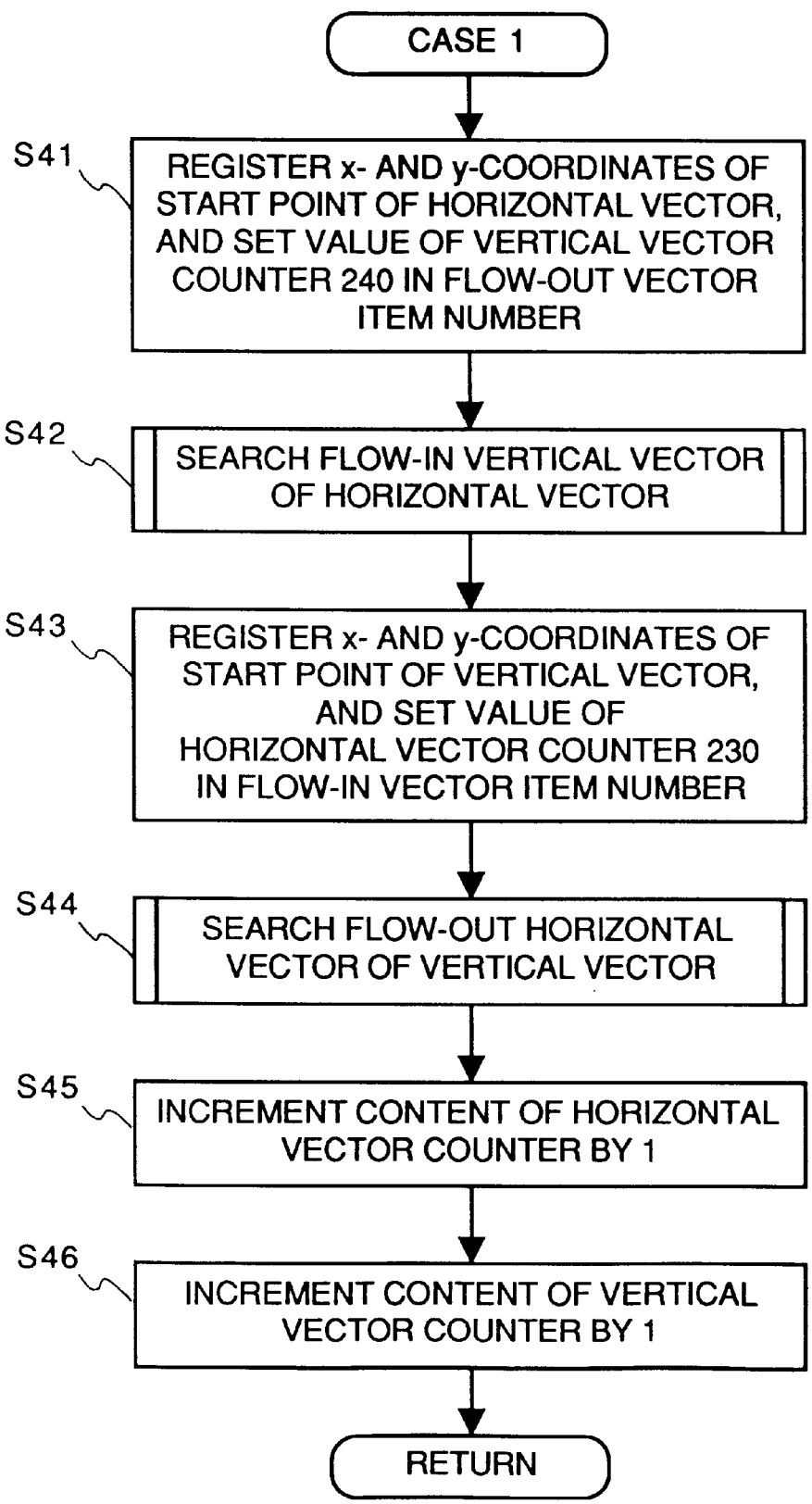

FIG. 26 is a flow chart showing processing of case 1, which processing is called if it is determined in step S30 in FIG. 24 that the value held in the register is "1."

In step S41, coordinates (2i+1,2j+1) are registered in the columns of the x- and y-coordinates of the start point of the table 23 shown in FIG. 20. A number (the column 234) of a vertical vector to which this horizontal vector flows out is assumed to be the value of the vertical vector counter 240, which value is to be registered in step S43 (to be described later). The flow advances to step S42, and a vertical vector which flows into the horizontal vector registered in step S41 is searched from a table 341 shown in FIG. 31, and is registered as a flow-in vector. The table 341 is registered with numbers of vertical vectors whose flow-out vectors are not determined. The content of the table 341 is sequentially registered, and is looked up by item numbers. The item numbers are assigned to registered vector numbers in turn from the beginning of the table. The processing content in step S42 is shown in the flow chart of FIG. 27.

In step S51, the value of a counter 340 is set to be a variable k. The counter 340 holds the number of vertical vectors whose flow-out vectors are not determined, and which are registered in the table 341. In step S52, it is checked if the content in the column of the x-coordinate of the start point of the vertical vector registered as an item number (k−1) in the table 341 is (2i+1). If the x-coordinate is not (2i+1), the variable k is decremented by 1, and step S52 is executed again. If it is determined in step S52 that the x-coordinate of the start point is (2i+1), the flow advances to step S54.

If "YES" is determined in step S52, it is determined that the vertical vector with the item number (k−1) in the table 341 is the flow-in vector of the horizontal vector registered in step S41, and it is also determined that the horizontal vector registered in step S41 is the flow-out vector of this vertical vector. Therefore, in step S54, the vertical vector number registered as the item number (k−1) in the table 341 is stored in the column 233 of the flow-in vector item number of the horizontal vector indicated by the horizontal vector counter 230 in FIG. 20, and the value of the horizontal vector counter 230 in step S43 is stored in the column of the flow-out vector item number of the vertical vector in FIG. 21.

In step S55, the number of the vector whose flow-out vector is determined in steps S53 and S54 is deleted from the table 341, and the deleted portion is filled in sequentially by sorting vectors. In step S56, since the number of vertical vectors whose flow-out vectors are not determined is decreased by 1, the value of the counter 340 is decremented by one, and the control returns to the previous routine.

The processing in step S42 in FIG. 26 is ended, as described above, and the flow then advances to step S43. In step S43, coordinates (2i−1,2j+1) are registered as the start point of a vertical vector, and as a horizontal vector, which flows into this vertical vector, a number of the horizontal vector registered in step S41 is registered. In step S44, a horizontal vector to which the vertical vector registered in step S43 flows out is searched from a table 311 shown in FIG. 28, and is registered. The table 311 is registered with numbers of vectors whose flow-in vectors are not determined. The processing content in step S44 is shown in the flow chart of FIG. 32.

Figure 27:
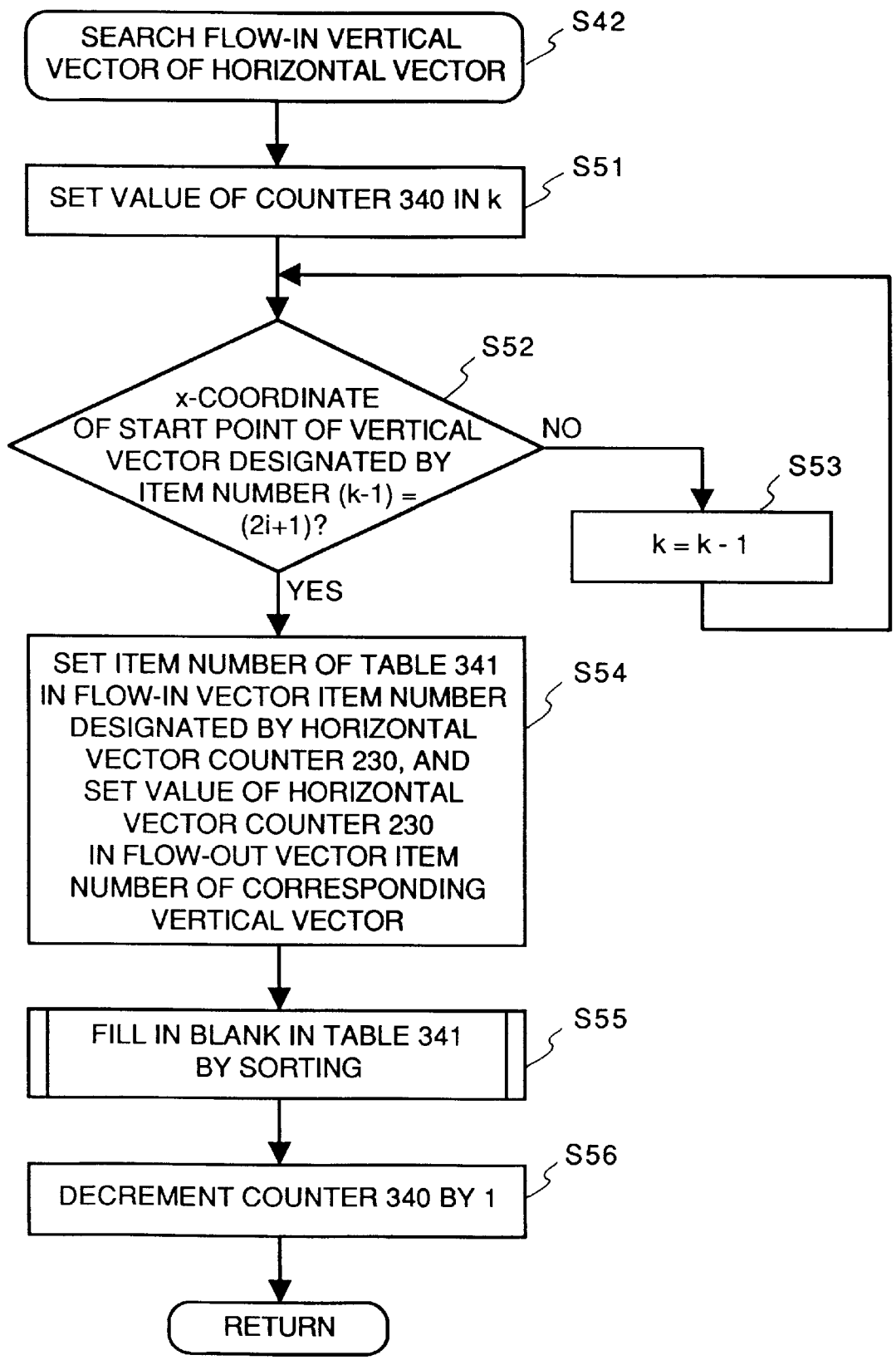
Figure 28:
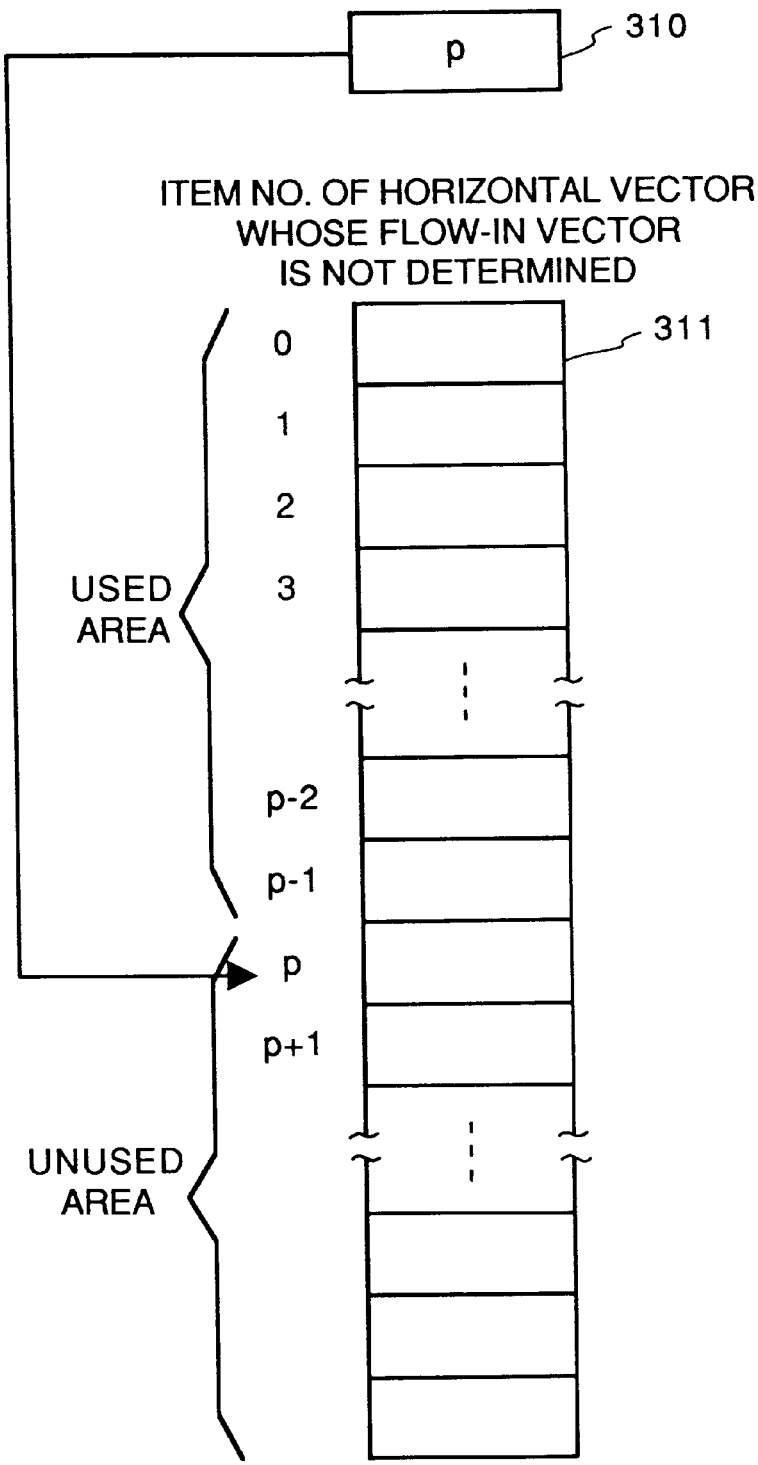
FIG. 28 shows a registration table for horizontal vectors whose flow-in vectors are not determined.

This processing is executed in the same manner as in the processing shown in FIG. 27. More specifically, the horizontal vector to which the vertical vector registered in step S43 flows out is registered in the column of the flow-out vector of the table 24 shown in FIG. 21. The value of the vertical vector counter 240 is set in the column of the flow-in vector item number of the horizontal vector which flows into this vertical vector so as to register that this vertical vector is a flow-in vector. In this manner, the table 311 shown in FIG. 28 is updated.

In step S45, the content of the horizontal vector counter 230 is incremented by 1. In step S46, the content of the vertical vector counter 240 is incremented by 1. Thereafter, the control returns to the previous routine.

<Description of Processing in Case 2 (FIGS. 5A, 5B, 20, 21, 30, and 33)>

Figure 33:
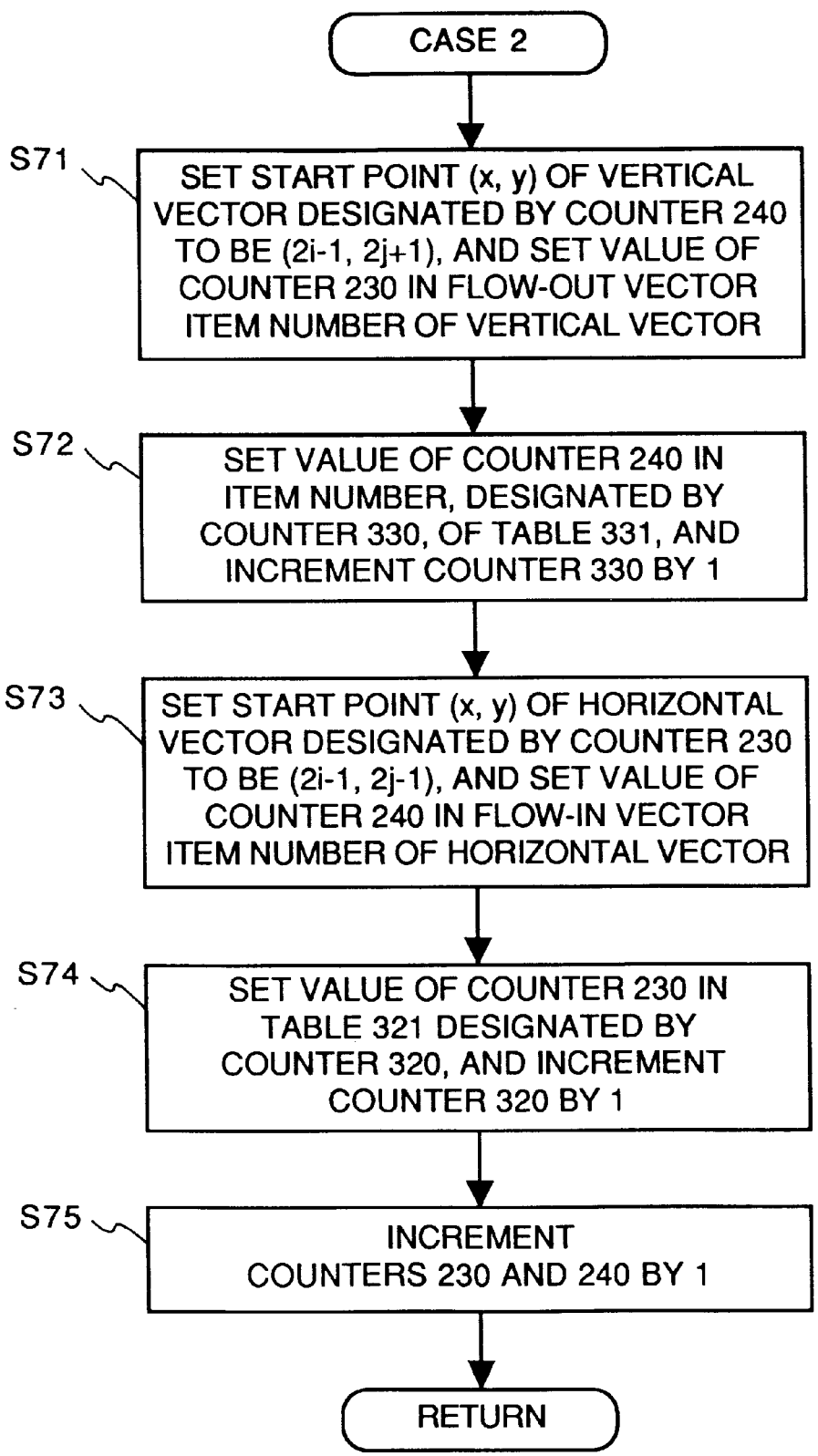

If it is determined in step S30 in FIG. 24 that the value held in the register is "2", processing shown in FIG. 33 is executed.

Figure 5A:
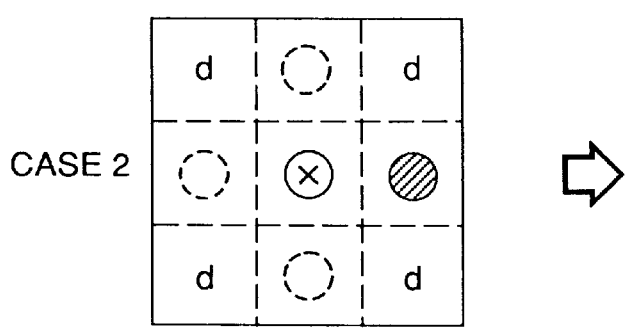
Figure 5B:
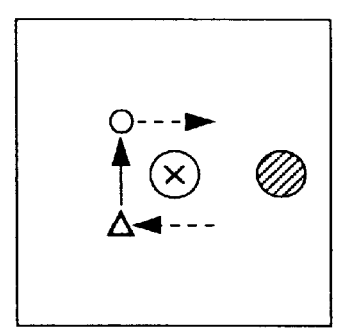

The processing shown in FIG. 33 is a sequence for processing the state shown in FIGS. 5A and 5B.

In step S71, coordinates (2i−1,2j+1) are registered as the start point of a vertical vector indicated by the vertical vector counter 240 of the table 24 shown in FIG. 21, and as a horizontal vector to which this vertical vector flows out, a horizontal vector to be registered in step S73 is registered. In step S72, the vertical vector registered in step S71 is registered in an unused area neighboring the used area in a table 331 shown in FIG. 30 since a horizontal vector which flows into this vertical vector is not determined. In addition, the content of a counter 330 is incremented by 1. The table 331 is registered with numbers of vertical vectors whose flow-in vectors are not determined. The content of the counter 330 indicates the number of vectors registered in the table 331.

The flow then advances to step S73. In step S73, coordinates (2i−1,2j−1) are registered as the start point of a horizontal vector indicated by the counter 230 shown in FIG. 20, and as a vertical vector which flows into this horizontal vector, the vertical vector registered in step S71 is registered.

Figure 29:
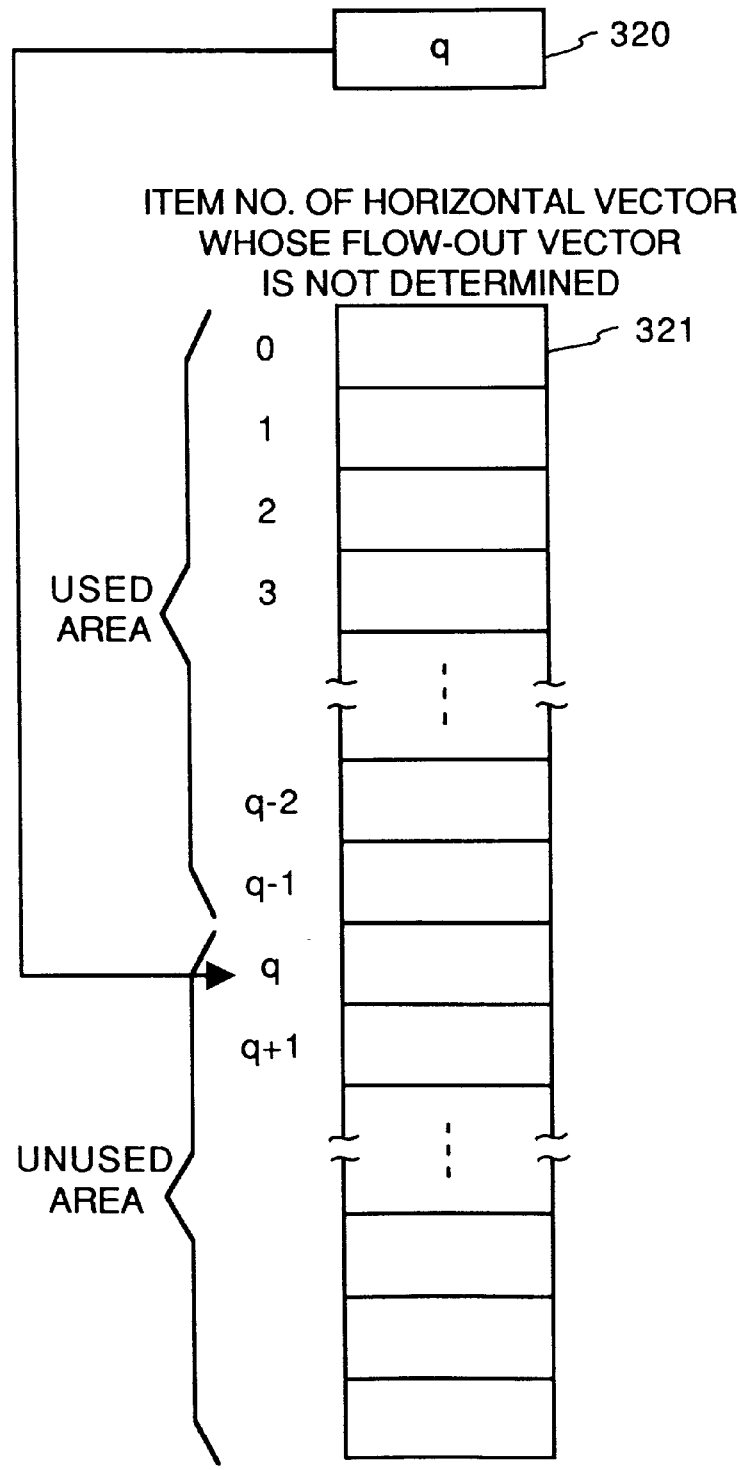
FIG. 29 shows a registration table for horizontal vectors whose flow-out vectors are not determined.

In step S74, the horizontal vector registered in step S73 is registered in an unused area neighboring the used area in a table 321 shown in FIG. 29 as a vector whose flow-out vertical vector is not determined, and the content of a counter 320 is incremented by 1. The table 321 is registered with numbers of horizontal vectors whose flow-out vectors are not determined, and the content of the counter 320 indicates the number of vectors registered in the table 321.

In step S75, the contents of the horizontal and vertical vector counters 230 and 240 are incremented by 1, and the control returns to the previous routine.

<Description of Case 3 (FIGS. 6A to 6C, 20, 21, and 34)>

Figure 34:
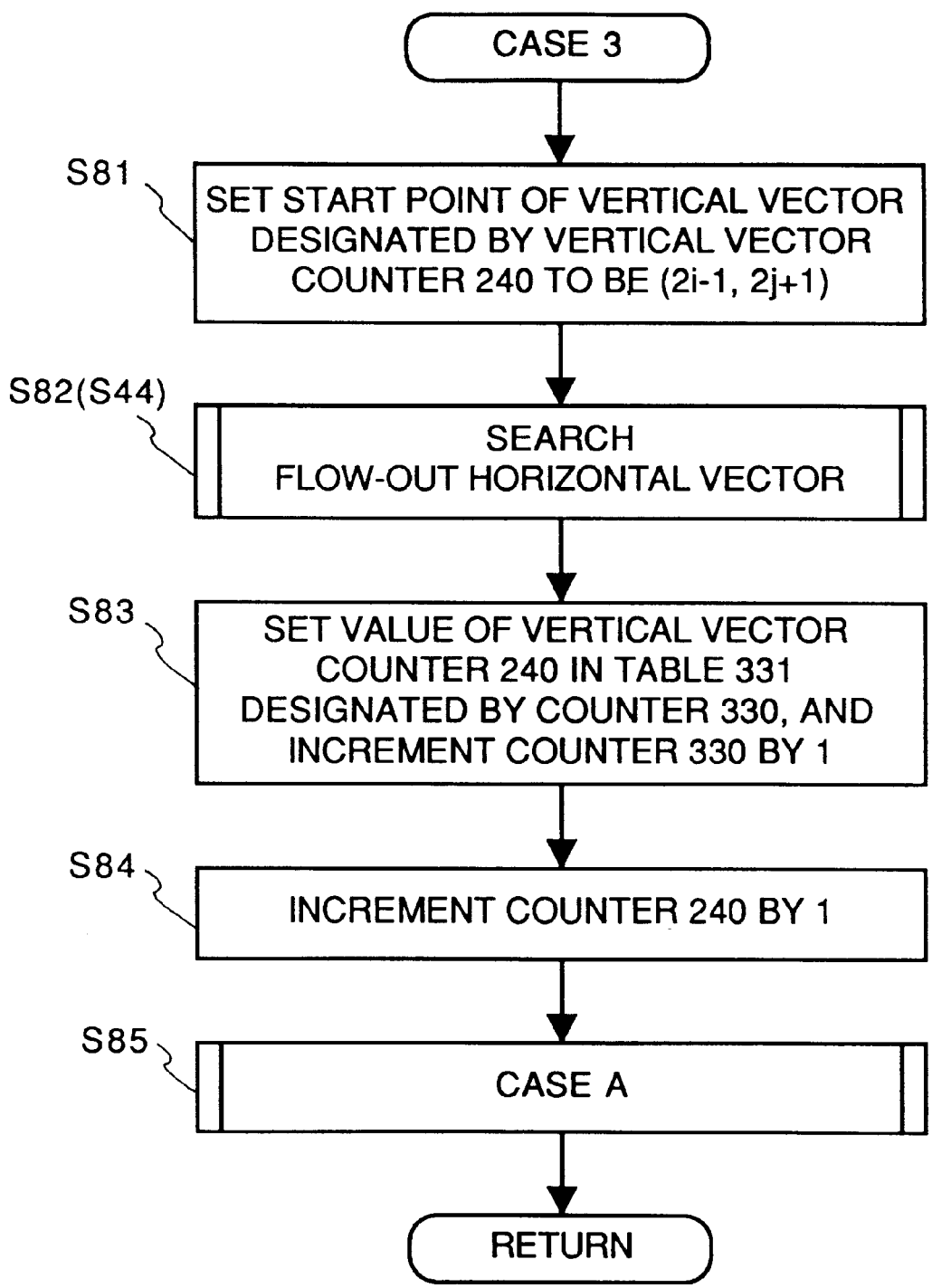

If it is determined in step S30 in FIG. 24 that the value in the register is "3", processing shown in FIG. 34 is executed. The processing shown in FIG. 34 is a sequence for processing the state shown in FIGS. 6A to 6C.

In step S81, coordinates (2i−1,2j+1) are registered as the start point of a vertical vector 91 (FIG. 6B or 6C). The flow advances to step S82 to obtain a horizontal vector to which the vertical vector registered in step S81 flows out, in the same manner as in step S44 described above. In step S83, the value of the vertical vector counter 240 is set in the table 331 indicated by the counter 330, and thereafter, the content of the counter 330 is incremented by 1. In step S84, the content of the vertical vector counter 240 is incremented by 1. In step S85, processing of case A is executed. This processing is shown in the flow chart of FIG. 35.

Figure 35:
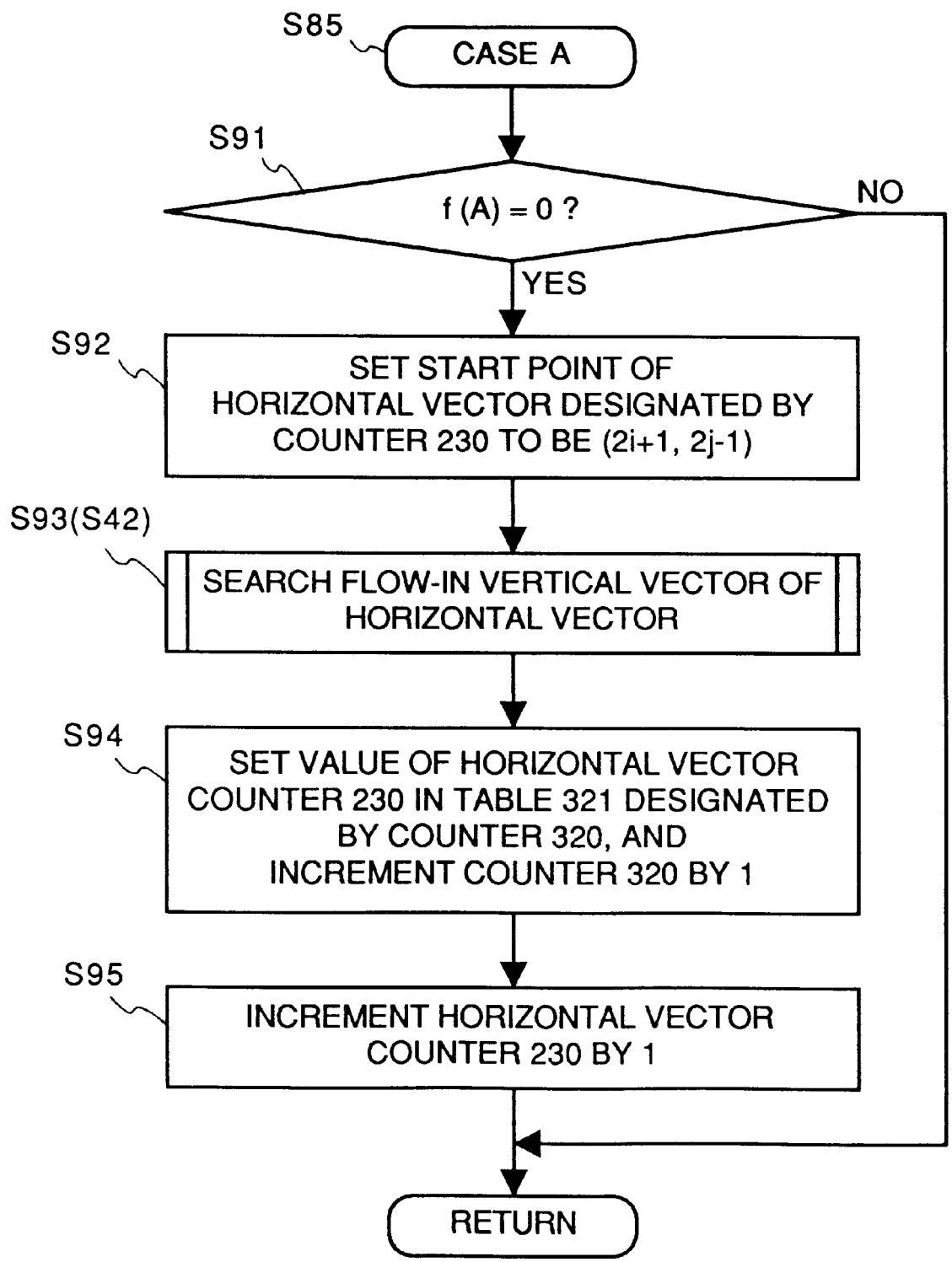

Referring to the flow chart of FIG. 35, in step S91, it is checked if a pixel A in FIG. 6A is a white pixel, i.e., "0". If NO in step S91, the processing is ended without any processing. This state is indicated by 93 in FIG. 6C.

If the pixel A is a white pixel, the flow advances to step S92, the start point of a horizontal vector 94 (FIG. 6B) is set to be (2i+1,2j−1). In step S93, a vertical vector which flows into this horizontal vector is searched. The flow then advances to step S94, and the number of this horizontal vector is set in the table 321 since the flow-out vector of this horizontal vector is not determined. In step S95, the content of the horizontal vector counter 230 is incremented by 1, and the processing is ended.

<Description of Case 4 (FIGS. 7A, 7B, 20, 21, 28 to 31, and 36)>

Figure 36:
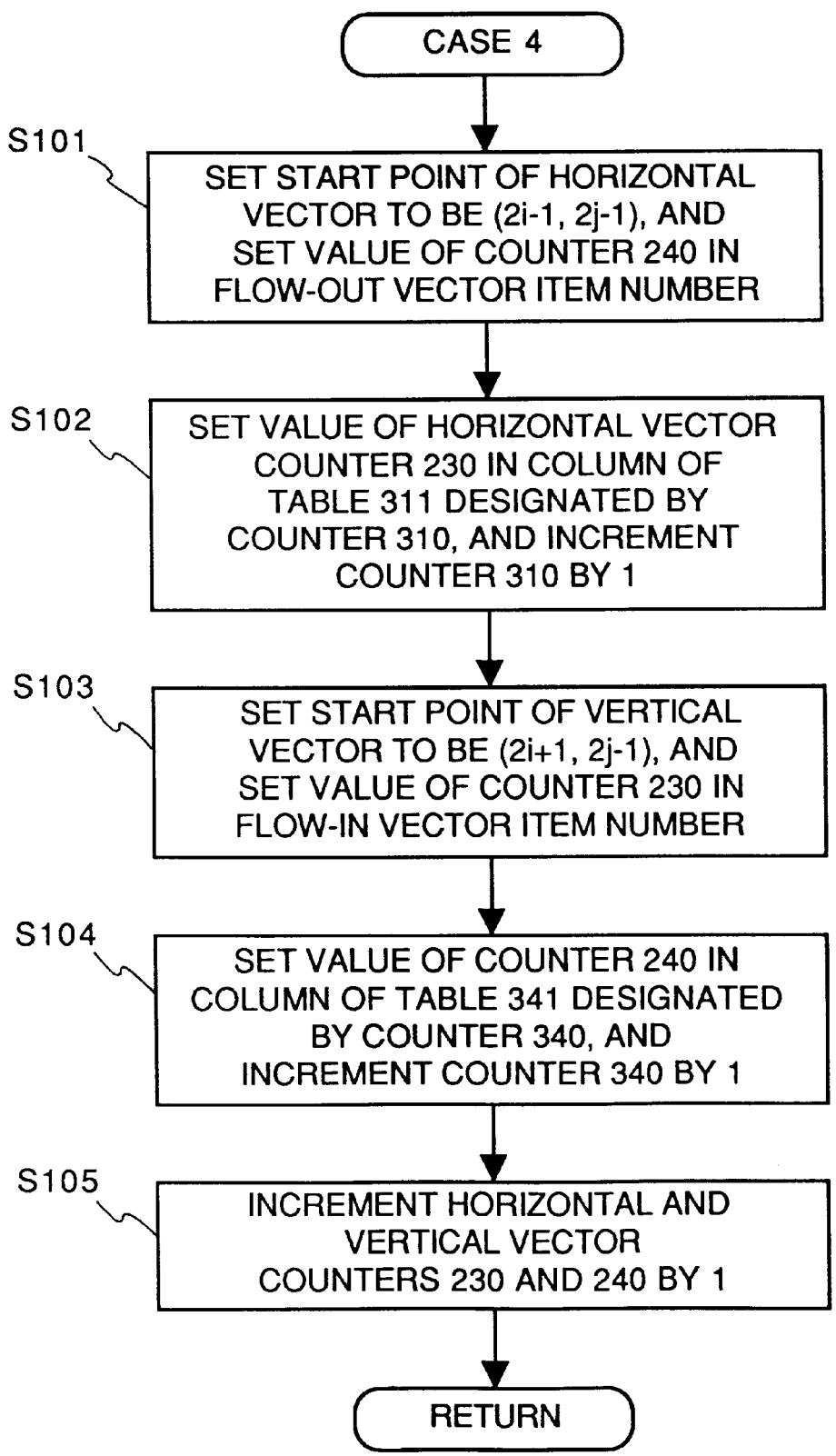

If it is determined in step S30 in FIG. 24 that the value in the register is "4", a routine shown in FIG. 36 is called. In this routine, processing for case 4 shown in FIGS. 7A and 7B is executed.

In FIGS. 7A and 7B, in step S101, coordinates (2i−1,2j−1) are registered as the start point of a horizontal vector 102. In addition, it is determined that a vector to which this horizontal vector 102 flows out is a vertical vector to be registered in step S103, and the value of the vertical vector counter 240 at this time is set in the column of the flow-out vector item number in the table of FIG. 20. In step S102, it is determined that a vector which flows into the vector 102 registered in step S101 is not determined, and the value of the counter 230 is registered in the table 311 shown in FIG. 28, thereby updating the table 311. In step S103, coordinates (2i+1,2j−1) are defined as the start point of a vertical vector 103 (FIG. 7B). In addition, it is determined that a vector which flows into this vector is the horizontal vector 102 registered in step S101, and the value of the horizontal vector counter 230 is set in the column of the flow-in vector item number in the table 24 shown in FIG. 21. In step S104, it is determined that a vector to which the vertical vector 103 registered in step S103 flows out is not determined, and the value of the vertical vector counter 240 is set in the table 341 indicated by the counter 340 in FIG. 31. In step S105, the contents of the horizontal and vertical vector counters 230 and 240 are incremented by 1, and the control returns to the previous routine.

<Description of Case 5>

If it is determined in step S30 in FIG. 24 that the value in the register is "5", a routine shown in FIG. 37 is called. The routine shown in FIG. 37 is called in the state shown in FIGS. 8A and 8B, and the control returns without any processing.

<Description of Case 6 (FIGS. 9A to 9C, 20, 21, 28 to 31, 38 and 39)>

If it is determined in step S30 in FIG. 24 that the value in the register is "6", a routine shown in the flow chart of FIG. 38 is called. In this routine, processing for case 6 shown in FIGS. 9A to 9C is executed.

In step S777, the start point of a horizontal vector 122 (FIG. 9B) indicated by the counter 230 in FIG. 20 is registered as (2i−1,2j−1). In step S112, it is determined that a flow-out vector of the horizontal vector 122 registered in step S111 is not determined, and the content of the counter 230 is set in the table 321 in FIG. 29, as in step S94 in FIG. 35. The table 321 is registered with numbers of horizontal vectors whose flow-out vectors are not determined. In step S113, it is determined that a vector which flows into the horizontal vector 122 registered in step S111 is not determined, and the value of the counter 230 is registered in the table 311 shown in FIG. 28, as in step S102 in FIG. 36. The table 311 is registered with horizontal vectors whose flow-in vectors are not determined. In step S114, the content of the horizontal vector counter 230 is incremented by 1. In step S115, it is checked if a pixel at a position (B) is a white or black pixel. If the pixel is a white pixel, coordinates (2i+1,2j−1) are registered as the start point of a vertical vector 124, as indicated by a matrix 120 in FIG. 9B; if the pixel is a black pixel, the processing is ended, as indicated by a matrix 121 in FIG. 9C.

Figure 39:
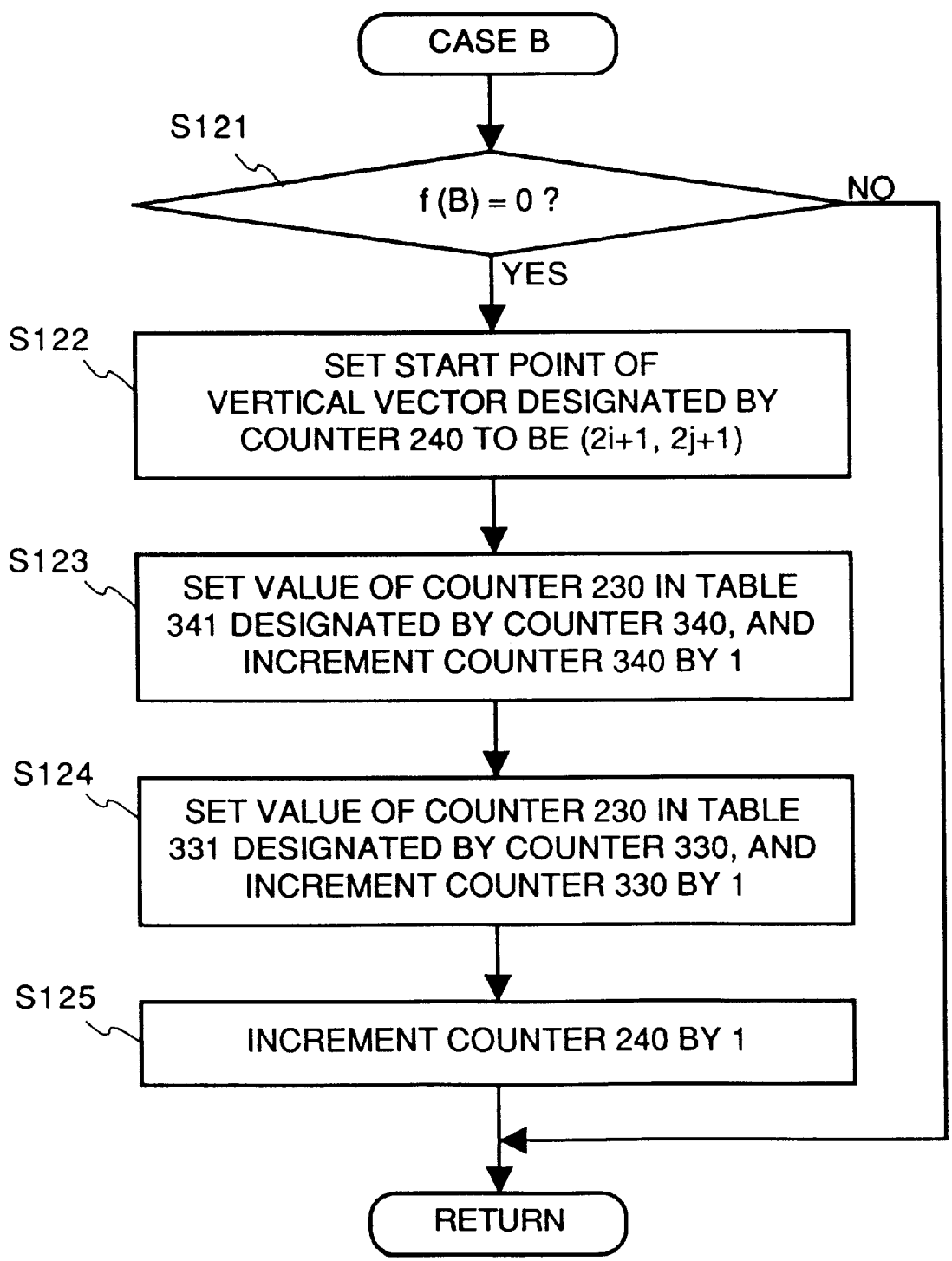

FIG. 39 shows the details of the processing in step S115.

In step S121, it is checked if the pixel B is a white or black pixel. If the pixel B is a black pixel, the flow returns. If the pixel B is a white pixel, the flow advances to step S122. In step S122, coordinates (2i+1,2j+1) are registered as the start point of the vertical vector 124. In step S123, it is determined the vertical vector 124 is a vertical vector whose flow-out vector is not determined, and the value of the counter 240 is set in the table 341 in FIG. 31, as in step S104 in FIG. 36. Furthermore, in step S124, it is determined that a vector which flows into the vertical vector 124 registered in step S122 is not determined, and the value of the counter 240 is set in the table 331 in FIG. 30, as in step S72 in FIG. 33. In step S125, the content of the vertical vector counter 240 is incremented by 1, and the control returns to the previous routine.

<Description of Case 7 (FIGS. 10A to 10E, 35, 39, and 40)>

Figure 40:
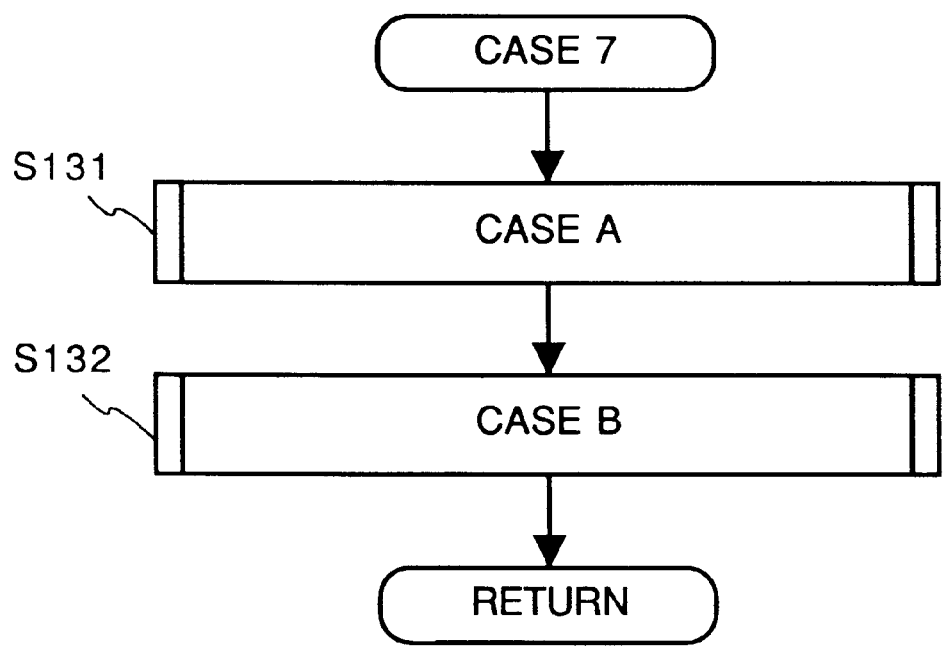

If it is determined in step S30 in FIG. 24 that the value of the register is "7", a routine shown in the flow chart of FIG. 40 is executed. In this routine processing for case 7 shown in FIGS. 10A to 10E is executed.

In step S131, processing according to the state of a pixel A in FIG. 10A is performed, as in step S85 in FIG. 35. In step S132, processing according to the state of a pixel B in FIG. 10A is performed as in step S115 in FIG. 38, and the flow returns to the previous routine.

FIG. 10B shows a case wherein both the pixels at the positions (A) and (B) are white pixels, FIG. 10C shows a case wherein only the pixel at the position (A) is a black pixel, FIG. 10D shows a case wherein only the pixel at the position (B) is a black pixel, and FIG. 10E shows a case wherein both the pixels at the positions (A) and (B) are black pixels.

<Description of Case 8 (FIGS. 11A, 11B, and 41 to 43)>

Figure 41:
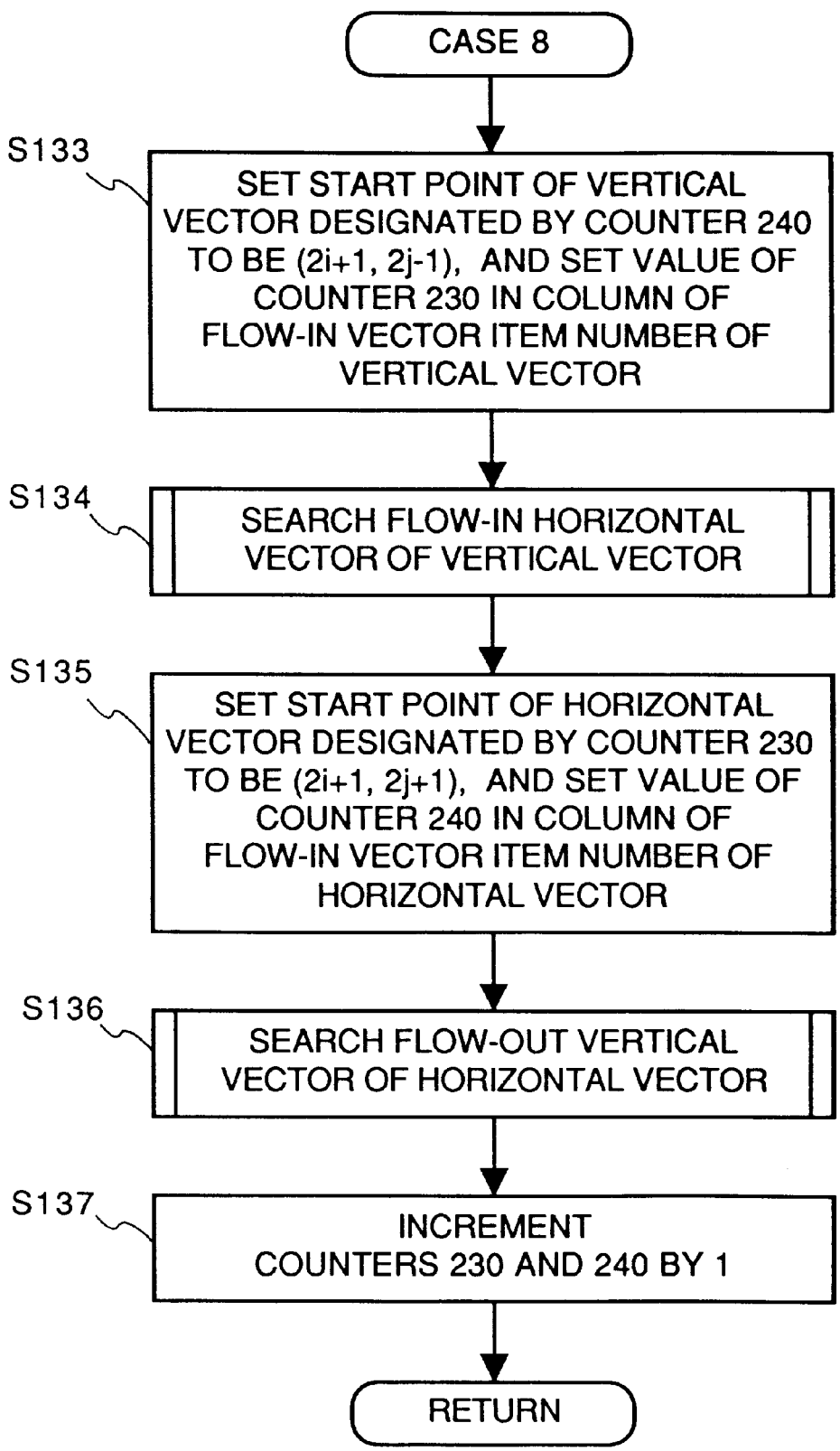

If it is determined in step S30 in FIG. 24 that the value of the register is "8", a processing routine shown in FIG. 41 is called. In this routine, processing for case 8 shown in FIGS. 11A and 11B is executed.

In step S133, the start point of a vertical vector 141 (FIG. 11B) designated by the vertical vector counter 240 is registered as (2i+1,2j−1) in the table shown in FIG. 21. It is determined that a horizontal vector to which this vector flows out is a vector to be registered in step S135 (to be described later), and the value of the counter 230 is registered in the column of the flow-out vector item number. In step S134, a horizontal vector which flows into the vertical vector 141 registered in step S133 is obtained in a procedure shown in FIG. 42 using the table 321 shown in FIG. 29.

Figure 32:
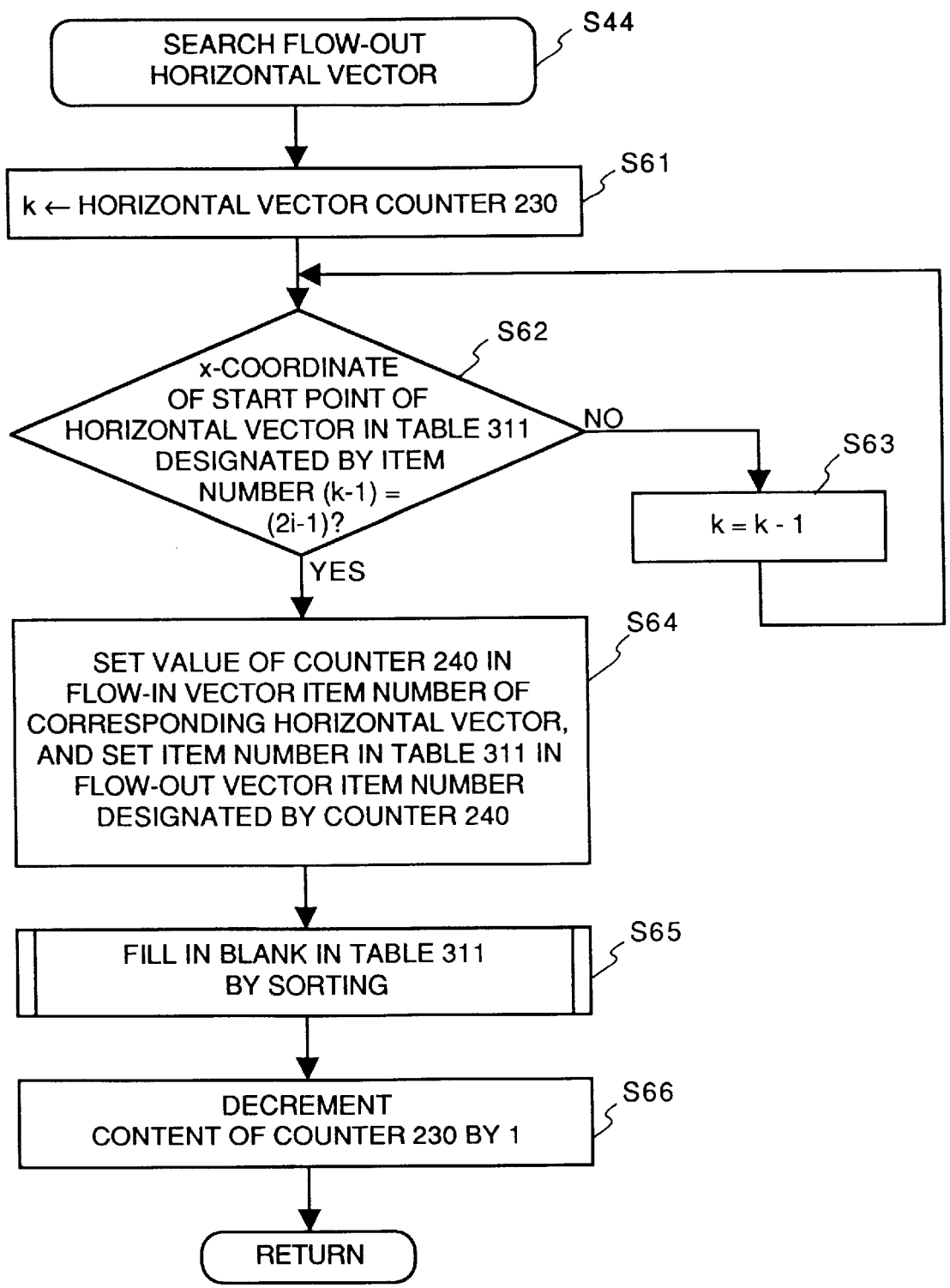
Figure 42:
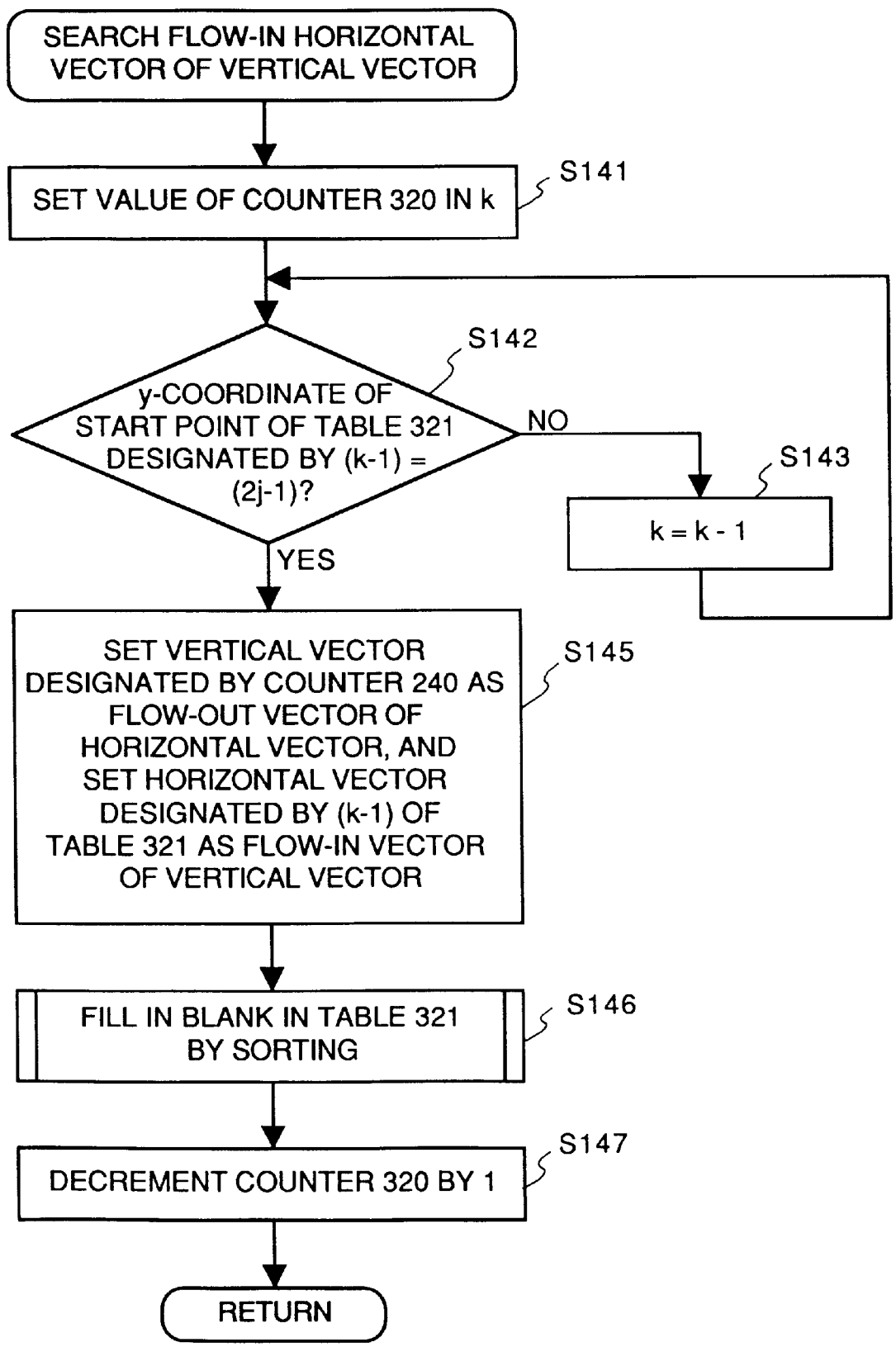

The processing shown in the flow chart of FIG. 42 is the same as the processing shown in FIGS. 27 and 32 described above. The horizontal vector which flows into the vertical vector 141 registered in step S133 is registered, and it is determined that a vertical vector to which this horizontal vector flows out is registered as the vertical vector 141 registered in step S133 (step S145). In step S146, the blank column of the table 321 is filled in sequentially by sorting the vectors. In step S147, the content of the counter 320 is decremented by 1, thus updating the table 321 shown in FIG. 29.

In step S135 shown in FIG. 41, the start point of a horizontal vector 142 (FIG. 11B) designated by the horizontal vector counter 230 is registered as (2i+1,2j+1) in the table shown in FIG. 20. It is determined that a vertical vector which flows into this vector 142 is the vertical vector 141 registered in step S133, and the value of the counter 240 is registered in the table shown in FIG. 20. In step S136, a vertical vector to which the horizontal vector registered in step S135 flows out is obtained according to a procedure shown in FIG. 43 using the table 331 shown in FIG. 30.

Figure 43:
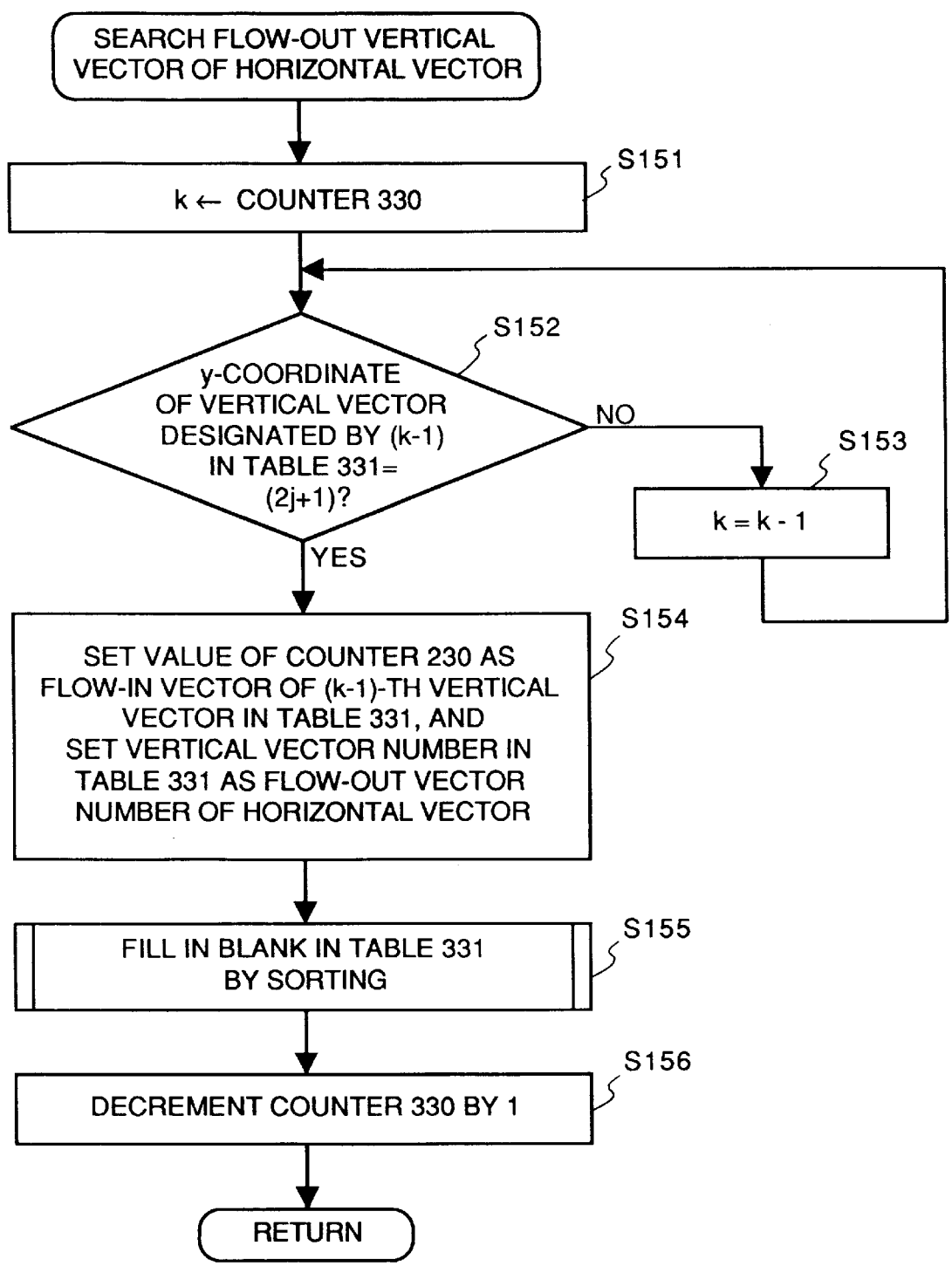

The processing in FIG. 43 is the same as the processing shown in FIGS. 27, 32, and 42 described above. A vertical vector to which the horizontal vector 142 registered in step S135 in FIG. 41 is registered, and it is registered that an original vector which flows into this vertical vector is the horizontal vector 142 registered in step S135 (step S154 in FIG. 43). Thereafter, the content of the table 331 shown in FIG. 30 is updated in steps S155 and S156.

Referring back to FIG. 41, in step S137, the horizontal and vertical vector counters 230 and 240 are respectively incremented by 1, and the flow returns to the previous routine.

<Description of Case 9 (FIGS. 12A to 12C, and 44)>

Figure 44:
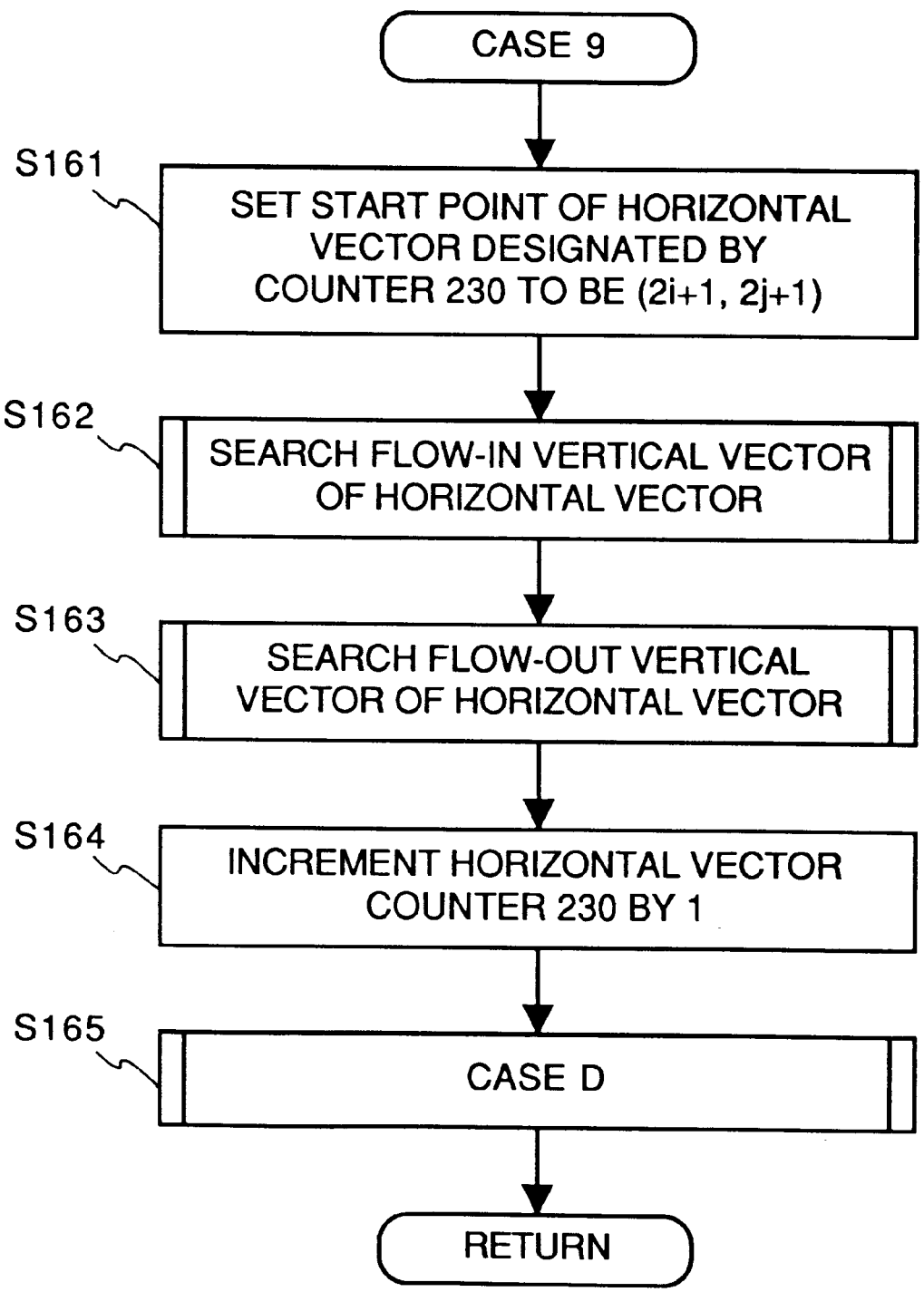

If it is determined in step S30 in FIG. 24 that the value of the register is "9", a routine shown in FIG. 44 is called. In this routine, processing for case 9 shown in FIGS. 12A to 12C is executed.

In step S161, coordinates (2i+1,2j+1) are registered as the start point of a horizontal vector 151 (FIG. 12B). In step S162, a vertical vector which flows into this horizontal vector 151 is searched from the table 341 shown in FIG. 31, and the searched vector is registered, in the same procedure as that shown in FIG. 27. In addition, a value indicating that a horizontal vector to which the searched vector flows out is the horizontal vector registered in step S161 is registered in the table shown in FIG. 21. Thus, the table 341 shown in FIG. 41 is updated.

In step S163, a vertical vector to which the horizontal vector 151 registered in step S161 flows out is searched from the table shown in FIG. 30, and the searched vector is registered, in the same procedure as that shown in FIG. 43. In addition, a value indicating that a horizontal vector to which a vector which flows into this vertical vector is the horizontal vector 151 registered in step S161 is registered. Thereafter, the table 331 shown in FIG. 30 is updated.

In step S164, the content of the horizontal vector counter 230 is incremented by 1. In step S165, it is checked if a pixel at a position (D) is a white or black pixel. If the pixel at the position (D) is a white pixel, coordinates (2i−1,2j−1) are registered as the start point of a vertical vector 154, as shown in a matrix 152 of FIG. 12B; if it is a black pixel, the processing is ended (a matrix 153 shown in FIG. 12C).

Figure 45:
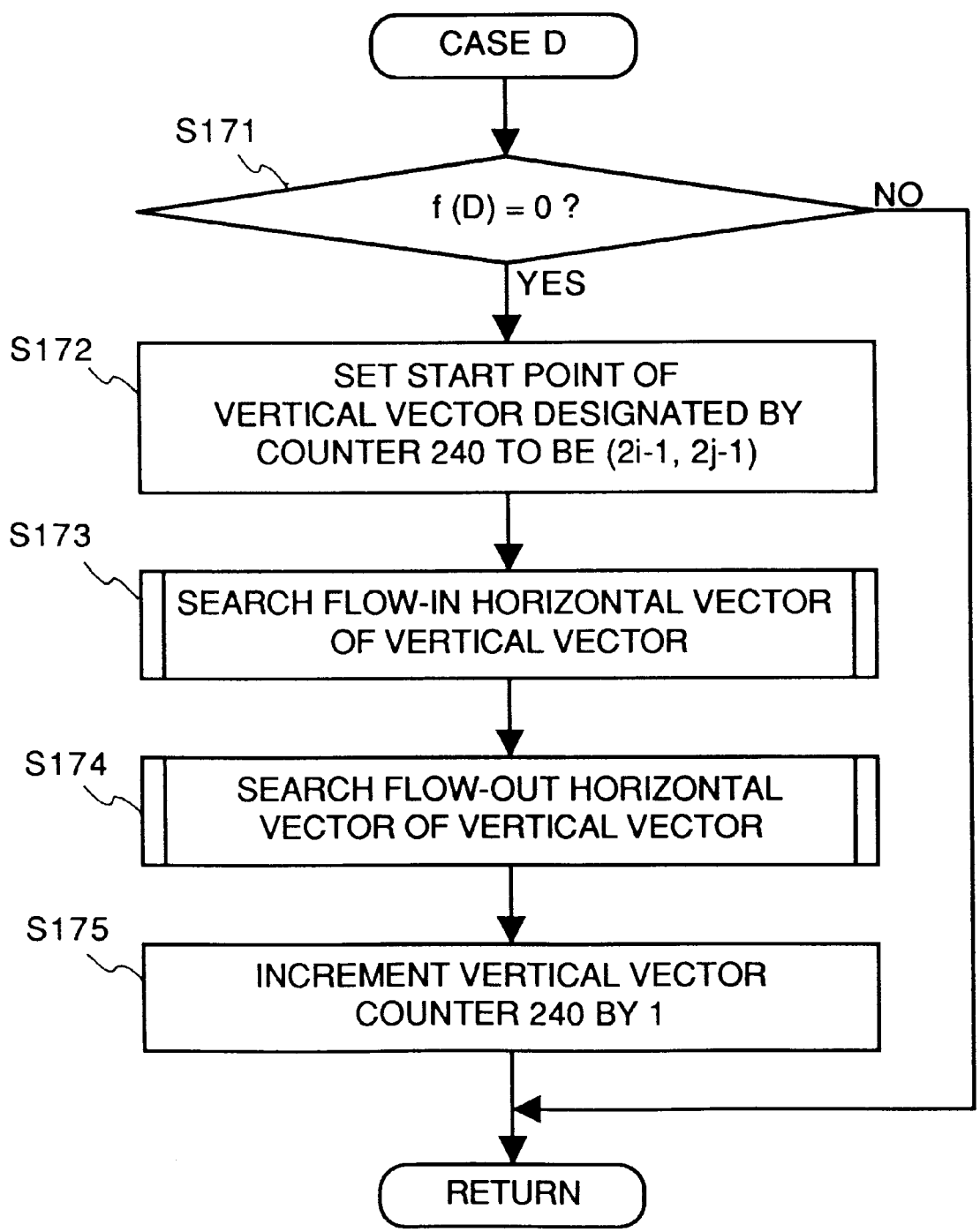

FIG. 45 shows the content of the processing (case D) in step S165.

In step S171, it is checked if the pixel at the position (D) is a white or black pixel. If the pixel at the position (D) is a black pixel, the flow returns to the previous routine. If the pixel at the position (D) is a white pixel, the flow advances to step S172, and coordinates (2i–1,2j–1) are registered as the start point of the vertical vector 154. The flow then advances to step S173, and the above-mentioned processing shown in FIG. 42 is executed. More specifically, a horizontal vector which flows into the vertical vector 154 registered in step S172 is registered, and a value indicating that a vertical vector to which the horizontal vector flows out is the vertical vector 154 registered in step S172 is registered. Thereafter, the table 321 shown in FIG. 29 is updated.

In step S174, the above-mentioned processing shown in FIG. 32 is executed. More specifically, a horizontal vector to which the vertical vector 154 registered in step S172 flows out is registered, and a value indicating that a vector which flows into this horizontal vector is the vertical vector 154 registered in step S172 is registered. Thereafter, the table 311 shown in FIG. 28 is updated. In step S175, the content of the vertical vector counter 240 is incremented by 1, and the flow then returns to the previous routine.

<Processing of Case 10>

Figure 46:
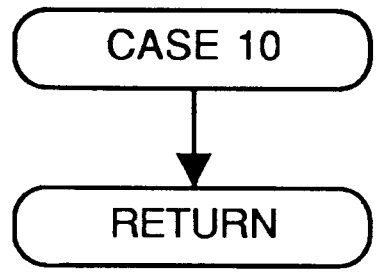

If it is determined in step S30 in FIG. 24 that the value of the register is "10", a routine shown in FIG. 46 is called. In this routine, processing for case 10 shown in FIGS. 13A and 13B is executed. When the routine shown in FIG. 46 is called, the flow returns to the previous routine without any processing.

<Description of Case 11>

Figure 47:
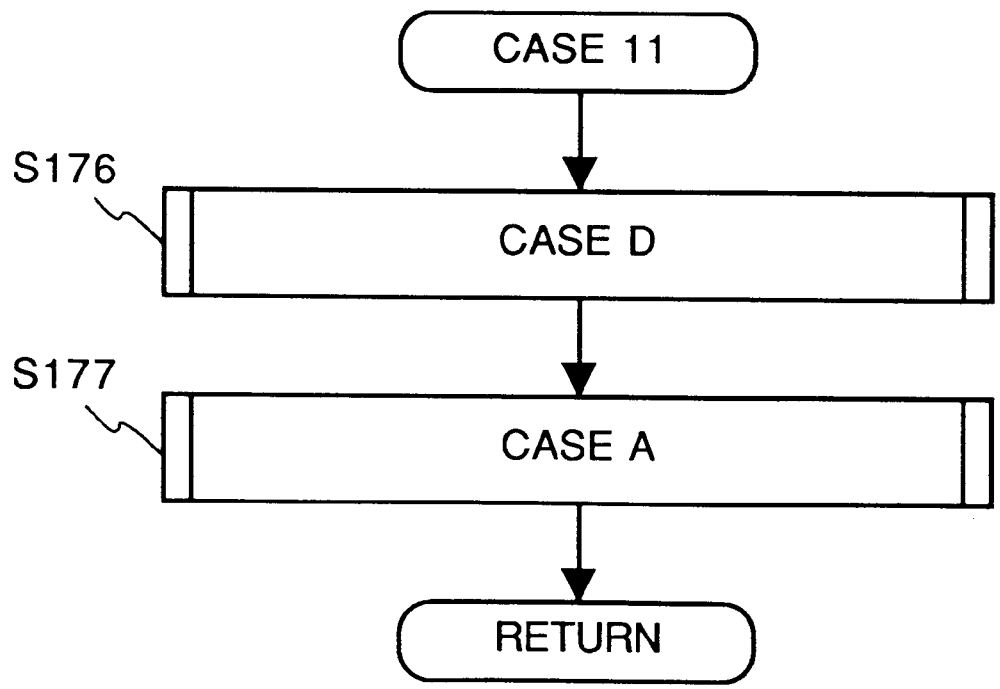

If it is determined in step S30 in FIG. 24 that the value of the register is "11", a routine shown in FIG. 47 is called. In this routine, processing for case 11 shown in FIGS. 14A to 14E is executed.

In step S176, the above-mentioned processing shown in the flow chart of FIG. 45 is executed according to the state of a pixel at the position (D), as in step S165. In step S177, the above-mentioned processing shown in FIG. 35 is executed according to the state of a pixel at the position (A), like in steps S85 and S131. FIG. 14B shows a processing result (matrix 170) obtained when both the pixels at the positions (D) and (A) in FIG. 14A are white pixels. FIG. 14C shows a processing result (matrix 171) obtained when only the pixel at the position (A) is a black pixel. FIG. 14D shows a processing result (matrix 172) obtained when only the pixel at the position (D) is a black pixel. FIG. 14E shows a processing result (matrix 173) obtained when both the pixels at the positions (A) and (D) are black pixels.

<Description of Case 12 (FIGS. 15A to 15C, 20, 21, 48, and 49)>

Figure 48:
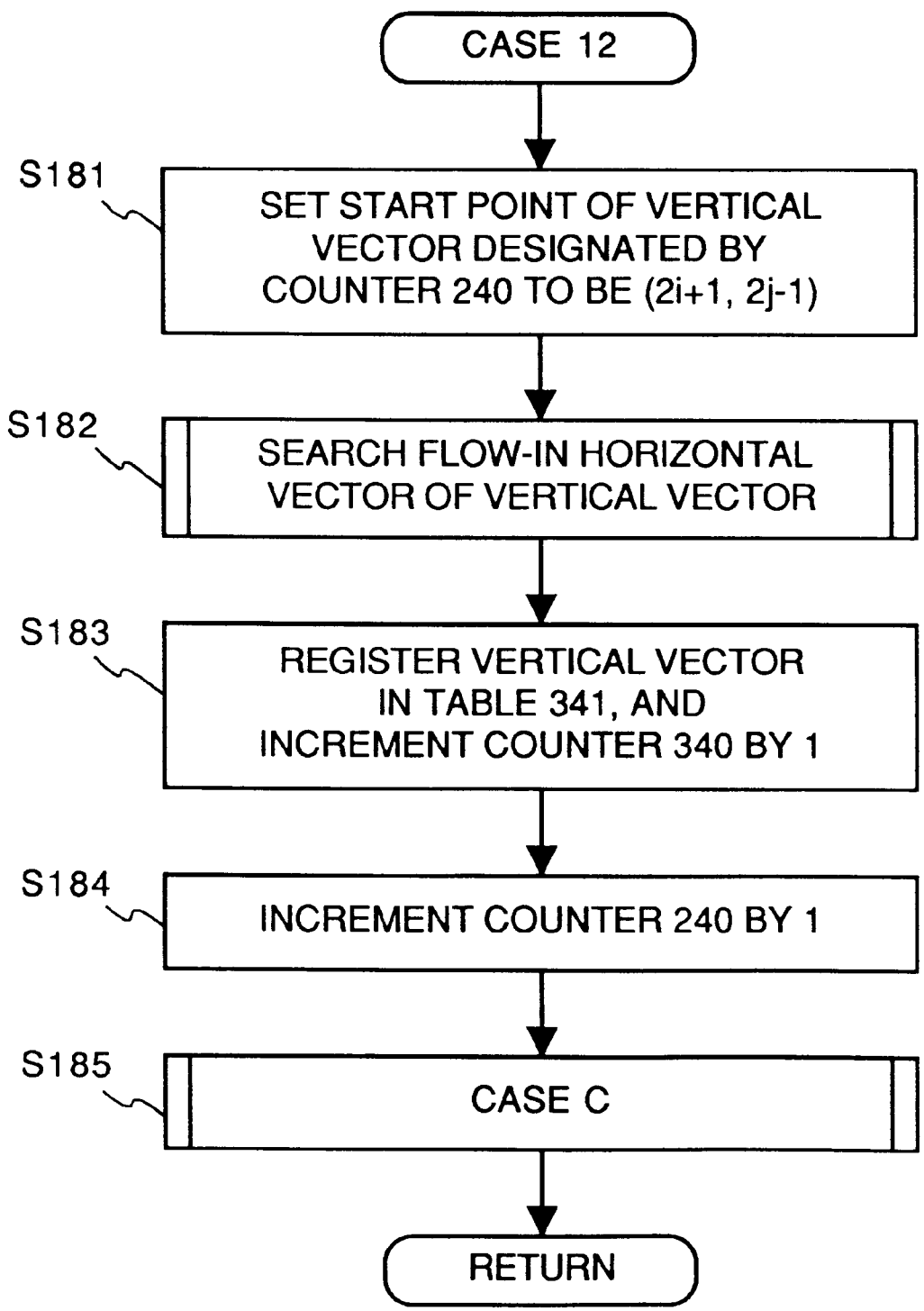

If it is determined in step S30 in FIG. 24 that the value of the register is "12", a routine shown in FIG. 48 is called. In this routine, processing for a state in case 12 shown in FIGS. 15A to 15C is executed.

In step S181, coordinates (2i+1,2j–1) are registered as the start point of a vertical vector 181 (FIG. 15B) in the table shown in FIG. 21. In step S182, a horizontal vector 182 which flows into the vertical vector 181 registered in step S181 is searched and registered according to the procedure shown in FIG. 42, as in step S134 in FIG. 41 described above. In addition, a value indicating that a vertical vector to which the horizontal vector 182 flows out is the vertical vector 181 registered in step S181 is registered, and thereafter, the table 321 shown in FIG. 29 is updated.

Figure 31:
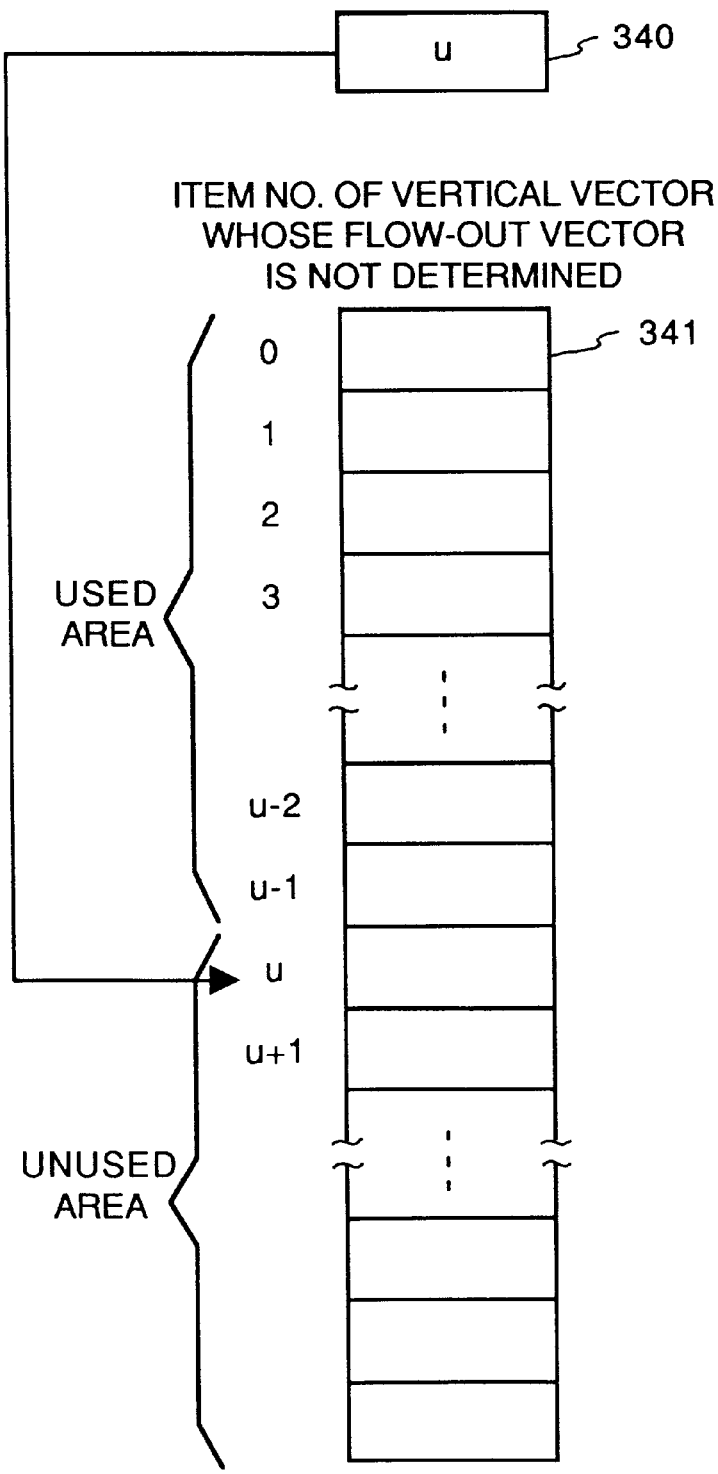
FIG. 31 shows a registration table for vertical vectors whose flow-out vectors are not determined.

In step S183, it is determined that a flow-out vector of the vertical vector 181 registered in step S181 is not determined, and the vertical vector 181 is registered in the table 341 shown in FIG. 31. Then, the counter 340 is updated. In step S184, the vertical vector counter 240 is incremented by 1. In step S185, it is checked if a pixel at the position (C) is a white or black pixel. If the pixel at the position (C) is a white pixel, coordinates (2i–1,2j+1) are registered as the start point of a horizontal vector 185, as shown in a matrix 183 in FIG. 15B; if it is a black pixel, the processing is ended, as shown in a matrix 184 in FIG. 15C.

Figure 49:
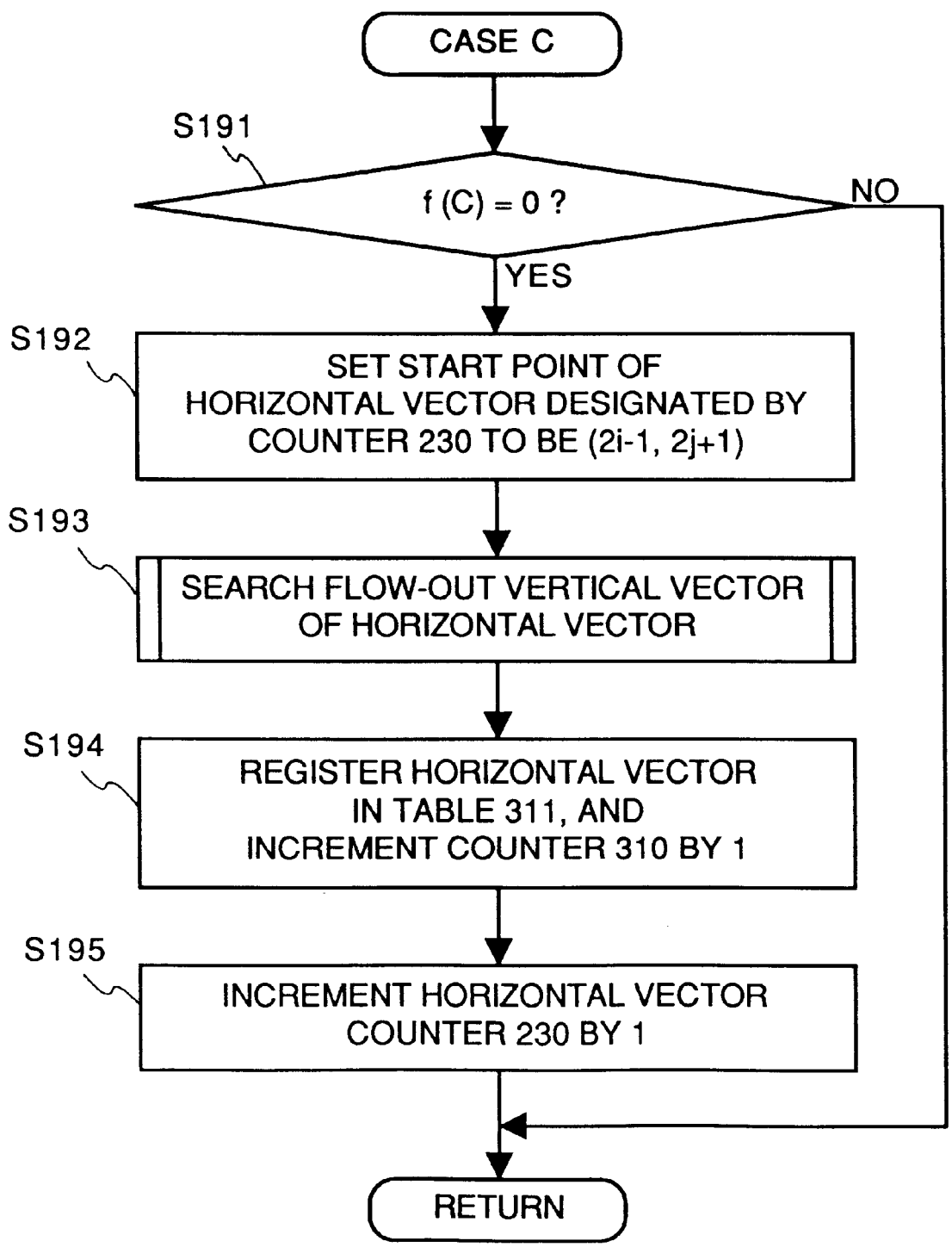

The content of the processing in step S185 is shown in the flow chart of FIG. 49.

In step S191, it is checked if a pixel at the position (C) is a white or black pixel. If the pixel at the position (C) is a black pixel, the flow returns to the previous routine. If the pixel at the position (C) is a white pixel, the flow advances to step S192, coordinates (2i–1,2j+1) are registered as the start point of a horizontal vector 185. In step S193, the above-mentioned processing shown in the flow chart of FIG. 43 is executed to register a vertical vector to which the horizontal vector 185 registered in step S192 flows out. In addition, a value indicating that an original vector which flows into this vertical vector is the horizontal vector 185 registered in step S192 is registered in the table shown in FIG. 21, and thereafter, the table 331 shown in FIG. 30 is updated.

In step S194, data indicating that a vertical vector 186 which flows into the horizontal vector 185 registered in step S192 is not determined is registered in the vector table 311 shown in FIG. 28, and the content of a counter 310 is incremented by 1. The flow then advances to step S195, and the content of the horizontal vector counter 230 is incremented by 1. Thereafter, the flow returns to the previous routine.

<Description of Case 13 (FIGS. 16A to 16E, and 50)>

Figure 50:
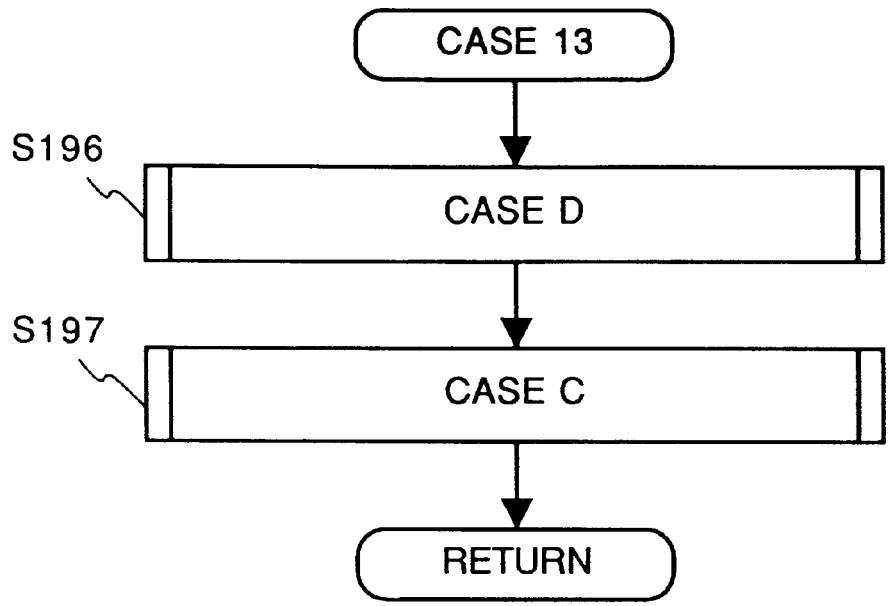

If it is determined in step S30 in FIG. 24 that the value of the register is "13", a routine shown in FIG. 50 is called. In this routine, processing for case 13 shown in FIGS. 16A to 16E is executed.

In step S196, the above-mentioned processing shown in the flow chart of FIG. 45 is executed according to the state of a pixel at the position (D), as in step S165 in FIG. 44 and step S176 in FIG. 47.

In step S197, the above-mentioned processing shown in the flow chart of FIG. 49 is executed according to the state of a pixel at the position (C), as in step S185 in FIG. 48. FIG. 16B shows a processing result (matrix 190) obtained when both the pixels at the positions (D) and (C) are white pixels. FIG. 16C shows a processing result (matrix 191) obtained when only the pixel at the position (C) is a black pixel. FIG. 16D shows a processing result (matrix 192) obtained when only the pixel at the position (D) is a black pixel. FIG. 16E shows a processing result (matrix 193) obtained when both the pixels at the positions (D) and (C) are black pixels.

<Description of Case 14>

Figure 51:
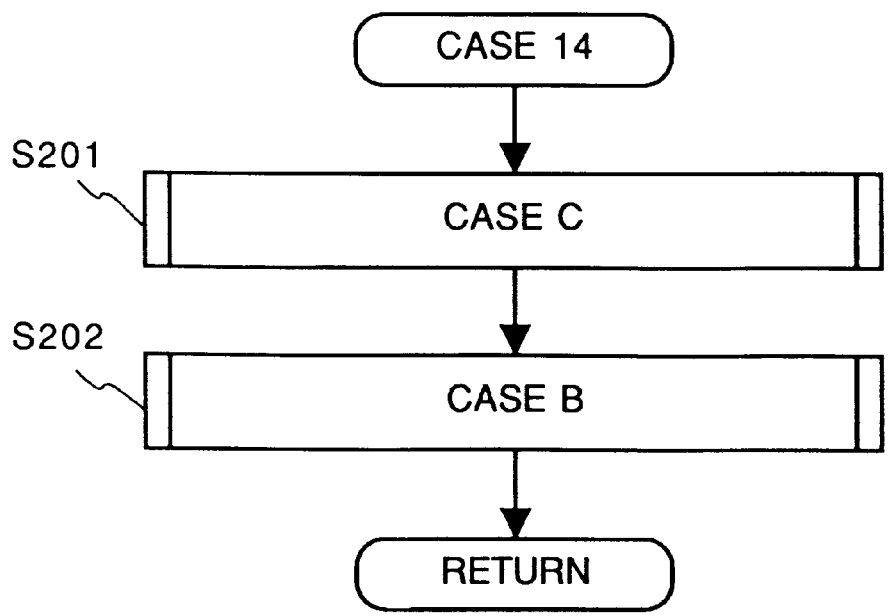

If it is determined in step S30 in FIG. 24 that the value of the register is "14", a routine shown in FIG. 51 is called. In this routine, processing for case 14 shown in FIGS. 17A to 17E is executed.

In step S201 in FIG. 51, the above-mentioned processing for case C shown in FIG. 49 is executed according to the state of a pixel at the position (C), as in step S185 in FIG. 48 and step S197 in FIG. 50. In step S202, the processing for case B shown in FIG. 39 is executed according to the state of a pixel at the position (B), as in step S115 in FIG. 38 and step S132 in FIG. 40.

FIG. 17B shows a processing result (matrix 201) obtained when both the pixels at the positions (C) and (B) are white pixels. FIG. 17C shows a processing result (matrix 202) obtained when only the pixel at the position (B) is a black pixel. FIG. 17D shows a processing result (matrix 203) obtained when only the pixel at the position (C) is a black pixel. FIG. 17E shows a processing result (matrix 204) obtained when both the pixels are black pixels.

<Description of Case 15>

Figure 52:
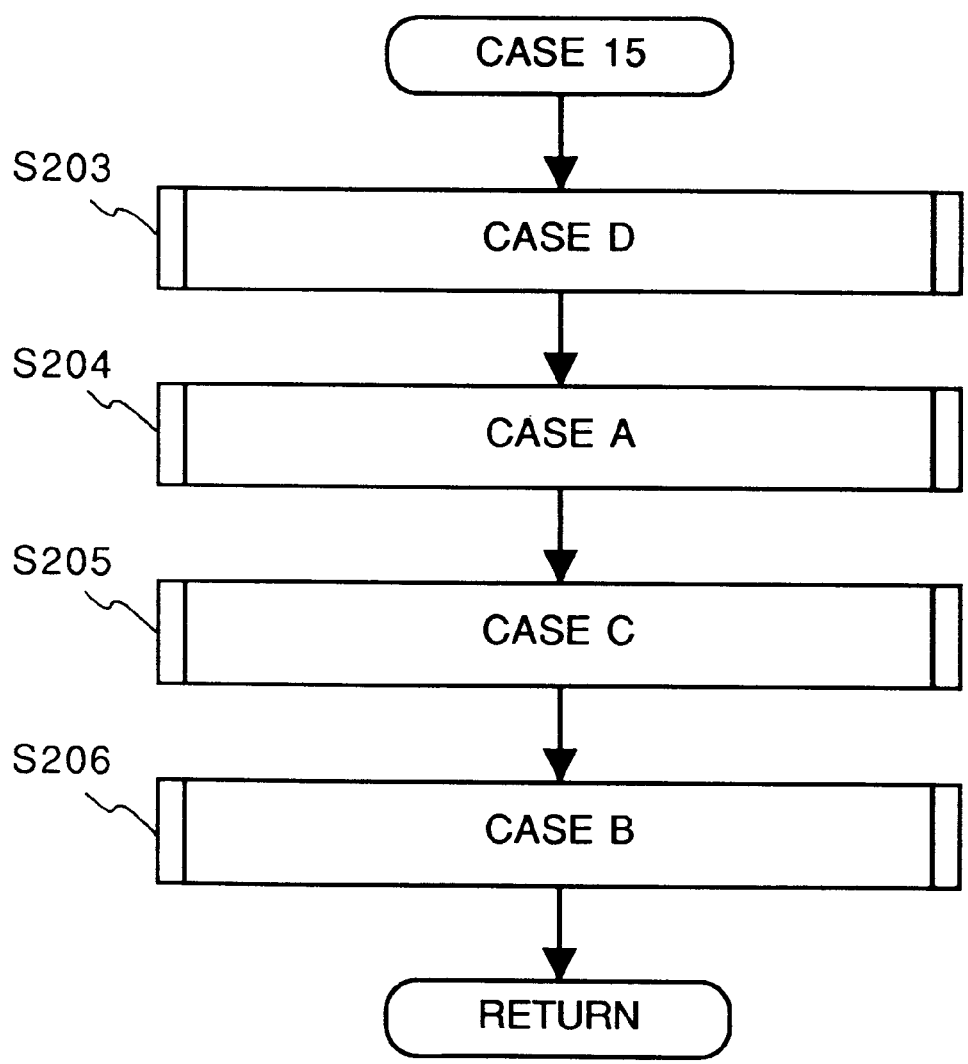

If it is determined in step S30 in FIG. 24 that the value of the register is "15", a routine shown in FIG. 52 is called. In this routine, processing for case 15 shown in FIGS. 18A to 18S is executed.

In step S203, the above-mentioned processing for case D shown in the flow chart of FIG. 45 is executed according to the state of a pixel at the position (D), as in step S165 described above. In step S204, the above-mentioned processing for case A shown in FIG. 35 is executed according to the state of a pixel at the position (A), as in, e.g., steps S85 and S131 described above. In step S205, the above-mentioned processing for case C shown in FIG. 49 is executed according to the state of a pixel at the position (C) as in, e.g., step S185 described above. Furthermore, in step S206, the above-mentioned processing for case B shown in FIG. 39 is executed according to the state of a pixel at the position (B) as in, e.g., step S115 in FIG. 38.

Thus, a matrix 210 (FIG. 18B) represents a processing result obtained when all the pixels (D), (A), (C), and (B) are white pixels; 211 (FIG. 18C), a processing result obtained when only the pixel (A) is a black pixel; 212 (FIG. 18D), a processing result obtained when only the pixel (B) is a black pixel; 213 (FIG. 18E), a processing result obtained when only the pixel (C) is a black pixel; 214 (FIG. 18F), a processing result obtained when only the pixel (D) is a black pixel; 215 (FIG. 18G), a processing result obtained when the pixels (A) and (B) are black pixels; 216 (FIG. 18H), a processing result obtained when the pixels (B) and (C) are black pixels; 217 (FIG. 18J), a processing result obtained when the pixels (C) and (D) are black pixels; 218 (FIG. 18K), a processing result obtained when the pixels (D) and (A) are black pixels; 219 (FIG. 18L), a processing result obtained when the pixels (B) and (D) are black pixels; 220 (FIG. 18M), a processing result obtained when the pixels (A) and (C) are black pixels; 221 (FIG. 18N), a processing result obtained when only the pixel (D) is a white pixel; 222 (FIG. 18P), a processing result obtained when only the pixel (C) is a white pixel; 223 (FIG. 18Q), a processing result obtained when only the pixel (B) is a white pixel; 224 (FIG. 18R), a processing result obtained when only the pixel (A) is a white pixel; and 225 (FIG. 18S), a processing result obtained when all the pixels are black pixels.

With the above-mentioned procedure, a series of processing operation of vector string extraction in step S2 in FIG. 19 are executed.

<Outline Vector String Sorting Processing>

Figure 53:
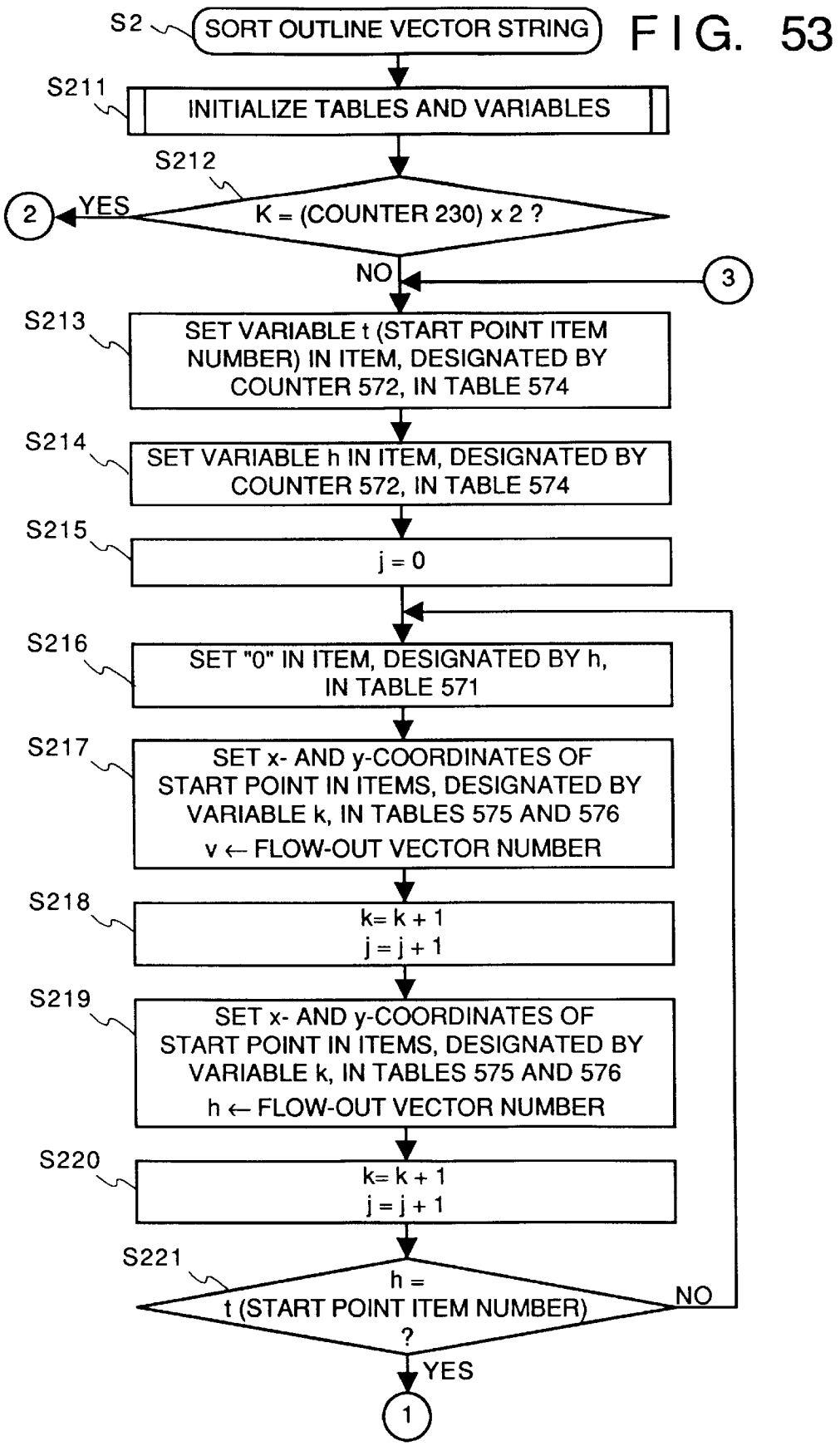
FIG. 53 is a flow chart showing outline vector string sorting processing.
Figure 54:
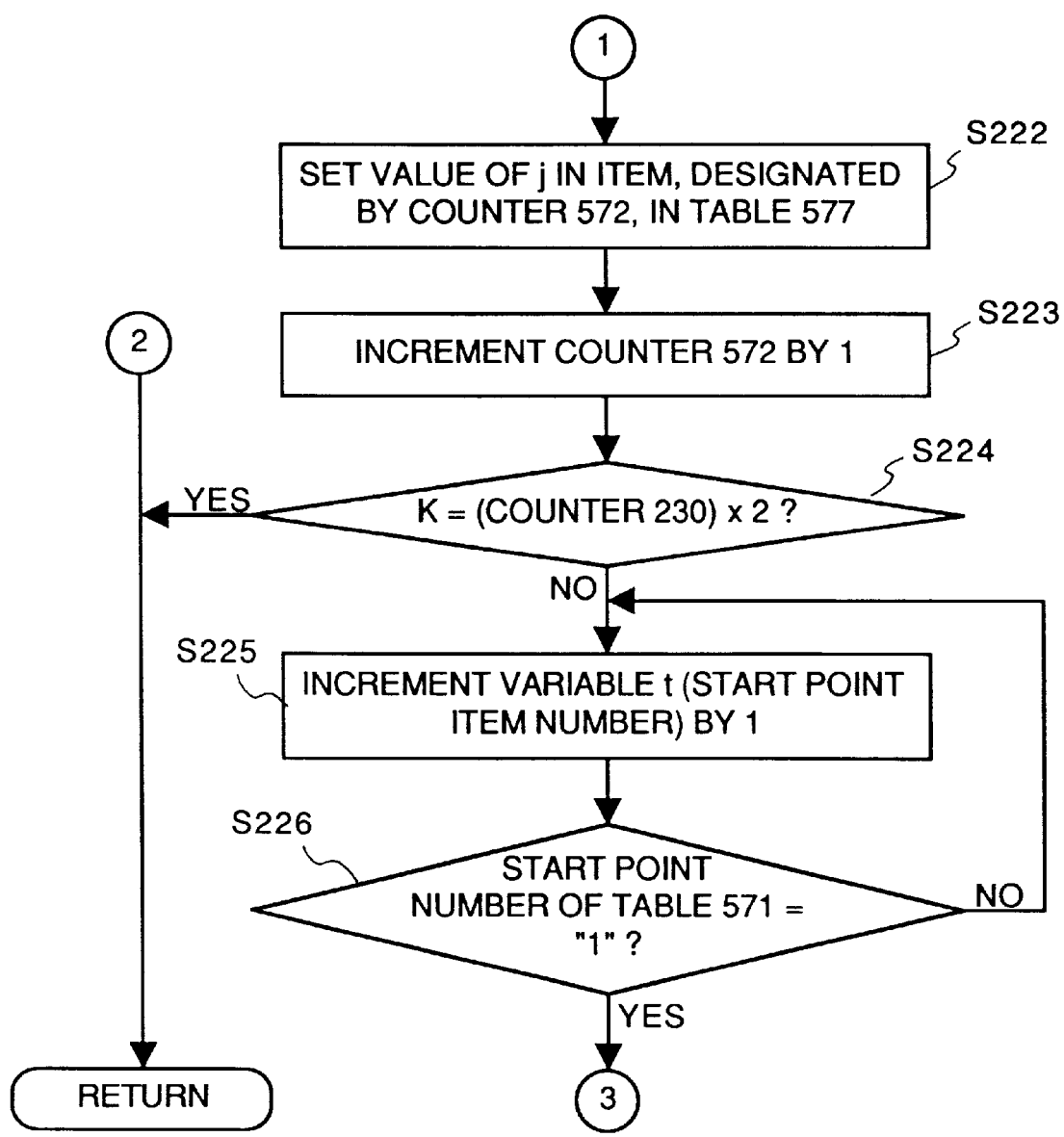
FIG. 54 is a flow chart showing outline vector string sorting processing.

FIGS. 53 and 54 show the content of outline vector string sorting processing in step S6 in FIG. 19. The flow charts shown in FIGS. 53 and 54 operate using the tables (FIGS. 20 and 21) associated with horizontal and vertical vectors formed in step S2 in FIG. 19, and tables shown in FIGS. 55A to 55G (to be described later).

Figure 56:
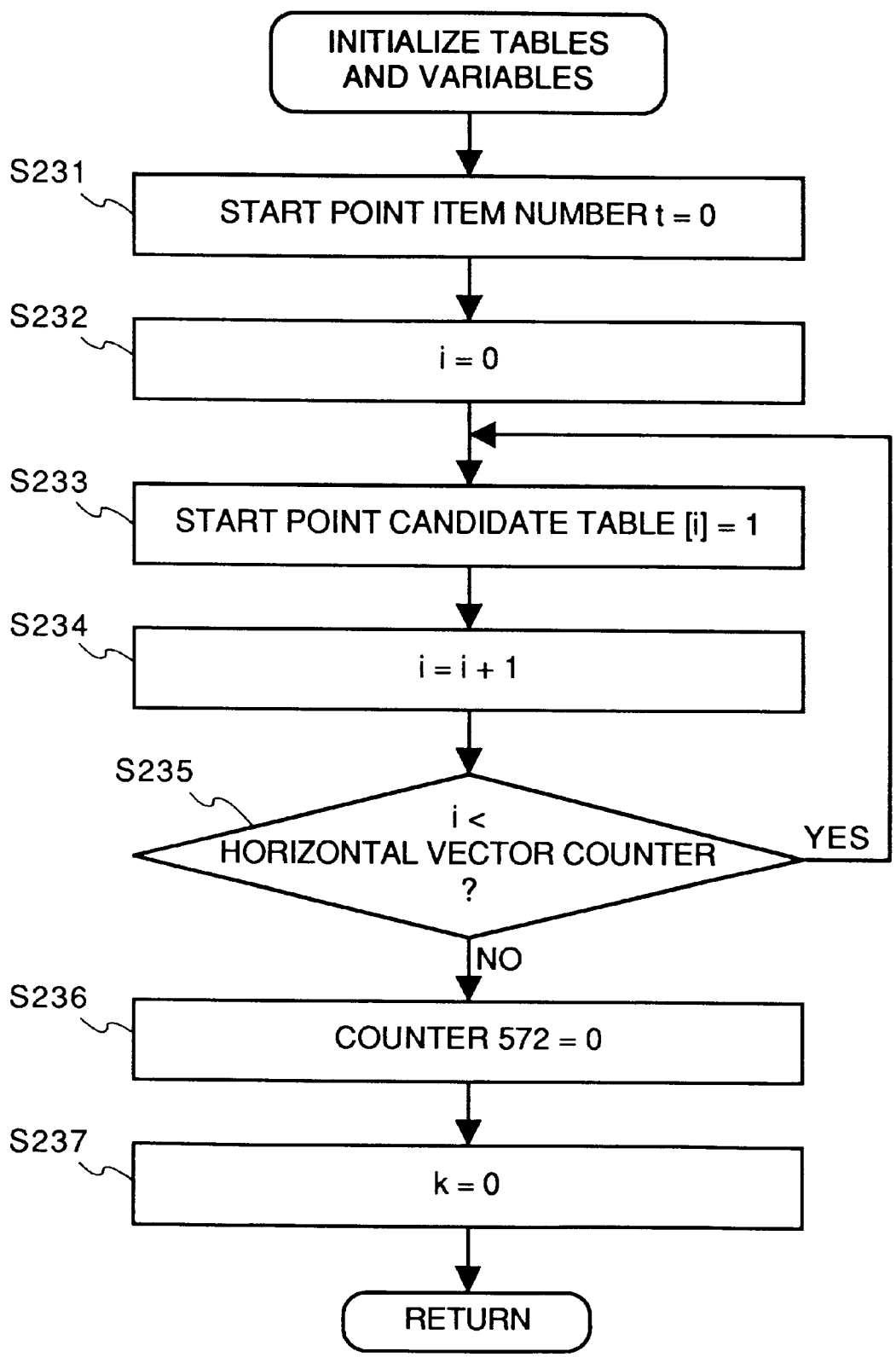
FIG. 56 is a flow chart showing outline vector string sorting processing.

In step S211, items required for the tables shown in FIGS. 55A to 55G are initialized. The processing content of step S211 is shown in detail in the flow chart of FIG. 56.

In step S231, "0" is set in a variable t (start point item number) for temporarily holding an item number of a start point. The flow advances to step S232 to set "0" in a variable i. In step S233, an i-th item of a start point candidate table 571 is set to be "1". In step S234, the variable i is incremented by 1, and it is then checked in step S235 if the variable i has a value smaller than the value of the horizontal vector counter 230. If YES in step S235, the flow returns to step S233.

However, if NO in step S235, the flow advances to step S236, and a loop counter 572 is reset to "0". In step S237, a variable k is reset to "0", and the flow returns to the previous routine. Thus, "1" is set in all the 0-th to (the value of the horizontal vector counter 230−1)-th columns of the start point candidate table 571.

Upon completion of step S211, the flow then advances to step S212 to check if the variable k is equal to a value obtained by doubling the value of the horizontal vector counter 230. If YES in step S212, the flow returns to the main routine; otherwise, the flow advances to step S213. In step S213, the value of the variable t is stored at an item position of a table 574, which position is designated by the loop counter 572. The table 574 is registered with the item numbers of start points. In step S214, the value stored in the item of the table 574 (i.e., the value stored in step S213), which item is designated by the loop counter 572, is is set in a variable h. In step S215, a variable j is reset to "0".

The loop counter 572 indicates the number of a currently sorted outline loop. In the item number column of the table 574, which is designated by the loop counter 572, the item number of the start point of the currently sorted outline loop is stored. The variable k holds the total number of processed and processing points in processed and processing outline loops so far, and the variable j holds the number of processed points in the currently sorted outline loop. The variable h indicates the item number of the next horizontal vector to be processed.

The flow advances to step S216, and the item number of the table 571 designated by the variable h is reset to "0". The table 571 is registered with start point candidates. The flow advances to step S217, and the values of the items of the x- and y-coordinates (FIG. 20) of the horizontal vector start point in the table 23 designated by the variable h are respectively stored in items, designated by the variable k, in x- and y-coordinate tables 575 and 576. At the same time, the value of the flow-out vector item number (FIG. 20) in the table 23 designated by the variable h is set in a variable v. The variable v indicates the item number of the next vertical vector to be processed. In step S218, the values of the variables k and j are respectively incremented by 1.

The flow then advances to step S219, and the values of the x- and y-coordinates (FIG. 21) of the vertical vector start point in the table 24 designated by the variable v are respectively stored in items designated by the variable k in the x- and y-coordinate tables 575 and 576. At the same time, the value of the item of the vertical vector flow-out vector item number (FIG. 21) in the table 24 designated by the variable v is set in the variable h. Thus, the variable h is set with the item number of the horizontal vector which flows out from this vertical vector. In step S220, the values of the variables k and j are respectively incremented by 1.

In step S221, it is checked if the value of the variable h is equal to the value of a counter 573 (variable t) for holding the item number of the start point of the currently sorted outline loop. If NO in step S221, the flow returns to step S216 to continue processing of the next point since it is determined that the currently processed point is one of points on the same outline loop. However, if YES in step S221, the flow advances to step S222, and processing of the currently sorted outline loop is ended. In step S222, the value of the variable j is stored, as the number of points included in the currently processed outline loop, in the item, designated by the loop counter 572, in a table 577 for holding the number of points included in each outline loop. In step S223, the loop counter 572 indicating the number of the currently sorted outline loop is incremented by 1.

In step S224, it is checked if the number of already processed points held in the variable k is equal to a value obtained by doubling the number of points held in the horizontal vector table 23 designated by the horizontal vector counter 230. If YES in step S224, the processing is ended, and the flow returns to the main routine. However, if NO in step S224, the flow advances to step S225, and the value of the start point item number counter 573 is incremented by 1. In step S226, it is checked if the value held in the item, designated by the start point item number counter 573, in the start point candidate table 571 is "1". If NO in step S226, the flow returns to step S225 to search the start point candidate again. However, if YES in step S226, the flow returns to step S213 to start sorting of points in the next outline loop.

With the processing in step S6 in FIG. 19, the start point data of the vectors shown in FIGS. 20 to 22 are sorted as a coordinate string of points aligned in units of outline loops in the tables shown in FIGS. 55A to 55G.

<Output of Vector String Table>

Figure 57:
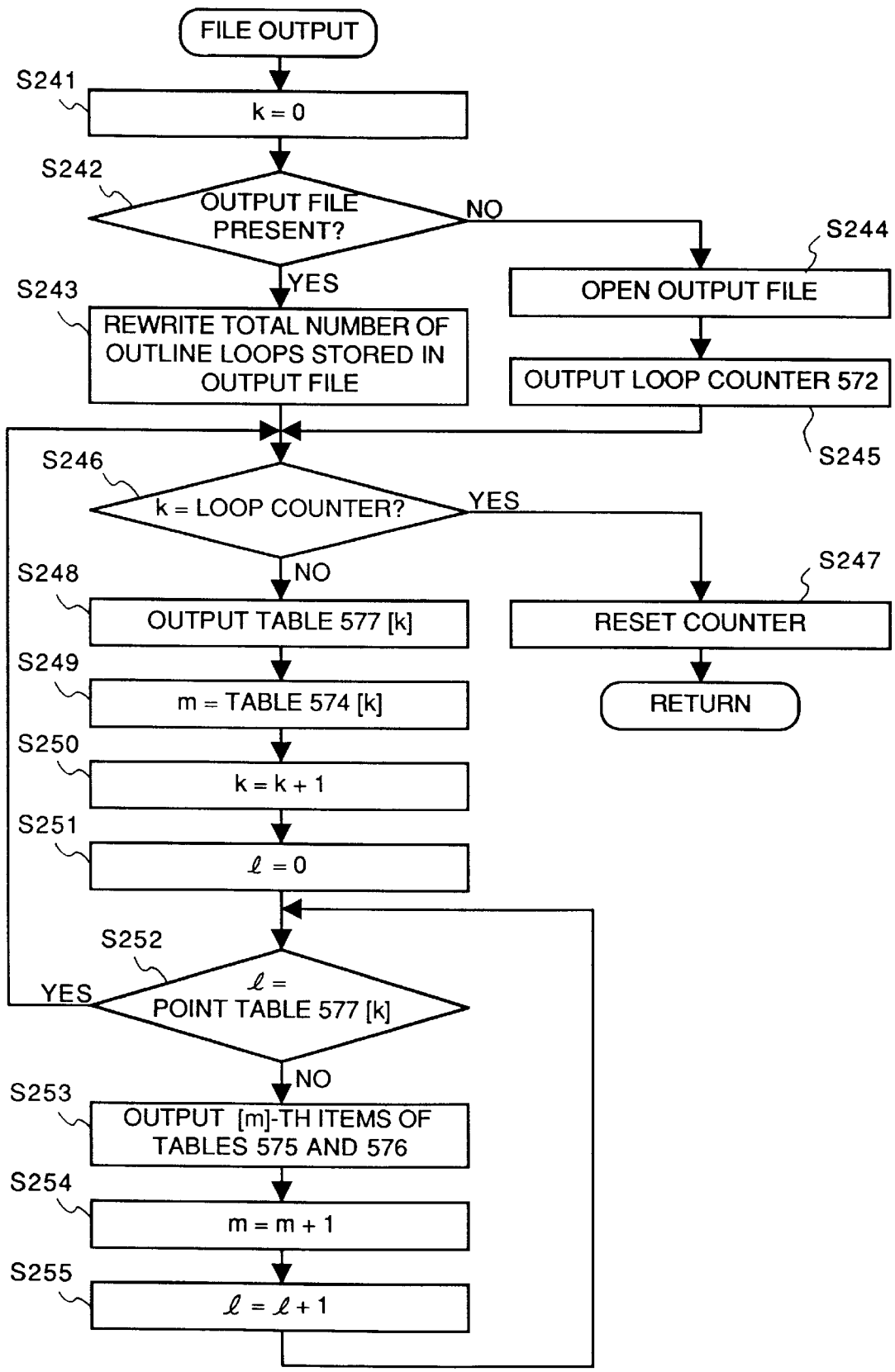
FIG. 57 is a flow chart showing processing for outputting a vector string table onto a file.

The vector string table file output processing in step S7 in FIG. 19 will be described below with reference to the flow chart shown in FIG. 57.

In step S241, the variable k is reset to "0". The flow advances to step S242 to check if an output file is already opened on a disk. If YES in step S242, the flow advances to step S243. In step S243, the sum of the total number of outline loops stored in the output file and the value designated by the loop counter 572 is calculated, and the total number of outline loops stored in the output file is rewritten with the sum. Thereafter, the flow advances to step S246. However, if NO in step S242, an output file is opened on the disk 522. In step S245, the value held in the loop counter 572 is output to the file opened in step S244. It is then checked in step S246 if the value of the variable k is equal to the value held in the loop counter 572. If YES in step S246, the flow advances to step S247 to reset the counters 230, 240, 310, 320, 330, and 340 (to "0"), and the flow returns to the main routine.

If NO in step S246, the flow advances to step S248, and the value stored at the item position designated by the value of the variable k in the outline loop point table 577 is output to the disk 522. In step S249, the value stored at the item position designated by the value of the variable k in the start point item number table 574 is set in a variable m. The variable k holds the currently output outline loop number, and the variable m holds the item number where the start point of a point string in the currently output outline loop is stored. In step S250, the value of the variable k is incremented by 1, and in step S251, the value of a variable l is reset to "0". The variable l is a variable for holding the number of already output points in the currently output outline loop.

In step S252, it is checked if the value of the variable l is equal to the number of points in the currently output outline loop. If YES in step S252, the flow returns to step S246; otherwise, the flow advances to step S253. In step S253, the values stored at the item positions designated by the value of the variable m in the x- and y-coordinate tables 575 and 576 are output to the output file. In step S254, the value of the variable m is incremented by 1, and in step S255, the value of the variable l is incremented by 1. Thereafter, the flow returns to step S252.

Upon completion of the processing in step S7 in FIG. 19, it is then checked in step S8 if the currently processed raster of interest is the final raster in an image. If NO in step S8, the flow advances to step S9 to shift the raster of interest to the next raster, and to shift the pixel of interest to the start pixel of the new raster of interest. Thereafter, the flow returns to step S2.

However, if YES in step S8, the flow advances to step S10 to execute the same processing as in step S6 and thereafter, execute the same processing as in step S7. Then, the processing in FIG. 19 is ended. In the processing in step S7, the output file is closed in place of resetting of the counters in step S247.

According to the above-mentioned procedure, outline loops connected in four directions are extracted. However, the present invention is not limited to this, but may be applied to a case wherein outline loops connected in eight directions are to be extracted.

As described above, in a conventional system, the tables (connection information tables) shown in FIGS. 20 and 21 require a capacity for one page. However, according to the present invention, since information in the tables (connection information tables) shown in FIGS. 20 and 21 is sorted and output every time a white raster is generated, the capacities of the tables (connection information tables) shown in FIGS. 20 and 21 can be reduced, and the memory capacity can be saved. Since the capacities of the tables (connection information tables) shown in FIGS. 20 and 21 are reduced, the search range upon sorting of a vector string is narrowed accordingly, and high-speed processing can be attained.

SECOND EMBODIMENT

Figure 58:
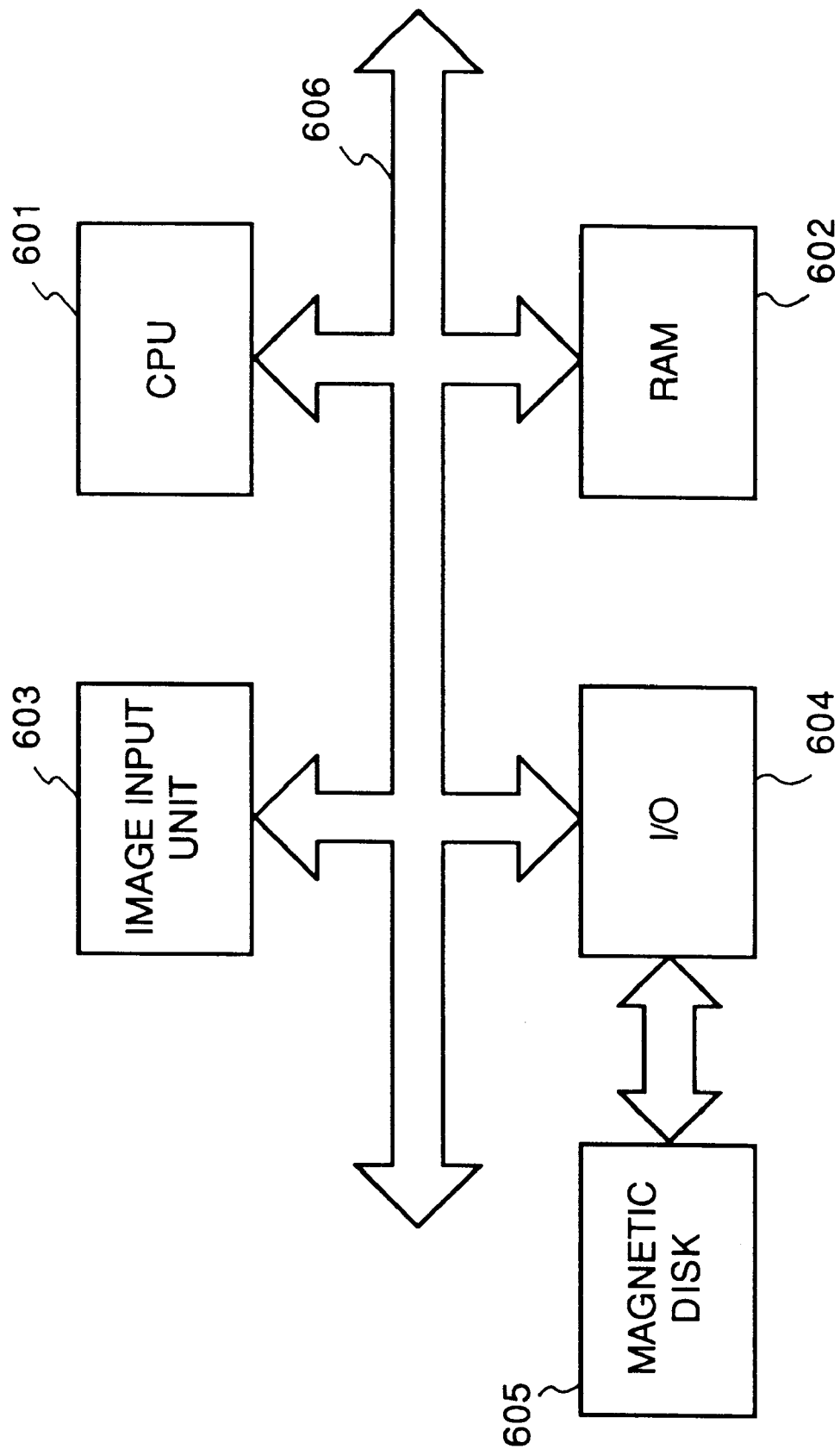
FIG. 58 is a schematic block diagram showing an apparatus according to the second embodiment of the present invention.

FIG. 58 is a block diagram showing an outline extraction apparatus according to the second embodiment of the present invention. This embodiment exemplifies an apparatus wherein outline vectors are extracted from image data, and the extracted vectors are output as coordinate data (the coordinates of four points and the coordinates of the end point) to a magnetic disk. In FIG. 58, a microprocessor (CPU) 601 is connected to a RAM (random-access memory) 602, an image input unit 603, and an I/O port 604 via a bus 606. The control sequence of the CPU 601 is stored as a program in an internal ROM (not shown). The CPU 601 is also connected to a magnetic disk 605 through the I/O port 604. In this embodiment, the coordinates of outline points are obtained using data input from the image input unit 603. In this case, image data pre-stored in, e.g., the magnetic disk 605 may be used. The obtained coordinate data are stored in the magnetic disk 605. However, the present invention is not limited to this embodiment. That is, another processing, for example, processing such as smoothing, enlargement, reduction, enlarging/compressing processing, and the like of outline loops may be successively executed using the outline vectors.

Figure 59:
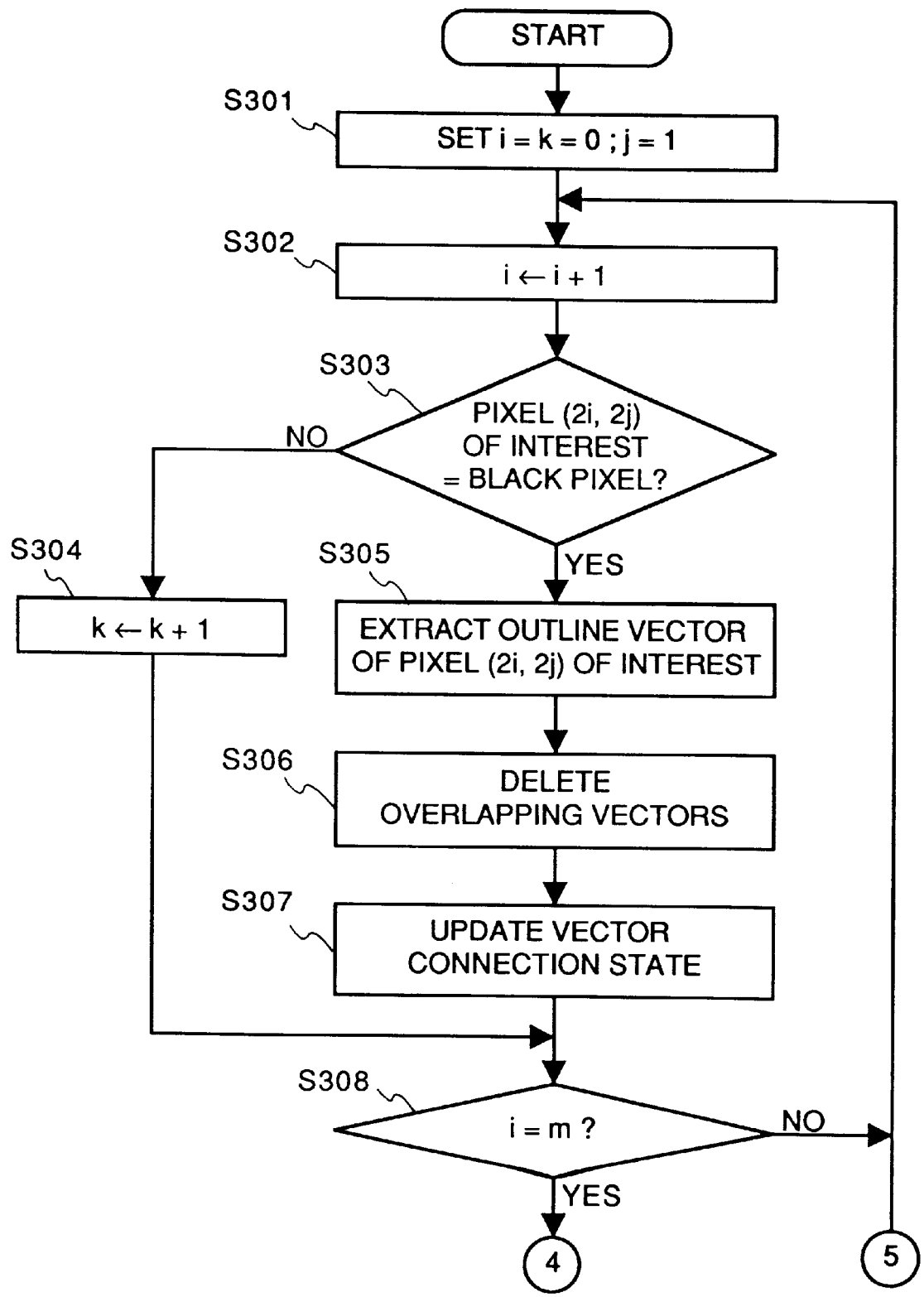
FIG. 59 is a flow chart showing a processing flow of the second embodiment.
Figure 60:
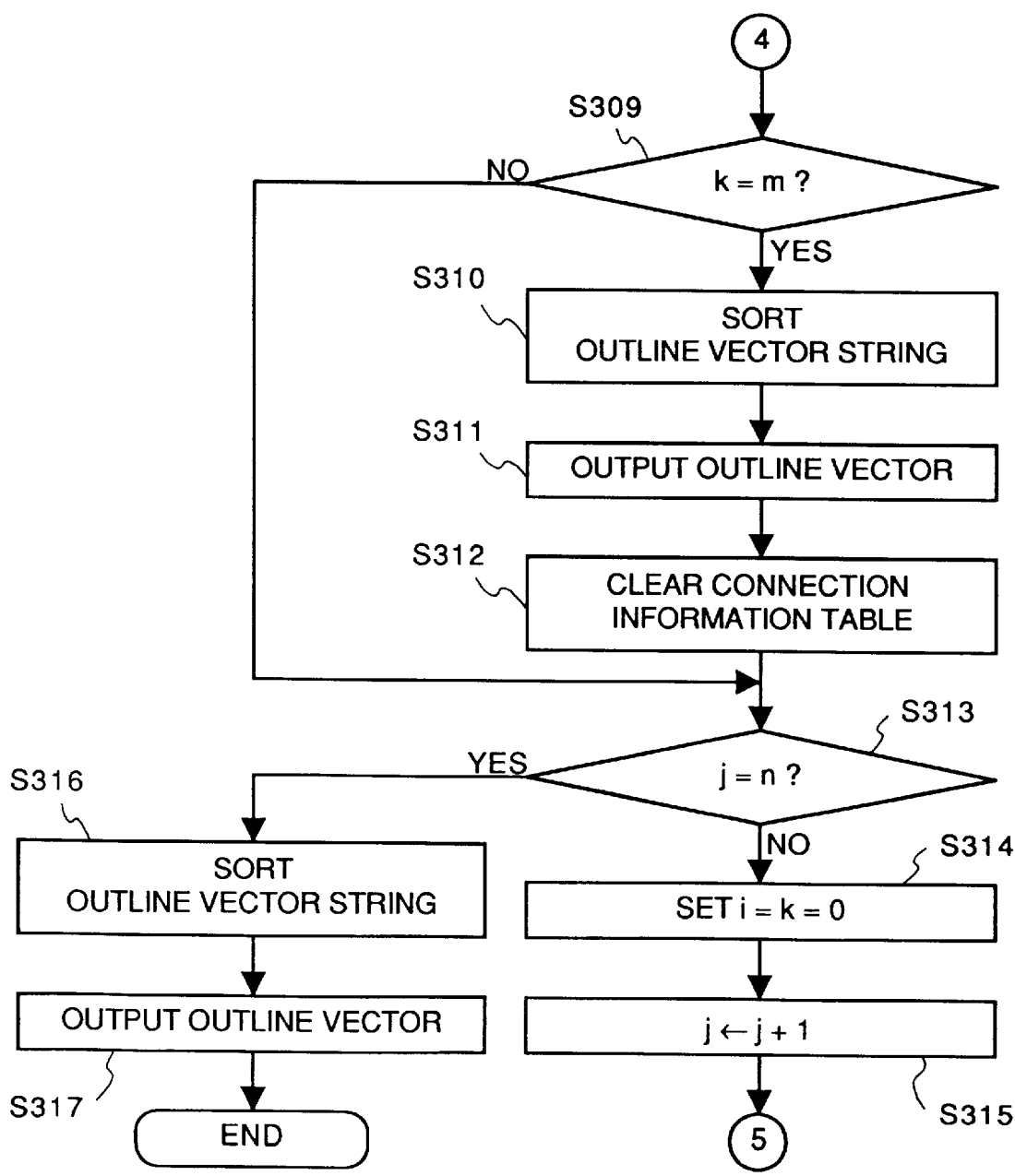
FIG. 60 is a flow chart showing a processing flow of the second embodiment.

The operation of this embodiment will be described below with reference to the flow charts shown in FIGS. 59 and 60.

In step S301, "0" is set in variables i and k, and "1" is set in a variable j. The variable i serves as a counter in the main scanning direction, and the variable j serves as a counter in the sub-scanning direction. (i,j) indicate the coordinates of a pixel of interest in an actual image. As in the first embodiment, in order to avoid decimal expression of the outline point coordinates, $(2i, 2j; i=1, \ldots, m, j=1, \ldots, n)$ are used as the coordinates of a pixel of interest in the following processing. In this embodiment, the number of pixels in the main scanning direction in an actual image is m, and the number of pixels in the sub-scanning direction is n. In step S302, the value of the variable i is incremented by 1. For the sake of convenience, the processing is started with i=0, i is incremented by 1 in step S302, and processing in step S303 is started with i=1 in practice. In step S303, it is checked if a pixel (2i,2j) of interest is a black pixel. If NO in step S303, the value of the variable k is incremented by 1 in step S304, and the flow advances to step S308. However, if YES in step S303, the flow advances to step S305, and four outline vectors of the pixel (2i,2j) of interest are extracted. The four vectors to be extracted are:

a=[(2i–2j–1), (2i+1, 2j–1)]
b=[(2i+2j–1), (2i+1, 2j+1)]
c=[(2i+2j+1), (2i–1, 2j 30 1)]
d=[(2i–2j+1), (2i–1, 2j–1)]

These vectors are registered in a connection information table. In step S306, the connection information table is searched. If a vector which overlaps the vector a is found, both the vector a and the vector which overlaps the vector a are deleted from the connection information table. If a vector which overlaps the vector d is found, both the vector d and the vector which overlaps the vector d are deleted from the connection information table. In this case, "a vector x overlaps a vector y" means that a vector obtained by exchanging the coordinates of the start and end points of the vector x with each other is equal to the vector y. In this case, no vectors overlapping the vectors b and c are present at this time. When old data are searched in the order from the latest registered data in the connection information table, the search time can be shortened. In this embodiment, once the vectors a, b, c, and d are registered in the connection information table in step S305, the overlapping vectors are deleted in step S306. Alternatively, only the vectors b and c may be registered in the connection information table. In step S306, the vector a may be registered if no vector overlapping the vector a is found, and the vector d may be registered if no vector overlapping the vector d is found. In step S307, the connection state (flow-in vector No. and flow-out vector No.) of the vectors registered in the connection information table is updated. As shown in FIG. 61, the connection information table consists of the start and end point coordinates of the vectors, the numbers (to be referred to as flow-in vector Nos. hereinafter) of vectors having the start point coordinates of the vectors as their end point coordinates, and the numbers (to be referred to as flow-out vector Nos. hereinafter) of vectors having the end point coordinates of the vectors as their start point coordinates. For the sake of simplicity, the directions of vectors which flow into or flow out from an outline point (2i–1,2j–1), an outline point (2i+1,2j–1), an outline point (2i–1,2j+1), and an outline point (2i+1, 2j+1) will be defined below.

Figure 62:
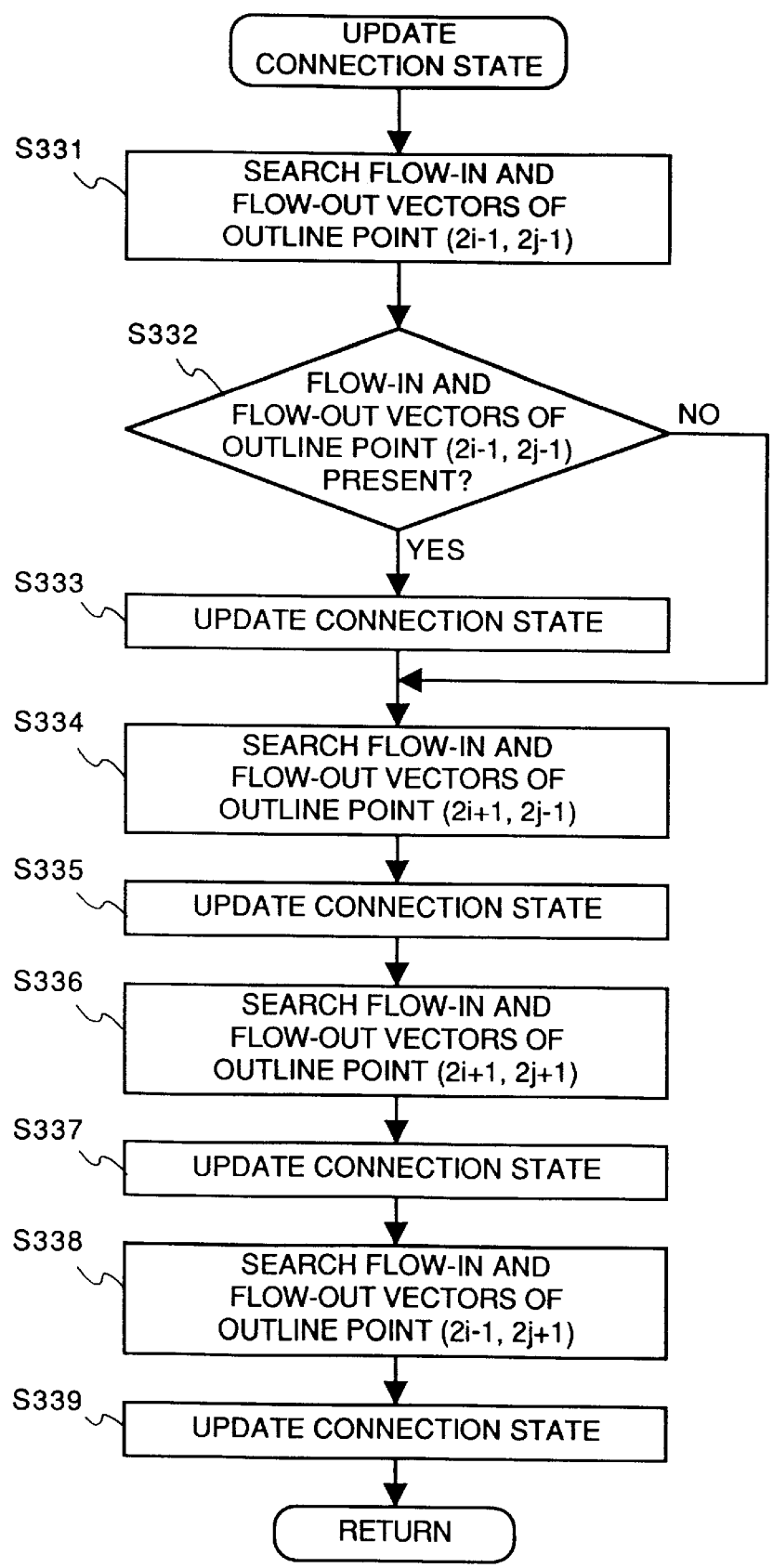
FIG. 62 is a flow chart showing processing for updating a connection state.

Vector flowing into outline point (flow-in vector)→vector having the outline point as end point coordinates Vector flowing out from outline point (flow-out vector) →vector having the outline point as start point coordinates Positive flow-in horizontal vector→flow-in vector in which the start and end points have the same y-coordinate, and the x-coordinate of the end point is larger than that of the start point Negative flow-in horizontal vector→flow-in vector in which the start and end points have the same y-coordinate, and the x-coordinate of the start point is larger than that of the end point Positive flow-in vertical vector→flow-in vector in which the start and end points have the same x-coordinate, and the y-coordinate of the end point is larger than that of the start point Negative flow-in vertical vector→flow-in vector in which the start and end points have the same x-coordinate, and the y-coordinate of the start point is larger than that of the end point Positive flow-out horizontal vector→flow-out in which the start and end points have the same y-coordinate, and the x-coordinate of the end point is larger than that of the start point Negative flow-out horizontal vector→flow-out vector in which the start and end points have the same y-coordinate, and the x-coordinate of the start point is larger than that of the end point Positive flow-out vertical vector→flow-out vector in which the start and end points have the same x-coordinate, and the y-coordinate of the end point is larger than that of the start point Negative flow-out vertical vector→flow-out vector in which the start and end points have the same x-coordinate, and the y-coordinate of the start point is larger than that of the end point Processing for updating the connection state of the vectors registered in an outline vector table will be described below with reference to the flow chart shown in FIG. 62.

In step S331, the outline vector table is searched to obtain a vector which flows into the outline point (2i–1,2j–1) or a vector which flows out from the outline point (2i–1,2j–1). When old data are searched in the order from the latest registered in the outline vector table, the search time can be shortened. The same applies to searching of the outline vector table to be described below.

In step S332, it is checked if the vector which flows into the outline point (2i–1,2j–1) or the vector which flows out from the outline point (2i–1,2j–1) is present. If YES in step S332, the flow advances to step S333; otherwise, the flow jumps to step S334.

In step S333, if the outline point has one each of flow-in and flow-out vectors, the column of the flow-out vector No. of the flow-in vector is updated with the vector No. of the flow-out vector, and the column of the flow-in vector No. of the flow-out vector is updated with the vector No. of the flow-in vector. If the outline point has two each of flow-in and flow-out vectors, the column of the flow-out vector No. of the positive flow-in vertical vector is updated with the vector No. of the positive flow-out horizontal vector, and the column of the flow-in vector No. of the positive flow-out horizontal vector is updated with the vector No. of the positive flow-in vertical vector. Also, the column of the flow-out vector No. of the negative flow-in vertical vector is updated with the vector No. of the negative flow-out horizontal vector, and the column of the flow-in vector No. of the negative flow-out horizontal vector is updated with the vector No. of the negative flow-in vertical vector.

In step S334, the outline vector table is searched to obtain a vector which flows into the outline point (2i+1,2j–1) or a vector which flows out from the outline point (2i+1,2j–1).

In step S335, if the outline point has one each of flow-in and flow-out vectors, the column of the flow-out vector No. of the flow-in vector is updated with the vector No. of the flow-out vector, and the column of the flow-in vector No. of the flow-out vector is updated with the vector No. of the flow-in vector. If the outline point has two each of flow-in and flow-out vectors, the column of the flow-out vector No. of the positive flow-in horizontal vector is updated with the vector No. of the negative flow-out vertical vector, and the column of the flow-in vector No. of the negative flow-out vertical vector is updated with the vector No. of the positive flow-in horizontal vector. Also, the column of the flow-out vector No. of the negative flow-in horizontal vector is updated with the vector No. of the positive flow-out vertical vector, and the column of the flow-in vector No. of the positive flow-out vertical vector is updated with the vector No. of the negative flow-in horizontal vector.

In step S336, the outline vector table is searched to obtain a vector which flows into the outline point (2i+1,2j+1) or a vector which flows out from the outline point (2i+1, 2j+1).

Since one each of the vector which flows into the outline point (2i+1,2j+1) and the vector which flows out from the outline point (2i+1,2j+1) are present, the column of the flow-out vector No. of the flow-in vector is updated with the vector No. of the flow-out vector, and the column of the flow-in vector No. of the flow-out vector is updated with the vector No. of the flow-in vector, in step S337.

In step S338, the outline vector table is searched to obtain a vector which flows into the outline point (2i−1,2j+1) or a vector which flows out from the outline point (2i−1,2j+1).

Since one each of the vector which flows into the outline point (2i−1,2j+1) and the vector which flows out from the outline point (2i−1,2j+1) are present, the column of the flow-out vector No. of the flow-in vector is updated with the vector No. of the flow-out vector, and the column of the flow-in vector No. of the flow-out vector is updated with the vector No. of the flow-in vector, in step S339.

Upon completion of the above-mentioned processing, the flow returns to step S308 to check if the pixel of interest is the final pixel of the raster of interest. If YES in step S308, the flow advances to step 309; otherwise, flow returns to step S302. In step S309, it is checked if the raster of interest is a white raster (constituted by only white pixels). If YES in step S309, the flow advances to step S310; otherwise, the flow jumps to step S313. In step S310, the connection information table is scanned, so that two or more continuous horizontal vectors and two or more continuous vertical vectors are combined to unit vectors, thus forming a table which stores the total number of loops in an image, the number of vertices in each loop, and the coordinates of middle points in each loop (to be defined as an outline vector table hereinafter). In step S311, the formed outline vector table is output to the magnetic disk 605 via the I/O port 604. In this case, if the previously output outline vector table has already been present on the disk, the sum of the total number of outline loops in the currently formed outline vector table and that in the outline vector table already present on the disk is calculated. The total number of outline loops in the outline vector table already present on the disk is rewritten with the sum, and the currently formed outline vector table excluding the total number of outline loops is stored after the end of the outline vector table already present on the disk. Thereafter, the flow advances to step S312, and the content of the connection information table is cleared. In step S313, it is checked if processing is ended up to the final raster in the image. If YES in step S313, the flow advances to step S316; otherwise, the flow advances to step S314. In step S314, "0" is set in the variables i and k. In step S315, the raster of interest is shifted to the next raster, and the flow then returns to step S302. In step S316, the same processing as in step S310 is executed, and in step S317, the same processing as in step S311 is executed, thus ending extraction of outline vectors in the image.

With the above-mentioned outline vector extraction processing, since the outline vectors can be extracted in units of pixels, the entire image need not be stored in a page memory unlike in a conventional apparatus, and the memory capacity can be greatly reduced. When information in the connection information table is sorted and output every time a white raster is generated, the capacity of the connection information table can be reduced, and the memory capacity can be saved. Since the capacity of the connection information table is reduced, the search range upon sorting of a vector string is narrowed accordingly, and high-speed processing can be attained.

THIRD EMBODIMENT

The third embodiment of the present invention will be described below with reference to the accompanying drawings.

FIG. 63 is a schematic diagram of an image processing apparatus according to this embodiment. In FIG. 63, a binary image acquisition unit 1001 acquires a digital binary image to be subjected to enlarging/compressing processing, and outputs a raster-scanned binary image. A white raster detection unit 1002 detects a white raster (a raster constituted by all white pixels in a raster of interest) from the input image. An outline extraction unit 1003 extracts coarse outline vectors (outline vectors before smoothing and enlarging/compressing processing) from a raster-scanned binary image. An outline smoothing & enlarging/compressing unit 1004 performs smoothing and enlarging/compressing processing of the coarse vector data in the form of vector data. A binary image reproduction unit 1005 reproduces a binary image from outline vector data as raster scanned-binary image data (obtained by processing for drawing an outline and painting a portion inside the outline). A binary image output unit 1006 displays binary image data of the raster-scanned binary image, or generates a hard copy thereof, or outputs it onto, e.g., a communication line.

Note that the binary image acquisition unit 1001 comprises a known raster-scanned binary image output device (e.g., an image reader) for reading and binarizing an image, and outputting binary data in the raster-scanning format. The white raster detection unit 1002 receives an image for one raster (one dot line) obtained by the binary image acquisition unit 1001, and discriminates whether or not all pixels in the raster are white pixels (when all pixels in a raster are white pixels, such a raster will be referred to as a white raster hereinafter). The unit 1002 outputs a discrimination signal to the outline extraction unit 1003. The outline extraction unit 1003 extracts outline vectors on the basis of the binary image input from the binary image acquisition unit 1001 and the discrimination signal from the white raster detection unit 1002. The outline extraction unit 1003 described in Japanese Patent Application No. 2-281958 which has been already proposed by the present applicant is basically adopted, and its processing content will be described in detail later.

FIGS. 1A and 1B show the scanning pattern of raster-scanned binary image data output from the binary image acquisition unit 1001, and also show the scanning pattern of raster-scanned binary image data to be received by the outline extraction unit 1003. In this format, the binary image data output from the binary image acquisition unit 1001 is supplied to the outline extraction unit 1003.

In FIGS. 1A and 1B, a pixel 101 represents a certain pixel (pixel of interest) in a binary image in scanning, and a region 102 represents a 9-pixel region (to be referred to as a pixel block hereinafter) including eight pixels near the pixel 101.

Figure 64B:
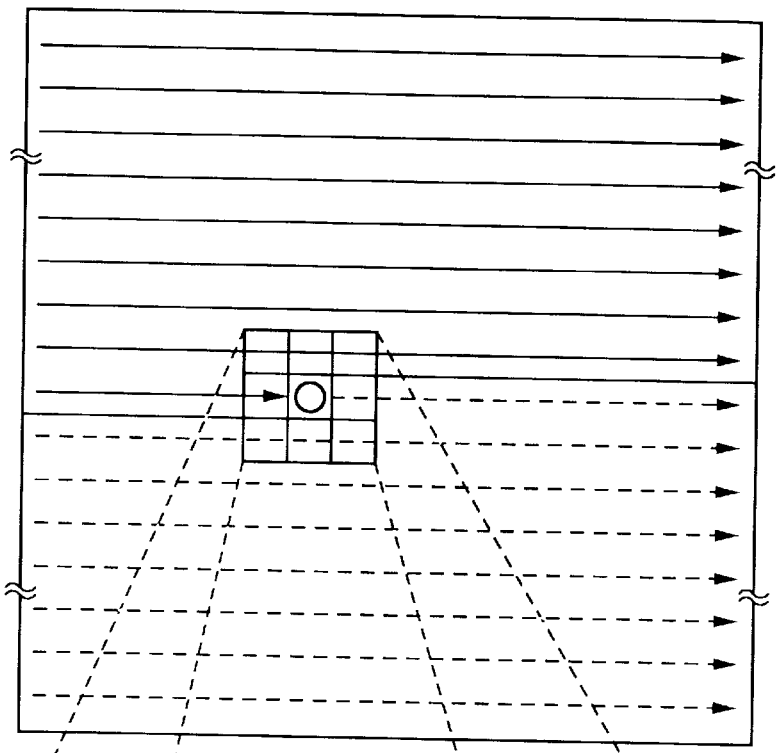
FIGS. 64A and 64B are views for explaining the principle of extracting a coarse outline vector from a raster-scanned binary image in the third embodiment.
Figure 64A:
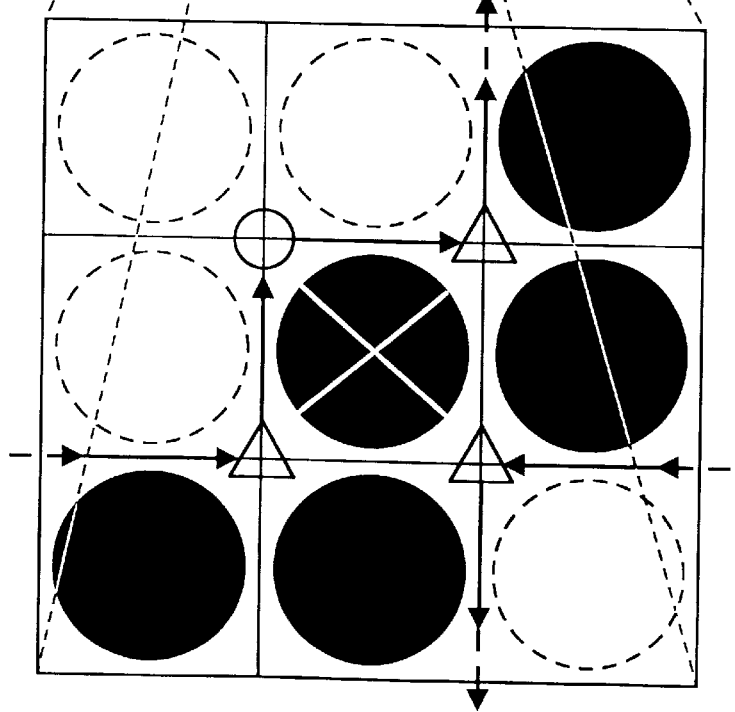

The outline extraction unit 1003 will be briefly described below. The outline extraction unit of this embodiment shifts a pixel of interest in the order of raster scanning, and detects outline side vectors present between the pixel of interest and its neighboring pixels according to the states (black or white pixels) of pixels in the 9-pixel region (i.e., the pixel block 102) with respect to each pixel of interest. If outline side vectors are detected, the outline extraction unit extracts data indicating the start point coordinates and direction of the side vector, and extracts a coarse outline vector while updating the connection relationship among these side vectors. Therefore, at least, a pixel block of interest must be present at the edge position of a binary image. FIGS. 64A and 64B show an extraction state of outline side vectors between a pixel of interest and its neighboring pixels. In FIG. 64A, a Δ mark represents the start point of a vertical vector, and a ○ mark represents the start point of a horizontal vector.

FIG. 65 shows a coarse outline vector loop extracted by the outline extraction unit. In FIG. 65, each box divided by lattice lines indicates a pixel position of an input image, a blank box means a white pixel, and a dotted circle means a black pixel.

Like in FIG. 64A, a Δ mark represents the start point of a vertical vector, and a ○ mark represents the start point of a horizontal vector. The operation of the white raster detection unit 1002 shown in FIG. 63 will be described below with reference to FIG. 65. Numbers on the left side in FIG. 65 indicate raster numbers.

The white raster detection unit 1002 operates to execute white raster detection processing for a raster next to the raster where the pixel of interest of the outline extraction unit 1003 is present. When the outline extraction unit 1003 completes extraction processing of the final pixel on the raster of interest, the white raster detection unit 1002 operates to complete white raster detection processing for the raster next to the raster of interest. For this purpose, a buffer for delaying data by one line can be arranged immediately before the outline extraction unit. For example, when the outline extraction unit 1003 processes the first pixel in the first raster, the white raster detection unit 1002 checks if the first pixel in the second raster is a white pixel, and the white raster detection unit 1002 checks if the final pixel in the second raster is a white pixel, in synchronism with completion of processing of the final pixel in the first raster by the outline extraction unit 1003. Then, the white raster detection unit 1002 discriminates whether or not the raster is a white raster, and outputs the discrimination result to the outline extraction unit 1003. In this case, the white raster detection unit 1002 does not discriminate the first raster. This is because even when the first raster is a white raster, since there are no previously extracted outline vectors, the white raster does not influence the subsequent processing. Also, when the raster of interest of the outline extraction unit 1003 is the final raster, the white raster detection unit 1002 does not perform any operation.

The outline extraction unit 1003 extracts a region where black pixels are connected as a coarse outline vector loop where horizontal and vertical vectors alternately and continuously appear. In this case, the heading directions of vectors are defined such that a black pixel region is always present on the right-hand side of the heading direction. The start point of each coarse outline vector is extracted as an intermediate position of each pixel in an input image, and even a line portion having a width of one pixel in an original image is extracted as a coarse outline loop having a significant width. When the coarse outline vectors are sequentially extracted, the extraction position finally returns to the start point position. In other words, a binary image is expressed by a set of closed (looped) outline vectors.

The coarse outline vector loops extracted in this manner are held in the data format, as shown in FIG. 22. More specifically, the vector loops are stored as the total number a of coarse outline loops extracted from an image, and first to a-th coarse outline loop data. Each coarse outline loop data consists of the total number of start points of outline side vectors present in the coarse outline loop (this number can also be considered as the total number of outline side vectors), and a string of the start point coordinate values (x- and y-coordinate values) of outline side vectors in the order of constituting the loop (the start points of horizontal and vertical vectors are alternately arranged).

In this embodiment, when a white raster is detected, it is determined that an outline loop is completed at least before the current line. Therefore, the outline loop extracted at that time is transferred to the next processing.

More specifically, when the discrimination signal from the white raster detection unit 1002 represents a white raster, the outline extraction unit 1003 outputs outline vectors (coarse outline vector loops) extracted so far to the outline smoothing & enlarging/compressing unit 1004 (FIG. 63) in the data format shown in FIG. 22; otherwise, the unit 1003 outputs no data. Thereafter, the outline extraction unit 1003 continues outline extraction processing. For example, when the outline extraction unit 1003 completes processing of the 11th raster in FIG. 65, since the next 12th raster is a white raster, the white raster detection unit 1002 outputs a discrimination signal indicating a white raster to the outline extraction unit 1003. At this time, coarse outline vector loops extracted so far are output to the outline smoothing & enlarging/compressing unit 1004 (FIG. 63) in the data format shown in FIG. 22.

Upon reception of coarse outline vector data from the outline extraction unit 1003, the outline smoothing & enlarging/compressing unit 1004 executes smoothing & enlarging/compressing processing of received data in the form of vector data. As will be described in detail later, the outline smoothing & enlarging/compressing processing can be executed parallel to the outline extraction processing, and the processing speed can be increased by the parallel processing.

The outline smoothing & enlarging/compressing unit 1004 receives coarse outline vector data output from the outline extraction unit 1003 (FIG. 63), and executes smoothing and enlarging/compressing processing to a desired magnification of the input data in the form of outline vector data (coordinate values).

Figure 66:
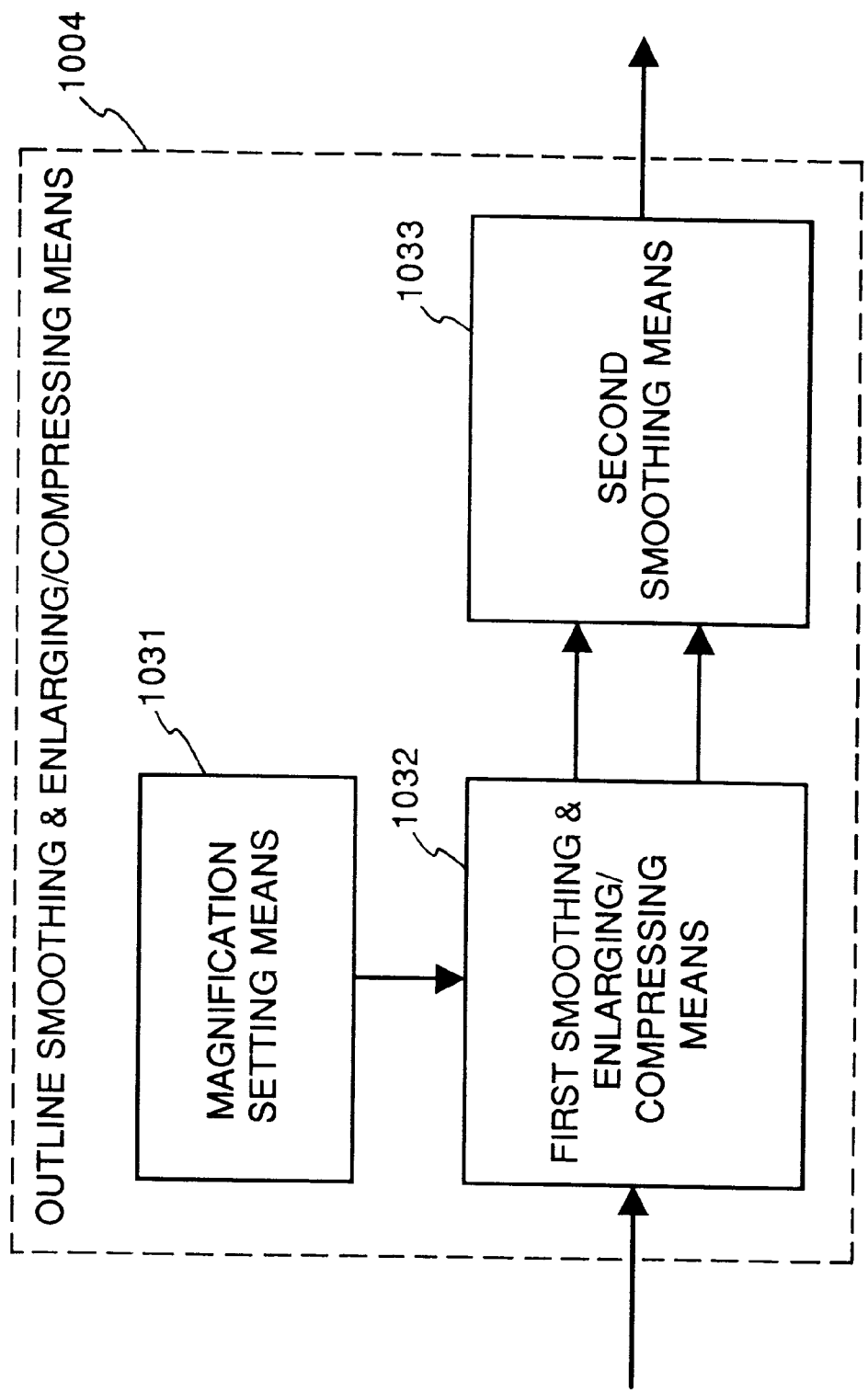
FIG. 66 is a functional block diagram of an outline smoothing & enlarging/compressing means in the third embodiment.

FIG. 66 shows the details of the outline smoothing & enlarging/compressing unit 1004. In FIG. 66, reference numeral 1031 denotes a magnification setting means for enlarging/compressing processing; and 1032, a first smoothing & enlarging/compressing unit for executing smoothing and enlarging/compressing processing of input coarse outline data at a magnification set by the magnification setting unit 1031. The processing result is subjected to another smoothing processing in a second smoothing unit 1033, thus obtaining a final output.

Note that the magnification setting unit 1031 may supply a fixed value pre-set by, e.g., dip switches or a dial switch to the first smoothing & enlarging/compressing unit 1032, or may receive magnification data from an external circuit through an I/F (interface). The magnification setting unit 1031 independently provides data associated with magnifications in the main scanning (horizontal) direction and the sub-scanning (vertical) direction with respect to an input image size.

The first smoothing & enlarging/compressing unit 1032 executes smoothing and enlarging/compressing processing on the basis of magnification data obtained from the magnification setting unit 1031.

Figure 67:
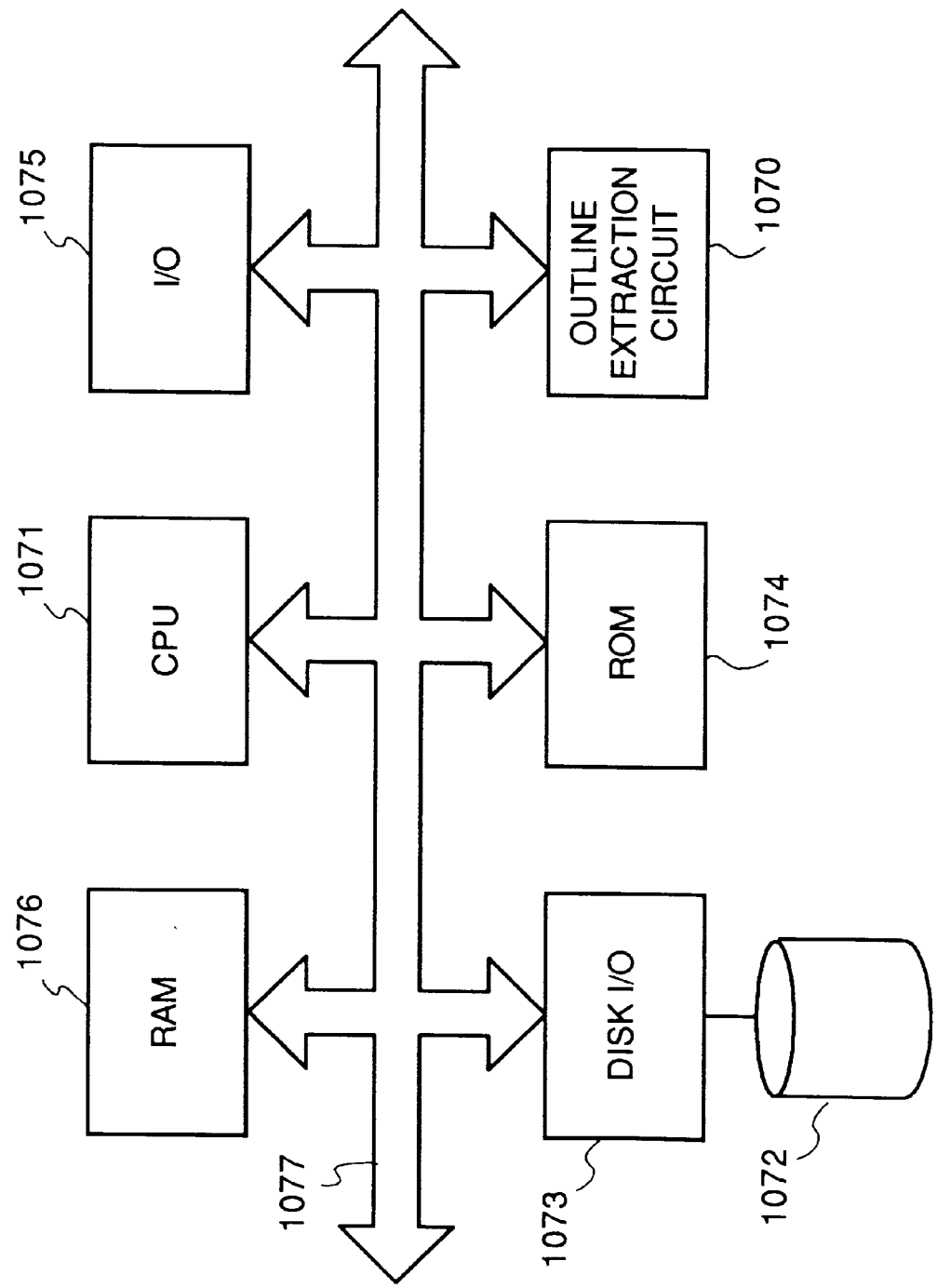
FIG. 67 is a detailed block diagram of the outline smoothing & enlarging/compressing means in the third embodiment.

FIG. 67 shows a hardware arrangement for realizing the outline smoothing & enlarging/compressing unit 1004. In FIG. 67, an outline extraction circuit 1070, a CPU 1071, a disk device 1072, a disk I/O 1073, a ROM 1074, an I/O port 1075, and a RAM (random-access memory) 1076 are connected through a bus 1077. The ROM 1074 stores the operation processing sequence of the CPU 1071.

The outline extraction circuit 1070 (FIG. 67) supplies coarse outline vector data to the disk device 1072 as an output file in the data format shown in FIG. 22.

Figure 68:
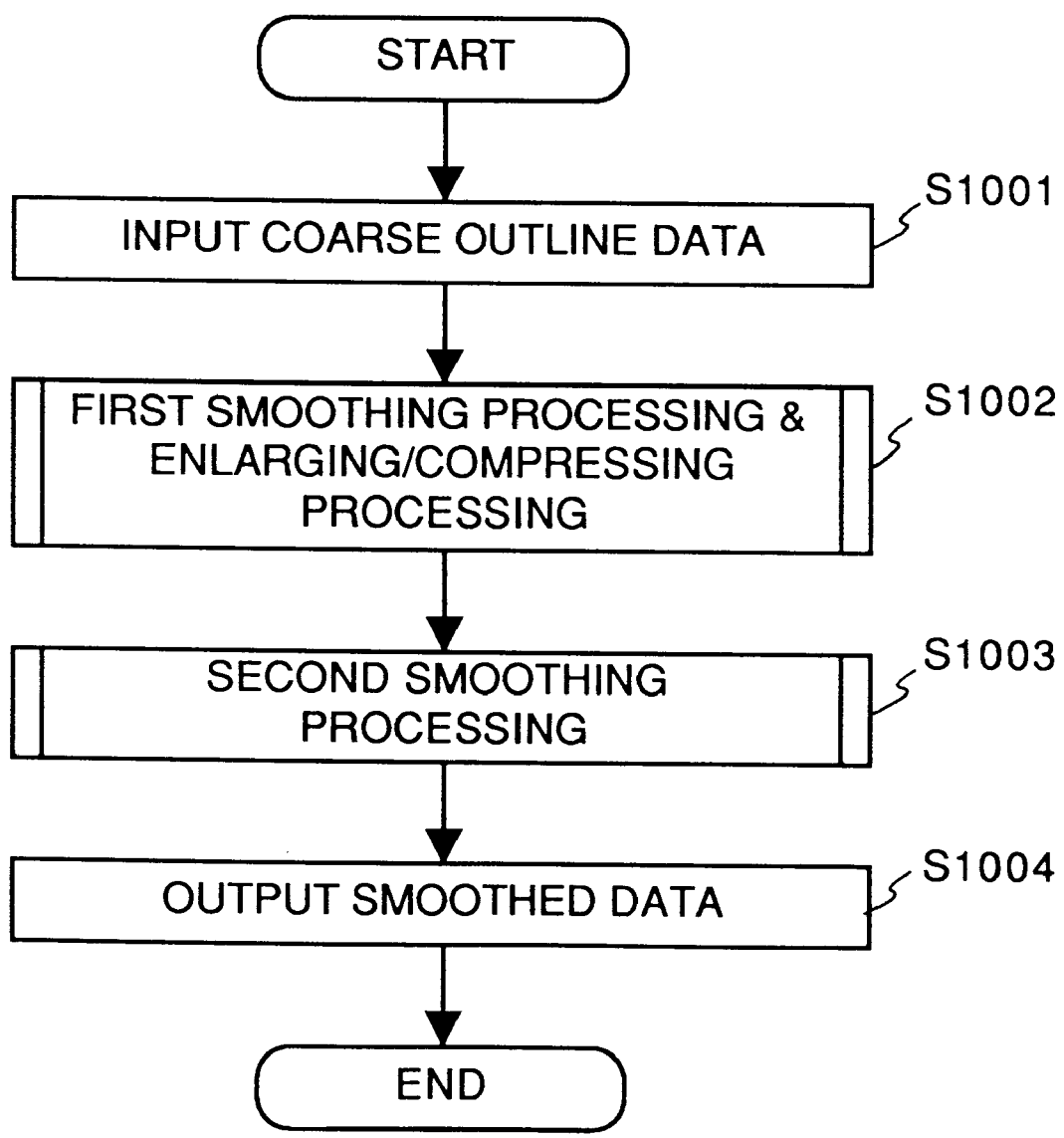
FIG. 68 is a flow chart showing the outline of outline smoothing & enlarging/compressing processing in the third embodiment.

The CPU 1071 operates according to the sequence shown in FIG. 68 (the corresponding program is stored in the ROM 1074), and executes outline smoothing & enlarging/compressing processing.

In step S1001, the CPU 1071 reads out coarse outline data stored in the disk device 1072 via the disk I/O 1073, and stores the readout data in a working memory area allocated in the RAM 1076. In step S1002, the CPU 1071 executes first smoothing processing and enlarging/compressing processing.

The first smoothing processing is executed in units of closed loops of coarse outline data. Each outline side vector (horizontal or vertical vector) of each coarse outline data is sequentially defined as an outline side vector of interest, and patterns are classified depending on combinations of lengths and directions of a maximum of three continuous outline side vectors each before and after the vector of interest (a maximum of a total of seven side vectors, i.e., three vectors before the side vector of interest, the side vector of interest itself, and three vectors after the side vector of interest). Then, an outline point after first smoothing processing for the side vector of interest is defined for each pattern. The coordinate values of outline points after the first smoothing processing, and additional information indicating whether or not a corresponding outline point is a corner point (to be referred to as corner point information hereinafter) are output. Outline points after the first smoothing processing, which points are determined as corner points, are not smoothed by the next second smoothing processing, and outline points after the first smoothing processing, which points are not determined as corner points, are further smoothed by the next second smoothing processing (step S1003). Then, the smoothing result is output (step S1004).

Figure 69:
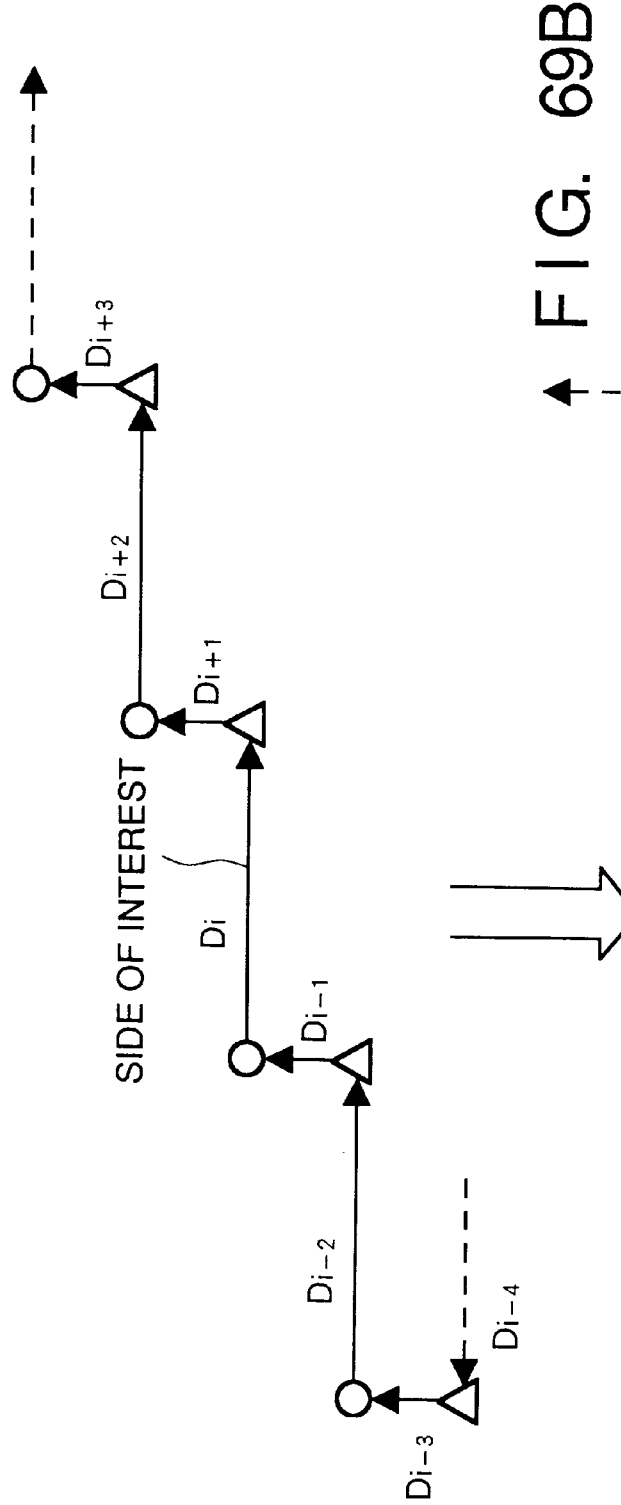
FIGS. 69A and 69B are views for explaining the operation of first smoothing processing in the third embodiment.
Figure 73A:
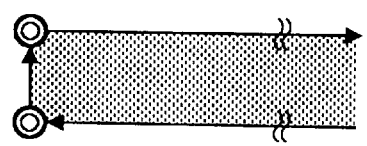
FIGS. 73A to 73D are views showing other first smoothing processing rules in the third embodiment.
Figure 73B:
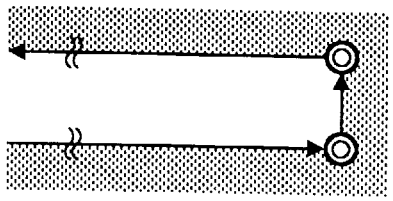
Figure 73C:
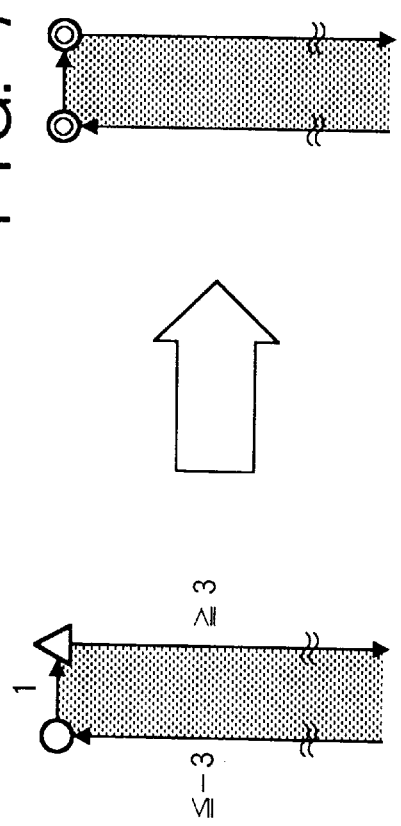
Figure 73D:
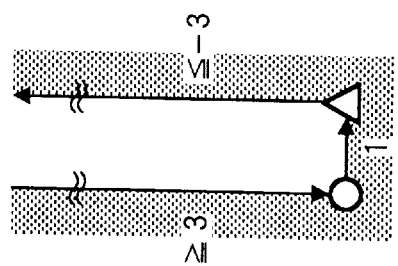

FIGS. 69A and 69B show the outline of the first smoothing processing. FIGS. 69A and 69B illustrate a connection state of a coarse outline side vector Di of interest, three side vectors Di−1, Di−2, and Di−3 before the coarse outline side vector of interest, and three side vectors Di+1, Di+2, and Di+3 after the coarse outline side vector of interest, and a state of an outline point after the first smoothing processing, which point is defined for the side vector Di of interest.

In this case, one coarse outline loop output from the outline extraction unit 1003 can be defined by a minimum of four side vectors (for example, in the case of a square image). In this manner, when one coarse outline loop is constituted by less than 7 side vectors, a side vector before the side vector of interest, and a side vector after the side vector of interest may be the same side vector. More specifically, when one loop is constituted by four vectors, if a side vector of interest is represented by Di, vectors Di−3 and Di+1, vectors Di−2 and Di+2, and Di−1 and Di+3 are the same side vectors; when one loop is constituted by six vectors, vectors Di−3 and Di+2 and vectors Di−2 and Di+3 are the same side vectors in practice.

When one coarse outline loop is constituted by four side vectors, there is also a rule for defining outline point data after the first smoothing processing for the coarse outline loop in place of defining an outline point for each side vector of interest.

A pattern of the lengths and directions of a side vector of interest and three side vectors each before and after the side vector of interest in the first smoothing processing, and a method of defining an outline point after the first smoothing processing as an output for the side vector of interest in each pattern will be described below.

Coarse outline data is input to the first smoothing & enlarging/compressing unit 1032 in the format shown in FIG. 22. In each outline loop, when the number of outline points (start points of outline side vectors) included in the loop is represented by n, an outline side vector having a first point as a start point and a second point as an end point is defined as a first side vector; an outline side vector having a second point as a start point and a third point as an end point is defined as a second side vector; an outline side vector having an i-th point (for i<n) as a start point and an (i+1)-th point as an end point is defined as an i-th side vector; and an outline side vector having an n-th point (the final point in the outline loop) as a start point and the first point as an end point is defined as an n-th side vector. As described above, the outline vector is constituted by alternately coupling vertical and horizontal side vectors, and is always constituted by an even number of side vectors (i.e., the number of vertical side vectors is equal to that of the horizontal side vectors).

In a vertical side vector, the x-coordinate of the start point is equal to that of the end point. For this reason, the length and direction (to be referred to as side data in combination) of the vertical side vector can be defined by a difference obtained by subtracting the y-coordinate value of the start point from that of the end point. More specifically, the absolute value of the difference is defined as a length, and when the difference is negative, the direction of the vector is defined as the upward direction; when it is positive, the direction of the vector is defined as the downward direction. These directions are defined based on the fact that a downward direction along the y-coordinate axis (sub-scanning direction) is determined as the positive direction in the outline extraction unit.

In a horizontal side vector, since the y-coordinate value of the start point is equal to that of the end point, the length and direction (to be referred to as side data in combination) of the horizontal side vector can be defined by a difference obtained by subtracting the x-coordinate value of the start point from that of the end point. More specifically, the absolute value of the difference is defined as a length, and when the difference is negative, the direction of the vector is defined as the leftward direction; when it is positive, the direction of the vector is defined as the rightward direction. These directions are defined based on the fact that the rightward direction along the x-coordinate axis (main scanning direction) is determined as the positive direction in the outline extraction unit.

FIG. 70 shows a case wherein a coarse outline loop is constituted by four side vectors, the vectors are coupled clockwise, and the lengths of all the four side vectors are "1". Also, FIG. 70 shows a rule for deleting the entire loop in this case. In order to check whether or not this condition is satisfied, it can be checked whether or not the total number of points in a coarse outline loop of interest is 4, and whether or not side data of the first horizontal vector is "1", and side data of a vertical vector immediately after the first horizontal vector is also "1"; or whether or not side data of the first horizontal vector is "−1", and side data of a vertical vector immediately after the first horizontal vector is also "−1". If this condition is satisfied, the coarse outline loop is in the state of FIG. 70; otherwise, it is not in the state of FIG. 70. This rule serves to remove an isolated point as a kind of noise unique to a binary image obtained by binarizing data read by an image reader.

FIGS. 71A and 71B show a state wherein a one-dot notch is removed to generate a flat edge. For the sake of easy understanding, a one-dot notch can be considered to be a one-dot isolated point generated on an edge of a binary image. Processing performed for a state shown in FIGS. 71C and 71D is the same as that for the state shown in FIGS. 71A and 71B.

In this embodiment, whether or not a notch is to be smoothed is determined according to the following condition.

More specifically, smoothing is performed when there are five continuous side vectors, the length (i.e., the absolute value of side data) of the central side vector is "1", side data of side vectors connected to the two ends of the central side vector are respectively "1" and "−1" or vice versa, and vectors two vectors before and after the central side vector have the same direction as that of the central side vector, and a length of 3 or more.

When these conditions are satisfied, an outline point after the first smoothing processing is not defined for a total of three side vectors, i.e., the central side vector and side vectors before and after the central side vector of the five continuous side vectors. That is, one side vector (its length is 7 or more) is generated. More specifically, the length of the side vector two vectors before the central side vector is corrected, and the remaining four side data are deleted. With this rule, a one-dot notch as a kind of noise unique to a binary image obtained by binarizing data read by an image reader can be removed, and a satisfactory image edge can be generated.

Whether or not these conditions are satisfied can be determined by detecting a combination pattern of side data of a side vector of interest and its neighboring side vectors in each of three continuous side vectors. More specifically, a side edge (an edge 1110 or 1115 in FIG. 71A or 71C) at the center of a one-dot notch, a side edge (an edge 1113 or 1118 in FIG. 71A or 71C) immediately before the center of the one-dot notch, and a side edge (an edge 1111 or 1116 in FIG. 71A or 71C) immediately after the center of the one-dot notch are determined as side vectors of interest, and combination patterns of side data in association with their neighboring side vectors are defined as follows.

i) A pattern having the side edge immediately before the center of the one-dot notch as the side vector of interest is as follows.

When the length of the side vector of interest is "1", the length of the side vector immediately after the side vector of interest is "1", the length of the side vector immediately before the side vector of interest is "3" or more, the directions of the side vector immediately before and after the side vector of interest are equal to each other, and a side vector two vectors after the side vector of interest has a length of "1" and a direction opposite to that of the vector of interest, no outline point after the first smoothing processing is defined for the side vector of interest, i.e., the side edge immediately before the center of the one-dot notch.

ii) A pattern having the side edge at the center of the one-dot notch as the side vector of interest is as follows.

When the length of the side vector of interest is "1", the side vectors immediately before and after the side vector of interest have a length of "1" and opposite directions (having different signs of side data), and side vectors two vectors before and after the side vector of interest have a length of "3" or more, and have the same direction as that of the side vector of interest, no outline point after the first smoothing processing is defined for the side vector of interest, i.e., the side edge at the center of the one-side notch.

iii) A pattern having the side edge immediately after the center of the one-dot notch as the side vector of interest is as follows.

When the length of the side vector of interest is "1", the length of the side vector immediately before the side vector of interest is "1", the length of the side vector immediately after the side vector of interest is "3" or more, the side vectors immediately before and after the side vector of interest have the same direction, and a side vector two side vectors before the side vector of interest has a length of "1" and has a direction opposite to that of the vector of interest, no outline point after the first smoothing processing is defined for the side vector of interest, i.e., the side edge immediately after the center of the one-side notch.

Note that FIGS. 71A to 71D exemplify a case wherein the side vector of interest is only a rightward horizontal vector. However, the above-mentioned rule includes cases wherein side vectors of interest are a leftward horizontal vector, an upward vertical vector, and a downward vertical vector.

Another example of smoothing processing will be described below with reference to FIGS. 72A and 72B.

FIG. 72A shows a case wherein the length of each of seven continuous side vectors is "1", the direction of a vector 1120 of interest is the same as those of side vectors 1125 and 1122 two vectors before and after the side vector of interest, and side vectors three vectors before, immediately before and after, and three vectors after the side vector of interest alternately have opposite directions. In this case, the side vector of interest and its surrounding side vectors can be detected according to the above-mentioned rule.

When the side vector of interest is a horizontal vector, a point after the first smoothing processing is defined by a point whose x-coordinate value is equal to that of a point of interest of the side vector of interest, and whose y-coordinate value is equal to that of a point of interest of a vector immediately before the side vector of interest. When the side vector of interest is a vertical vector, a point after the first smoothing processing is defined by a point whose x-coordinate value is equal to that of a point of interest of a vector immediately before the side vector of interest, and whose y-coordinate value is equal to that of a point of interest of the side vector of interest. This point is an outline point but not a corner point (to be simply referred to as a non-corner point hereinafter).

FIGS. 72A and 72B exemplify a case wherein the side vector of interest is a rightward horizontal vector. However, the above-mentioned rule includes cases wherein side vectors of interest are a leftward horizontal vector, an upward vertical vector, and a downward vertical vector. This rule serves to remove continuous notches (notches generated at every other pixel) as a kind of noise unique to a binary image obtained by binarizing data read by an image reader.

Sill another example will be described below with reference to FIGS. 73A to 73D. FIGS. 73A to 73D show a case wherein the length of a side vector of interest of three continuous side vectors is "1", the lengths of vectors before and after the side vector of interest are "3" or more, and their directions are opposite to each other. When these conditions are satisfied, points after the first smoothing processing are defined, so that both the start and end points of the side vectors of interest are determined as outline points as corner points (to be simply referred to as corner points hereinafter) using their coordinate values. FIGS. 73A to 73D exemplify a case wherein the side vector of interest is a rightward horizontal vector. However, the above-mentioned rule includes cases wherein side vectors of interest are a leftward horizontal vector, an upward vertical vector, and a downward vertical vector. This rule has an effect of preserving a thin line projection and a thin line recess unique to a binary image obtained by binarizing data read by an image reader.

Figure 74A:
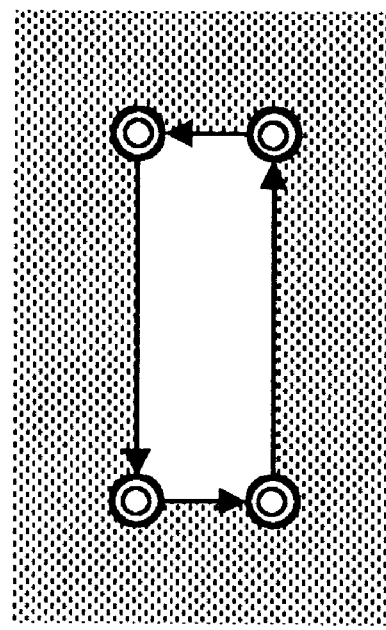
FIGS. 74A and 74B are views showing still another first smoothing processing rule in the third embodiment.
Figure 74B:
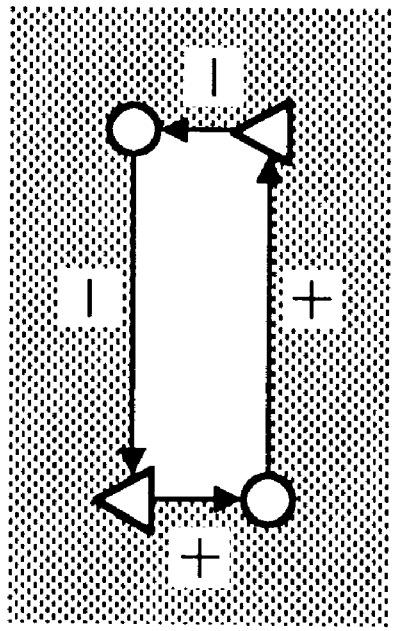

FIGS. 74A and 74B show a case wherein a coarse outline loop is constituted by four side vectors, and the vectors are coupled counterclockwise. In this embodiment, since a coarse outline vector is extracted under a condition that a black pixel region is present at the right-hand side of the extraction direction, the fact that the vectors are coupled counterclockwise means a blank space present in a black image, as shown in FIGS. 74A and 74B. In order to check if a coarse outline vector is constituted by four side vectors, and the vectors are coupled counterclockwise, it need only be checked if the total number of points in the coarse outline loop of interest is 4, and if the sign of side data of a vertical vector immediately after a first horizontal vector is negative (upward) when the sign of side data of the first horizontal vector is positive (rightward); or if the sign of side data of a vertical vector immediately after the first horizontal vector is positive (downward) when the sign of side data of the first horizontal vector is negative (leftward). That is, it need only be checked if the sign of the side data of the first horizontal vector is different from the sign of the side data of the vertical vector immediately after the first horizontal vector. When this condition is satisfied, all the four points in the loop are determined as corner points, and points after the first smoothing processing are defined using their coordinate values. This rule has an effect of preserving a small white hole often formed in a binary image obtained by binarizing data read by an image reader.

FIGS. 75A to 78B show a case wherein when the central side vector of five continuous coarse outline vectors is determined as a vector of interest, the length of the vector of interest is "3" or more, vectors immediately before and after the vector of interest have the same direction (having the same sign of side data), and have a length of "1".

FIGS. 75A and 75B show, in addition to the above-mentioned condition, a case wherein vectors two vectors before and after the side vector of interest have the same direction as that of the vector of interest. In this case, a point after the first smoothing processing is defined using the coordinate value of the middle point of the side vector of interest, and this point is determined as an outline point. Therefore, when the state shown in FIGS. 75A and 75B continuously appears (i.e., in the case of an edge having a relatively slow inclination), the centers of long vectors forming the edge are connected as outline points.

FIGS. 76A and 76B show a case wherein the direction of a vector (Di−2) two side vectors before a side vector (Di) of interest is opposite to that of the side vector of interest, and the direction of a vector (Di+2) two vectors after the side vector of interest is the same as that of the vector of interest. In this case, points after the first smoothing processing are defined, so that the start point of the side vector of interest is determined as a corner point using its coordinate value, and the coordinate value of the middle point of the side vector of interest is determined as an outline point.

FIGS. 77A and 77B show a case wherein a vector (Di−2) two side vectors before a side vector (Di) of interest has the same direction as that of the side vector of interest, and a vector (Di+2) two side vectors after the side vector of interest has a direction opposite to that of the side vector of interest. In this case, points after the first smoothing processing are defined, so that the coordinate value of the middle point of the side vector of interest is determined as an outline point, and the coordinate position of the end point of the side vector of interest is determined as a corner point.

FIGS. 78A and 78B show a case wherein vectors (Di−2, Di+2) two side vectors before and after a side vector (Di) of interest have the same direction, and a direction different from that of the vector of interest. In this case, points after the first smoothing processing are defined so that the start and end points of the side vector of interest are determined as corner points using their coordinate values.

In FIGS. 75A to 78B, a side vector of interest and its surrounding side vectors need only be detected according to the above-mentioned rules. Note that the processing in FIGS. 75A and 75B has an effect of smoothing an oblique line portion having a slow inclination to obtain a smoother line, the processing in FIGS. 76A to 77B has an effect of smoothing an oblique line portion to obtain a smoother line, and preserving a small notch portion near a contact point between the oblique line and the small notch portion, and the processing in FIGS. 78A and 78B has an effect of preserving a small notch portion of a figure. FIGS. 75A to 78B exemplify a case wherein the side vector of interest is a rightward vector, and vectors before and after the vector of interest are upward vectors. However, the above-mentioned rule also includes a case wherein a side vector of interest is a rightward vector, and vectors before and after the vector of interest are downward vectors; a case wherein a side vector of interest is a leftward vector, and vectors before and after the vector of interest are downward vectors; a case wherein a side vector of interest is a leftward vector, and vectors before and after the vector of interest are upward vectors; a case wherein a side vector of interest is an upward vector, and both vectors before and after the vector of interest are rightward or leftward vectors; and a case wherein a side vector of interest is a downward vector, and both vectors before and after the vector of interest are rightward or leftward vectors.

Other examples will be described below with reference to FIGS. 79A to 81B. FIGS. 79A to 80B show a case wherein the length of a side vector of interest is "2" or more, one of vectors before and after the side vector of interest has a length of "1", and the other vector has a length of "2" or more (excluding a case wherein the length of the side vector of interest is "2", and at least one of the vectors before and after the side vector of interest is "2").

Figure 79A:
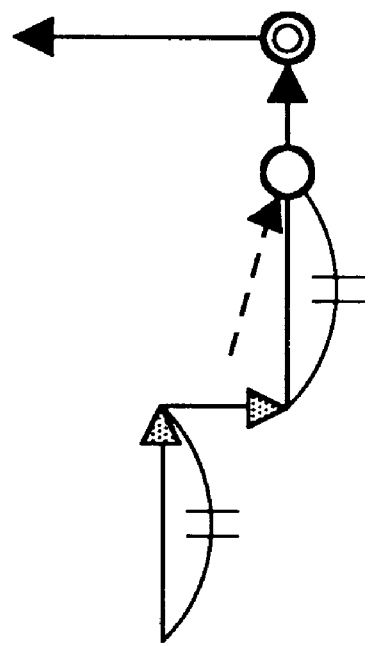
FIGS. 79A and 79B are views showing still another first smoothing processing rule in the third embodiment.
Figure 79B:
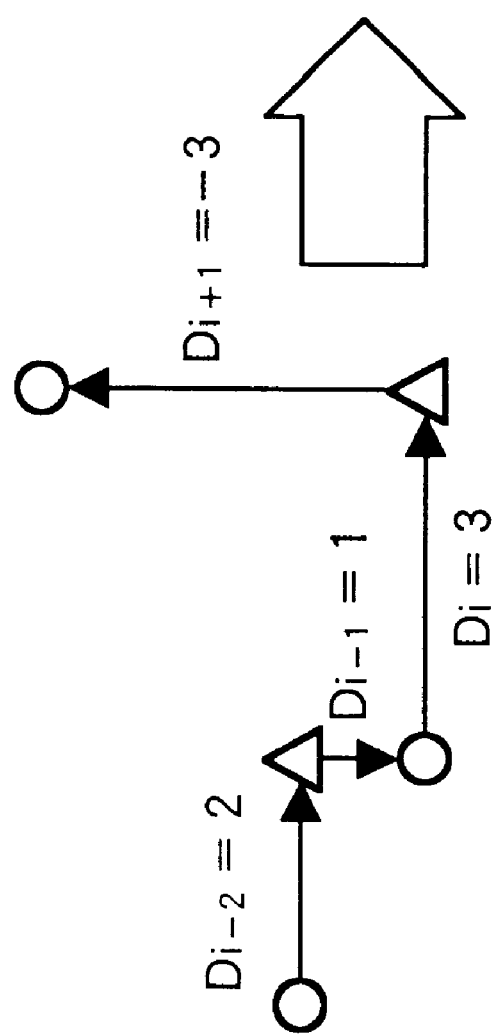

FIGS. 79A and 79B show a case wherein the length of a side vector immediately before the side vector of interest is "1", and the length of a side vector immediately after the side vector of interest is "2" or more. In this case, when the length of a side vector two side vectors before the side vector of interest is smaller than that of the side vector of interest, an outline point is defined by the coordinate value of a position on the side vector of interest, which position is separated from the start point of the side vector of interest toward the end point by the length of the side vector two vectors before the side vector of interest, and a corner point is defined by the coordinate value of the end point of the side vector of interest regardless of the lengths of the side vector of interest and the side vector two side vectors before the side vector of interest. These points are determined as points after the first smoothing processing.

Figure 80A:
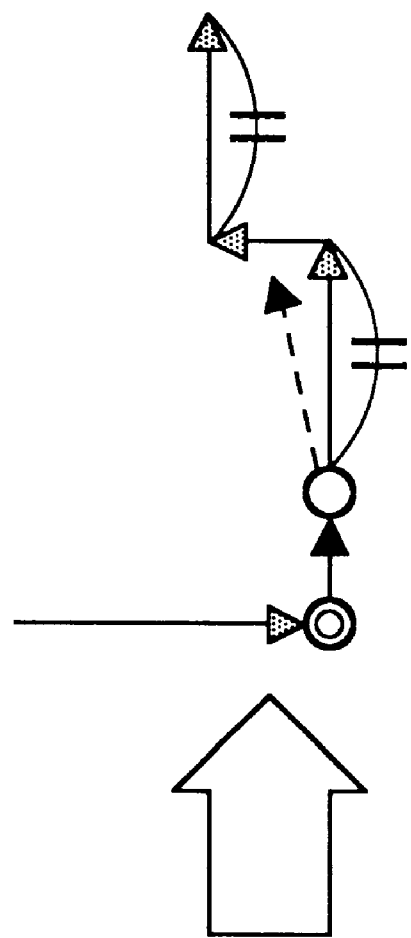
FIGS. 80A and 80B are views showing still another first smoothing processing rule in the third embodiment.
Figure 80B:
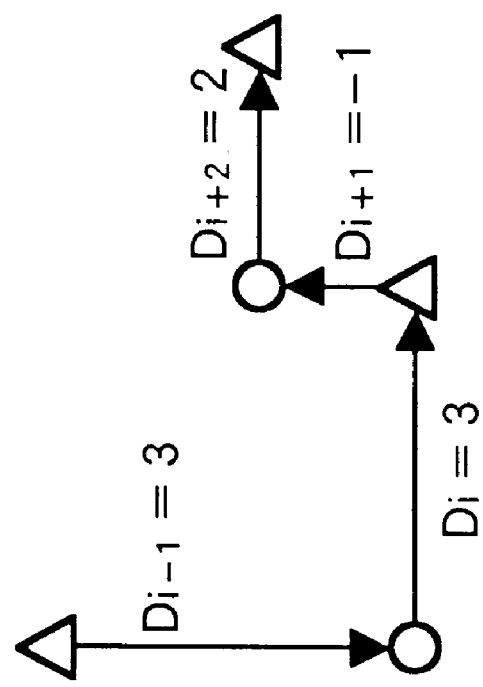

FIGS. 80A and 80B show a case wherein the length of the side vector immediately before the side vector of interest is "2" or more, and the length of the side vector immediately after the vector of interest is "1". In this case, the coordinate value of the start point of the side vector of interest is defined as a corner point. Furthermore, when the length of a side vector two side vectors after the side vector of interest is smaller than the length of the side vector of interest, a position on the side vector of interest, which is separated from the end point of the side vector of interest toward the start point by the length of the side vector two side vectors after the side vector of interest, is defined as an outline point. These points are determined as points after the first smoothing processing.

In FIGS. 79A to 80B, the side vector of interest and its surrounding side vectors need only be detected according to the above-mentioned rules. These rules have an effect of smoothing an oblique line portion to obtain a smoother line and preserving a corner portion near a boundary between the oblique line and the corner portion.

FIGS. 81A and 81B show a case wherein the length of the side vector of interest is "3" or more, and the lengths of side vectors immediately before and after the side vector of interest are "2" or more. In this case, corner points are defined by the coordinate values of the start and end points of the side vector of interest. These points are determined as points after the first smoothing processing. In FIGS. 81A and 81B, the side vector of interest and its surrounding side vectors need only be detected according to the above-mentioned rules. This rule has an effect of preserving a corner portion. FIGS. 79A to 81B exemplify only one direction of the side vector of interest. However, the above-mentioned rules include cases wherein side vectors of interest are leftward, rightward, upward, and downward vectors.

Figure 82B:
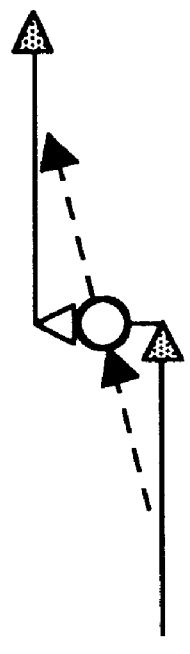
FIGS. 82A and 82B are views showing still another first smoothing processing rule in the third embodiment.
Figure 82A:
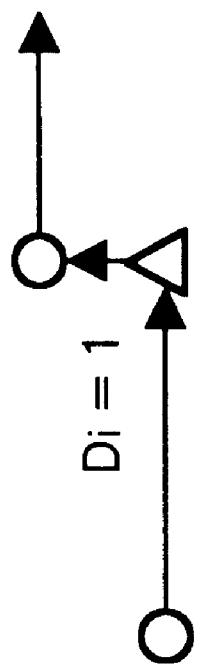
Figure 83B:
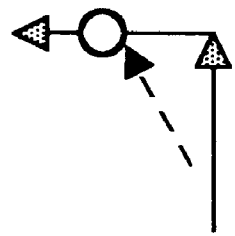
FIGS. 83A to 83D are views showing other first smoothing processing rules in the third embodiment.
Figure 83D:
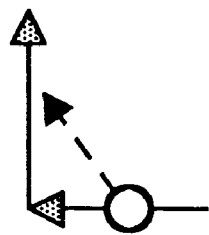
Figure 83A:
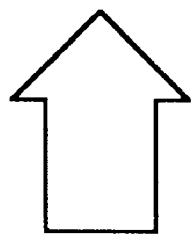
Figure 83C:
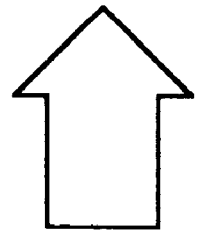

Other examples will be described below. FIGS. 82A and 82B show a case wherein the length of a side vector of interest is "1", and the states of other vectors do not fall within the above-mentioned cases. In this case, the coordinate value of the middle point of the side vector of interest is determined as an outline point to define a point after the first smoothing processing. This rule has an effect of smoothing an oblique line portion.

FIGS. 83A to 83D show a case wherein the length of a side vector of interest is "2", and at least one of side vectors immediately before and after the side vector of interest is "2". In this case, an outline point is defined by the coordinate value of the middle point of the side vector of interest, thus defining a point after the first smoothing processing. This rule has an effect of smoothing an oblique line portion.

FIGS. 82A to 83D exemplify a case wherein the side vector of interest is a rightward vector. However, the above-mentioned rules also include cases wherein side vectors of interest are leftward, rightward, upward, and downward vectors.

Figure 84A:
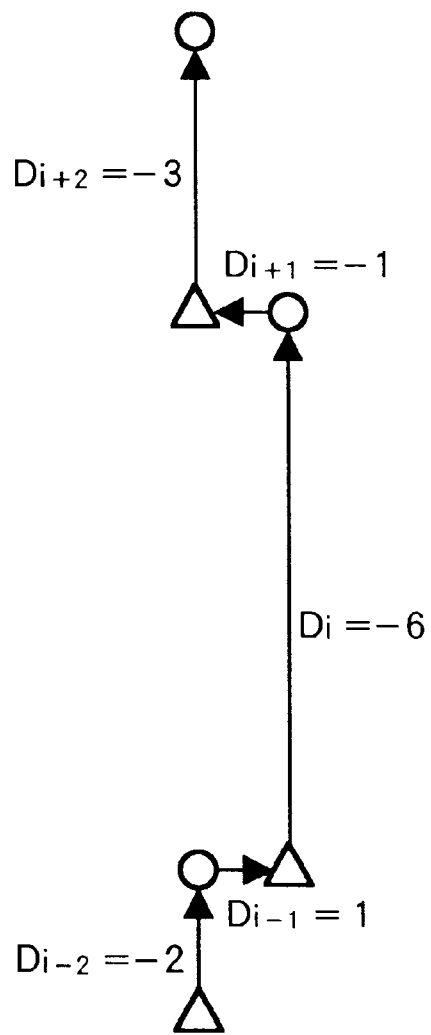
FIGS. 84A and 84B are views showing still another first smoothing processing rule in the third embodiment.
Figure 84B:
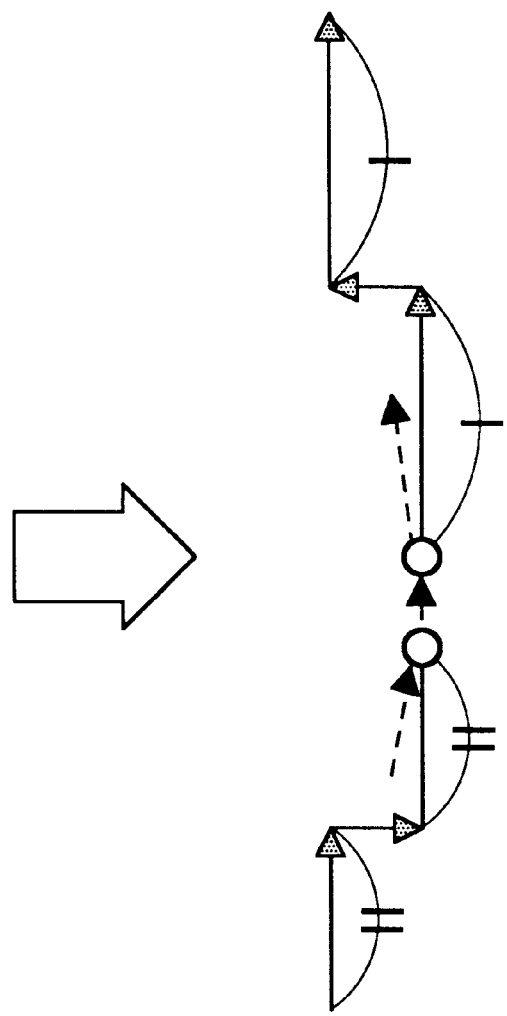

FIGS. 84A and 84B show a case wherein the length of a side vector of interest is "3" or more, side vectors immediately before and after the side vector of interest have a length of "1" and opposite directions, and the sum of the lengths of side vectors two side vectors before and after the side vector of interest is smaller than the length of the side vector of interest. In this case, the coordinate value of a point, which is moved along the side vector of interest from the start point toward the end point by the length of the side vector two side vectors before the side vector of interest, is defined as an outline point, and the coordinate value of a point, which is moved along the side vector of interest from the end point toward the start point by the length of the side vector two side vectors after the side vector of interest, is defined as an outline point. Points after the first smoothing processing are defined by these two outline points. This rule has an effect of smoothing a smooth curve portion. FIGS. 84A and 84B exemplify a case wherein the side vector of interest is an upward vector, the side vector immediately before the vector of interest is a rightward vector, and the side vector immediately after the vector of interest is a leftward vector. However, the above-mentioned rule is not limited to this case, and includes cases wherein side vectors of interest are upward, downward, leftward, and rightward vectors, and side vectors immediately before and after the side vector of interest have a length of "1" and opposite directions.

When the states of vectors do not fall within the rules described above with reference to FIGS. 70A to 84B, a point after the first smoothing processing is defined, so that the coordinate value of the middle point of a side vector of interest is determined as an outline point.

The content of step S1002 in the flow chart of FIG. 68, i.e., the content of the first smoothing processing will be described below with reference to FIGS. 85 to 91C. A problem corresponding to these flow charts is stored in the ROM 1074.

Figure 85:
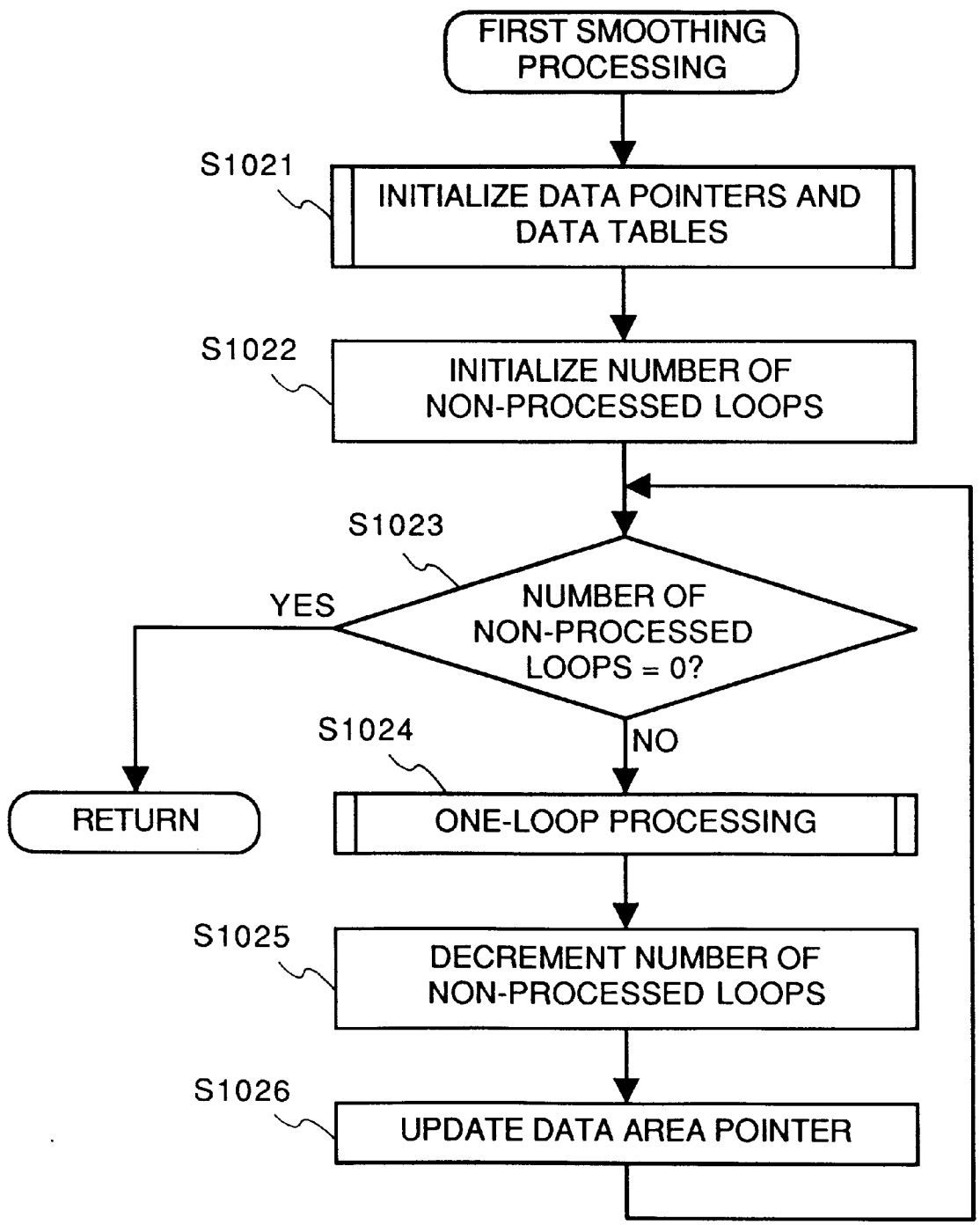
FIG. 85 is a flow chart showing the processing content of the first smoothing processing in the third embodiment.

FIG. 85 shows the general flow of the first smoothing processing. When the first smoothing processing routine is called in step S1002 in FIG. 68, processing shown in the flow chart of FIG. 85 is executed. In step S1021, a data pointer, a data table, and a counter area (not shown) required for a processing operation of coarse outline data stored in the working memory area 1076 in step S1002 in FIG. 68 are assured on the working area 1076, and are initialized. In addition, desired magnifications in the main scanning and sub-scanning directions are independently obtained through the magnification setting unit 1031. In step S1022, the total number of outline loops in an image in coarse outline data is copied to and held in a temporary area for a processing operation as a non-processed loop table. It is checked in step S1023 if data of the number of non-processed loop is "0". If YES in step S1023, the flow returns to the routine shown in FIG. 68. However, if NO in step S1023, i.e., if it is determined that loops to be processed still remain, the flow advances to step S1024.

In step S1024, a series of first smoothing processing operations are executed for coarse outline data on a coarse outline loop designated by the start address of the data area in the working memory area of coarse outline loop data to be processed. The processing content will be described in detail later with reference to FIG. 86. The start address (held in a data area pointer) of the data area in the working memory area of coarse outline loop data to be processed is initialized to that of the first outline data in step S1021 at the beginning of the processing.

Upon completion of the processing in step S1024, when the flow advances to step S1025, the data of the number of non-processed loops is decremented by one. In step S1026, the pointer is updated to designate the start address of the data area of a coarse outline loop to be processed in the next processing in step S1024. This updating operation can be easily attained by adding the data amount corresponding to the number of coarse outline points present in the coarse outline loop processed in the immediately preceding processing to the start address of the data area of the coarse outline loop processed in the immediately preceding processing. Upon completion of the processing in step S1026, the flow returns to step S1023 to repeat the same processing.

The processing content of one-loop smoothing processing in step S1024 described above will be described below with reference to FIG. 86.

When this routine is called, it is checked in step S1031 if the total number of coarse outline points in a coarse outline loop present in the area designated by the data area pointer is 4. If YES in step S1031, the flow advances to step S1032; otherwise, the flow advances to step S1036.

In step S1032, it is checked if the coarse outline loop constituted by the four points is a counterclockwise loop. More specifically, when side data of the first horizontal vector is represented by Di, if Di<0, it is checked if Di+1>0; or if Di>0, it is checked if Di+1 <0, thereby determining whether or not the corresponding loop is a counterclockwise loop. Otherwise, it is determined that the corresponding loop is a clockwise loop. If YES in step S1032, the flow advances to step S1033; otherwise, the flow advances to step S1034.

In step S1033, since the coarse outline loop is constituted by four coarse outline points, and is a counterclockwise loop, and since this case corresponds to that shown in FIGS. 74A and 74B, all the four coarse outline points are output as corner points. Although a detailed description will be omitted, as for a difference between corner and non-corner points, an additional data area is assured on the RAM area 1076 in addition to the coordinate value data area, and is managed using a pointer in the same manner as the coordinate value data area. The additional data area is assured for outline points (including both corner and non-corner points) as a continuous memory area. Upon completion of the processing in step S1033, it is determined that processing of the corresponding coarse outline loop is ended, and the flow returns to the routine (step S1025) shown in FIG. 85. In step S1034, it is checked if all the side data lengths of the clockwise loop constituted by the four coarse outline points are "1". More specifically, it is checked if the first side data Di satisfies Di=1 or –1 and Di+1=1 or –1. If these conditions are satisfied, it means that the loop of interest is an isolated point, as shown in FIG. 70. Therefore, all the coarse outline points (=four points) constituting the corresponding outline loop are deleted, and this processing is ended.

When the total number of outline points in the loop is larger than 4, or when the clockwise loop constituted by the four outline points includes a side vector having a length larger than "1", the flow advances to step S1036.

In step S1036, initialization necessary for executing the following processing for outline side data in a coarse outline loop is executed. More specifically, all side data between adjacent coarse outline points present in the coarse outline loop are generated for one loop. Pointers and registers for processing the data in the loop in turn are also initialized. The processing is executed in units of side vectors as follows.

In step S1037, it is checked if processing for all the edges in the loop is ended. If YES in step S1037, it is determined that the processing of the corresponding coarse outline loop is completed, and the flow returns to the routine shown in FIG. 85; otherwise, the flow advances to step S1038. Whether or not processing for one coarse outline loop is completed can be determined as follows. That is, the number of coarse outline points in one loop is copied to the temporary area allocated on the RAM 1076 as the number of non-processed edges, and every time processing for one side edge is completed, the number of non-processed edges is decremented by one. Then, whether or not the value becomes "0" is checked to make the above-mentioned determination.

In step S1038, smoothed vector data are generated using the side data of the side vectors generated in step S1036, a pointer for providing the address of an area where the side data of a side vector of interest at that time is stored, and a pointer for providing the address of an area where the coordinate values of the start and end points of the side vector of interest are stored. These pointers are initialized in step S1036, and thereafter, every time processing (step S1038) for one side vector is completed, the addresses designated by the pointers are updated by the corresponding data areas for one side vector in step S1039. More specifically, the pointers for the memory areas of the side data and the coordinate value data are updated to be able to look up the next data areas, and the data of the number of non-processed edge data is decremented by one. When the processing in step S1039 is completed, the flow returns to step S1037 to repeat the same processing.

FIG. 87 shows a state of the side data area of the side vectors generated in step S1036. Each side data is calculated as a difference between the coordinate values of two adjacent outline points in an outline point string. More specifically, in the case of a horizontal vector, the side data is generated by subtracting the x-coordinate value of the start point from that of the end point, and in the case of a vertical vector, the side data is generated by subtracting the y-coordinate value of the start point from that of the end point. The side data of horizontal and vertical vectors are alternately stored in the order of original coarse outline points in a memory area having ascending (or descending) addresses.

The processing content in step S1038 (smoothing processing for one side vector) will be described in detail below with reference to FIGS. 88 to 91C.

Figure 86:
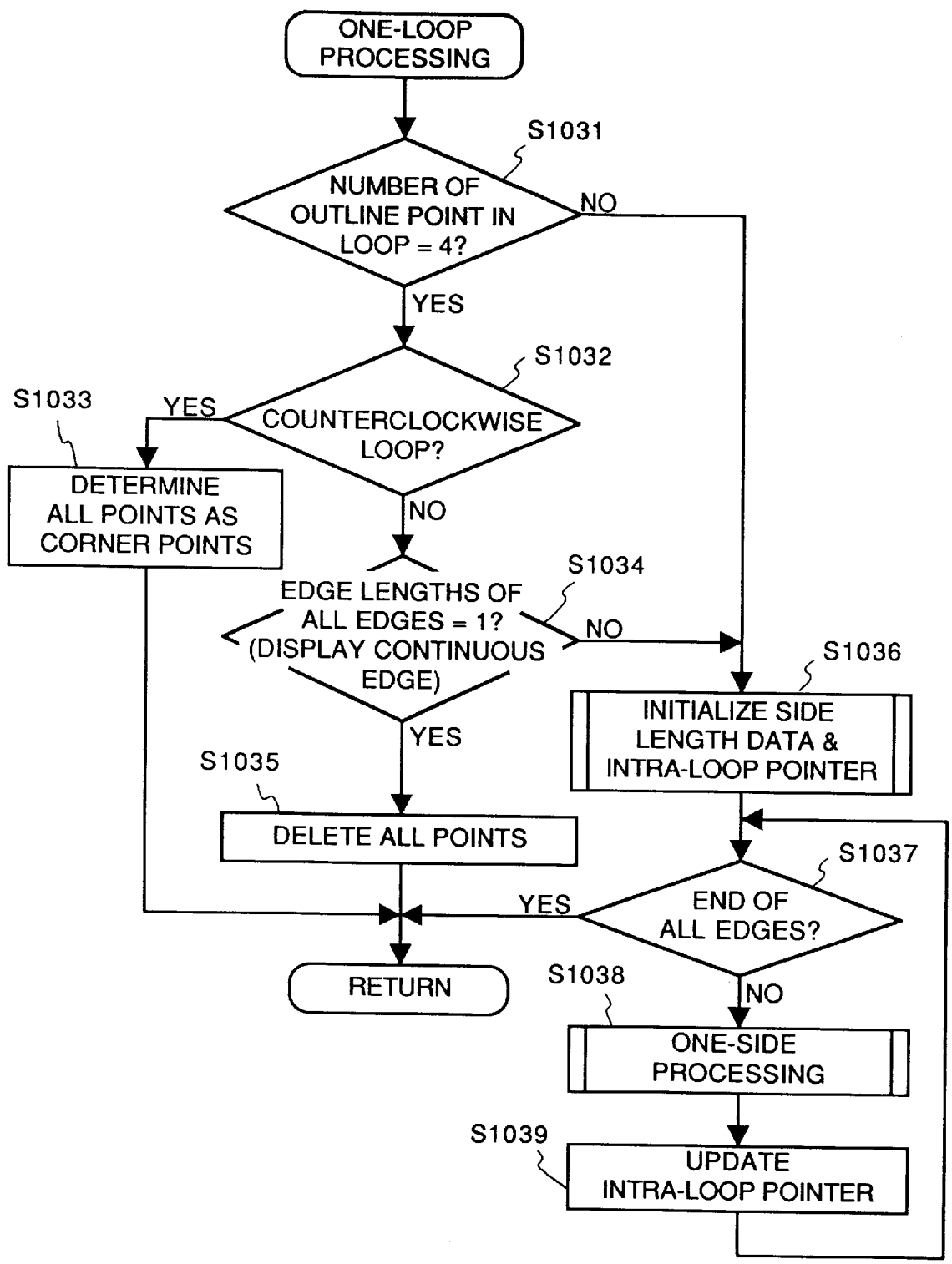
FIG. 86 is a flow chart showing the flow of the first smoothing processing for one coarse outline loop in FIG. 85.
Figure 88:
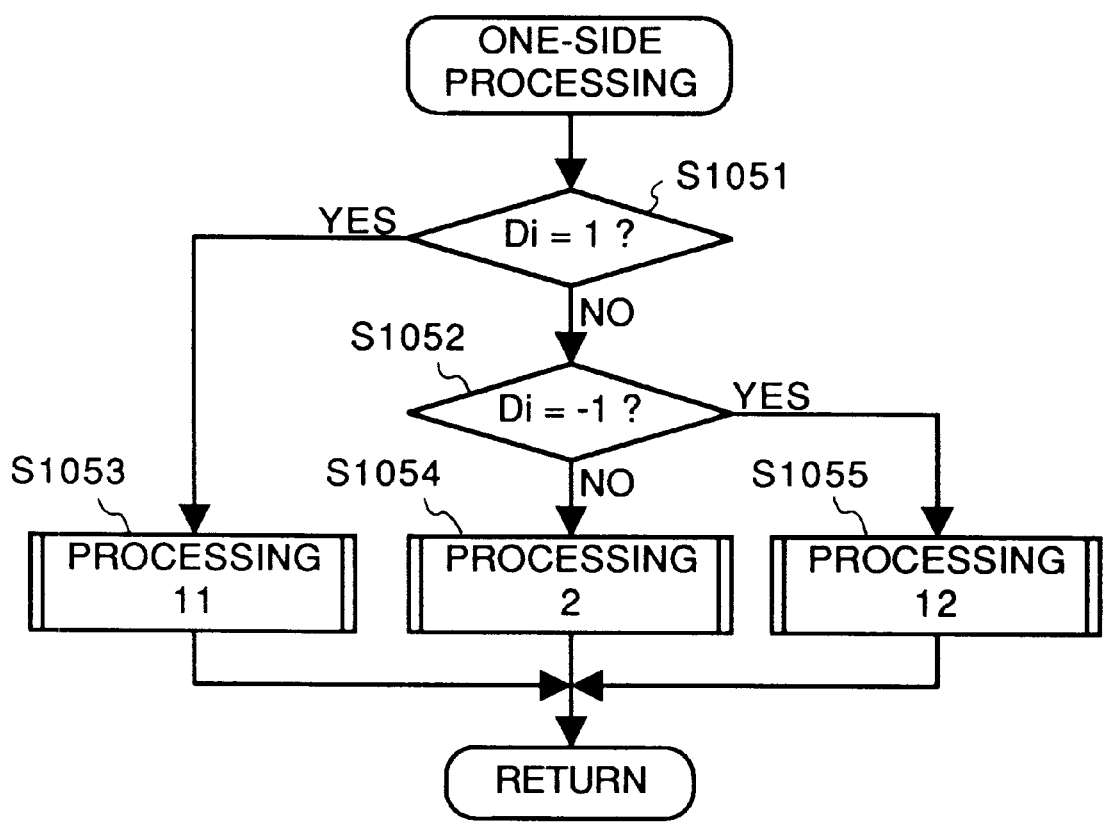
FIG. 88 is a flow chart showing the content of one-side processing in FIG. 87.

The processing shown in the flow chart of FIG. 88 is started when it is called in step S1038 in FIG. 86.

In step S1051, it is checked if side data of a side vector of interest is "1", i.e., if the length of the vector of interest is "1", and its direction is a rightward or downward direction. If YES in step S1051, the flow advances to step S1053 to execute corresponding processing; otherwise, the flow advances to step S1052. In step S1052, it is checked if the side data of the side vector of interest is "–1" (i.e., if the length of the vector of interest is "1", and its direction is a leftward or upward direction). If YES in step S1052, the flow advances to step S1055 to execute corresponding processing; otherwise, the flow advances to step S1054 to execute corresponding processing.

The fact that the flow advances to step S1053 means that the length of the vector of interest is "1", and its direction is a rightward or downward direction. In this case, the processing is executed according to the flow charts shown in FIGS. 89A and 89B. In step S1054, processing for a case wherein the length of the side vector of interest is "2" or more is executed. The processing content is as shown in the flow charts of FIGS. 91A to 91C. In step S1055, processing for a case wherein the side data of the side vector of interest is "–1", i.e., the vector length is "1", and the direction of the vector is a leftward or upward direction is executed. The processing content is as shown in the flow charts of FIGS. 90A and 90B.

When one of the processing operations in steps S1053, S1054, and S1055 is completed, it is determined that smoothing for one side vector of interest is completed, and the flow returns to the routine shown in FIG. 86.

The content of the processing in step S1053 (processing executed when the side vector of interest has a length of "1", and is a rightward or downward vector) will be described below with reference to FIGS. 89A and 89B.

Figure 89A:
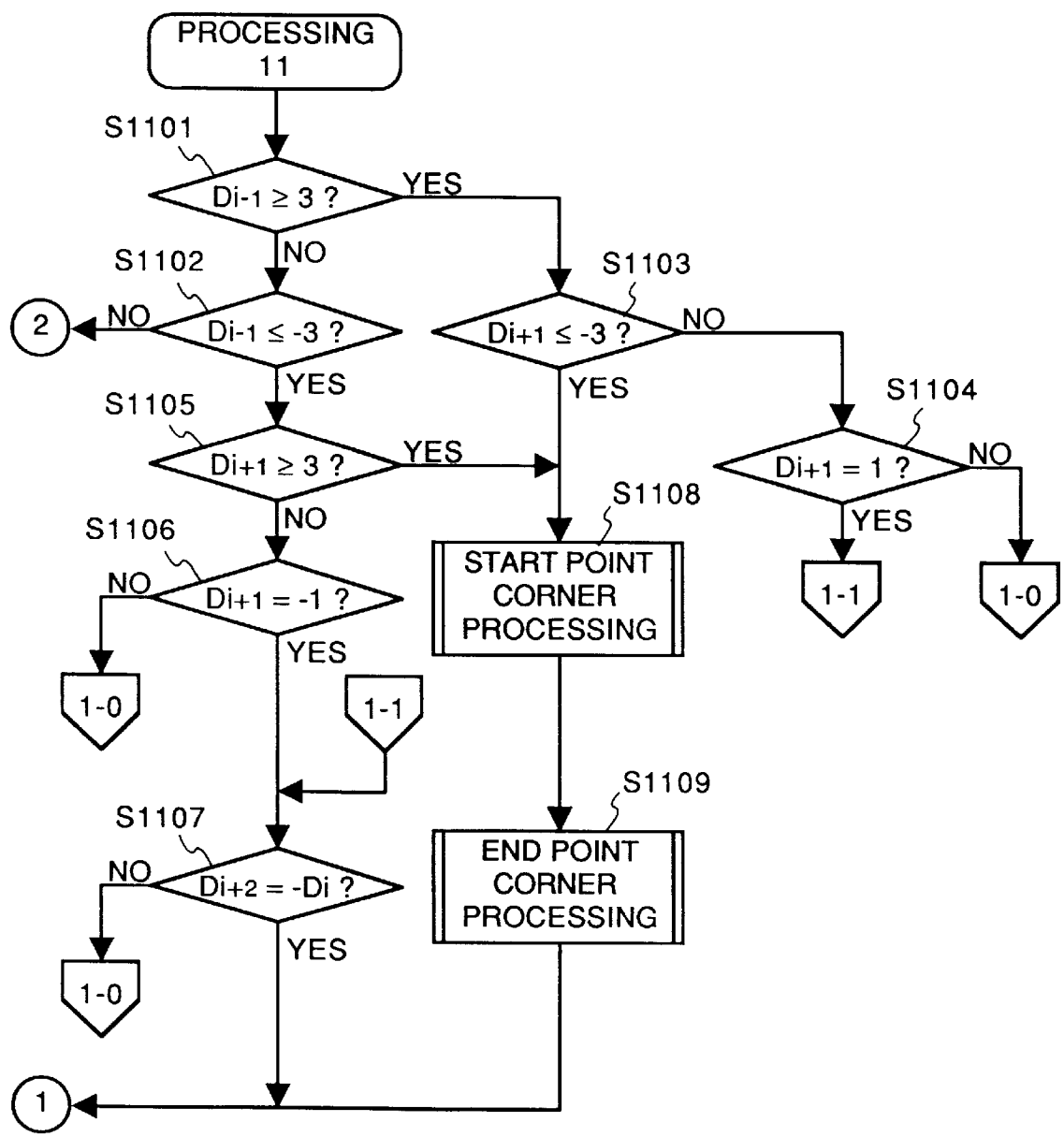
FIG. 89A is a flow chart showing the details of processing 11 in FIG. 88.

The processing shown in the flow chart of FIG. 89A is started when it is called in step S1053.

In step S1101, it is checked if side data (to be referred to as previous side data hereinafter) of a vector immediately before the vector of interest is "3" or more (the corresponding vector has a vector length of "3" or more, and is a rightward or downward vector). If YES in step S1101, the flow advances to step S1103; otherwise, the flow advances to step S1102. It is checked in step S1102 if the previous side data is "–3" or less (the corresponding vector has a vector length of "3" or more, and is a leftward or upward vector). If YES in step S1102, the flow advances to step S1105; otherwise, the flow advances to step S1110. As can be understood from the above description, the sign of the value of side data indicates a direction, and its absolute value indicates a vector length. The same applies to the following description, and a detailed description thereof will be omitted. The "vector length" means the absolute value (length) of side data.

Figure 92:
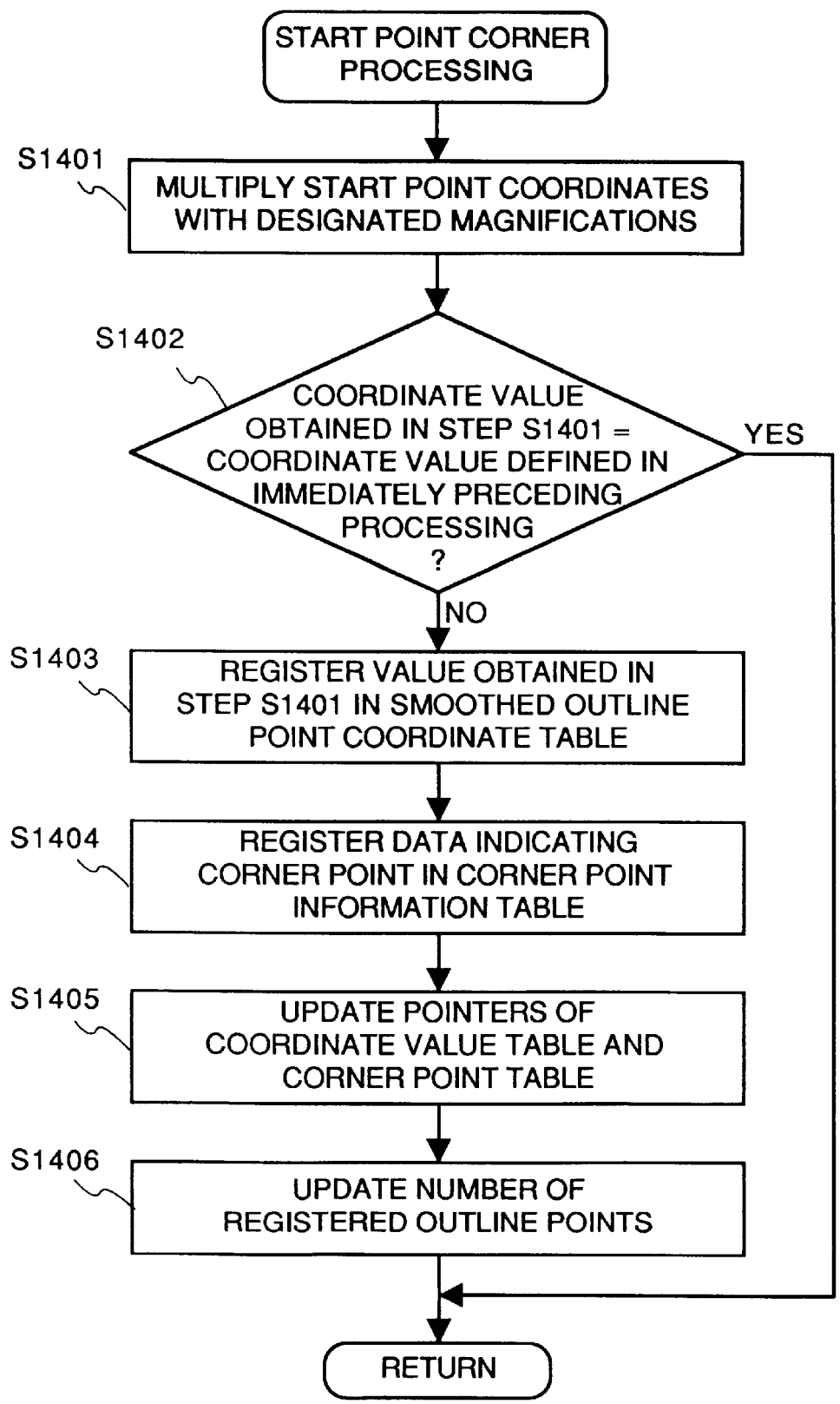
FIG. 92 is a flow chart showing the content of start point corner processing in the third embodiment.
Figure 93:
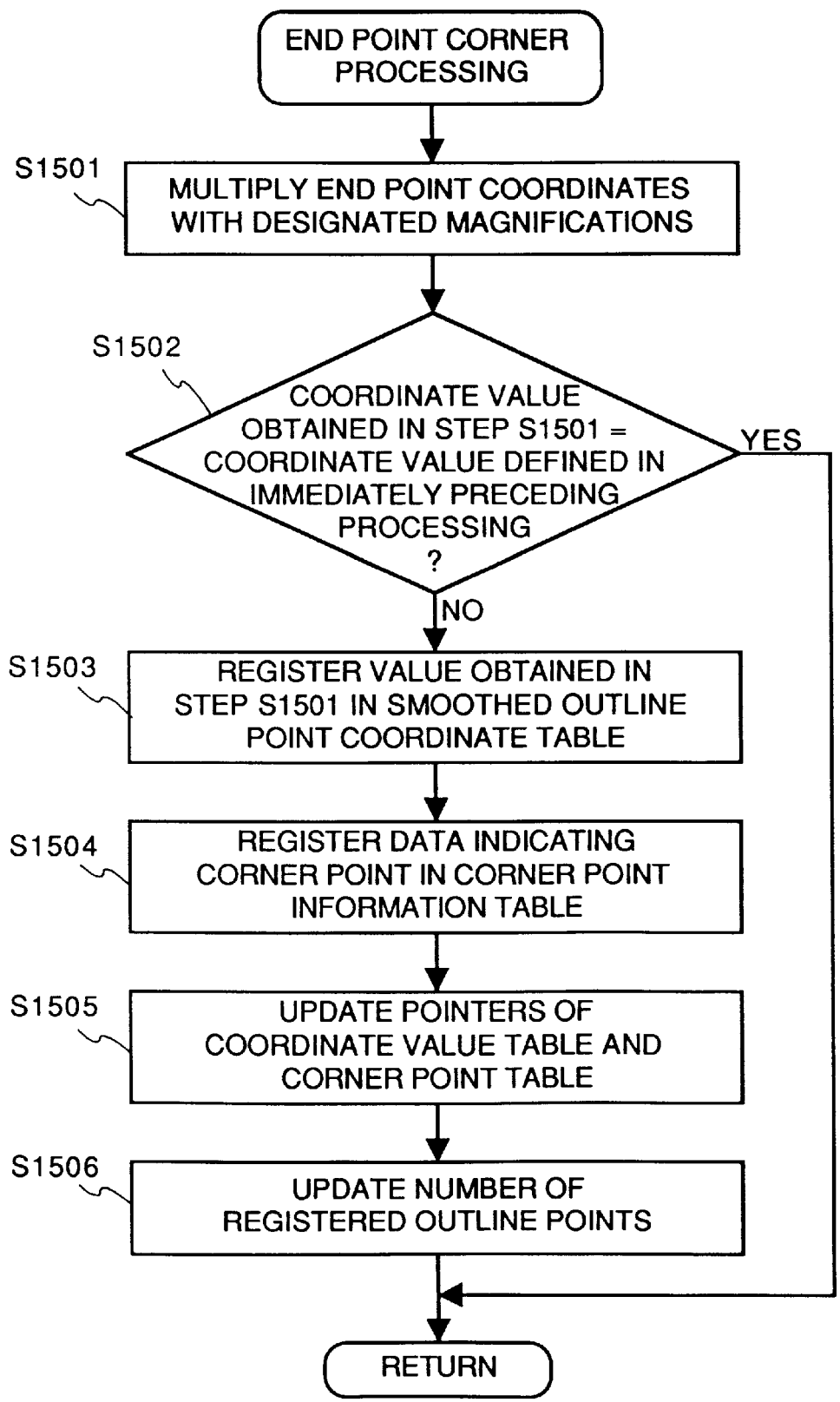
FIG. 93 is a flow chart showing the content of end point corner processing in the third embodiment.

In step S1103, it is checked if side data (to be referred to as next side data hereinafter) of a vector immediately after the vector of interest is "−3" or less. If YES in step S1103, the flow advances to step S1108 and subsequent steps; otherwise, the flow advances to step S1104. Processing in step S1108 and subsequent steps corresponds to the above-mentioned processing shown in FIG. 73 (processing for defining a corner point), and the processing shown in FIGS. 92 and 93 is executed, as will be described later.

In step S1104, it is checked if the next side data is "1". If YES in step S1104, the flow advances to step S1107; otherwise, the flow advances to step S1125. In step S1125, the processing shown in FIGS. 82A and 82B is executed.

In step S1105, it is checked if the next side data is "3" or more. If YES in step S1105, the flow advances to step S1108; otherwise, the flow advances to step S1106. In step S1106, it is checked if the next side data is "−1". If YES in step S1106, the flow advances to step S1107; otherwise, the flow advances to step S1125. In step S1107, it is checked if side data (to be referred to as second-subsequent side data hereinafter) of a vector two vectors after the vector of interest is equal to a value obtained by inverting the sign of the side data of interest. If YES in step S1107, the vector of interest corresponds to the side vector 1118 shown in FIG. 71C, and no point after smoothing processing is defined for this side vector of interest. The flow then returns to the routine shown in FIG. 88.

If it is determined that the previous side data of the side vector of interest is neither "3" or more nor "−3" or less, i.e., if it is determined that the length of the side vector immediately before the vector of interest is "2" or less, the flow advances to step S1110 to check if the next side data is "3" or more. If YES in step S1110, the flow advances to step S1114; otherwise, the flow advances to step S1111.

In step S1111, it is checked if the next side data is "−3" or less. If YES in step S1111, the flow advances to step S1112; otherwise, the flow advances to step S1115. In step S1112, it is checked if the previous side data is "−1". If YES in step S1112, the flow advances to step S1113; otherwise, the flow advances to step S1125. In step S1113, it is checked if side data (to be referred to as second-previous side data hereinafter) of a vector two vectors before the vector of interest is equal to a value obtained by inverting the sign of the side data of the vector of interest. If YES in step S1113, it is determined that the vector of interest corresponds to the side vector 1111 shown in FIG. 71A, and no point after smoothing processing is defined for this side vector of interest. The flow then returns to the routine shown in FIG. 88. In step S1114, it is checked if the previous side data is "1". If YES in step S1114, the flow advances to step S1113; otherwise, the flow advances to step S1125.

If it is determined that the previous side vector length of the side vector of interest is "3" or less, and the next side vector length is also "3" or less, the flow advances to step S1115 to check if the next side data is "1". If YES in step S1115, the flow advances to step S1117; otherwise, the flow advances to step S1116. In step S1116, it is checked if the next side data is "−1". If YES in step S1116, the flow advances to step S1117; otherwise, the flow advances to step S1125. In either case, the fact that the flow advances to step S1117 means that the previous side vector length is "1".

In step S1117, it is checked if the next side data is equal to a value obtained by inverting the sign of the previous side data. If YES in step S1117, the flow advances to step S1118; otherwise, the flow advances to step S1125. In step S1118, it is checked if the second-previous side data is "3" or more. If YES in step S1118, the flow advances to step S1124; otherwise, the flow advances to step S1119. In step S1119, it is checked if the second-previous side data is equal to the side data of interest. If YES in step S1119, the flow advances to step S1120; otherwise, the flow advances to step S1125. In step S1120, it is checked if the second-subsequent side data is equal to the side data of interest. If YES in step S1120, the flow advances to step S1121; otherwise, the flow advances to step S1125. In step S1121, it is checked if side data (to be referred to as third-previous side data hereinafter) of a vector (to be referred to as a third-previous side vector hereinafter) immediately before the secondprevious side vector, i.e., a side vector three vectors before the side vector of interest is equal to the next side data. If YES in step S1121, the flow advances to step S1122; otherwise, the flow advances to step S1125. In step S1122, it is checked if side data (to be referred to as third-subsequent side data hereinafter) of a vector (to be referred to as a third-subsequent side vector hereinafter) next to the second-subsequent vector, i.e., a side vector three vectors after the side vector of interest is equal to the previous side data. If YES in step S1122, the flow advances to step S1123; otherwise, the flow advances to step S1125.

The fact that the flow advances to step S1123 means that the side vector of interest corresponds to the side vector 1120 shown in FIG. 72A. Therefore, in step S1123, processing for removing continuous notches is executed, and thereafter, the flow returns to the routine shown in FIG. 88. This processing is executed according to the flow chart shown in FIG. 95, as will be described in detail later.

Step S1124, it is checked if the second-subsequent side data is "3" or more. If YES in step S1124, it is determined that the vector of interest corresponds to the side vector 1110 or 1115 shown in FIG. 71A or 71C, and no point after smoothing processing is defined for this side vector of interest. The flow then returns to the routine shown in FIG. 88.

In step S1125, it is determined that the side vector of interest is in a state shown in FIG. 82A, and processing is executed according to the flow chart shown in FIG. 94 (to be described later).

The processing executed when the side data of interest is "1" has been described with reference to FIGS. 89A and 89B.

Processing executed when the side data of interest is "−1" will be described below with reference to the flow charts shown in FIGS. 90A and 90B. The processing shown in FIGS. 90A and 90B is started when it is called in step S1055 in FIG. 88.

Figure 89B:
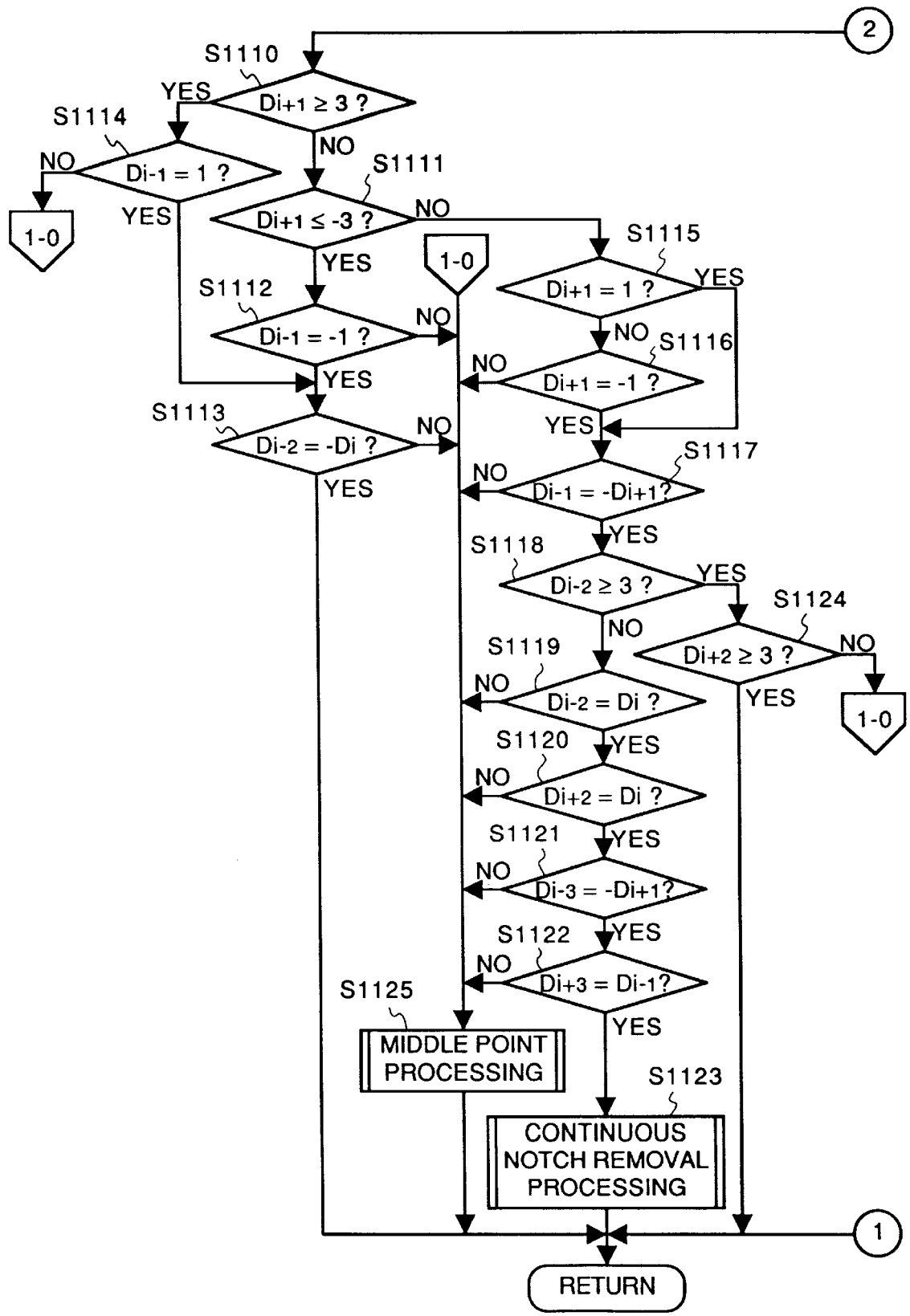
FIG. 89B is a flow chart showing the details of processing 11 in FIG. 88.
Figure 90A:
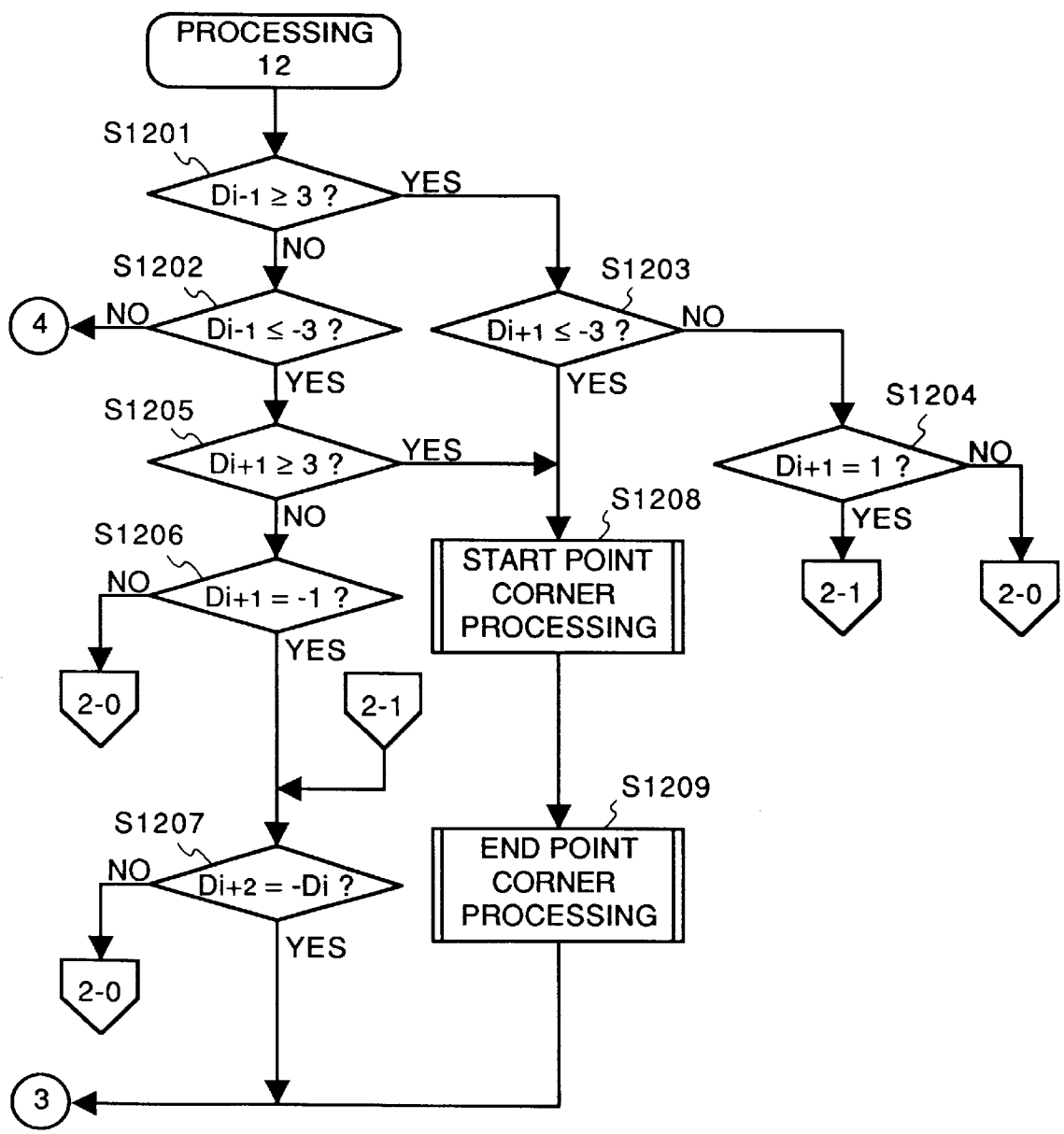
FIG. 90A is a flow chart showing the details of processing 12 in FIG. 88.
Figure 90B:
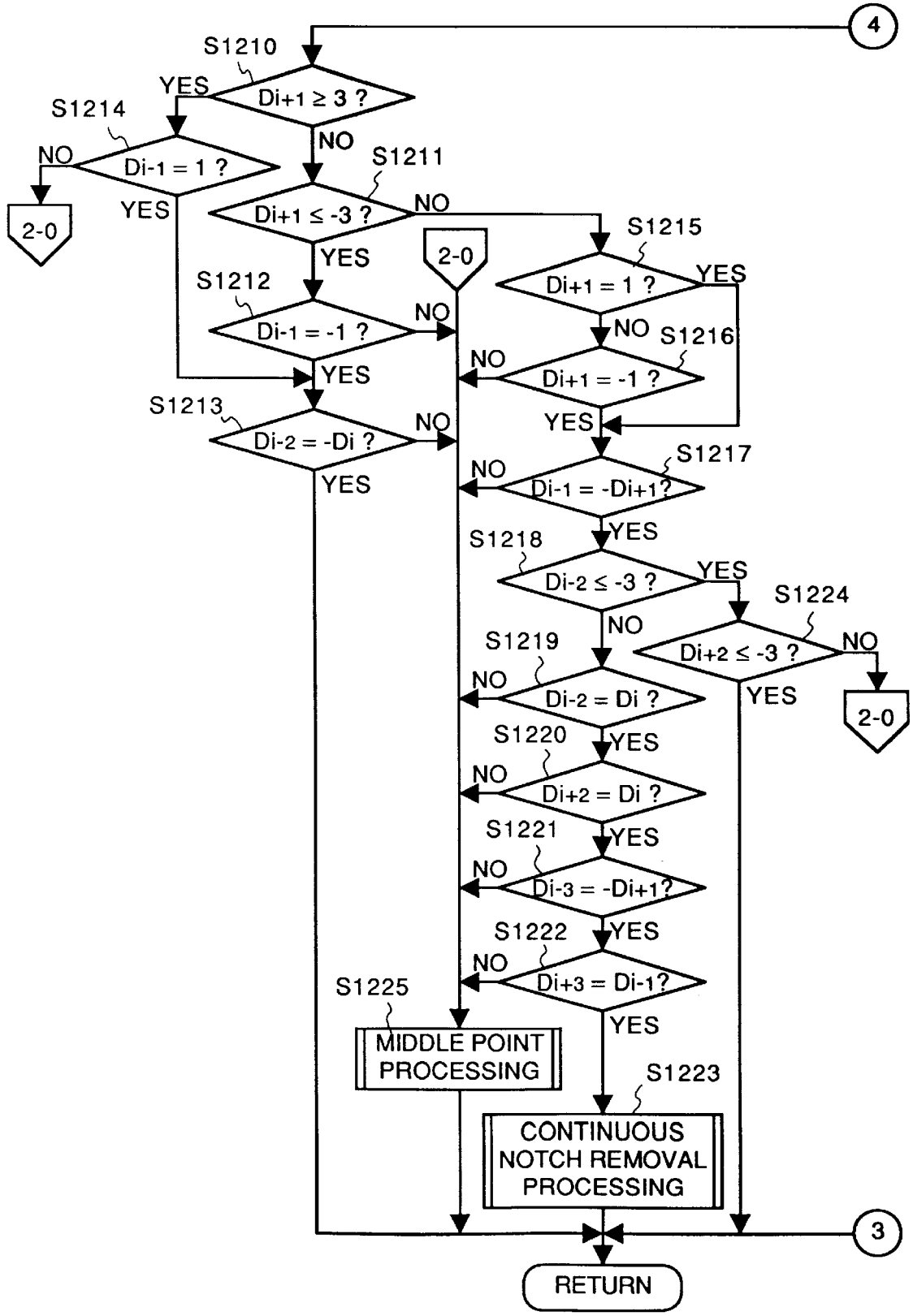
FIG. 90B is a flow chart showing the details of processing 12 in FIG. 88.

As shown in FIGS. 90A and 90B, this processing (FIGS. 90A and 90B) is substantially the same as the above-mentioned processing (FIGS. 89A and 89B). For the sake of easy understanding, the step numbers have the same tens and units digits as those in FIGS. 89A and 89B.

As shown in FIGS. 90A and 90B, the processing in FIGS. 90A and 90B is substantially the same as the processing in FIGS. 89A and 89B, except that the signs of inequality in steps S1218 and S1224 are inverted from those in steps S1118 and S1124. This is caused by a difference in sign of the side data of interest, and the same side pattern is checked. For this reason, the description of the flow charts shown in FIGS. 89A and 89B applies to the description of the content of the flow charts shown in FIGS. 90A and 90B, and a detailed description thereof will be omitted.

Figure 91A:
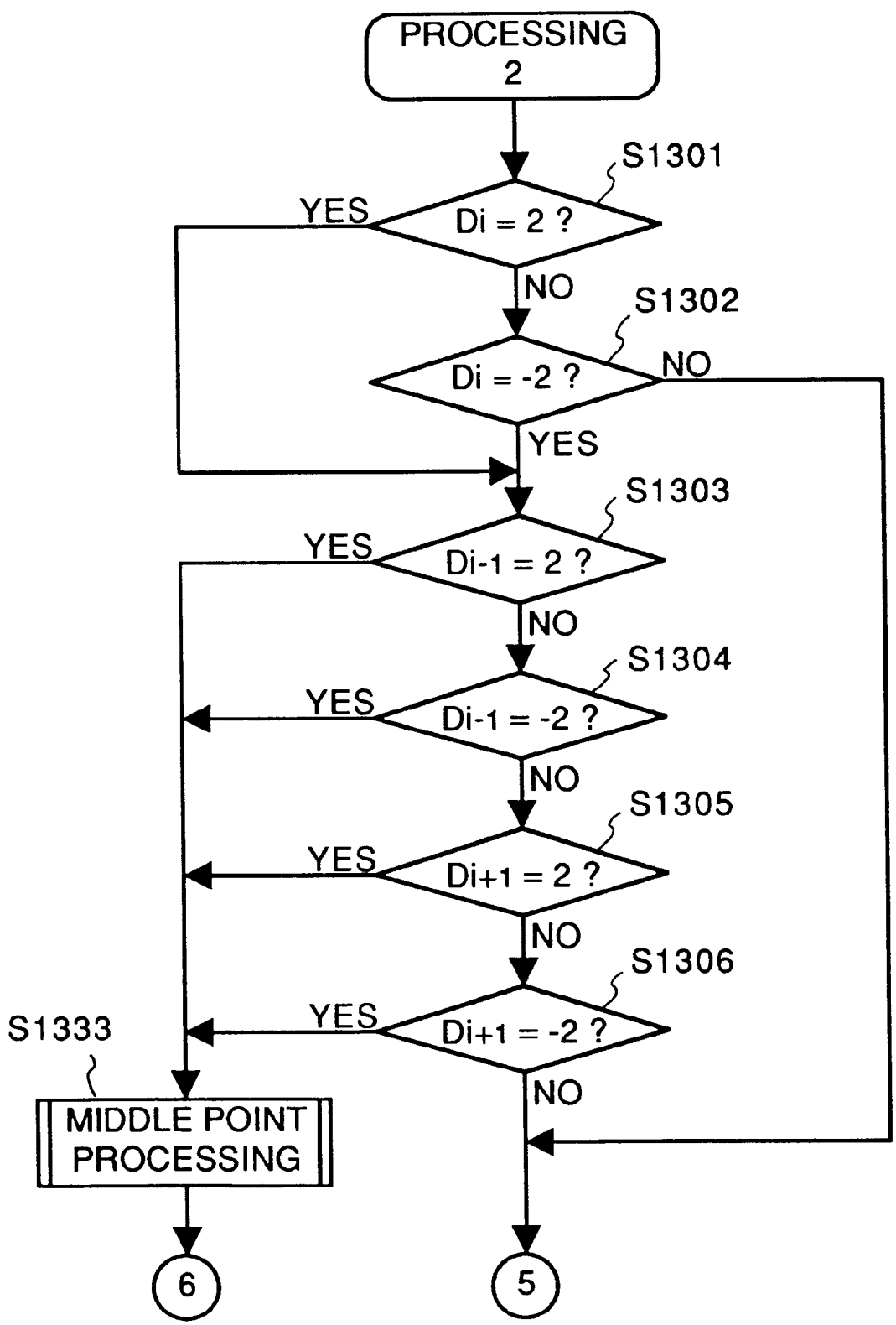
FIG. 91A is a flow chart showing the details of processing 2 in FIG. 88.
Figure 91B:
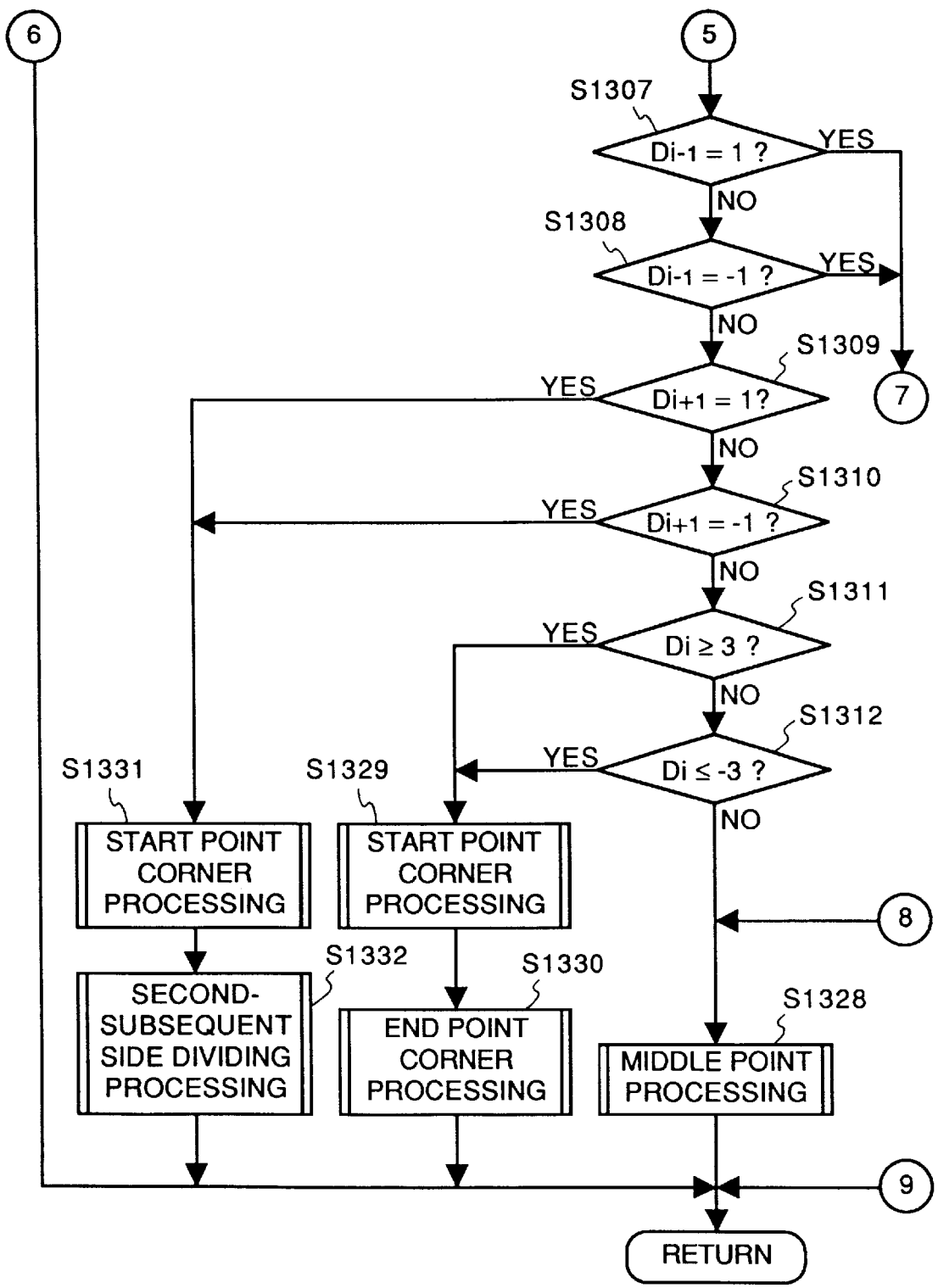
FIG. 91B is a flow chart showing the details of processing 2 in FIG. 88.
Figure 91C:
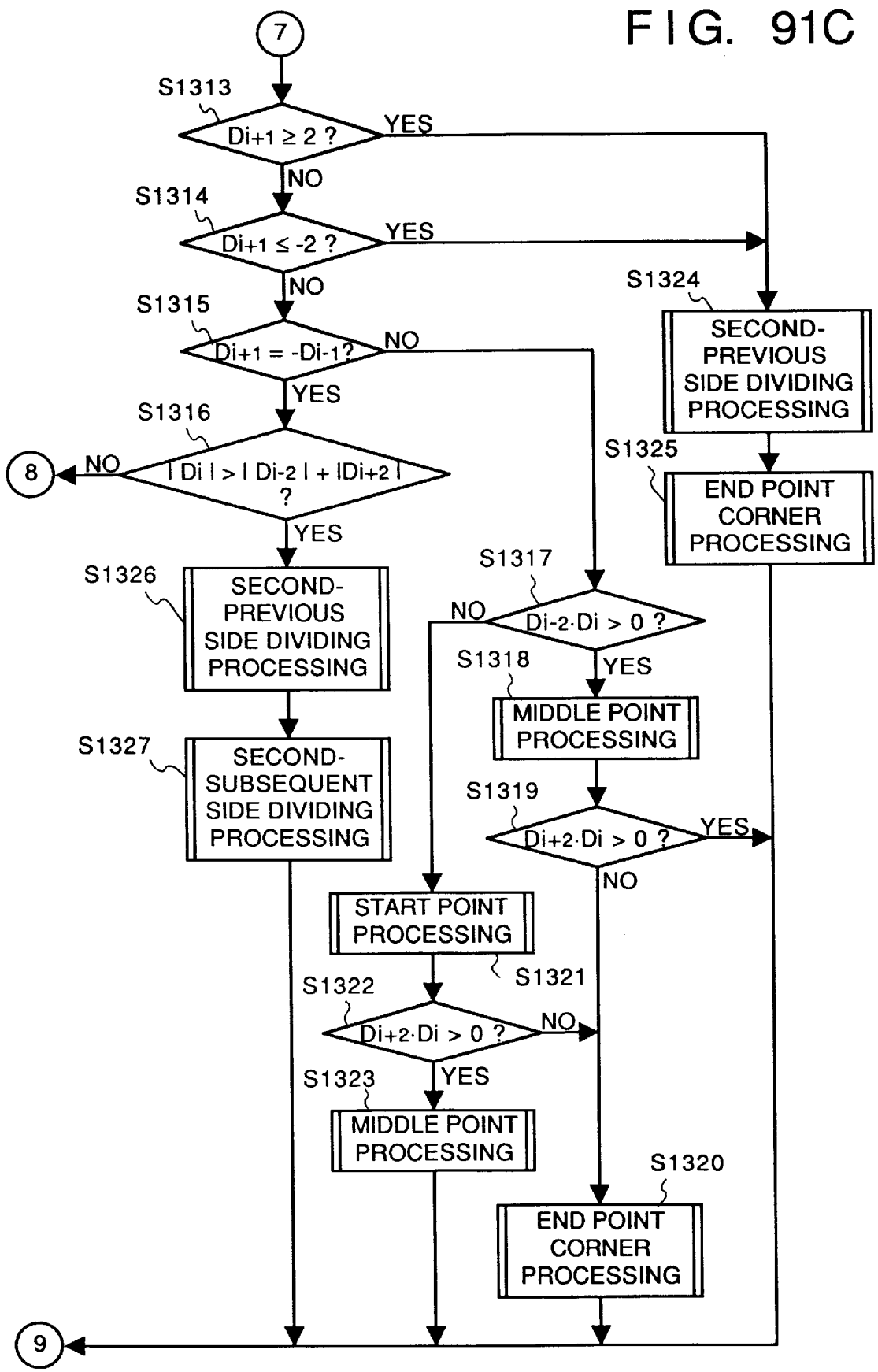
FIG. 91C is a flow chart showing the details of processing 2 in FIG. 88.

Processing executed when the length of the side vector of interest is "2" or more will be described below with reference to the flow charts of FIGS. 91A to 91C. Needless to say, this processing is started when it is called in step S1054 in FIG. 88.

In step S1301, it is checked if the side data of interest is "2". If YES in step S1301, the flow advances to step S1303; otherwise, the flow advances to step S1302. In step S1302, it is checked if the side data of interest is "−2". If YES in step S1302, the flow advances to step S1303; otherwise, the flow advances to step S1307. In either case, the fact that the flow advances to step S1303 means that the vector length of the side vector of interest is "2".

In steps S1303 to S1306, it is checked if the vector length of at least one of the previous and next side data is "2". If YES in one of steps S1303 to S1306, the flow advances to step S1333; otherwise, the flow advances to step S1307.

In step S1307, it is checked if the previous side data is "1". If YES in step S1307, the flow advances to step S1313; otherwise, the flow advances to step S1308. In step S1308, it is checked if the previous side data is "−1". If YES in step S1308, the flow advances to step S1313; otherwise, the flow advances to step S1309. More specifically, when the vector length of the previous side data is "1", the flow advances to step S1313; otherwise, the flow advances to step S1309.

Figure 97:
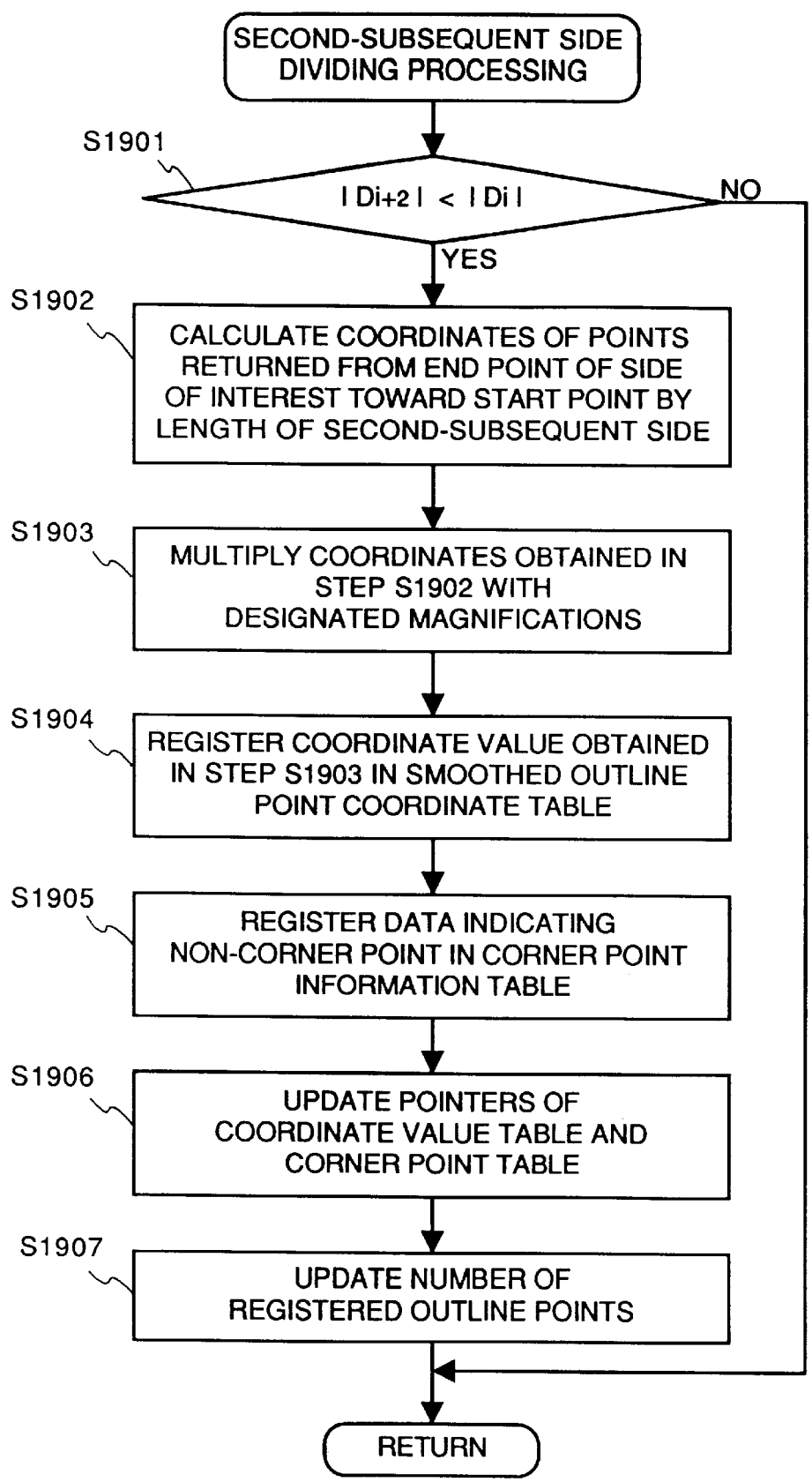
FIG. 97 is a flow chart showing the content of processing for equally dividing a side two sides after the side of interest in the third embodiment.

It is checked in steps S1309 and S1310 if the vector length of the next side data is "1". If YES in step S1309 or S1310, the flow advances to step S1331; otherwise, the flow advances to step S1311. In steps S1331 and S1332, it is determined that the side vector of interest is in a state shown in FIG. 80A, and the processing shown in FIGS. 80A and 80B is executed. In step S1331, the processing for determining the start point of the vector as a corner point is executed, and in step S1332, processing for removing a corner for a side vector two vectors after the side vector of interest is executed. These processing operations are executed according to the flow charts shown in FIGS. 92 and 97, as will be described in detail later.

In steps S1311 and S1312, it is checked if the vector length of the side vector of interest is "3" or more. If YES in step S1311 or S1312, the flow advances to step S1329; otherwise, the flow advances to step S1328. In steps S1329 and S1330, it is determined that the side vector of interest is in a state (=Di) shown in FIG. 81A, and the processing shown in FIGS. 81A and 81B is executed. In step S1311, the processing shown in FIG. 92 (also called in step S1331; to be described later) is executed, and in step S1330, processing for determining the end point as a corner point is executed, as shown in FIG. 93. These processing operations will be described in detail later.

If "YES" is determined in step S1307 or S1308, i.e., if it is determined that the vector length of the previous side data is "1", the flow advances to step S1313. In steps S1313 and S1314, it is checked if the vector length of the next side data is "2" or more. If YES in step S1313 or S1314, the flow advances to step S1324; otherwise (i.e., if the vector length of the next side data is "1"), the flow advances to step S1315.

In step S1315, it is checked if the next side data is equal to a value obtained by inverting the sign of the previous side data. If YES in step S1315, the flow advances to step S1316; otherwise, the flow advances to step S1317. In step S1316, it is checked if the vector length of the side vector of interest is larger than the sum of the second-previous vector length and the second-subsequent vector length. If YES in step S1316, the flow advances to step S1326; otherwise, the flow advances to step S1328.

In step S1317, it is checked if the sign of the second-previous side data is equal to that of the side data of interest. If YES in step S1317, the flow advances to step S1318; otherwise, the flow advances to step S1321.

The flow advances to step S1318 when it is determined that the side vector of interest is in a state shown in FIG. 75A or 77A. Thus, the middle point of the side vector of interest is defined as an outline point after the first smoothing processing. The content of this processing will be described later with reference to FIG. 92. The flow then advances to step S1319 to check if the sign of the second-subsequent side data is equal to that of the side data of interest, thus determining whether the side vector of interest is in a state shown in FIG. 75A or 77A. When the sign of the second-subsequent side data is equal to that of the side data of interest, it can be determined that the side vector of interest is in a state shown in FIG. 75A. Therefore, the flow returns to the previous routine. However, when the sign of the second-subsequent side data is not equal to that of the side data of interest, it can be determined that the side vector of interest is in a state shown in FIG. 77A, and the flow advances to step S1320 to execute processing for defining the end point of the side vector of interest as a corner point, i.e., as an outline point after the first smoothing processing. Thereafter, the flow returns to the previous routine. The processing in step S1320 is as shown in FIG. 93, as will be described later.

When the flow advances to step S1321, the side vector of interest is in a state shown in either FIG. 76A or 78A. In either case, common processing, i.e., processing for determining the start point as a corner point (as in steps S1329 and S1331) is executed. The flow then advances to step S1322 to check if the sign of the second-subsequent side data is equal to that of the side data of interest. If YES in step S1322, since it can be determined that the side vector of interest is in a state shown in FIG. 76A, processing in step S1323, i.e., processing for determining the middle point of the side vector of interest as an outline point after the first smoothing processing, is executed, and thereafter, the flow returns to the previous routine. However, if NO in step S1322, the processing in step S1320 is executed.

If it is determined in step S1313 or S1314 that the vector length of the next side data is "2" or more, the flow advances to steps S1324 and S1325. In steps S1324 and S1325, processing for obtaining the result shown in FIG. 79A for the side vector of interest is performed. More specifically, in step S1324, a point moved from the start point of the side vector of interest toward its end point by the length of the second-previous vector is defined as an outline point after the first smoothing processing, and in step S1325, processing for defining the end point of the side vector of interest as a corner point, i.e., as an outline point after the smoothing processing is executed. The processing in step S1324 adopts the sequence shown in FIG. 96, as will be described later. The processing in step S1325 adopts the sequence shown in FIG. 93, as will be described later.

When the flow advances to steps S1326 and S1327, it can be determined that the side vector of interest corresponds to the vector Di shown in FIG. 84A. Thus, in step S1326, the same processing as in step S1324 is executed, and in step S1327, processing for defining a point returned from the end point of the side vector of interest toward its start point by the length of the second-subsequent vector as an outline point after the first smoothing processing is executed. The content of the processing in step S1327 will be described later with reference to FIG. 97. Upon completion of the processing in step S1327, the flow returns to the previous routine.

Finally, when the flow advances to step S1328, this means that the side vector of interest corresponds to none of the rules described with reference to FIGS. 70A to 84B. In this case, processing shown in FIG. 94 is executed, and the flow returns to the previous routine.

Processing executed when the vector of interest has a length of 2 or more has been described.

The processing for determining the start point as a corner point will be described below with reference to FIG. 92. This processing is called in steps S1108, S1208, S1321, S1329, and S1331 in the above-mentioned processing sequences.

In step S1401, the coordinates (x- and y-coordinates) of the start point of the side vector of interest are multiplied with magnifications (main scanning and sub-scanning magnifications) designated through the magnification setting unit 1031 to calculate new coordinates. In step S1402, it is checked if the coordinates calculated in step S1401 are equal to those (both the x- and y-coordinates) defined in the immediately preceding processing. If YES in step S1402, since this position has already been defined as an outline point, the flow returns to the previous routine. That is, a plurality of the same coordinate data are prevented from being generated in a single loop. If it is determined in step S1402 that the coordinates defined in the immediately preceding processing are not equal to those calculated in the current processing, the flow advances to step S1403. In step S1403, the calculated coordinates are registered in a storage area of outline point coordinate data after the first smoothing processing, which area is assured on the working memory area in the RAM 1076. In step S1404, data indicating that a point indicated by the corresponding coordinate position is a corner point is registered in the additional data area. These data areas are assured as continuous areas having sufficient sizes, and are managed using pointers. In step S1405, the address values held in the pointers for the outline point coordinate data storage area and the additional data area are incremented by values for one data so that the pointers can indicate the storage positions for the next data.

In step S1021 in FIG. 85 described above, the data area for holding the number of outline points after the smoothing processing, which points are registered during processing, is assured in advance in the working memory area in correspondence with the number of coarse outline loops, and initialized to all "0"s. This data area also includes an area for holding the number of processed outline points at that time for a coarse outline loop of interest. In step S1406, the data indicating the number of processed outline points for the loop of interest is incremented by one, and after this processing, the flow returns to the previous routine.

The processing for determining the end point of a vector as a corner point (processing called in steps S1109, S1209, S1320, S1325, and S1330) is executed according to FIG. 93. As shown in FIG. 93, this processing has the same architecture as that of the above-mentioned start point corner processing. For the sake of easy understanding, the step numbers have the same tens and units digits as those in FIG. 92. The processing shown in FIG. 93 is substantially the same as that shown in FIG. 92, except that processing in step S1501 is executed for the end point in place of the start point in step S1401, and a detailed description thereof will be omitted.

Figure 94:
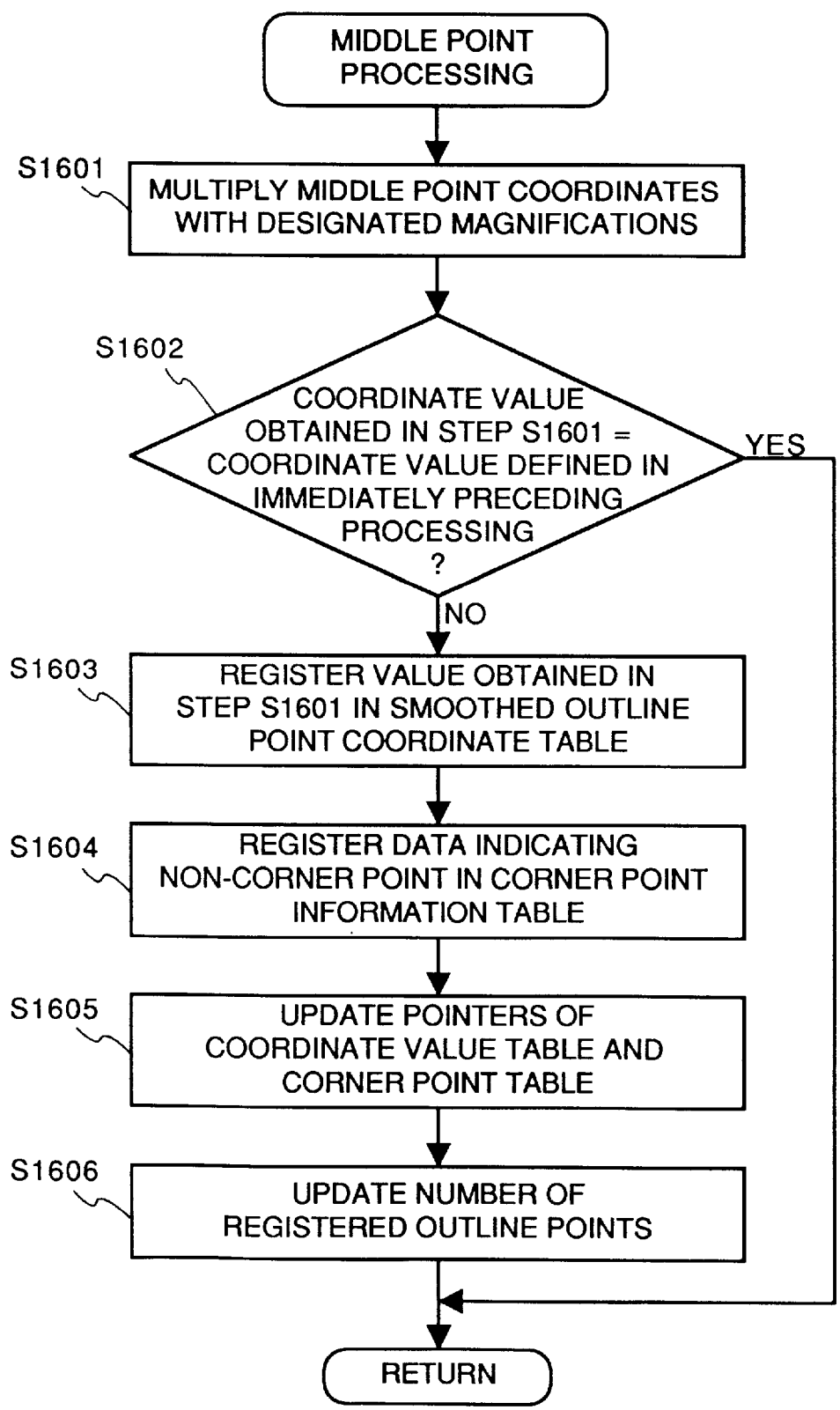
FIG. 94 is a flow chart showing the content of middle point processing in the third embodiment.

The processing for determining the middle point of a vector as an outline point (the processing called in steps S1125, S1225, S1318, S1323, S1328, and S1333) is executed according to FIG. 94. Since FIG. 94 has the same architecture as that in the flow chart of FIG. 92, it has the corresponding step numbers. The processing in FIG. 94 is substantially the same as that shown in FIG. 92, except that steps S1601 and S1604 are different from steps S1401 and S1404 in FIG. 92. Therefore, processing operations in only steps S1601 and S1604 will be described below. In step S1601, the coordinates of the middle point between the start and end points of the vector of interest are calculated, and are multiplied with the designated magnifications to obtain new coordinates of the middle point after enlarging/compressing processing. In step S1604, data of the calculated middle point is registered as a non-corner point in a corner point information table.

Figure 95:
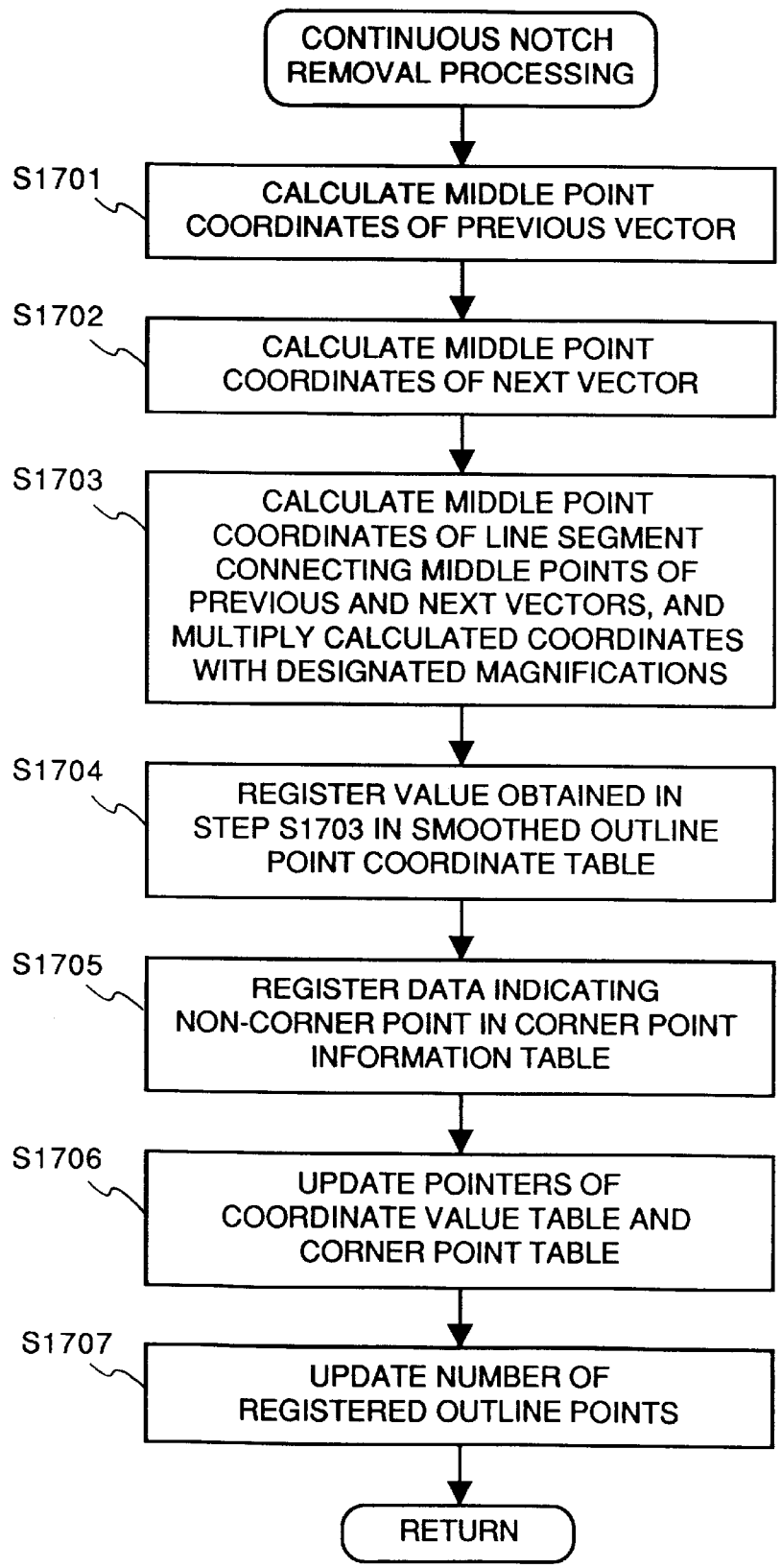
FIG. 95 is a flow chart showing the content of continuous notch removal processing in the third embodiment.

The continuous notch removal processing (called in steps S1123 and S1223) will be described below with reference to the flow chart shown in FIG. 95.

In step S1701, the coordinates of the middle point between the start and end points of the previous side vector are calculated. In step S1702, the coordinates of the middle point between the start and end points of the next side vector are calculated. In step S1703, the coordinates of the middle point between the two middle points are calculated based on the coordinates calculated in steps S1701 and S1702. Processing operations in steps S1704 to S1707 are the same as those in steps S1603 to S1606.

Figure 96:
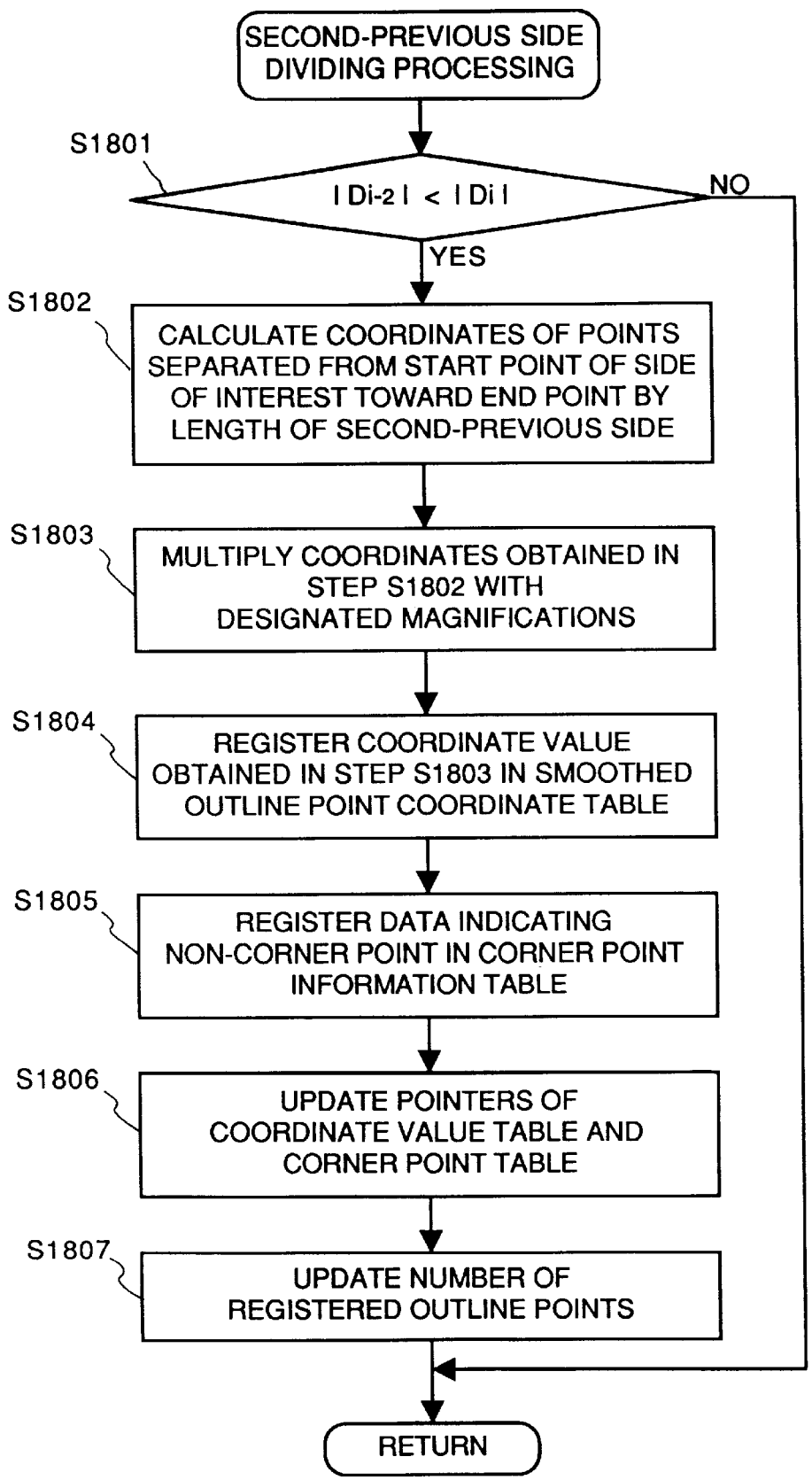
FIG. 96 is a flow chart showing the content of processing for equally dividing a side two sides before the side of interest in the third embodiment.

The processing for dividing a side vector two vectors before the vector of interest (processing called in steps S1324 and S1326) will be described below with reference to the flow chart shown in FIG. 96.

In step S1801, it is checked if the vector length of the side vector of interest is larger than that of the second-previous side vector. If YES in step S1801, the flow advances to step S1802; otherwise, the flow returns to the previous routine. In step S1802, the coordinates of a point separated from the start point of the vector of interest toward the end point by the length of the second-previous vector are calculated. In step S1803, the values calculated in step S1802 are multiplied with the designated magnifications to calculate new values. Processing operations in steps S1804 to S1807 are the same as those in steps S1603 to S1606.

Figure 99:
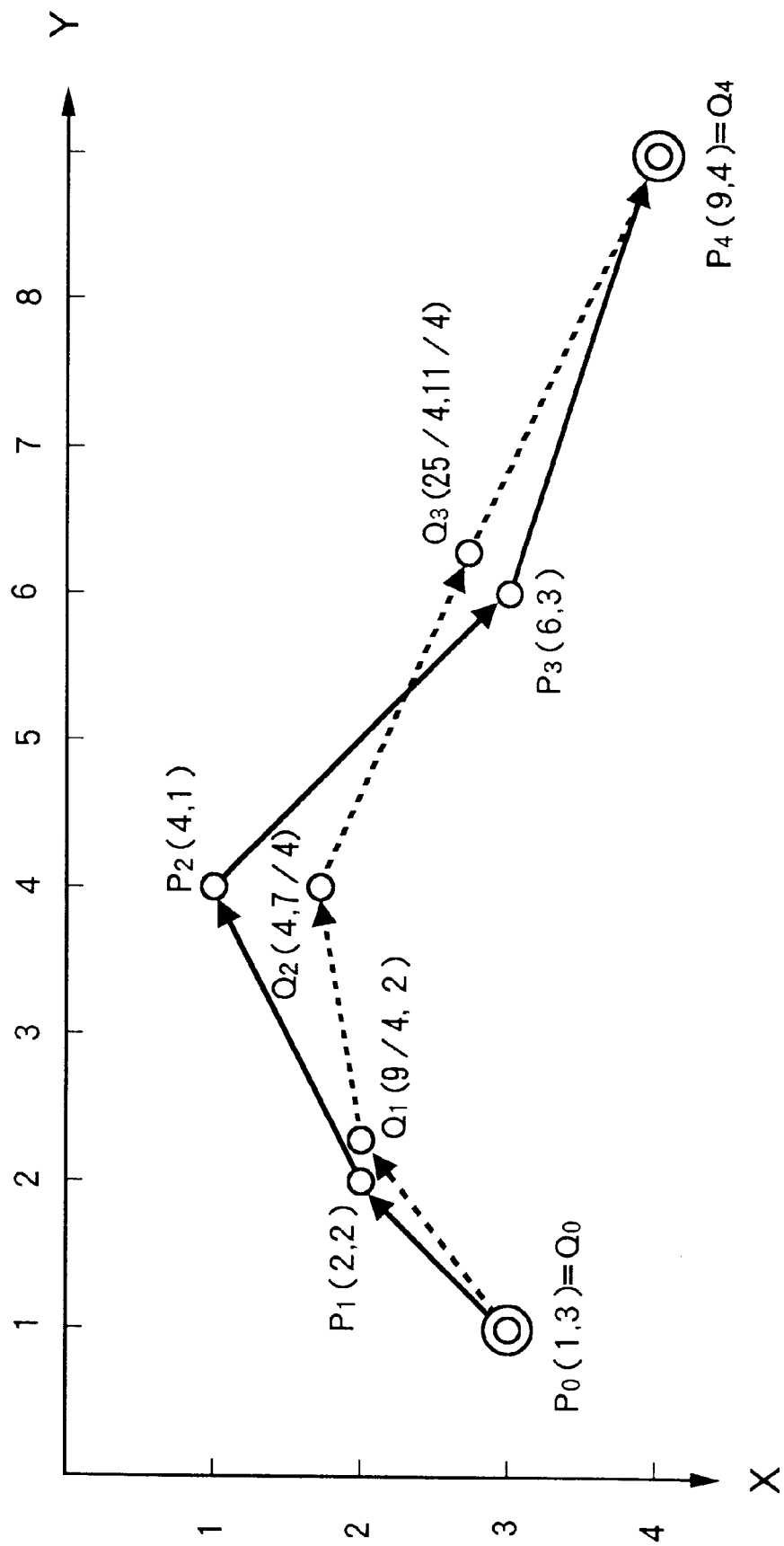
FIG. 99 is a view showing the smoothing content of the second smoothing processing.

The processing for dividing a side vector two vectors after the vector of interest (processing called in steps S1327 and S1332) is executed according to the flow chart shown in FIG. 99.

In step S1901, it is checked if the vector length of the side vector of interest is larger than that of the second-subsequent side vector. If YES in step S1901, the flow advances to step S1902; otherwise, the flow returns to the previous routine. In step S1902, the coordinates of a point returned from the end point of the vector of interest toward its start point by the length of the second-subsequent side vector are calculated. Processing operations in steps S1903 to S1907 are the same as those in steps S1803 to S1807.

The content of the first smoothing processing has been described. The data after the first smoothing processing are held on the designated area in the RAM 1076. In this manner, the processing in step S1002 in FIG. 68 is completed.

The CPU 1071 then executes second smoothing processing in step S1003. The second smoothing processing is executed on the basis of the data after the above-mentioned first smoothing processing. More specifically, the number of closed loops, the number of outline points in units of closed loops, the coordinate value data strings of the outline points after the first smoothing processing in units of closed loops, and additional information data strings of the outline points after the first smoothing processing in units of closed loops are input, and outline point data after the second smoothing processing are output.

Figure 98:
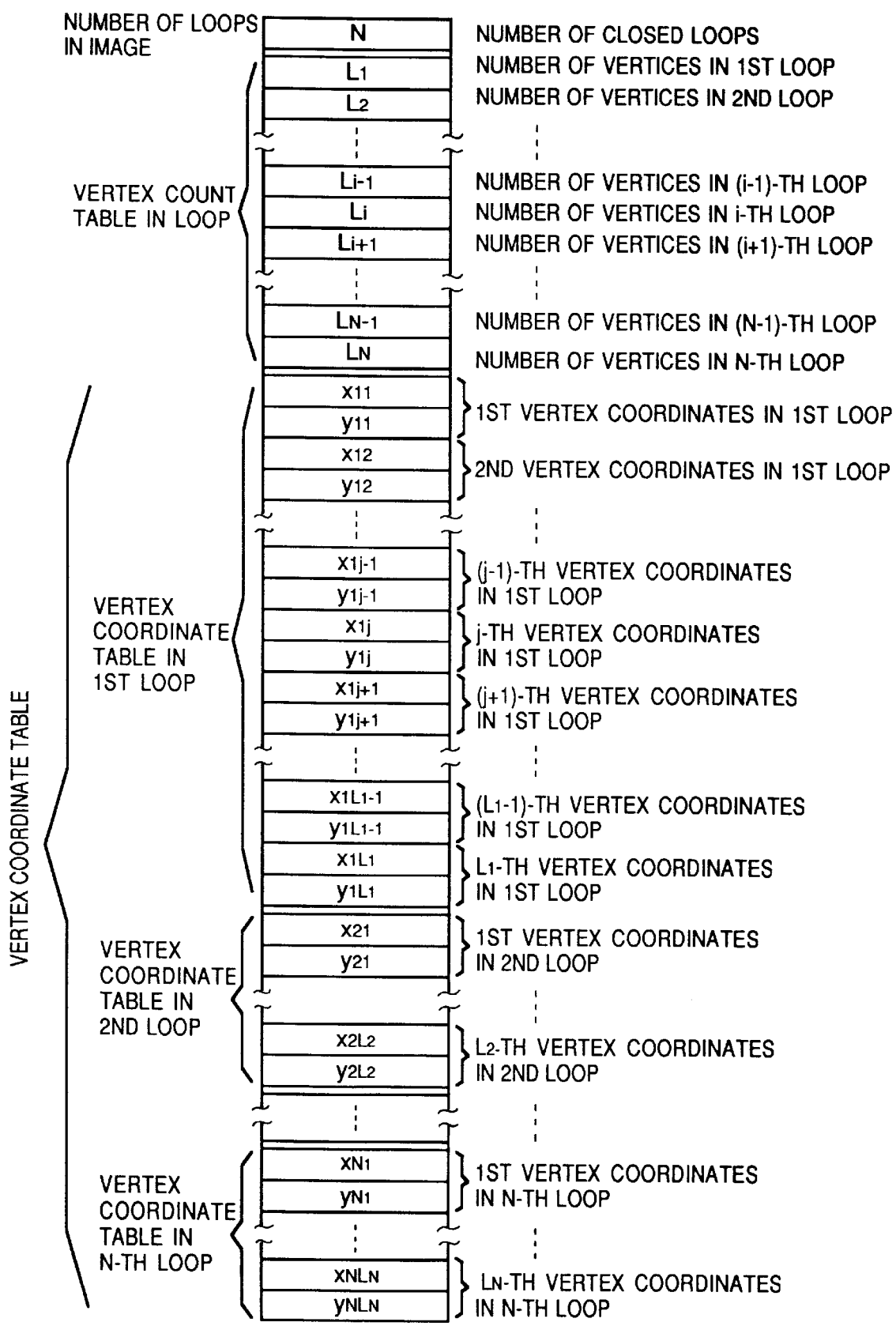
FIG. 98 is a view showing the format of outline data after second smoothing processing in the third embodiment.

As shown in FIG. 98, the outline data after the second smoothing processing consists of the number of closed loops, outline point count tables in units of closed loops, the coordinate value data strings of the outline points after the second smoothing processing in units of closed loops, and additional information data strings of the outline points after the second smoothing processing in units of closed loops.

The second smoothing processing will be described below with reference to FIG. 99. The second smoothing processing is executed in units of outline loops, and is also executed in units of outline points in each outline loop, as in the first smoothing processing.

As for each outline point, when an outline point of interest is a corner point, the coordinates themselves of the input outline point are determined as outline point coordinate data after the second smoothing processing for the outline point of interest. More specifically, the coordinates of points defined as corner points are not changed. When an outline point of interest is a non-corner point, a value obtained by calculating a weighted mean of the coordinate values of outline points before and after the outline point of interest, and the coordinate value of the outline point of interest is defined as the coordinate value of an outline point after the second smoothing processing for the outline point of interest.

More specifically, the input outline point of interest as a non-corner point is represented by $Pi(xi,yi)$, an outline point immediately before the point Pi in an input outline loop is represented by $Pi-1(xi-1,yi-1)$, and an outline point immediately after the point Pi is represented by $Pi+1(xi+1,yi+1)$. Also, if an outline point after the second smoothing processing for the point Pi of interest is represented by $Qi(xi', yi')$, the point Qi is calculated as:

$xi'=ki-1\cdot xi-1+ki\cdot xi+ki+1\cdot xi+1$ $yi'=ki-1\cdot yi-1+ki\cdot yi+ki+1\cdot yi+1$ In this embodiment, $ki-1=ki+1=¼$, and $ki=½$.

In FIG. 99, points P0, P1, P2, P3, and P4 are some of continuous outline points after the first smoothing processing as input data. Of these points, the points P0 and P4 are corner points, and the points P1, P2, and P3 are non-corner points. The processing results at this time are respectively represented by points Q0, Q1, Q2, Q3, and Q4. Since the points P0 and P4 are corner points, their coordinate values are respectively used as the coordinate values of the points Q0 and Q4, and the point Q1 has a value calculated from the points P0, P1, and P2 according to the above-mentioned equations as the coordinate value. Similarly, the point Q2 is calculated based on the points P1, P2, and P3, and the point Q3 is calculated based on the points P2, P3, and P4.

The CPU 1071 executes the above-mentioned processing for outline data after the first smoothing processing on the RAM area 1076. The processing is executed in the order of the first loop, the second loop, the third loop, . . . , i.e., in units of loops, and upon completion of processing for all the loops, the second smoothing processing is completed. The processing for each loop is executed in the order of the first point, the second point, the third point, . . . , and upon completion of the processing expressed by the above-mentioned equations for all the outline points in the corresponding loop, the processing of the loop is completed. The processing then advances to the next loop. When a given loop includes L outline points, a point immediately before the first point is the L-th point, and a point immediately after the L-th point is the first point.

In the second smoothing processing, outline point data having the same total number of loops as that of the input outline data after the first smoothing processing (excluding a case wherein a one-dot isolated point is removed), and having the same number of outline points as that on each loop are generated. The CPU 1071 outputs the above-mentioned results onto the RAM 1076 or the disk device 1072 in the format shown in FIG. 98, and ends the second smoothing processing in step S1003 in FIG. 68.

The flow then advances to step S1004, and the CPU 1071 transfers the data obtained as a result of the second smoothing processing to the binary image reproduction unit 1005 via the I/O 1075, thus ending the series of processing operations shown in FIG. 68.

The binary image reproduction unit 1005 can comprise an apparatus described in, e.g., Japanese Patent Application No. 3-172098 proposed by the present applicant. This apparatus can output a binary image obtained by painting a region surrounded by a vector figure expressed by outline data after second smoothing processing transferred through the I/O. As disclosed in this patent application, an output image may be visualized using a binary image output unit such as a video printer.

In this embodiment, the binary image reproduction unit may comprise an apparatus described in Japanese Patent Application No. 3-172097 or 3-172099 proposed by the present applicant.

Furthermore, in the above description, the binary image output unit of this embodiment comprises a video printer. However, this unit may comprise, e.g., a display apparatus or a transmission unit to an external communication path.

In this embodiment, the binary image acquisition unit may comprise a reception unit from an external communication path.

In this embodiment, the outline enlarging/compressing processing is executed simultaneously with the first smoothing processing, but may be executed simultaneously with the second smoothing processing, so as not to be executed during the first smoothing processing. Of course, only the enlarging/compressing processing may be executed after completion of the first smoothing processing, and after the enlarging/compressing processing is completed for all the outline data, the second smoothing processing may be executed. The enlarging/compressing processing can be easily realized by multiplying outline data before enlarging/compressing processing with magnifications obtained from the magnification setting unit. Also, the enlarging/compressing processing may be executed after the second smoothing processing.

In the above embodiment, the weighting coefficients $ki-1$, $ki$, and $ki+1$ in the second smoothing processing assume $ki-1=ki+1=¼$, and $ki=½$. However, the present invention is not limited to this. For example, these coefficients may assume, e.g., $ki-1=ki+1=⅛$ and $ki=¾$.

Figure 100:
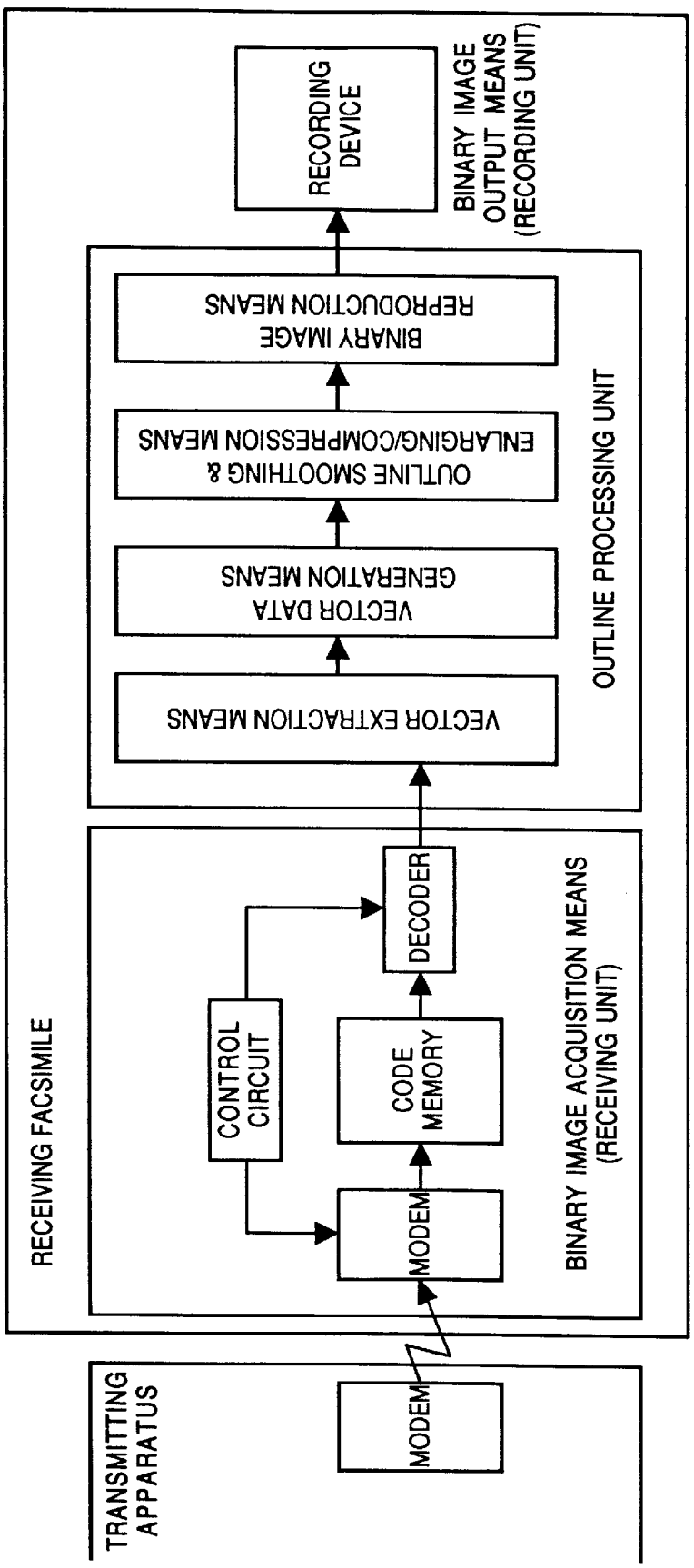
FIG. 100 is a block diagram upon application to a receiving facsimile apparatus.
Figure 101:
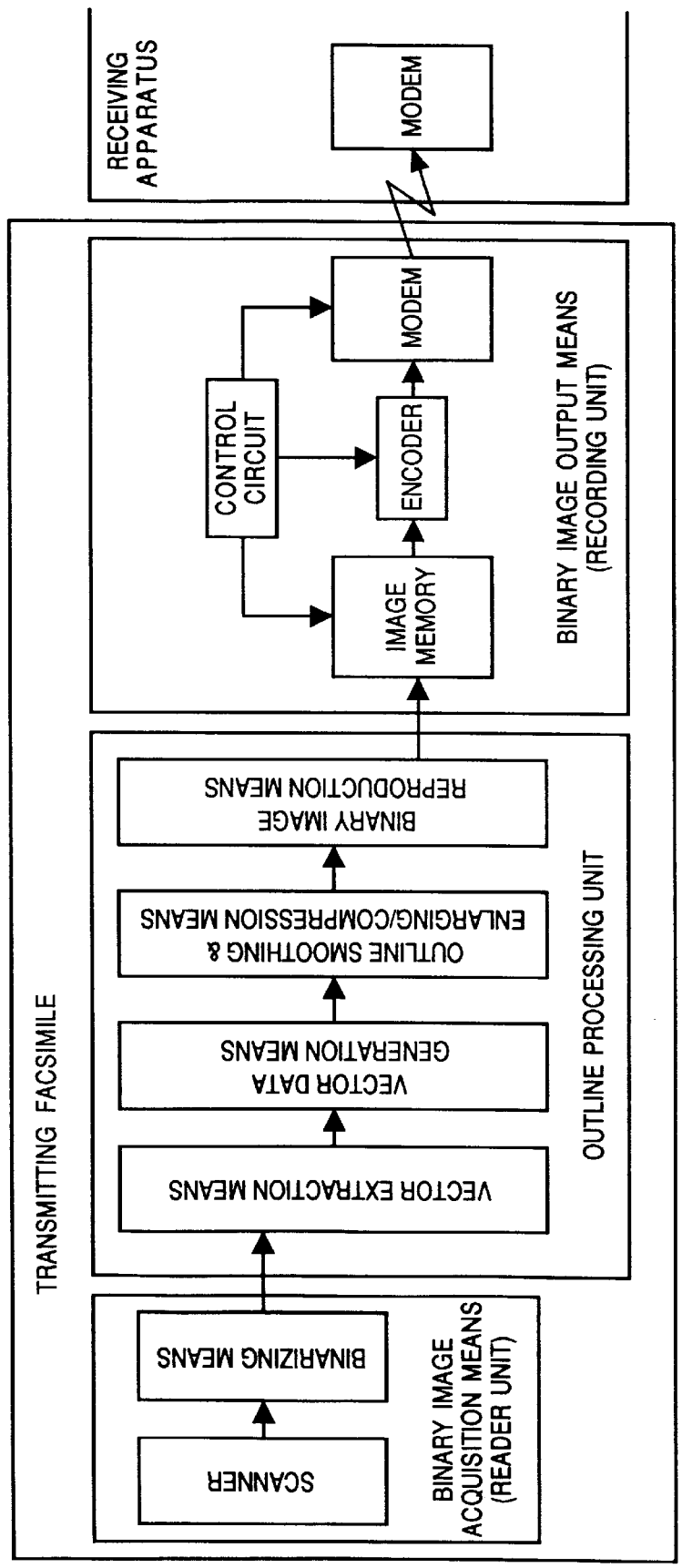
FIG. 101 is a block diagram upon application to a transmitting facsimile apparatus.
Figure 102:
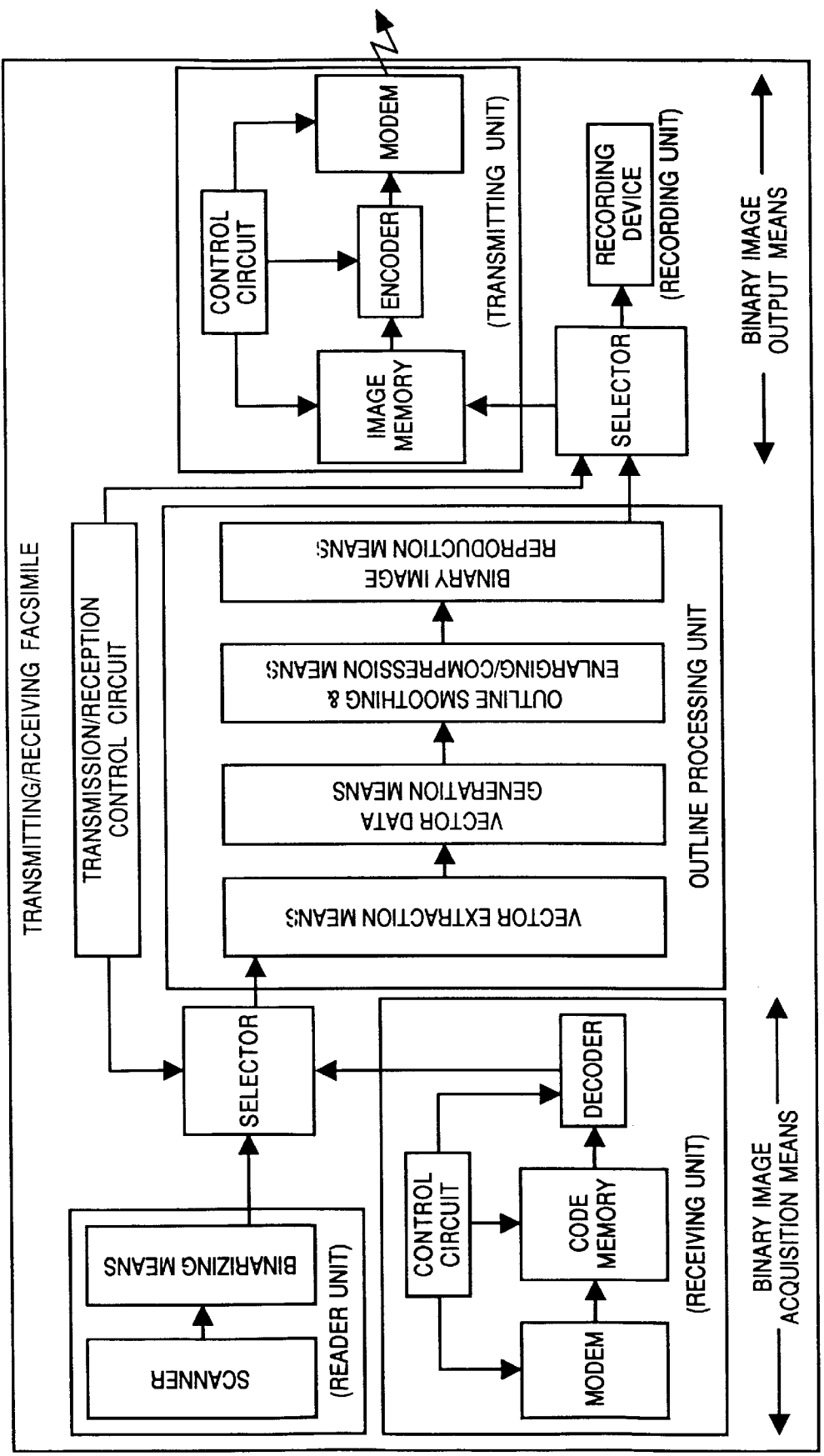
FIG. 102 is a block diagram upon application to a transmitting/receiving facsimile apparatus.

FIGS. 100, 101, and 102 show arrangements when this embodiment is applied to a facsimile apparatus.

FIG. 100 is a block diagram when this embodiment is applied to a receiving facsimile apparatus. This apparatus generates input binary image data by decoding codes transmitted as, e.g., MH codes, and executes outline processing. A binary image re-generated by an outline processing unit is output onto, e.g., a paper sheet by a recording apparatus, or is displayed on a display apparatus (not shown).

FIG. 101 is a block diagram when this embodiment is applied to a transmitting facsimile apparatus. This apparatus generates input image data by binarizing an image signal input through, e.g., a scanner, and executes outline processing. A binary image re-generated by outline processing is stored in an image memory, is converted into codes such as MH codes, and these codes are then transmitted.

FIG. 102 is a block diagram when this embodiment is applied to a transmitting/receiving facsimile apparatus. In this case, the above-mentioned two arrangements are combined. Selectors are controlled by a transmission/reception control circuit, thus determining input/output data to/from an outline processing unit according to a transmission or reception mode. A reader may be selected as a binary image acquisition unit, and a recording apparatus may constitute (or may be selected as) a binary image output unit. In this case, a digital copying machine (or copy mode) having a enlarging/compressing function can be realized.

Note that the present invention can be applied to either a system constituted by a plurality of devices or an apparatus consisting of a single device. The present invention can also be applied to a case wherein the invention is achieved by supplying a program to a system or an apparatus.

As described above, according to this embodiment, a binary image is input in units of lines. When one input line constitutes a white raster, outline vector data extracted so far can be transferred to the outline smoothing & enlarging/compressing unit 1004. Therefore, the control need not wait until the entire binary image is input, and high-speed processing can be attained. In particular, when the outline extraction unit 1003 and the outline smoothing & enlarging/compressing unit 1004 are controlled by independent controllers (e.g., CPUs), the processing speed can be remarkably increased. When the next line constitutes a white raster, the outline extraction unit 1003 can supply outline vector data detected so far to the outline smoothing & enlarging/compressing unit 1004, and need not hold coarse outline vector data for the entire image, thus reducing the memory capacity.

The present invention is not limited to the above embodiments and various changes and modifications can be made within the spirit and scope of the present invention. Therefore, to apprise the public of the scope of the invention, the following claims are made.

What is claimed is:

1. An image processing apparatus which processes pixel matrix image data, said apparatus comprising:

extraction means for extracting vector data including coordinate value data and connection information data based on inputted image data for plural lines of pixels, the coordinate value data defining vectors and the connection information data defining other vectors connected with the vectors defined by the coordinate value data;

determination means for determining whether or not a line is entirely white; and sort means for sorting, when the line is determined to be entirely white by said determination means, the coordinate value data so that the vectors are arranged in connection order of the vectors based upon the extracted vector data, and for outputting the sorted coordinate value data, wherein, when the line is determined to be not entirely white by said determination means, a line subsequent to the plural lines is inputted to said extraction means and said extraction means proceeds to extract vector data from image data including the subsequent line.

2. An apparatus according to claim 1, further comprising input means for inputting image data in a raster scanning order.

3. An apparatus according to claim 1, wherein said extraction means extracts vector data which represents one pixel by four vectors.

4. An apparatus according to claim 1, wherein the coordinate value data include a coordinate of a starting point of a vector and the connection information data include information defining a flow-in vector flowing into a start point of the vector defined by the coordinate and a flow-out vector flowing from an end point of the vector defined by the coordinate.

5. An apparatus according to claim 1, further comprising:

reproduction means for magnifying coordinate value data outputted from said sort means and for reproducing image data based upon magnified coordinate value data; and output means for outputting image data reproduced by said reproduction means.

6. An apparatus according to claim 5, wherein said output means includes a printing device.

7. An apparatus according to claim 1, wherein said extraction means extracts the vector data from 3 by 3 pixels.

8. An image processing method for processing pixel matrix image data, said method comprising the steps of:

extracting vector data including coordinate value data and connection information data based on inputted image data for plural lines of pixels, the coordinate value data defining vectors and the connection information data defining other vectors connected with the vectors defined by the coordinate value data;

determining whether or not a line is entirely white; and sorting, when the line is determined to be entirely white in said determining step, the coordinate value data so that the vectors are arranged in connection order of the vectors based upon the extracted vector data and outputting the sorted coordinate value data, wherein, when the line is determined to be not entirely white, a subsequent line to the plural lines is inputted in said extracting step and vector data extraction from image data including the subsequent line is processed in said extracting step.

9. A method according to claim 8, further comprising an inputting step of inputting image data in a raster scanning order.

10. A method according to claim 8, wherein said extracting step comprises extracting vector data which represents one pixel by four vectors.

11. A method according to claim 8, wherein the coordinate value data include a coordinate of a starting point of a vector and the connection information data include information defining a flow-in vector flowing into a start point of the vector defined by the coordinate and a flow-out vector flowing from an end point of the vector defined by the coordinaete.

12. A method according to claim 8, further comprising the steps of:

magnifying coordinate value data outputted in said sorting step and reproducing image data based upon magnified coordinate value data; and outputting image data reproduced in said magnifying/reproducing step.

13. A method according to claim 12, wherein said outputting step comprises outputting the image data by a printing device.

14. A method according to claim 8, wherein said extracting step comprises extracting the vector data from 3 by 3 pixels.

15. A computer readable medium storing a program for processing pixel matrix image data which comprises the processing steps of:

extracting vector data including coordinate value data and connection information data based on inputted image data for plural lines of pixels, the coordinate value data defining vectors and the connection information data defining other vectors connected with the vectors defined by the coordinate value data;

determining whether or not a line is entirely white; and sorting, when the line is determined to be entirely white in said determining processing step, the coordinate value data so that the vectors are arranged in connection order of the vectors based upon the extracted vector data and outputting the sorted coordinate value data, wherein, when the line is determined to be not entirely white, a subsequent line to the plural lines is inputted in said extracting processing step and vector data extraction from image data including the subsequent line is processed in said extracting processing step.

16. A medium according to claim 15, further comprising an inputting processing step of inputting image data in a raster scanning order.

17. A medium according to claim 15, wherein said extracting processing step comprises extracting vector data which represents one pixel by four vectors.

18. A medium according to claim 15, wherein the coordinate value data include a coordinate of a starting point of a vector and the connection information data include information defining a flow-in vector flowing into a start point of the vector defined by the coordinate and a flow out vector flowing from an end point of the vector defined by the coordinate.

19. A medium according to claim 15, further comprising the processing steps of:

magnifying coordinate value data outputted in said sorting processing step and reproducing image data based upon magnified coordinate value data; and outputting image data reproduced in said magnifying/reproducing processing step.

20. A medium according to claim 19, wherein said outputting processing step comprises outputting the image data by a printing device.

21. A medium according to claim 15, wherein said extracting processing step extracts the vector data from 3 by 3 pixels.

* * * * *

UNITED STATES PATENT AND TRADEMARK OFFICE
CERTIFICATE OF CORRECTION

PATENT NO. : 5,933,528

DATED : August 3, 1999

INVENTOR(S): AKIHIRO KATAYAMA, ET AL.

It is certified that error appears in the above-identified patent and that said Letters Patent is hereby corrected as shown below:

COLUMN 2

Line 16, "redetermined" should read --predetermined--.

COLUMN 7

Line 1, "*" should read --∅--.
    Line 18, "point}," should read --point),--.

COLUMN 9

Line 14, "FIG. is" should read --FIG. 25 is--.

COLUMN 13

Line 24, "mined" should read --mined whether--.

COLUMN 17

Line 45, "operation" should read --operations--.

UNITED STATES PATENT AND TRADEMARK OFFICE
CERTIFICATE OF CORRECTION

PATENT NO. : 5,933,528

DATED : August 3, 1999

INVENTOR(S): AKIHIRO KATAYAMA, ET AL.

It is certified that error appears in the above-identified patent and that said Letters Patent is hereby corrected as shown below:

COLUMN 21

Line 7, "2j 30 1)]" should read --2j+1)]--.

COLUMN 38

Line 11, "secondprevious" should read --second-previous--.
Line 29, "Step" should read --In step--.

Signed and Sealed this

Twenty-third Day of May, 2000

Attest:

Q. TODD DICKINSON

Attesting Officer        Director of Patents and Trademarks